US012665453B2

(12) United States Patent
Pennington, III et al.

(10) Patent No.: US 12,665,453 B2
(45) Date of Patent: Jun. 23, 2026

(54) ELECTRIC MOTORS

(71) Applicant: Tau Motors, Inc., Redwood City, CA (US)

(72) Inventors: Walter Wesley Pennington, III, Los Altos, CA (US); Matthew J Rubin, Indianapolis, IN (US); Gregory Gordon Stevenson, San Carlos, CA (US); Michael Parker Owen, Raleigh, NC (US)

(73) Assignee: TAU MOTORS, INC., Redwood City, CA (US)

( * ) Notice: Subject to any disclaimer, the term of this patent is extended or adjusted under 35 U.S.C. 154(b) by 155 days.

(21) Appl. No.: 18/593,229

(22) Filed: Mar. 1, 2024

(65) Prior Publication Data

US 2024/0204591 A1 Jun. 20, 2024

Related U.S. Application Data

(63) Continuation of application No. 18/083,461, filed on Dec. 16, 2022, now Pat. No. 11,949,289, which is a
(Continued)

(51) Int. Cl.
*H02K 1/22* (2006.01)
*H02K 1/02* (2006.01)
(Continued)

(52) U.S. Cl.
CPC .............. *H02K 1/223* (2013.01); *H02K 1/02* (2013.01); *H02K 21/16* (2013.01); *H02P 7/29* (2013.01); *H02P 2207/05* (2013.01)

(58) Field of Classification Search
CPC .......... H02K 1/223; H02K 1/02; H02K 21/16; H02K 21/14; H02P 7/29; H02P 2207/05; H02P 25/022; H02P 25/03
(Continued)

(56) References Cited

U.S. PATENT DOCUMENTS 5,907,202 A 5/1999 Muraji
6,051,952 A * 4/2000 Moreira .................. H02P 25/04
318/738

(Continued)

FOREIGN PATENT DOCUMENTS

CN 1933298 A 12/2010
CN 103348585 A 10/2013
(Continued)

OTHER PUBLICATIONS

A Handbook of electric vehicles, vol. 5, Drive motors and power electronics, Nov. 30, 2019 He Shijuan, Wang Rong, Chen Wenlong, Beijing, China Machine Press pp. 77-79 Jan. 2024.
(Continued)

*Primary Examiner* — David Luo

(74) *Attorney, Agent, or Firm* — Quarles & Brady, LLP

(57) ABSTRACT

A stator defines multiple stator poles with associated electrical windings. A rotor includes multiple rotor poles. The rotor is movable with respect to the stator and defines, together with the stator, a nominal gap between the stator poles and the rotor poles. The rotor poles includes a magnetically permeable pole material. The rotor also includes a series of frequency programmable flux channels (FPFCs). Each FPFC includes a conductive loop surrounding an associated rotor pole. The stator and the rotor are arranged such that the electrical windings in the stator induce an excitement current within at least one of the FPFCs during start-up.

19 Claims, 91 Drawing Sheets

Related U.S. Application Data continuation of application No. 17/151,978, filed on Jan. 19, 2021, now Pat. No. 11,563,347.

(60) Provisional application No. 62/962,159, filed on Jan. 16, 2020.

(51) Int. Cl.
   *H02K 21/16*      (2006.01)
   *H02P 7/29*       (2016.01)

(58) Field of Classification Search
   USPC .................................. 318/400.2, 400.01, 700
   See application file for complete search history.

(56)                    References Cited

U.S. PATENT DOCUMENTS

| | | | |
|---|---|---|---|
| 6,873,071 B2 | 3/2005 | Dooley | |
| 7,375,488 B2 * | 5/2008 | Jones | H02P 25/102 |
| | | | 318/725 |
| 9,013,083 B2 | 4/2015 | Morita | |
| 10,052,730 B2 * | 8/2018 | Cheng | H02P 7/28 |
| 10,424,981 B2 | 9/2019 | Kusase | |
| 2006/0290316 A1 | 12/2006 | Seguchi et al. | |
| 2013/0334937 A1 | 12/2013 | Yamada et al. | |
| 2015/0318774 A1 | 11/2015 | Tremelling et al. | |
| 2017/0222504 A1 | 8/2017 | Kusase et al. | |
| 2020/0052557 A1 | 2/2020 | Rubin et al. | |

FOREIGN PATENT DOCUMENTS

| | | |
|---|---|---|
| JP | 2007-185082 A | 7/2007 |
| JP | 2011-041433 A | 2/2011 |
| JP | 2019-126143 A | 7/2019 |
| WO | 2019226929 A1 | 11/2019 |

OTHER PUBLICATIONS

Annex to PCT International Preliminary Report on Patentability Ch. II in International Appln. No. PCT/US2021/013750, dated Apr. 4, 2022, 8 pages.

PCT Second Written Opinion in International Appln. No. PCT/US2021/013750, dated Dec. 21, 2021, 7 pages.

PCT International Preliminary Report on Patentability Ch. II in International Appln. No. PCT/US2021/013750, dated Apr. 4, 2022, 9 pages.

PCT International pages Search Report and Written Opinion in International Appln. No. PCT/US2021/013750, dated May 11, 2021, 11 pages.

* cited by examiner

600

600

600

700

708

710

600

800

800

800

900

910

800

908

920

902

1608

1620

1608

1620

1700

1701

1720

1710

1810

1803

1801

1800

2100

2200

2400

2302

2306

2300

3101

3120 2306

3108

3100

3101

3120

3100

3108

3101

3120

3108

3100

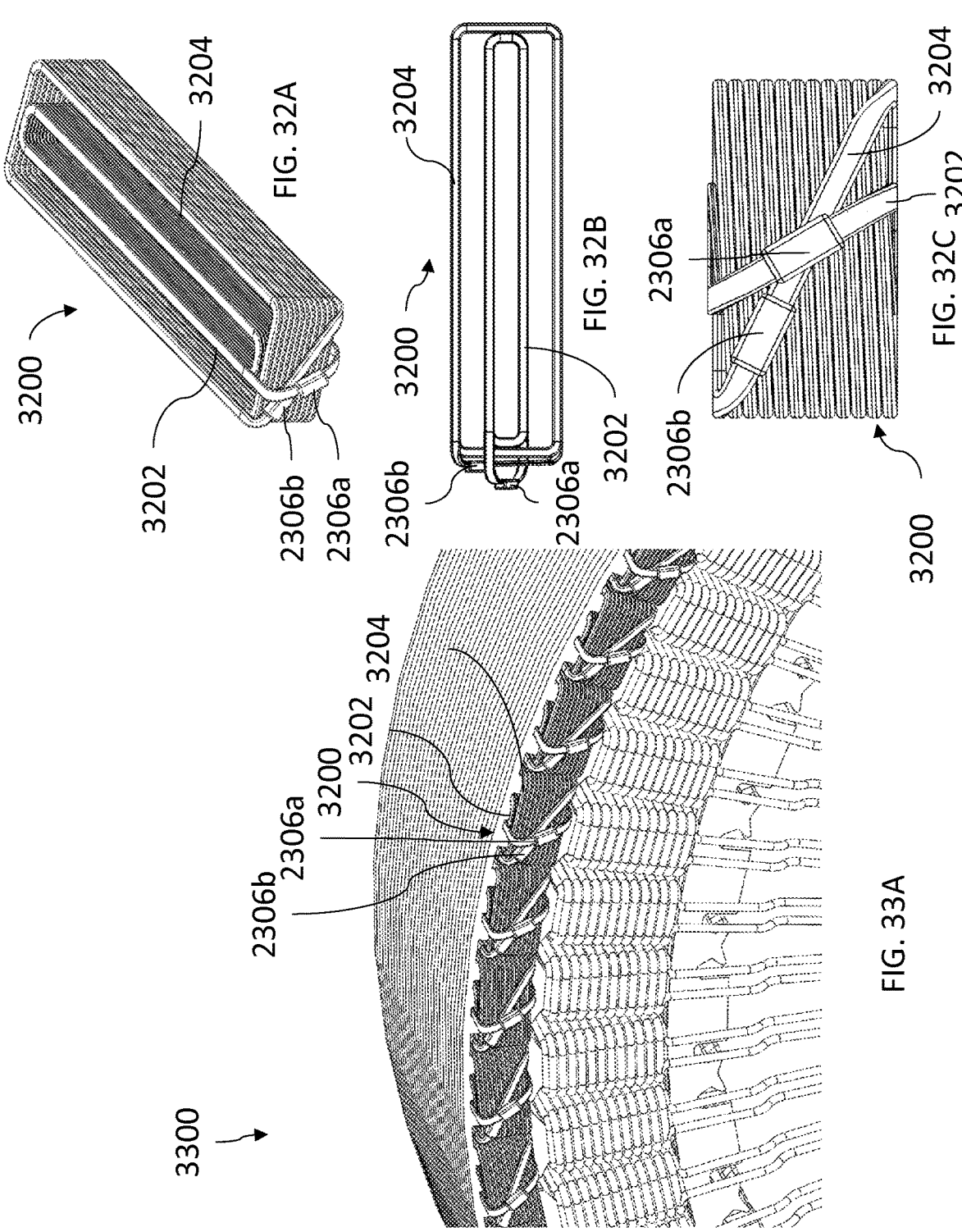

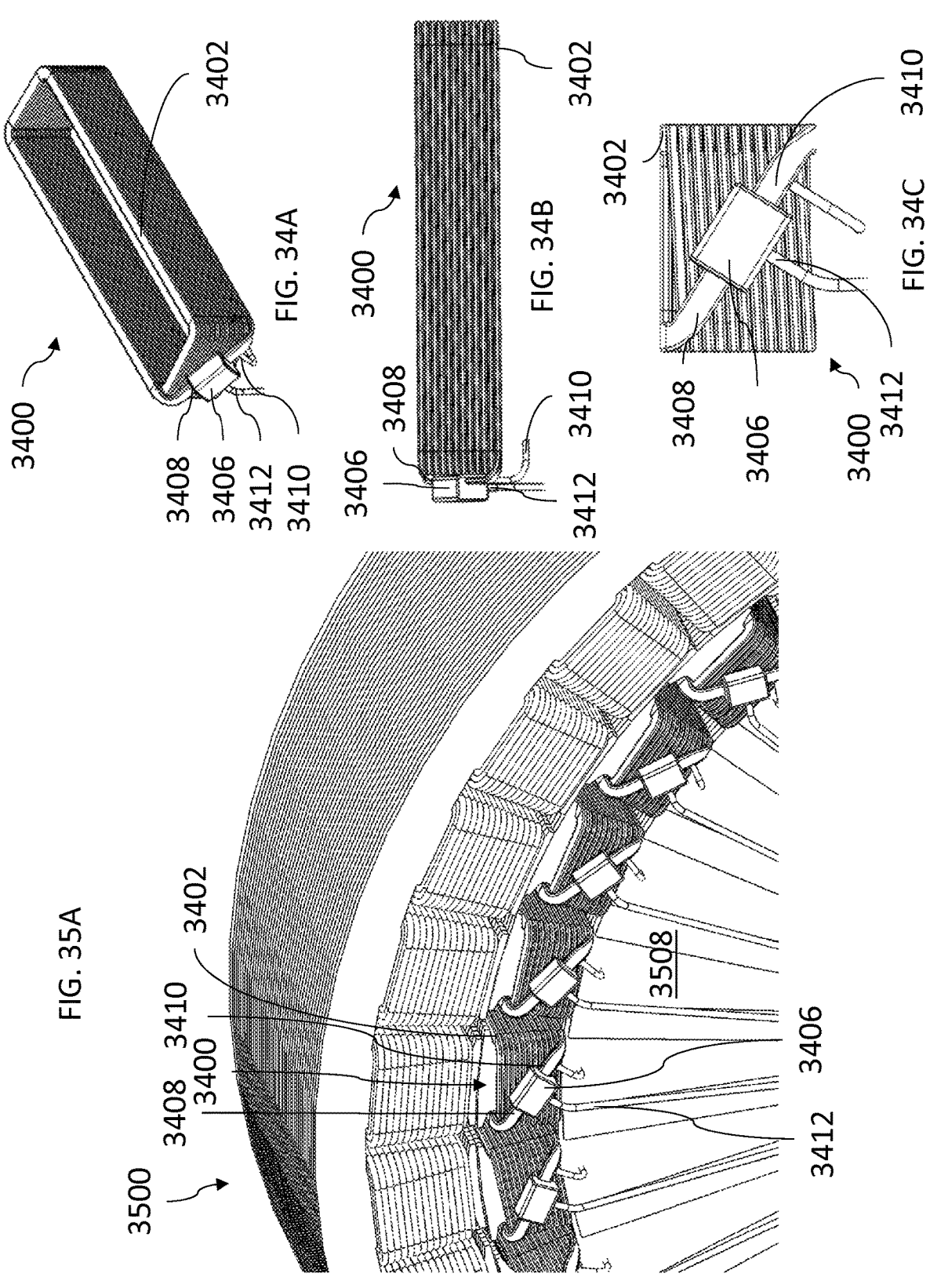

3500

3508

3500

3508

3706

3700

3706

3700

Phase A
Phase B
Phase C

"Hard" Ferromagnetic Material

"Soft" Ferromagnetic Material

ELECTRIC MOTORS

CROSS-REFERENCE TO RELATED APPLICATIONS

This application is a continuation of U.S. application Ser. No. 18/083,461, filed Dec. 16, 2022, which application is a continuation of U.S. application Ser. No. 17/151,978, filed Jan. 19, 2021, granted to patent on Jan. 24, 2023, as U.S. Pat. No. 11,563,347, which claims priority U.S. Provisional Application No. 62/962,159 filed Jan. 16, 2020, all of which are herein incorporated by reference in their entireties.

TECHNICAL FIELD

This disclosure relates to electric motors and operation of such motors.

BACKGROUND

Two of the ways in which the performance of electric motors may be characterized is by their torque/force and their output power. The output power of a rotary motor is a product of a torque that a motor generates and an angular velocity of its output shaft. For a linear motor, the output power is a product of linear force and speed. Conventionally, there are two primary means to directly increase the motor performance: (1) by increasing the size of the motor and (2) by creating a stronger magnetic field within the motor itself. While the ultimate size of a motor limits its specific useful applications, increasing the magnetic field to thereby increase the electromagnetic force may be considered as a key to enable greater motor performance and further broader applications of motor technology.

SUMMARY

Various aspects of this disclosure feature a motor with frequency programmable flux channels (FPFCs) disposed around passive poles to alter the path of magnetic flux and to reflect flux produced in operation to provide a greater component of magnetically induced motive force aligned with movement direction (to provide useful torque and/or linear force).

An example implementation of the subject matter describe within this disclosure is an electric machine with the following features. A stator defines multiple stator poles with associated electrical windings. A rotor includes multiple rotor poles. The rotor is movable with respect to the stator and defines, together with the stator, a nominal gap between the stator poles and the rotor poles. The rotor poles include a magnetically permeable pole material. The rotor also includes a series of frequency programmable flux channels (FPFCs). Each FPFC includes a conductive loop surrounding an associated rotor pole.

An example implementation of the subject matter described within this disclosure is an electric machine with the following features. A stator is configured to generate a controlled magnetic field. A rotor is configured to move with respect to the stator responsive to the controlled magnetic field. The rotor defines, together with the stator, a nominal gap between a surface of the rotor and a surface of the stator. The rotor includes a magnetically permeable pole material. The rotor includes a variable magnetomotive force source controllable by the controlled magnetic field produced by stator.

An example implementation of the subject matter described within this disclosure is a motor control method with the following features. A pulse of magnetizing current is applied over time to a stator coil of a stator pole when the stator pole is aligned with a rotor pole across a nominal gap. The magnetizing current is configured to charge a magnetic field within the rotor pole through induced coupling. A load current pulsed over time is applied to the stator coil when rotor pole is positioned between adjacent stator poles. The load current pulses stiffen the magnetic field within the rotor pole. The pulsed load current includes more pulses per increment of time than pulse the magnetizing current.

An example implementation of the subject matter described within this disclosure is a motor control method with the following features. A rotor pole of an electric machine is magnetically hardened through current around the rotor pole. The current is induced by a current flowing through a stator coil. Motion of the rotor with respect to the stator is induced by an electromotive force produced by the current flowing through the stator coil and the current flowing around the rotor pole.

An example implementation of the subject matter described within this disclosure is a method of starting a three-phase electric motor. The method has the following features. Direct current is flowed through a stator winding associated with a phase of stator winding for a duration of time. Then, an inverted direct current is pulsed for a second duration of time through the stator winding associated with the phase.

An example implementation of the subject matter described within this disclosure is a method of driving an electric motor. The method having the following feature. An average flux of an electric rotor is increased primarily through a waveform excitation from a stator.

Implementations previously described can include any, all, or none of the following features.

The stator and the rotor are arranged such that the electrical windings in the stator excite a current within at least one of the FPFCs during start-up.

The stator and the rotor are arranged such that the electrical windings in the stator magnetize at least one of the rotor poles during start-up.

An excitement current of the FPFC is produced by an electrical windings in the stator during operation.

The conductive loop includes material more conductive than a rotor core material.

The conductive loop includes material less magnetically permeable than a rotor core material.

Each of the FPFCs do not overlap with an adjacent FPFC.

The conductive loop includes a substantially uniform inductance. The substantially uniform inductance can be in a radial direction.

The conductive loop includes at least one turn of shorted conductive material.

The conductive loop includes shorted litz wire.

A thickness of individual conductors within the conductive loop is small enough for full skin effect penetration for a drive frequency. The drive frequency can between 0 hertz and 20 hertz. The drive frequency extends between 100 hertz and 2,000 hertz, or in excess of 20,000 hertz.

The conductive loop includes a rectifier in series with two ends of the conductive loop. The rectifier can include a diode. The diode can be a p-n junction diode. The diode can be a Schottky diode. The Schottky diode can be a silicon carbide diode. The diode can be a gas diode. The diode can be a Zener diode.

The conductive loop includes a discrete capacitor in series with two ends of the conductive loop. The capacitor can be connected in parallel with the diode.

The conductive loop includes a logic circuit in series with two ends of the conductive loop. The logic circuit can include a transistor. The transistor can include a field effect transistor, a dual gate field effect transistor, or a bipolar junction transistor.

The conductive loop is a first conductive loop, each FPFC further comprises a second conductive loop the associated rotor pole and an additional rotor pole adjacent the first rotor pole. The second conductive loop can include material more conductive than a rotor core material. The second conductive loop can include material less magnetically permeable than a rotor core material. The first conductive loop can include a first substantially uniform inductance and the second conductive loop can include a second substantially uniform inductance. The second substantially uniform inductance can be in a radial direction. The second substantially uniform inductance can be substantially similar to the first substantially uniform inductance. The second conductive loop can include at least one turn of shorted conductive material. The second conductive loop can include shorted litz wire. A thickness of individual conductors within the second conductive loop can be small enough for full skin effect penetration for a drive frequency. The second conductive loop can surround a third additional rotor pole adjacent to the first rotor pole. The second conductive loop can include a logic circuit in series with two ends of the second conductive loop. The logic circuit can include a transistor. The transistor can include a field effect transistor, a dual gate field effect transistor, or a bipolar junction transistor. The second conductive loop can include a rectifier in series with two ends of the conductive loop. The rectifier can include a diode. The diode can be a p-n junction diode. The diode can be a Schottky diode. The Schottky diode can be a silicon carbide diode. The diode is can be a Zener diode. The diode can be a gas diode. The second conductive loop can include a discrete capacitor in series with two ends of the conductive loop. The capacitor can be connected in parallel with the diode.

The rotor circumferentially surrounds the stator.

The stator circumferentially surrounds the rotor.

The rotor and the stator are separated by an axial gap.

The electric machine is a motor.

Each of the rotor poles includes a material with a non-zero remanence.

A controller configured to apply a pulse of magnetizing current over time to a stator coil of a stator pole when the stator pole is aligned with a rotor pole across a nominal gap. The magnetizing current is configured to charge a magnetic field within the rotor pole through induced coupling. The controller is also configured to apply a load current pulsed over time to the stator coil when rotor pole is positioned between adjacent stator poles. The load current pulses stiffen the magnetic field within the rotor pole. The pulsed load current includes more pulses per increment of time than pulse the magnetizing current.

The rotor further includes permanently magnetic channels. The permanent magnet channels can be located at respective rotor poles. The permanent magnet channels can be located between the FPFCs and the stator. The permanent magnet channels can be located within a back-iron of the rotor. The permanently magnetic channels can include ferrite. The permanently magnetic channels can include SmFeN. The permanently magnetic channels can include N35. The permanently magnetic channels can include N45.

The rotor includes a plurality of permanently magnetic spokes extending from a central axis of the rotor. The spokes can be positioned between the FPFCs.

The magnetizing current is applied as a single pulse of current over time. The single pulse of current can include a half-sine wave. The single pulse of current can include a half-square wave. The single pulse of current can include a half-trapezoidal wave. Applying the magnetizing current can strongly couple the rotor pole to the stator pole.

The pulsed load current is applied as multiple current pulses over time as a rotor rotates from a first pole to a second pole. The multiple current pulses can include half-sine waves. The multiple current pulses can include half-square waves. The multiple current pulses can include half-trapezoidal waves. The multiple current pulses can include full sine waves. The multiple current pulses can include full square waves. The multiple current pulses can include full trapezoidal waves. The multiple current pulses are not a function of a rotor speed. The multiple current pulses are applied between five to ten hertz.

A rotor flux is maintained within a desired range during peak load condition. The desired range can vary within 50-100%. The desired range can vary within 65-100%. The desired range can vary within 80-100%.

The stator includes permanent magnet channels. The control method further includes adjusting a strength of apparent magnetism within the permanent magnet channels. The permanent magnet channels can include ferrite.

The rotor includes permanent magnet spokes. The control method further includes adjusting a strength of apparent magnetism within the permanent magnet spokes.

The variable magnetomotive force source includes a series of frequency programmable flux channels (FPFCs). Each FPFC includes a conductive loop surrounding an associated rotor pole. An excitement current of the FPFC is produced by the controlled magnetic field in the stator during start-up.

The electric rotor is rotated synchronously with the waveform.

Increasing the average flux includes applying a magnetizing current to a stator coil of a stator pole when the stator pole is aligned with a rotor pole across a nominal gap. The magnetizing current is configured to stiffen a magnetic field within the rotor pole.

A pulsed load current is applied to the stator coil when rotor pole is positioned between adjacent stator poles. The pulsed load current is configured to induce a motive force to the rotor. The pulsed load current includes more pulses than the magnetizing current.

A rotor pole of the electric machine magnetically softened. Magnetically softening can include changing an excitation waveform, produced by current flowing through the stator, to allow magnetic decay within the rotor pole, or adjusting a control circuit within the rotor pole.

The rotor pole magnetically hardened is in response to a sinusoidal drive frequency.

The direct current is flowed for nine milliseconds and the inverted direct current is pulsed for one millisecond.

A ratio of duration of direct current to a duration of pulsing inverted current is 1:1 to 100:1. A ratio of duration of direct current to a duration of pulsing inverted current can be 5:1 to 15:1. A ratio of duration of direct current to a duration of pulsing inverted current can be 9:1.

A rotor is rotated responsive to flowing the direct current and pulsing the inverted direct current. Then, an alternating current is flowed through a phase of the stator winding.

As used herein, the term "electric motor" also includes electric generators that generate electrical power from mechanical power.

By 'nominal gap' we mean a gap between relatively moving surfaces of the stator (or active magnetic component) and rotor (or passive magnetic component) poles, across which gap magnetic flux extends during motor operation to induce a force on the rotor (or passive magnetic component). We use the term 'active magnetic component' to refer to that portion of a motor that includes electrical windings associated with respective magnetically permeable structures in which magnetic flux is generated by current flowing in the windings whose purpose generally includes directly transferring power into or out of the machine. The poles of an 'active magnetic component' are referred to as 'active poles'. The electrical windings will generally be held in fixed relation to corresponding active poles. A wound stator is an example of an active magnetic component. We use the term 'passive magnetic component' to refer to that portion of the motor upon which a motive force is induced by magnetic flux generated by the active magnetic component, to extend into the passive magnetic component across the nominal gap. The poles of a 'passive magnetic component' are referred to as 'passive poles'. A non-wound rotor is an example of a passive magnetic component. The nominal gap may be radial, as in a radial gap motor, or axial, as in an axial gap motor, for example, and may be filled with air or other gas, or even a liquid, such as a coolant.

By 'flux barrier' we mean a structure that defines at least one electrically conductive path in which a flow of current is induced by a changing magnetic field. Generally, eddy currents will be induced in the flux barrier that cause destructive interference of an impending magnetic field, such that the flux barrier effectively acts to inhibit a change in magnetic flux during motor operation, which in some cases will result in a repulsive force that will act to increase an induced motive force on the passive poles. More specifically, a flux barrier allows zero flux to pass through it. Examples of flux barriers are described in application Ser. No. 16/534,217, filed on Aug. 7, 2019, which claims priority to provisional application No. 62/715,386, filed on Aug. 7, 2019, both of which are hereby incorporated by reference.

By 'frequency programmable flux channel' (FPFC) we mean a structure that defines at least one electrically conductive path around at least the pole segment of at least one rotor pole where the conductive path has a substantially uniform inductance. In some implementations the electrically conductive path fully encircles at least one rotor pole. In some cases, a stator pole can be encircled as well. In some cases, the electrically conductive loops can be non-overlapping. Generally, a current will be induced in the electrically conductive path to resist a change in the magnetic flux density of its corresponding pole. This causes a reflective or resistant magnetic field, such that the FPFC can controllably attenuate a change in magnetic flux during operation, which in some cases will result in a repulsive force that will act to increase an induced motive force on the passive poles. More specifically, in contrast with a flux barrier, an FPFC allows for zero flux or non-zero flux to pass through it responsive to a control frequency received from the stator windings.

By 'flux pinning' we mean the resistance of topological movement of a flux location. In other words, flux is directed through a specified location, typically within a tooth of a rotor or a tooth of a stator.

By 'electrical conductivity' we mean the propensity of a material to conduct electricity. With respect to structures in which current is constrained to flow in a principal direction, such as a wire, we mean the conductivity in that principal direction.

By 'electrically isolated from one another' we mean that the ohmic resistance to an electric potential within a flux barrier is at least 10 times less than the ohmic resistance between flux barriers. To say that they are isolated from one another external to the ferromagnetic material does not preclude that they are in electrical communication through the ferromagnetic material of the layers. In fact, in many cases the flux barriers are electrically connected through the ferromagnetic material.

By 'electrically conductive' we mean that a material or structure is at least as conductive as amorphous carbon at typical motor operating voltages, or has a conductivity greater than 1000 Siemens per meter. Examples of electrically conductive materials include silver, copper, aluminum, nickel, iron, and electrical steel (grain oriented or otherwise). Examples of non-conductive materials include non-filled resins, air, wood, and cotton. We use the term 'insulator material' to refer to materials that are non-conductive or not electrically conductive.

By 'finite width' we mean that the layer has opposite edges and does not, for example, extend around an entire circumference of the rotor (or along an entire length of a linear passive magnetic component).

Similarly, by 'finite thickness' we mean that the layer extends to a limited depth and does not, for example, extend entirely through the rotor.

By 'electrical current skin depth' we mean the depth from the surface of a conductor at which electric current mainly flows, particularly eddy current induced from a magnetic field changing at a given frequency. For a given material, skin depth can be calculated as:

$$\delta \approx 1/\sqrt{\pi f \mu \sigma}$$

where 'f' is the magnetic switching frequency, $\mu$ is the magnetic permeability (in H/mm) of the material, and o is the electrical conductivity (in % AICS) of the material.

By 'magnetic permeability' we generally mean the ability for a material to support the formation of a magnetic field. The magnetic permeability of a material can be determined in accordance with ASTM A772. When we say that a material is 'magnetically permeable' we mean that it has a magnetic permeability of at least $1.3 \times 10^{-6}$ Henries per meter.

By 'transmissible range' we mean the frequency range over which the magnetic permeability depreciates by no more than 10 db relative to the permeability at 60 hz, as measured under static frequency conditions (e.g., with permeability measurements for a given frequency taken over at least 5 cycles of the applied field).

Several features described within this disclosure include frequency programmable flux channels (FPFCs) to increase the performance of an electric motor, e.g., in high torque and power densities. The flux barriers have dynamic (or transient) diamagnetic properties. By utilizing the FPFCs in the motor, significant gains in torque can be achieved by directing magnetic flux substantially more tangential, where the magnetic field is altered by redirecting a radial force (or normal force) along the tangential direction. That is, the average force vector during operation is substantially more tangential where the predominant force vector in traditional motor designs is radial in nature.

The magnetic permeability of the FPFCs can be controlled by adjusting a magnetic frequency of induced currents in the FPFCs, e.g., by pulsing current through electrical windings of active poles. In such a way, the electric motors can have significantly different magnetic properties at different magnetic frequencies: at low frequencies, the properties of the FPFCs are ferromagnetic; at medium to high operational frequencies, the magnetic permeability of the flux barrier can be less than that of air, and the properties of the FPFCs can be diamagnetic.

Some implementations describe herein can also create a high reactance circuit where the magnetic field does not permeate through the electromagnetic cycle, but is substantially reflected. This can reduce or eliminate flux fringing. Unlike a traditional permanent magnet (PM) motor, a reduced flux permeates FPFCs in the motors that utilize FPFCs within their design, which can avoid demagnetization (coercive force) and excessive heat during operation. Moreover, the FPFCs can produce a magnetic field during operation depending on the frequency imparted by the stator windings, so they can behave like PM motors in certain conditions, thus allowing lower energy permanent magnetic materials to be used, or in some cases, eliminated entirely.

Aspects of this disclosure can be applied to various types of motors to improve their performances. The motors can be radial-gap motors or axial-gap motors or linear motors. The motors can be switched reluctance motors (SRMs), induction motors (IMs), or permanent magnet motors (PMs), for example.

Various implementations disclosed herein can provide particularly high motor performance with significant torque/force and power densities, and can be used to provide essentially smooth and efficient output shaft power for propelling vehicles, as well as in stationary systems. The design concepts can more effectively increase torque and power by increasing the saliency ratio of the motor itself, avoiding some of the traditional trade-offs of harnessing one at the expense of the other. This motor may also obtain higher system efficiency during cycled operation due to the avoidance of magnetic breaking that can occur with permanent magnet motors under passive conditions.

The details of one or more implementations are set forth in the accompanying drawings and the description below. Other features, objects, and advantages will be apparent from the description and drawings, and from the claims.

DESCRIPTION OF DRAWINGS

FIGS. 32A-32C are views of an example rectified FPFC that can be used with aspects of this disclosure.

FIG. 33A is a perspective view of a portion of an electric motor using the rectified FPFC illustrated in FIGS. 32A-32C.

FIGS. 34A-34C are views of an example rectified FPFC that can be used with aspects of this disclosure.

FIG. 35A is a perspective view of a portion of an electric motor using the FPFC illustrated in FIGS. 34A-34C.

Like reference symbols in the various drawings indicate like elements.

DETAILED DESCRIPTION

Figure 1:
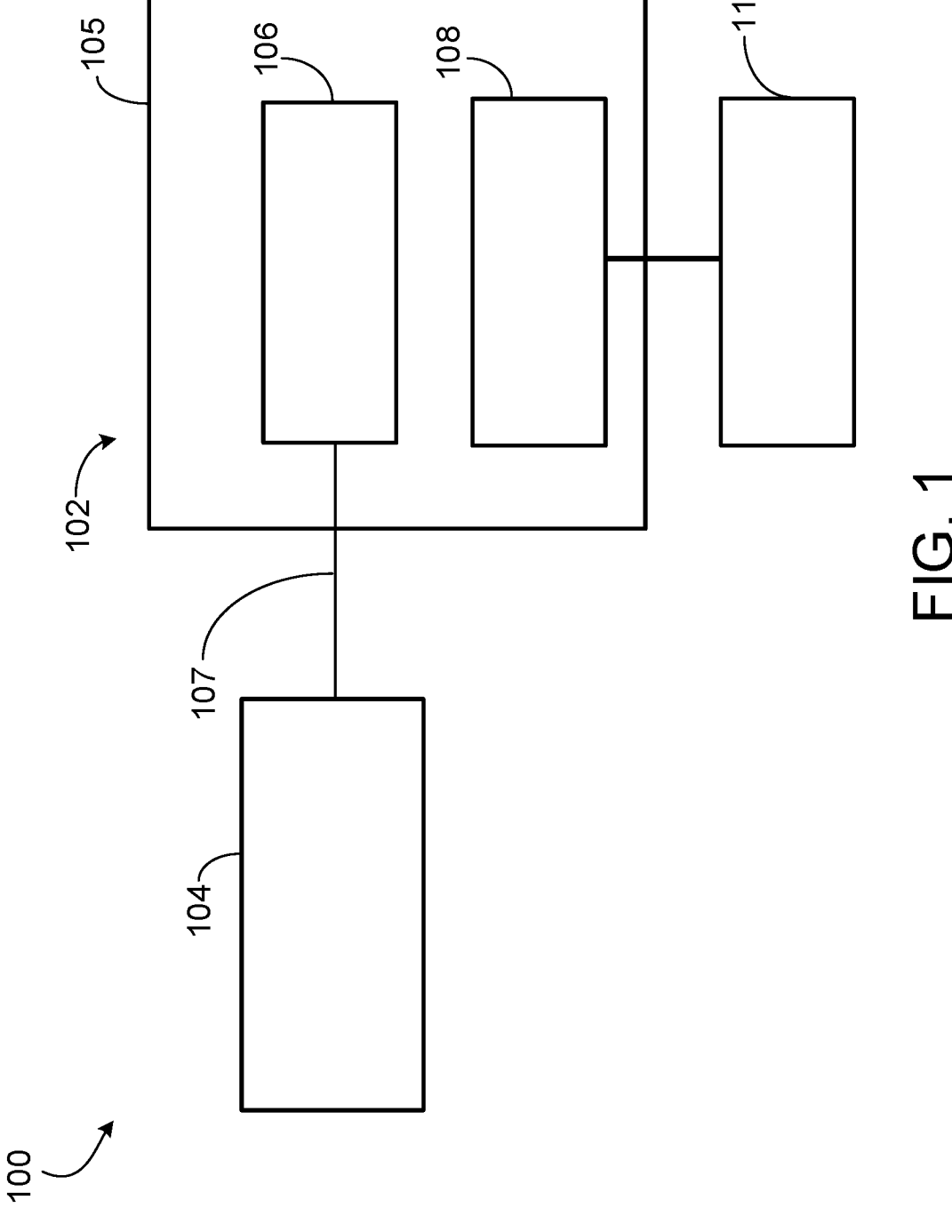
FIG. 1 is a schematic illustration of an example of an electric drive system.

This disclosure describes an electric machine with a rotor and a stator. The stator defines multiple stator poles with associated electrical windings. The rotor is movable with respect to the stator and includes multiple rotor poles. The rotor poles include a magnetically permeable pole material. Together, the rotor and the stator define a nominal gap between the stator poles and the rotor poles. As will be described in detail throughout this disclosure, the rotor includes a series of frequency programmable flux channels (FPFCs). Each FPFC includes a conductive loop having some resistance surrounding an associated rotor pole. In some implementations, the stator and the rotor are arranged such that the electrical windings in the stator excite a current within at least one of the FPFCs during start-up. In some implementations, the stator and the rotor are arranged such that the electrical windings in the stator magnetize at least one of the rotor poles during start-up. In other words, the FPFCs can act as a variable magnetomotive force source controlled by the stator. This power transfer is generally synchronous with the magnetic field produced by the stator. The intrinsic resistance within the conductive loop enables frequency modulated performance through resistive loads.

The FPFCs themselves work to reflect the magnetic field of the stator away from the rotor. Such an arrangement can be used to protect permanent magnets within the rotor from demagnetization forces induced by the stator. As a result, weaker permanent magnetic components can be used within the rotor without reducing torque or power abilities of the electric machine. In the context of this disclosure, "weaker magnetic components" means that relatively low-energy magnetic material can be used or a lesser amount of high energy material can be used than those found in conventional permanent magnetic motors of similar power and torque ratings. Indeed, permanent magnetic materials can also be eliminated entirely with such an arrangement. Energy of a magnetic material, in the context of this disclosure, is a function of the coercivity and the remanence of the material. In addition, geometry and amount of material can play a role in determining a total magnetic energy and flux density. For example, a small amount of a neodymium magnet, such as NeFeB, can have a similar total energy product effect as a larger amount of magnetic ferrite.

In some implementations, an FPFC only includes a conductive loop with inherent resistance, capacitance, and inductance values. While the conductive loop may inherently include such values, additional passive, discrete components (e.g. resistors, capacitor, and inductors) can be added to the conductive loop to achieve desired characteristics. Implementations which only use passive components are henceforth referred to as "passive FPFCs". In some implementations, the FPFC or conductive loop may define a capacitance, where, in some implementations, the capacitance may be formed, inserted, and/or defined by a certain part of the FPFC or conductive loop. In other implementations, the FPFC or conductive loop may have a resonant frequency. In some implementations, the resonant frequency of the FPFC may be in the transmissible range of the magnetically permeable pole or FPFC material.

The magnetomotive force produced by the passive FPFCs can create a reduced torque moment in operation during recharge (field strengthening). In other words, the magnetic force induced within the rotor might require a recharge at certain intervals in operation when the field of the FPFC weakens. Field weakening of the FPFCs can occur in two ways. In the first, the field may weaken over time due to the inherent reactance within the FPFC. In the second, a permanent magnetomotive force source (e.g., a permanent magnet) may weaken when loaded. Recharge cycles to counteract these effects can reduce efficiency and create torque ripple. To mitigate this issue, the FPFC can include a rectifier (henceforth referred to as a "rectified FPFC") to essentially "shut-down" the circuit during the recharge cycle, preventing current from crossing flux in the associated rotor pole (and hence a resultant reduced torque moment). Such an arrangement only allows current to pass through the loop in one direction and allows the rectified FPFC to maintain the desired flux during operation.

While maintaining a desired flux within the rotor can be advantageous, it is conceivable for operation modes where it may be desired to weaken the flux more rapidly than inherent field weakening allows, for example, high-speed low-load conditions. Such operation modes can include the rotor coasting or fly-wheeling when the electric machine is not working as a generator. Such operating conditions can be done with a rectified FPFC, but further control and sensitivity in reducing the magnetic drag on the system during such operations can be provided by a logic circuit within the FPFC. The logic circuit can include active components such as a field effect transistor, a dual gate field effect transistor, or a bipolar junction transistor. Such circuitry can be controlled directly with a brushed connection, by light sensitive diodes, or by other wireless communication mediums. Such an arrangement is henceforth referred to as an "active FPFC".

Implementations of the present disclosure provide systems, devices, and methods of using FPFCs to increase performance of electric motors. Various designs/configurations of FPFCs for the motors are presented and discussed. The FPFCs are configured to exhibit varying diamagnetic effects based on the current operating mode, such that variable magnetomotive force sources within the rotor can be actively controlled and adjusted primarily by the magnetic field produced by the stator windings.

Example Electric Drive System

FIG. 1 illustrates an electric drive system 100 that includes an electric motor 102 and a motor controller 107 coupled to the electric motor 102. The motor controller 107 is configured to operate the electric motor 102 to drive a load 104. The load 104 can be an additional gear train such as a planetary gear set or another motor where multiple motors can be linked and operated in parallel.

The electric motor 102 has an output shaft 107 rotatable with respect to a motor housing 105, which is considered to be a datum with respect to rotations and other motions of motor components. In use, the output shaft 107 can be coupled to the load 104 to which the motor 102 can impart rotary power when electrically activated by appropriate electrical power and signals from the motor controller 107. The output shaft 107 may extend through the motor and be exposed at both ends, meaning that rotary power can be transmitted at both ends of the motor. Housing 105 can be rotationally symmetric about the rotation axis of output shaft, but may be of any external shape and can generally include means for securing the housing to other structure to prevent housing rotation during motor operation.

The electric motor 102 includes an active magnetic component 106 such as a stator and a passive magnetic component 108 such as a rotor. For illustration purposes, in the following, stator is used as a representative example of the active magnetic component and rotor is used as a representative example of the passive magnetic component.

The rotor 106 is associated with the stator 108 and can be disposed within the stator 108, e.g., in an internal rotor radial-gap motor, or parallel to the stator, e.g., in an axial-gap motor, or in a linear motor. As described more fully below, electrical activity in the stator 108, properly controlled, drives motion of the rotor 106. The rotor 106 is rotationally coupled to the output shaft 107, such that any rotational component of resultant rotor motion is transmitted to the output shaft 107, causing the output shaft 107 to rotate. The stator 108 is fixed to the motor 102 such that during operation the rotor 106 moves about the stator 108 or parallel to the stator 108.

Figure 2A:
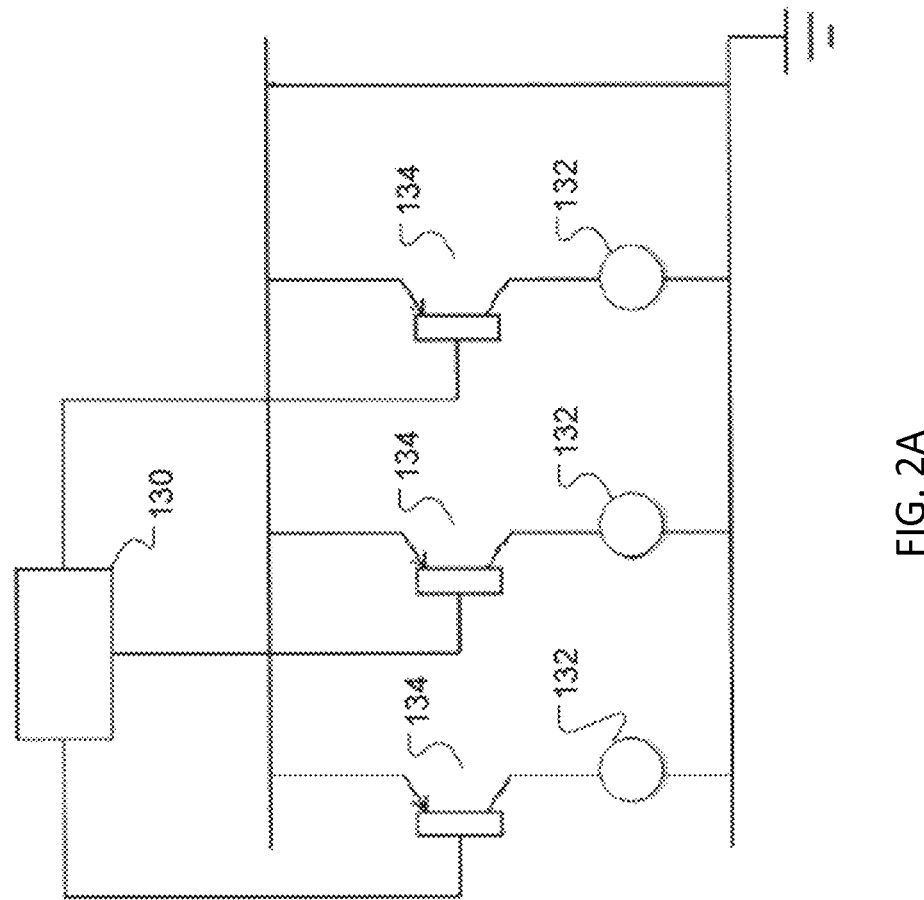
FIG. 2A is a schematic illustration of a motor controller including power switching.

The stator 108 defines multiple stator poles with associated electrical windings and the rotor 106 includes multiple rotor poles, such as the example illustrated with further details in FIGS. 5A-5D. The rotor 106 defines, together with the stator 108, a nominal air gap between the stator poles and the rotor poles, such as the example as illustrated with further details in FIGS. 5A-5D later within this disclosure. The rotor 106 is movable with respect to the stator 108 along a motion direction. As illustrated in FIG. 2A, the stator 108 has multiple independently activatable windings 132 spaced apart circumferentially about the rotor 106. The multiple adjacent windings 132 of the stator 108 are activatable simultaneously as a winding set, and the stator 108 can include multiple such multi-winding sets spaced about the stator 108. The motor 102 may also include a winding controller 130 with a set of switches 134 operable to activate the windings 132 of the stator 108. The switches 134 can be semiconductor switches, e.g., transistors such as metal-oxide-semiconductor field-effect transistors (MOSFETs). The winding controller 130 is coupled to gates of the switches 134 and operable to send a respective control voltage to each switch 134. The control voltage can be a direct current (DC) voltage. The winding controller 130 can be in the motor controller 107.

While only three switches are shown in FIG. 2A, it will be understood that the motor controller 107 can have a switch for each stator pole, or multiple switches to energize multiple coils. Adjacent pole pairs may be wired in series via a common switch, but in such cases the instantaneously faster of the two moving rotors can generate a slightly larger counter-electromotive force (EMF) or back-EMF and instantaneously draw more relative electrical power as compared to the slower pole, thereby providing additional acceleration and separation of relative velocities. Higher frequency excitation can decrease effects of low frequency harmonic ripple during operation. The switches 134 can be wired in parallel to balance relative speed between multiple rotors in a nested configuration by using parallel inductive load reactors. In certain implementations with nested rotor configurations, individual rotors in the system can be driven individually and any harmonic frequency may be bypassed from one rotor to another by decreasing the loading on a given rotor. In other implementations, rotors can be nested as pairs to balance the force between an inner and outer ring locally.

Figure 2B:
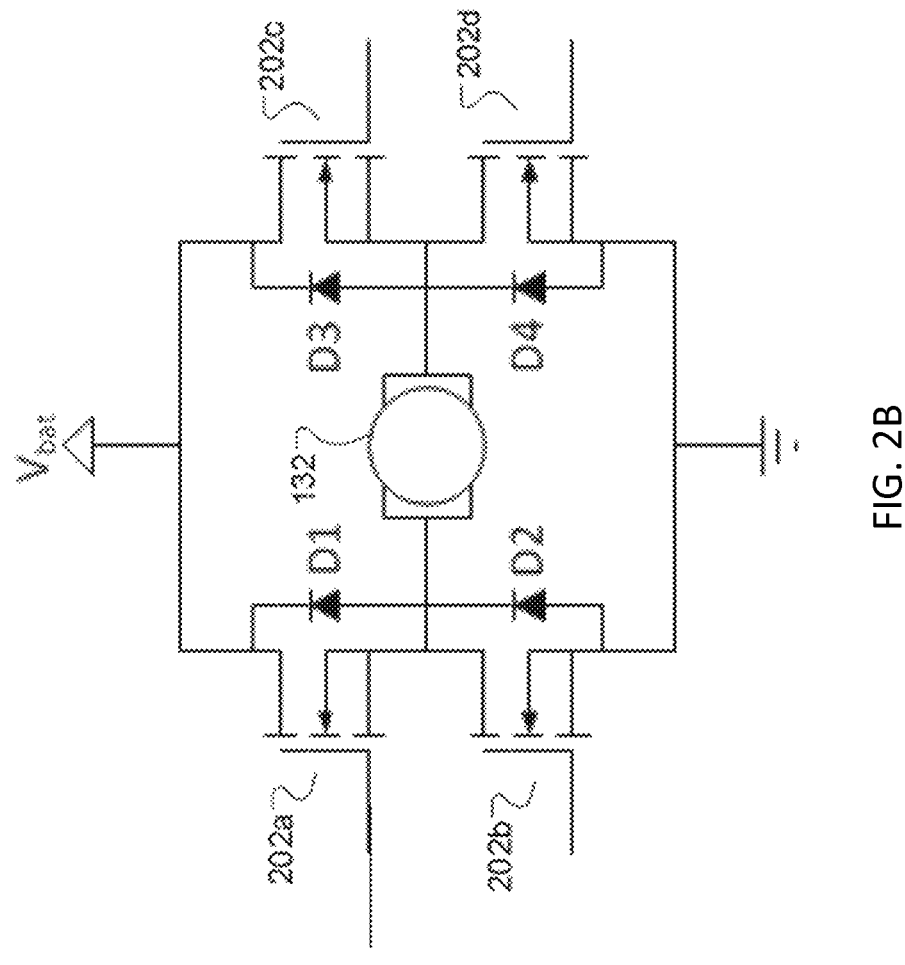
FIG. 2B is a schematic illustration of an example power switch for an electrical winding.

FIG. 2B shows another example power switch 200 for an individual electrical winding 132. The power switch 200 can have an H-bridge circuit including four switching elements 202a, 202b, 202c, 202d, with the electrical winding 132 at the center, in an H-like configuration. The switching elements 202a, 202b, 202c, 202d can be bi-polar or FET transistors. Each switching element 202a, 202b, 202c, 202d can be coupled with a respective diode D1, D2, D3, D4. The diodes are called catch diodes and can be of a Schottky type. The top-end of the bridge is connected to a power supply, e.g., a battery $V_{bat}$, and the bottom-end is grounded. Gates of the switching elements can be coupled to the winding controller 130 which is operable to send a respective control voltage signal to each switching element. The control voltage signal can be a DC voltage signal or an AC (alternating current) voltage signal.

The switching elements can be individually controlled by the controller 130 and can be turned on and off independently. In some cases, if the switching elements 202a and 202d are turned on, the left lead of the stator is connected to the power supply, while the right lead is connected to ground. Current starts flowing through the stator, energizing the electrical winding 132 in a forward direction. In some cases, if the switching elements 202b and 202c are turned on, the right lead of the stator is connected to the power supply, while the left lead is connected to ground. Current starts flowing through the stator, energizing the electrical winding 132 in a reverse, backward direction. That is, by controlling the switching elements, the electrical winding 132 can get energized/activated in either of two directions.

Figure 2C:
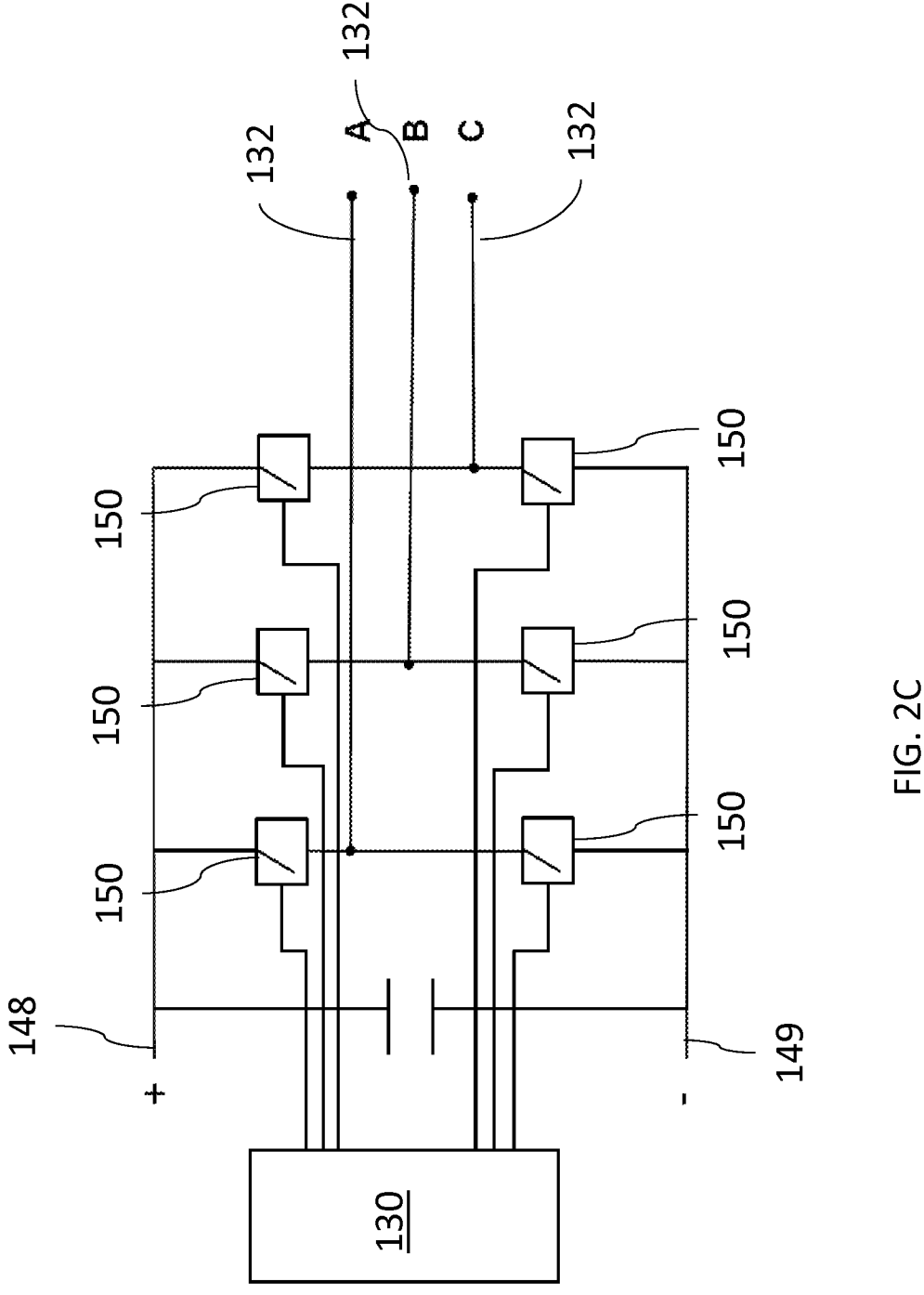
FIG. 2C is a schematic illustration of a motor controller including power switching.
Figures 3A, 3B, 3C, 3D:
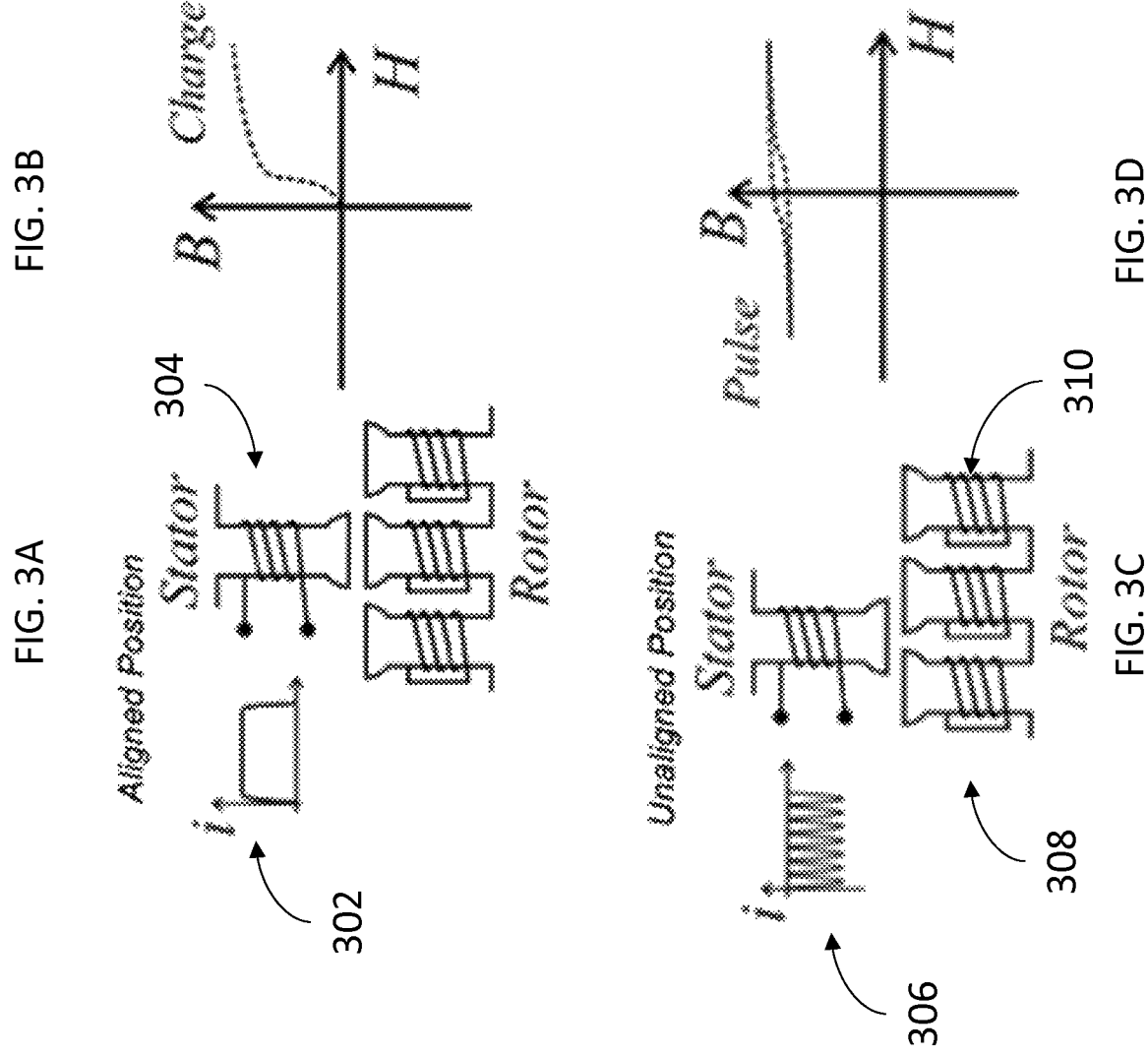
FIG. 3A is a schematic diagram of stator poles aligned with rotor poles, the rotor poles including an FPFC.
FIG. 3B is a diagram of a rotor pole becoming charged during alignment.
FIG. 3C is a schematic diagram of stator poles unaligned with rotor poles, the rotor poles including an FPFC.
FIG. 3D is a diagram of a rotor hardening during misalignment.

FIG. 2C is a schematic illustration of a motor controller including power switching. FIG. 2C is substantially similar to FIG. 2A with the exception of any differences described herein. As illustrated in FIG. 2C, each rotor winding 132 phase (A, B, C) has a switch between a positive power rail 148 and the individual winding 132 and a switch between each rotor winding phase and a negative power rail 149. Voltage is supplied to both the positive rail 148 (positive voltage) and the negative rail (negative voltage) is supplied in a substantially constant manner while the controller 130 controls switches 150 to exchange current between the windings 132 and the individual power rails (148, 149). In other implementations, such a controller and power switches may be connected and configured to operate from a current source.

The motor controller 107, e.g., the winding controller 130, can be configured to sequentially operate the switches 134, 150, or 200 for respective pole energization duty cycles to generate magnetic flux across the air gap between the stator poles and rotor poles, as described with further details throughout this disclosure. The switches can be controlled to sequentially energize stator poles to create a local attraction force pulling on the rotor. Such a sequential energization (or activation) can cause a rotation of the rotor 106, the output shaft 107, and the load 104.

As discussed in further detail below, various types and configurations of FPFCs can be implemented in the rotor 106 and/or the stator 108. The FPFCs can adjustably attenuate flux passing through them.

In some examples, a FPFC is made of a single material, such as aluminum, copper, brass, silver, zinc, gold, pyrolytic graphite, bismuth, graphene, or carbon-nanotubes. In some examples, ferromagnetic combinations of materials, such as copper-iron, nickel-iron, lead-iron, brass-iron, silver-iron, zinc-iron, gold-iron, bismuth-iron, aluminum-iron, pyrolytic graphite-iron, graphene-iron, carbon-nanotubes-iron, or Alinco (aluminum-nickel-cobalt) alloys can be used as a flux barrier, in many cases with an electric conductivity higher than ferromagnetic material (e.g., iron) making up the rotor poles. In some cases, the FPFC, e.g., made of copper-iron, has an effective magnetic permeability lower than the ferromagnetic material. In some cases, the FPFC, e.g., made of nickel-iron, has an effective magnetic permeability higher than the ferromagnetic material. In general, the FPFC is constructed as a shielded pole of an electrically conductive material forming a loop about a core of a core material more magnetically permeable than the electrically conductive material. Due to the electrically conductive material of the loop, the shielded pole can also have an effective electric conductivity higher than the core material (e.g., iron). The FPFCs may include multiple materials arranged as alternating layers. In some implementations, the alternating layers from interlayer interfaces of different materials. In some implementations, the first layer may be more electrically conductive than the second layer. In some implementations, the second layer of the pair is more magnetically permeable than the first layer. In some implementations, the first and second layers each have an electrical current skin depth greater than a respective layer thickness in a direction perpendicular to the nominal gap at a particular operating frequency.

Another material property of interest, which we refer to as the EMF Shielding Factor, is the quotient of electrical conductivity and magnetic permeability (e.g., Siemens per Henry). The EMF Shielding Factors of two materials may be determined simultaneously by placing equally sized samples of the materials on a non-conductive support and moving them between two parallel Helmholtz coils with a diameter greater than the samples, such that their primary plane of conduction (e.g., the orientation of the plane as is experienced during operation in a magnetic system) is perpendicular to the magnetic fields produced during excitation of the Helmholtz coils. For a given excitation waveform (e.g., voltage, shape, and frequency) the current of the Helmholtz coils will be proportional to the EMF Shielding Factor of the material between the coils, such that an increase in the EMF Shielding Factor will be observed as an increase in the current during constant excitation.

As noted above and discussed in further detail below, the FPFC can be configured to be diamagnetic. The magnetic permeability of the flux barrier can be controlled by adjusting an induced frequency through the FPFC. In such a way, the motor can have significantly different magnetic properties at different magnetic frequencies.

To operate the FPFC under operational frequencies, sinusoidal or square wave control can be used where the stator poles interact with the FPFCs as the primary power source of the machine. In operation, a pulsed to continuous sine wave may be used, which occurs as a function of the rotor speed where pulsing occurs from to locked conditions (e.g., 0 hertz). This is because at higher speeds, the pulse and charge cycles overlap as the mechanical timing reaches the pulse frequency. Therefore, the waveform adopts a fundamental wave. The transition to synchronous operation can occur in certain implementations at 10,000 hertz, more preferably from 1,000 hertz-10,000 hertz, more preferably 100 hertz-500 hertz, more preferably 10 hertz-100 hertz. For some implementations, 10,000 hertz can be considered substantially synchronous operation, more preferably 10,000 hertz, more preferably 1,000 hertz, more preferably 100 hertz, more preferably 10 hertz. Under such generally synchronous conditions further frequency modulation can occur. For example, as illustrated in FIGS. 3A-3D, during an energization duty cycle of each active pole the motor controller 107 is configured to pulse a current 302 through the winding of the stator pole 304. Unlike induction motors that pulse each pole once in succession at low speeds, motor controller 107 pulses an inverted current 306 multiple times when a stator pole 304 is between two adjacent rotor poles 308. This magnetically "stiffens" the FPFC 310. More details on the charging and stiffening cycles are described throughout this disclosure. Such multiple inverted pulses 306 to the same pole, before pulsing a subsequent pole, make up one energization duty cycle. In some examples, the motor controller pulses current through the winding of an active stator pole 304 during an energization duty cycle of the pole, including a sequence of at least three inverted pulses 306. The electrical circuit including the electrical windings of each pole is configured such that a ratio of inverted pulses 306 to pulses 302 through the stator windings is at least 4:1, in some cases at least 7:1, or in some cases even at least 10:1. In some operating conditions, inverted pulses 306 are not necessary, and the motor can be driven with a standard sinusoidal or trapezoidal wave-form through the stator pole 304.

The combination of pulsed current 302 and inverted pulsed current 306 causes alternating magnetic intensities, e.g., magnetic fields, which induce currents in the FPFC 310. The induced current generates a secondary magnetic field opposing the applied alternating magnetic field, thereby producing a repelling force. The repelling force can concentrate and redirect the magnetic flux substantially more tangentially along a direction of relative motion between the rotor and the stator, to therefore increase the force available to do work. Also, FPFCs 310 having different materials or designs can have different properties. Thus, the generated horizontal force is with a function of the magnetic frequency and the structure of the FPFC 310.

The magnetic frequency for the FPFC 310 (and the generated force) can be determined by the pulse frequency of the current through the winding of the stator pole 304 during the energization duty cycle for each active pole 304. The pulse frequency can be, for example, in some cases between 2 hertz and 1 Mhertz, in some cases between 10 hertz and 20 khertz, and in some cases between 100 hertz and 5,000 hertz and in some cases between 5,000 and 15,000 hertz, and in some cases between 15,000 hertz and 25,000 hertz and above depending on the fundamental. In some cases, the motor controller is configured to maintain pulse frequency during motor speed changes, up to at least a motor speed at which an energization duty cycle frequency for each active pole is at least one-half the pulse frequency. In some cases, the motor controller is configured to pulse current only below a motor speed corresponding to one pulse per energization duty cycle. In some implementations, at least one of the electrical windings includes multiple coils conductively connected in parallel and wound about a common core. Such electrical winding can have a low reactance, enabling faster decay of current between pulses.

Example Motors

In the following, various designs/configurations of frequency programmable flux channels (FPFCs) for electric motors, radial-gap motors, axial-gap motors, and linear motors are presented and discussed. While variations of these motors are illustrated and described in detail, other motor designs with FPFCs can be constructed without departing from this disclosure.

Radial-Gap Motors with Passive FPFCs

This section primarily describes implementations relating to radial-gap motors using passive FPFCs. In the context of this disclosure, a "passive" FPFC is an FPFC that that includes nothing more than a shorted conductor fully encircling at least one pole on a rotor. That is, only the inherent capacitance, inductance, and resistance defined by the FPFC is present without the addition of other discrete components. In the various implementations described herein, both internal rotors and external rotors are described. While individual implementations may be illustrated as either using an internal or an external rotor, it is noted that aspects of the implementations described herein are applicable to both internal rotors and external rotors regardless if the individual implementation described.

Figures 4A, 4B, 4C, 5A:
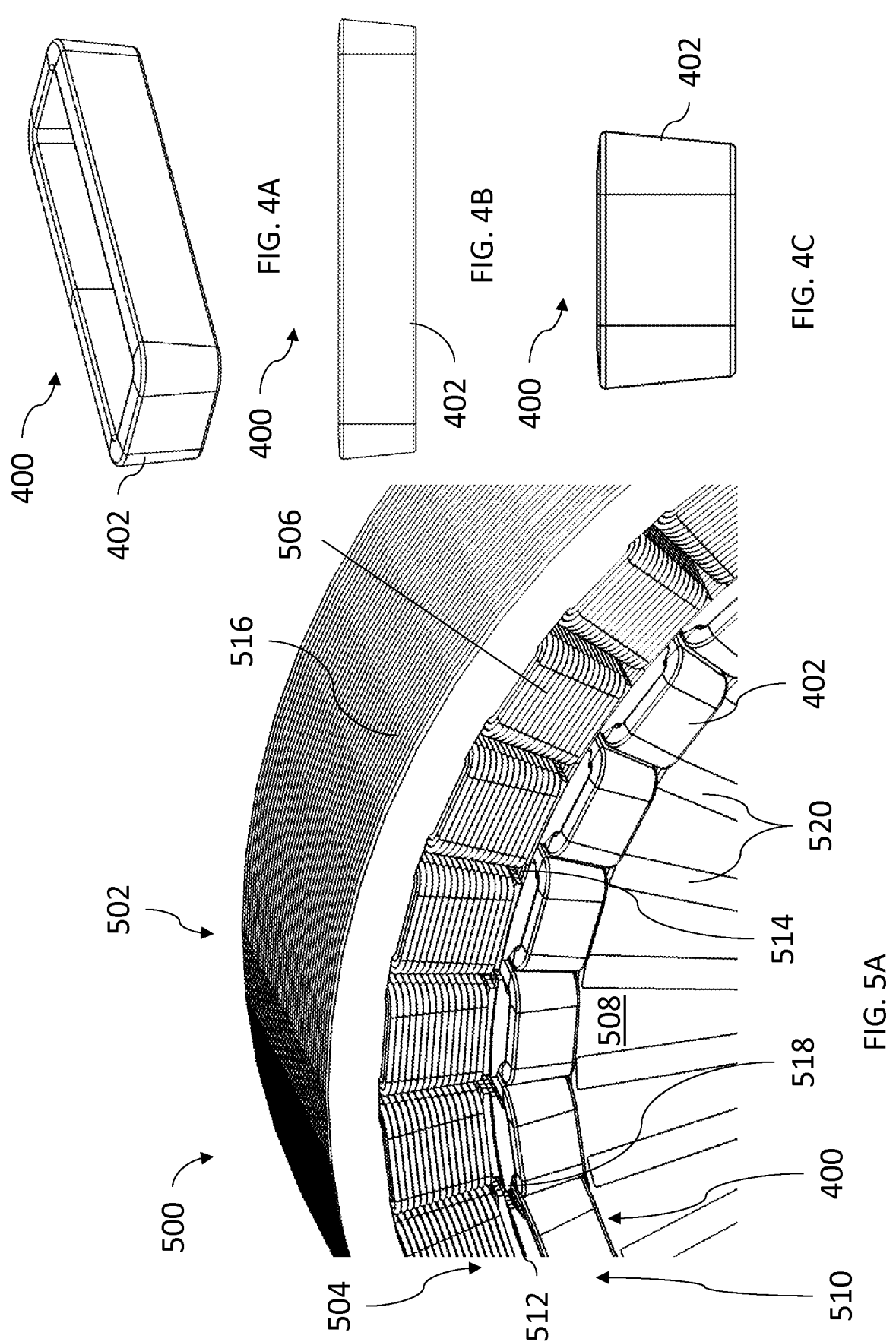
FIGS. 4A-4C are views of an example passive frequency programmable flux channel (FPFC) that can be used with aspects of this disclosure.
FIG. 5A is a perspective view of a portion of an electric motor using the passive FPFC illustrated in FIGS. 4A-4C.
Figure 5B:
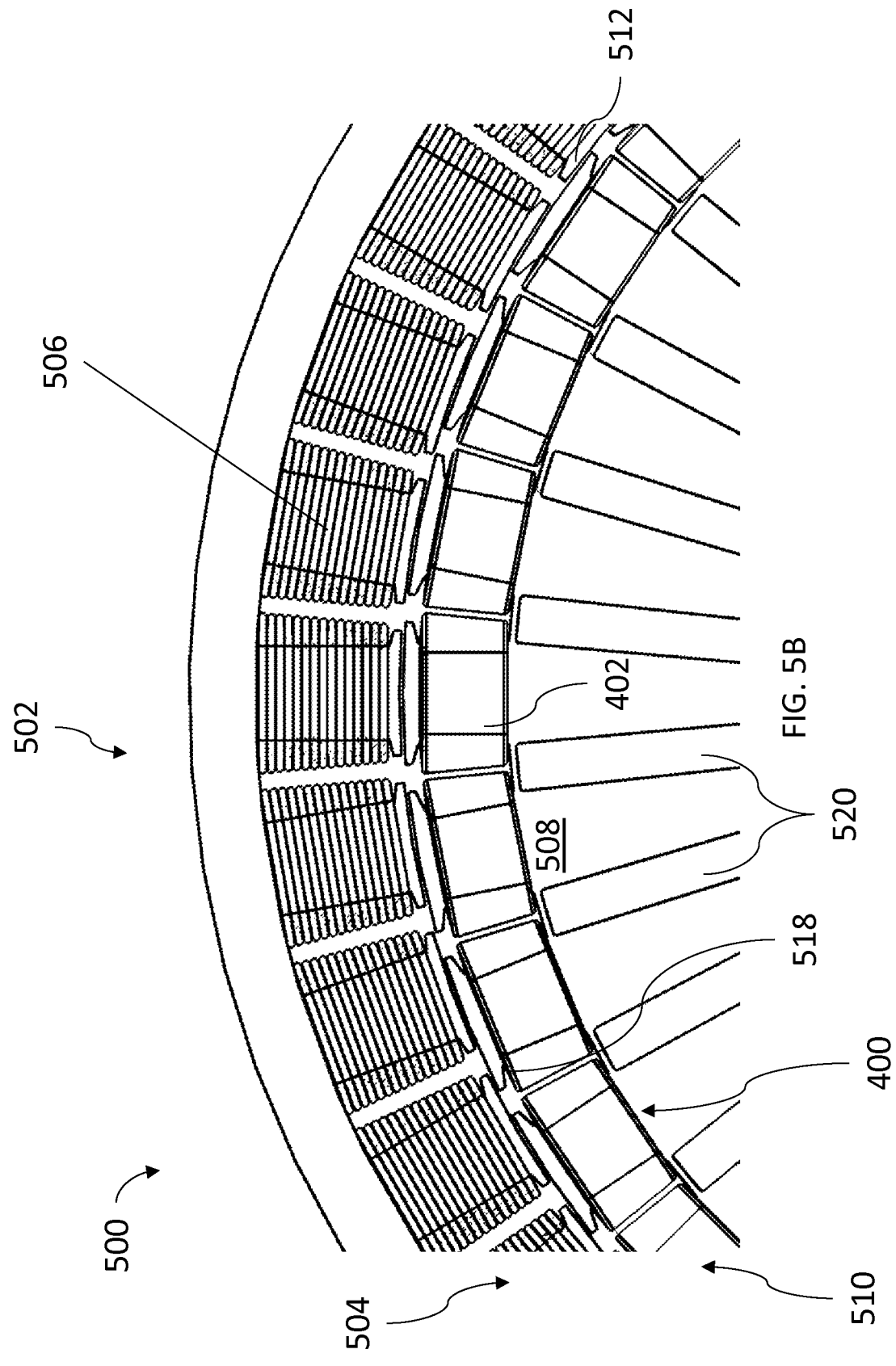
FIG. 5B is a planar view of a portion of an electric motor using the passive FPFC illustrated in FIGS. 4A-4C.
Figure 5C:
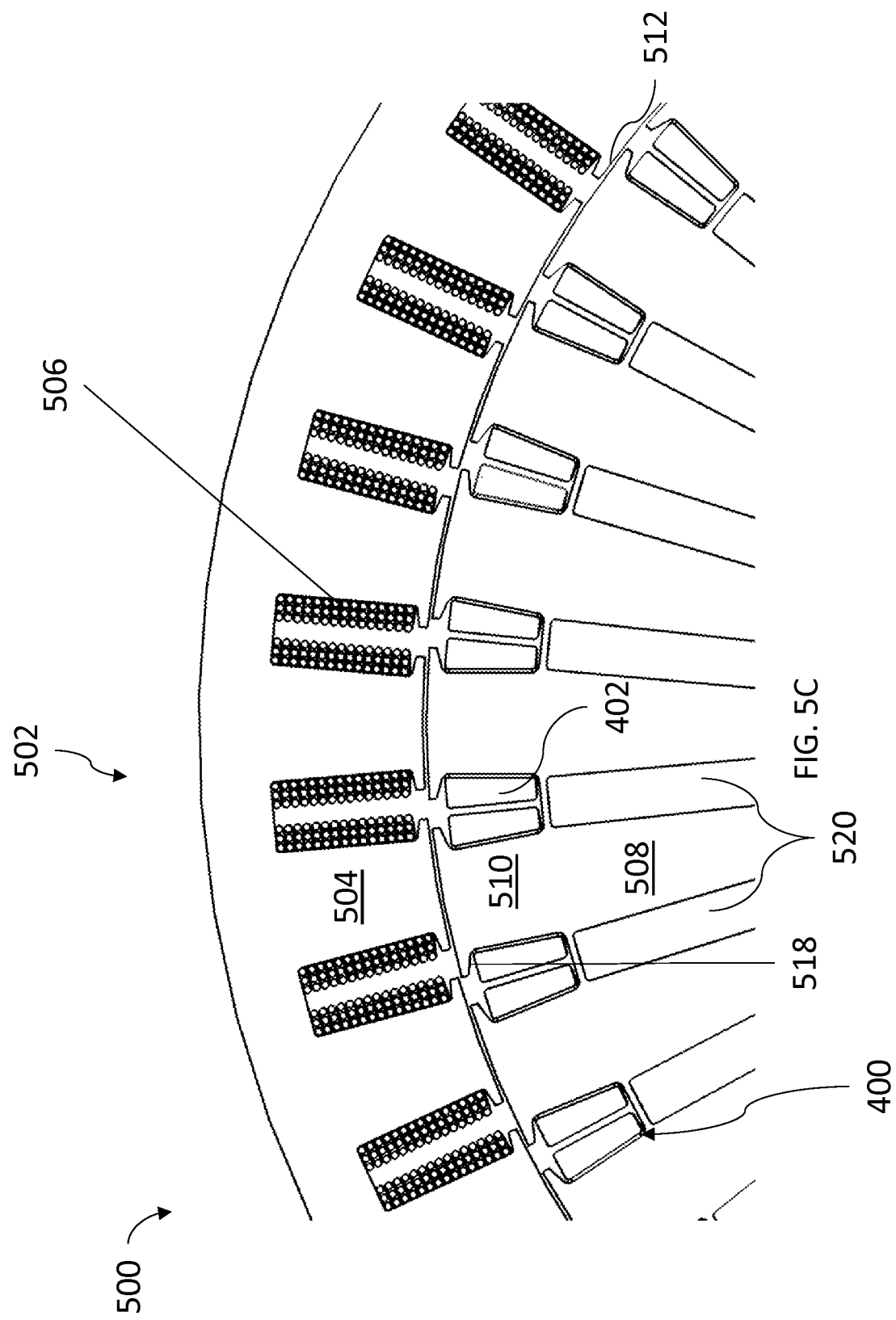
FIG. 5C is a planar cross-sectional view of a portion of an electric motor using the passive FPFC illustrated in FIGS. 4A-4C.
Figure 5D:
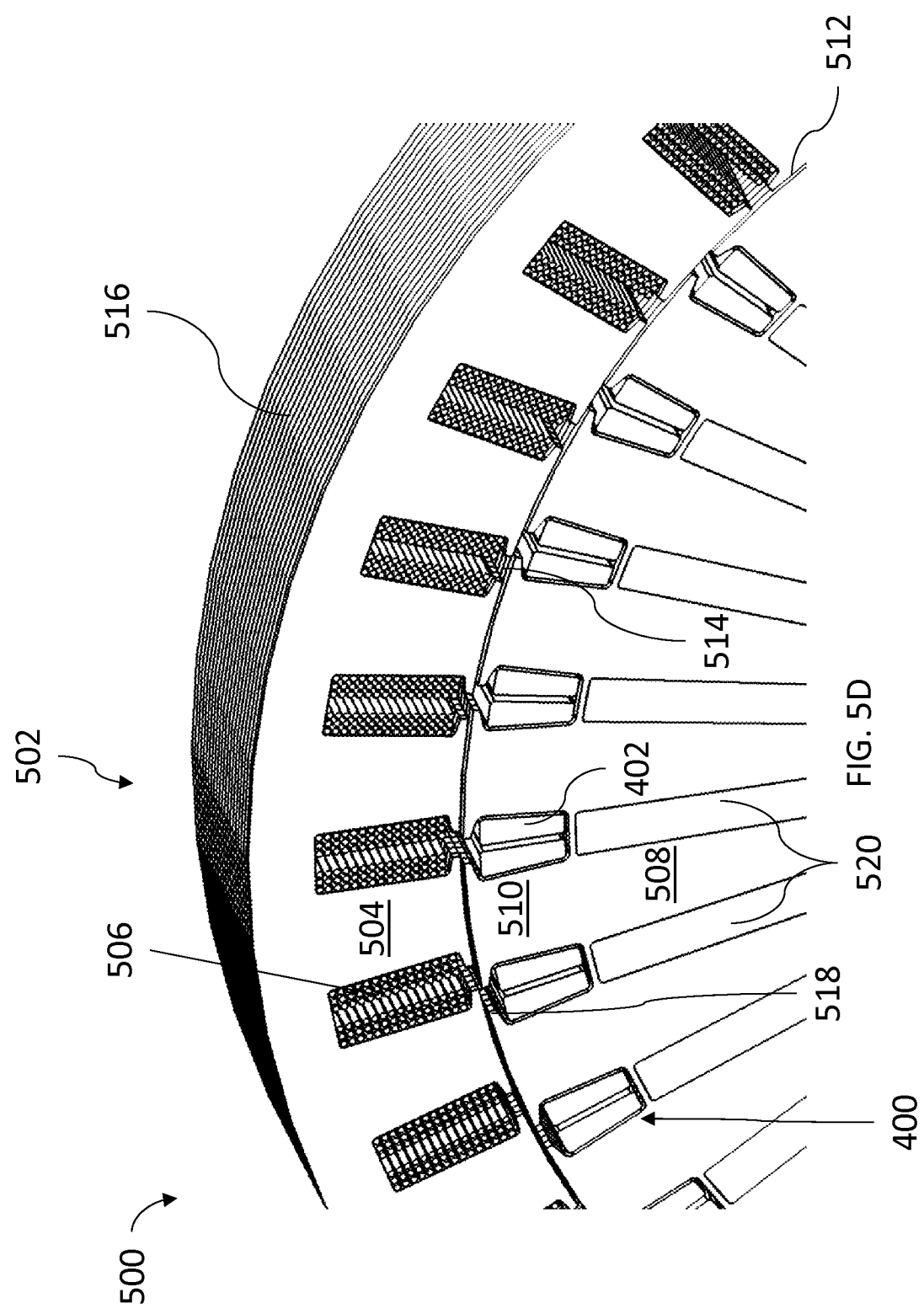
FIG. 5D is a perspective cross-sectional view of a portion of an electric motor using the passive FPFC illustrated in FIGS. 4A-4C.

FIGS. 4A-4C are views of an example passive frequency programmable flux channel 400 (FPFC) that can be used with aspects of this disclosure. FIG. 5A is a perspective view of a portion of an electric motor 500 using the passive FPFC 400 illustrated in FIGS. 4A-4C. FIG. 5B is a planar view of a portion of the electric motor 500 using the passive FPFC 400 illustrated in FIGS. 4A-4C. FIG. 5C is a planar cross-sectional view of a portion of the electric motor 500 using the passive FPFC 400 illustrated in FIGS. 4A-4C. FIG. 5D is a perspective cross-sectional view of a portion of the electric motor 500 using the passive FPFC 400 illustrated in FIGS. 4A-4C. FIGS. 4A-5D are used in combination to describe the electric motor 500 and FPFC 400.

The electric machine 500 includes a stator 502 defining multiple stator poles 504 with associated electrical windings 506. A rotor 508 includes multiple rotor poles 510. The rotor 508 is movable with respect to the stator 502. In this case, the rotor 508 is arranged to rotate within the stator 502. The rotor 508 and the stator 502 together define a nominal gap 512 between the stator poles 504 and the rotor poles 510. In this case, the nominal gap 512 is a radial gap with the stator 502 circumferentially surrounding the rotor 508. The rotor poles 510 include a magnetically permeable pole material, such as iron. The rotor 508 also includes a series of frequency programmable flux channels (FPFCs) 400. Each FPFC 400 includes a conductive loop 402 that surrounds or encircles an associated rotor pole 510. In the illustrated implementation, each rotor pole 510 is encircled. The stator 502 and the rotor 508 are arranged such that the electrical windings 506 in the stator 502 can excite a current within the FPFCs 400 during start-up. In other words, the rotor 508 includes a variable magnetomotive force source, the FPFCs 400, controllable by a controlled magnetic field produced by stator windings 506. Cleats or brushes providing current to the rotor 508 through conduction during start-up are unnecessary in all of the implementations described herein.

The rotor can be made of a magnetically permeable material, such as iron. In some implementations, the rotor 508 can be made-up of rotor laminations 514 to reduce eddy currents within the back-iron of the rotor 508. Similarly, the stator 502 can be made-up of stator laminations 516 to reduce eddy currents within the back iron of the stator 502. In some implementations, the poles 510 of the rotor 508 include a material with a non-zero remanence. In the illustrated implementation, the rotor poles include a lip 518 arranged to retain each FPFC 400 on their respective rotor pole 510 at the desired operating speed. Other arrangements can be used to retain each FPFC 400, such as various fasteners, adhesives, or resins.

As illustrated, the rotor 508 includes several permanently magnetic spokes 520 extending from a central axis of the rotor 508. Each of the permanently magnetic spokes 520 is positioned between the poles 510, including the FPFCs 400, of the rotor. The permanently magnetic spokes 520 can penetrate the entire longitudinal length of the rotor 508 or partially though the rotor 508. In some implementations, the permanently magnetic spokes 520 can be made-up of multiple layers or laminations. The permanently magnetic spokes 520 can be made from a variety of material, including ferrite, SmFeN, N35, and N45. While lower power permanent magnetic material is typically used, higher powered magnetic material in lower quantities can be used without departing from this disclosure. While illustrated and described as having a spoke-like shape and being positioned between the rotor poles 510 and behind the FPFCs 400, other arrangements are possible without departing from this disclosure. In some implementations, no permanent magnetic material is used.

Regarding the FPFCs 400, they include at least one conductive loop 402 that has at least one turn of shorted conductive material. That is, the conductive material fully encircles a rotor pole 510 and shorts itself to form a loop. In some implementations, the conductive loop 402 includes material more conductive than a rotor core material. In some implementations, the conductive loop 402 includes material less magnetically permeable than a rotor core material. Materials that meet one or both of these criteria include but are not limited to single material, such as aluminum, copper, brass, silver, zinc, gold, pyrolytic graphite, bismuth, graphene, or carbon-nanotubes. In some examples, ferromagnetic combinations of materials, such as copper-iron, nickel-iron, lead-iron, brass-iron, silver-iron, zinc-iron, gold-iron, bismuth-iron, aluminum-iron, pyrolytic graphite-iron, graphene-iron, or copper-carbon-nanotubes, carbon-nanotubes-iron, or Alinco (aluminum-nickel-cobalt) alloys can be used as a flux barrier, in many cases with an electric conductivity higher than ferromagnetic material (e.g., iron) making up the rotor poles. In some cases, the FPFC, e.g., made of copper-iron, has an effective magnetic permeability lower than the ferromagnetic material. In some cases, the FPFC, e.g., made of nickel-iron, has an effective magnetic permeability higher than the ferromagnetic material. In general, the FPFCs 400 have a substantially uniform inductance, particularly in a radial direction. Such a criteria allows for full skin effect penetration of each FPFC 400 at a specified drive frequency. Conductor geometry, such as thickness of individual conductors within the conductive loop, is considered when designing the FPFCs 400. In some implementations, drive frequencies can extend between 0 hertz and 20 hertz. In some implementations, drive frequencies can range between 100 hertz and 2000 hertz. In other implementations, drive frequencies can operation in excess of 20 kilohertz. While the FPFCs 400 are illustrated as having a substantially rectangular cross-section in this implementation, other cross-sectional shapes can be used without departing from this disclosure. Other examples of FPFCs using different cross-sectional shapes are described throughout this disclosure are described throughout this disclosure.

Figures 6A, 6B, 6C, 7A:
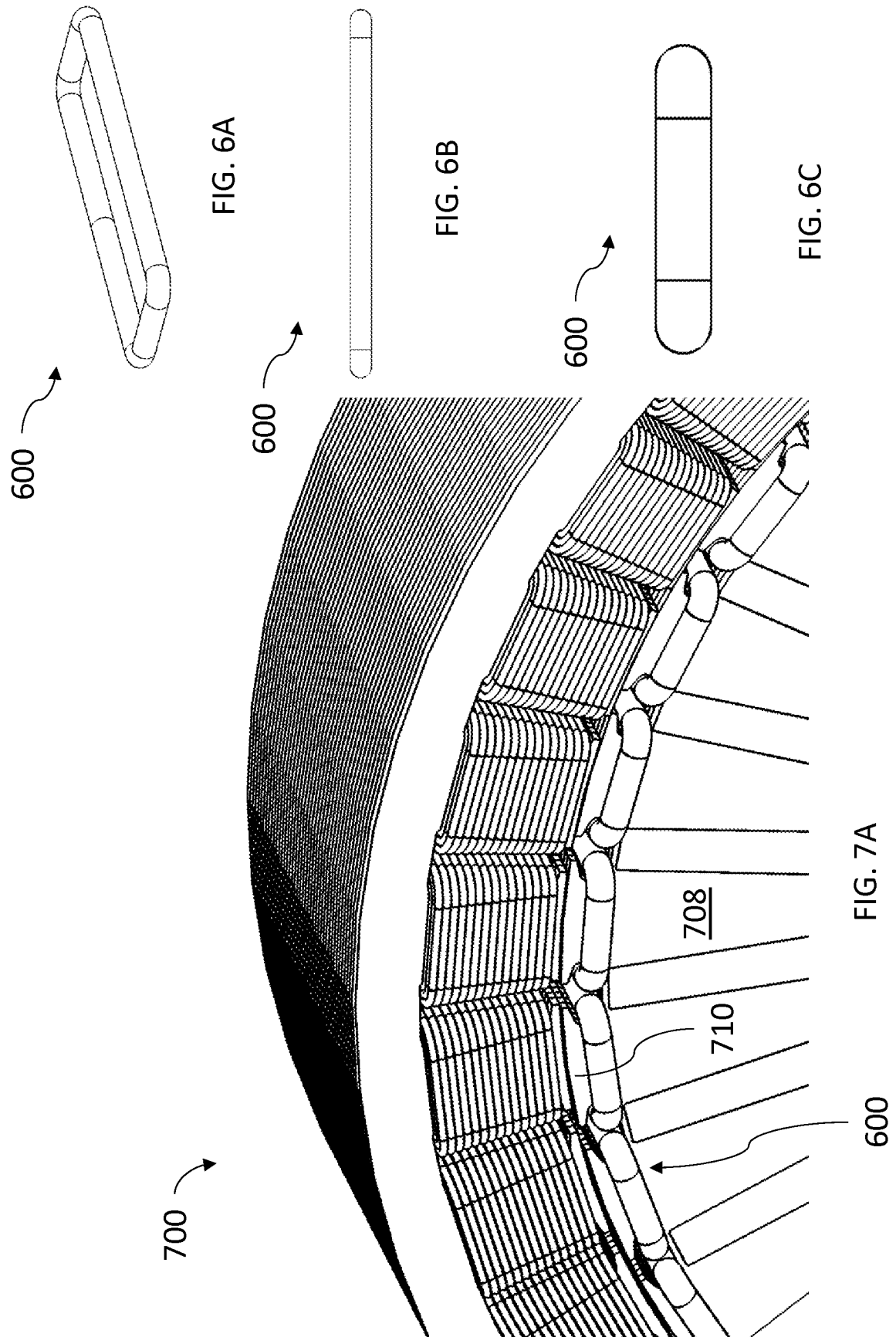
FIGS. 6A-6C are views of an example passive FPFC that can be used with aspects of this disclosure.
FIG. 7A is a perspective view of a portion of an electric motor using the passive FPFC illustrated in FIGS. 6A-6C.
Figure 7B:
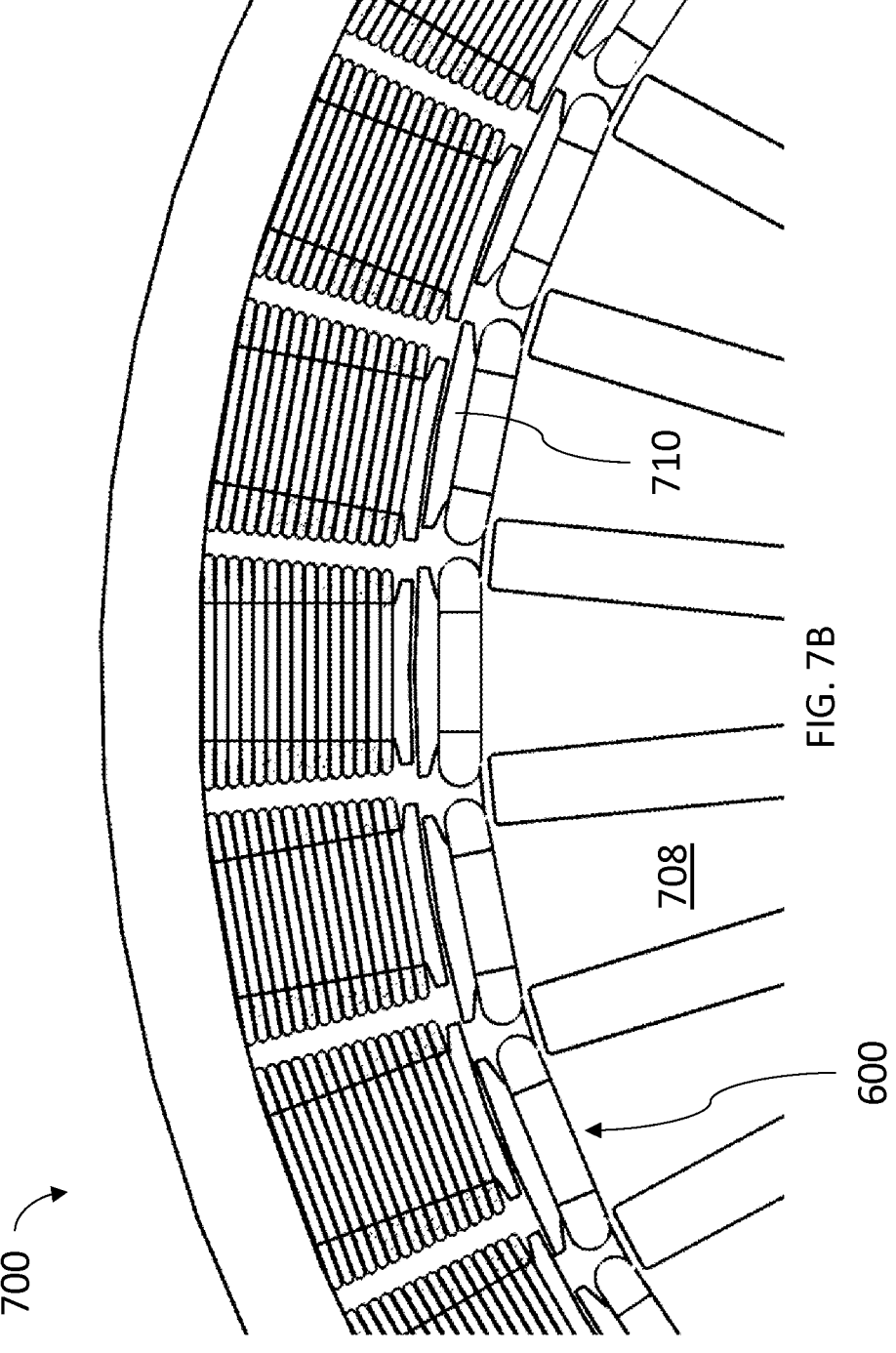
FIG. 7B is a planar view of a portion of an electric motor using the passive FPFC illustrated in FIGS. 6A-6C.
Figure 7C:
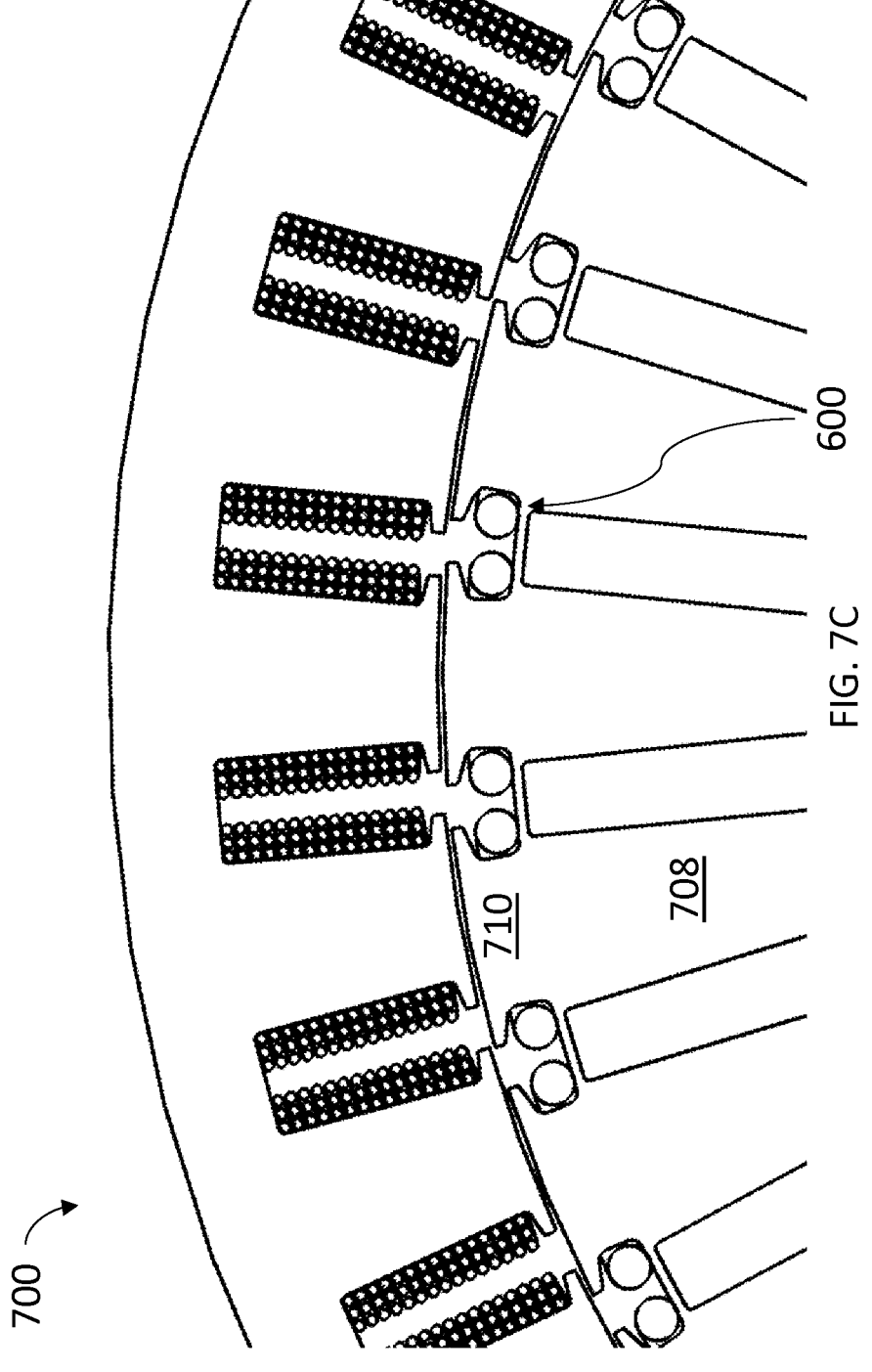
FIG. 7C is a planar cross-sectional view of a portion of an electric motor using the passive FPFC illustrated in FIGS. 6A-6C.
Figure 7D:
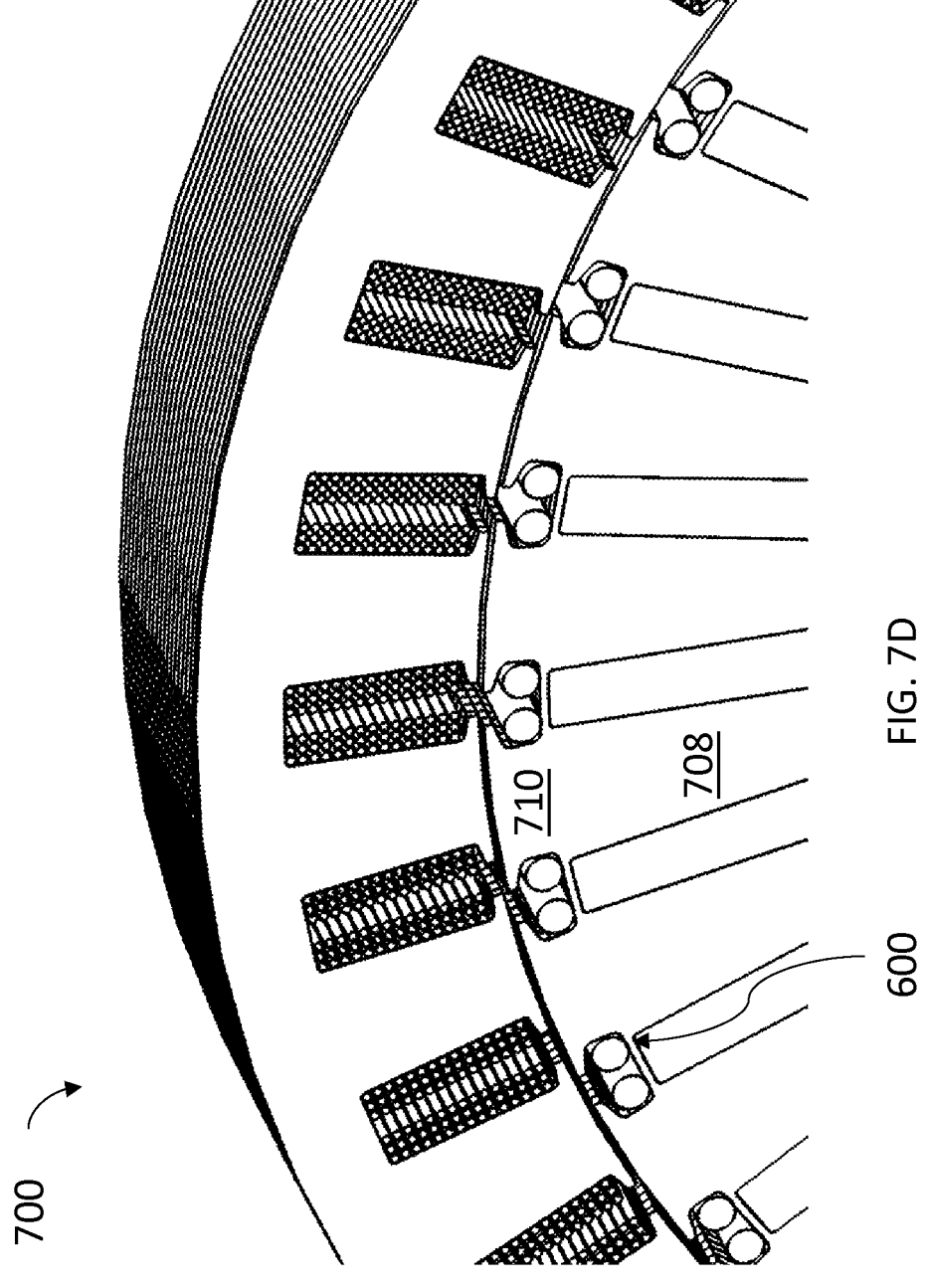
FIG. 7D is a perspective cross-sectional view of a portion of an electric motor using the passive FPFC illustrated in FIGS. 6A-6C.

FIGS. 6A-6C are views of an example passive FPFC 600 that can be used with aspects of this disclosure. FIG. 7A is a perspective view of a portion of an electric motor 700 using the passive FPFC 600 illustrated in FIGS. 6A-6C. FIG. 7B is a planar view of a portion of the electric motor 700 using the passive FPFC 600 illustrated in FIGS. 6A-6C. FIG. 7C is a planar cross-sectional view of a portion of the electric motor 700 using the passive FPFC 600 illustrated in FIGS. 6A-6C. FIG. 7D is a perspective cross-sectional view of a portion of the electric motor 700 using the passive FPFC 600 illustrated in FIGS. 6A-6C. The electric motor 700 is substantially similar to the electric motor 500 with the exception of any differences described herein.

The FPFCs 600 have a substantially circular cross-section with a smaller cross-sectional area than the FPFCs 400. The smaller cross-sectional area can allow for full skin depth penetration at higher operating frequencies. The rotor poles 710 within the rotor 708 are shortened to help retain the geometry of their respective FPFCs 600.

Figures 8A, 8B, 8C, 9A:
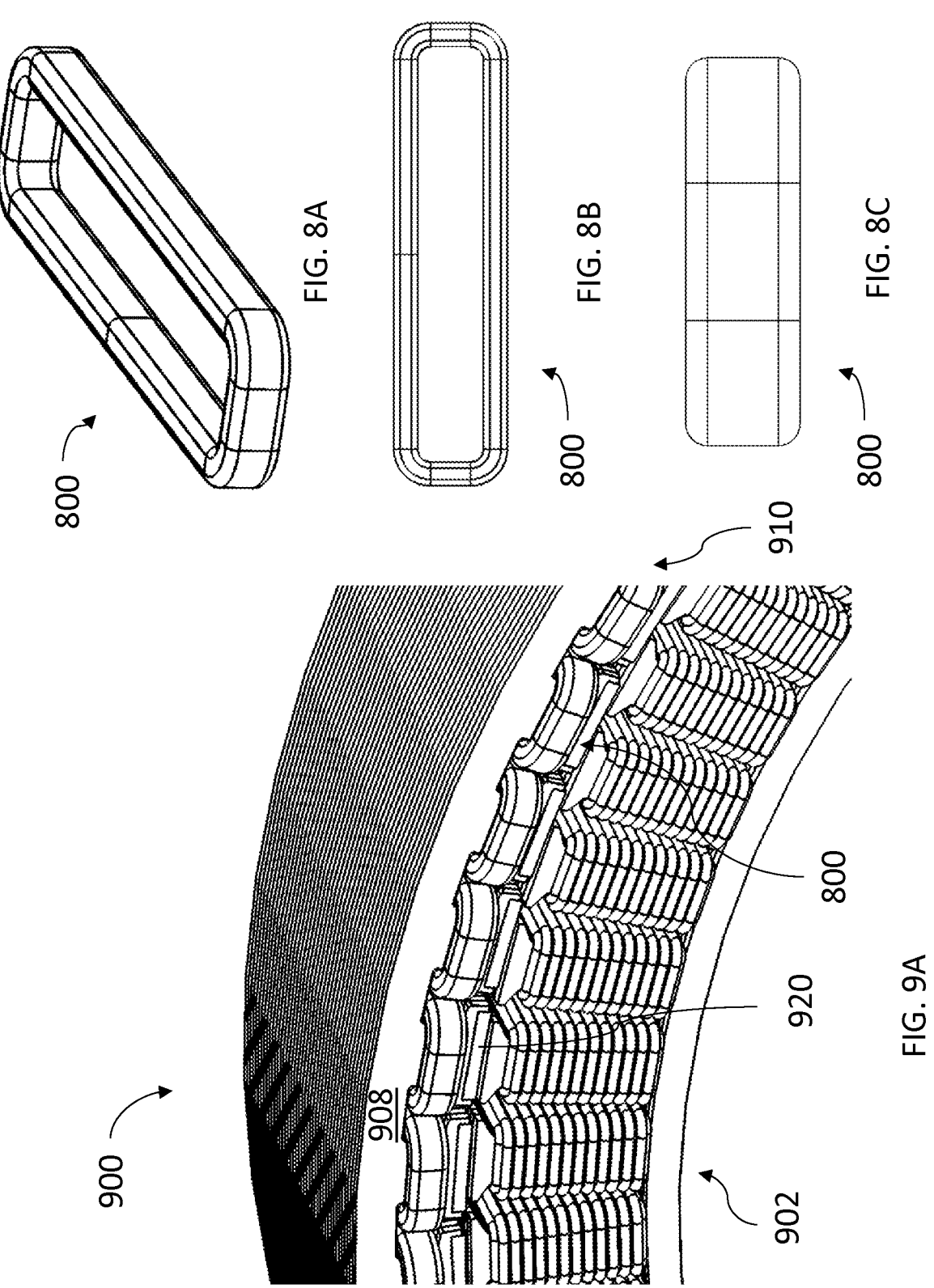
FIGS. 8A-8C are views of an example passive FPFC that can be used with aspects of this disclosure.
FIG. 9A is a perspective view of a portion of an electric motor using the passive FPFC illustrated in FIGS. 8A-8C mounted behind a permanent magnet on the rotor.
Figure 9B:
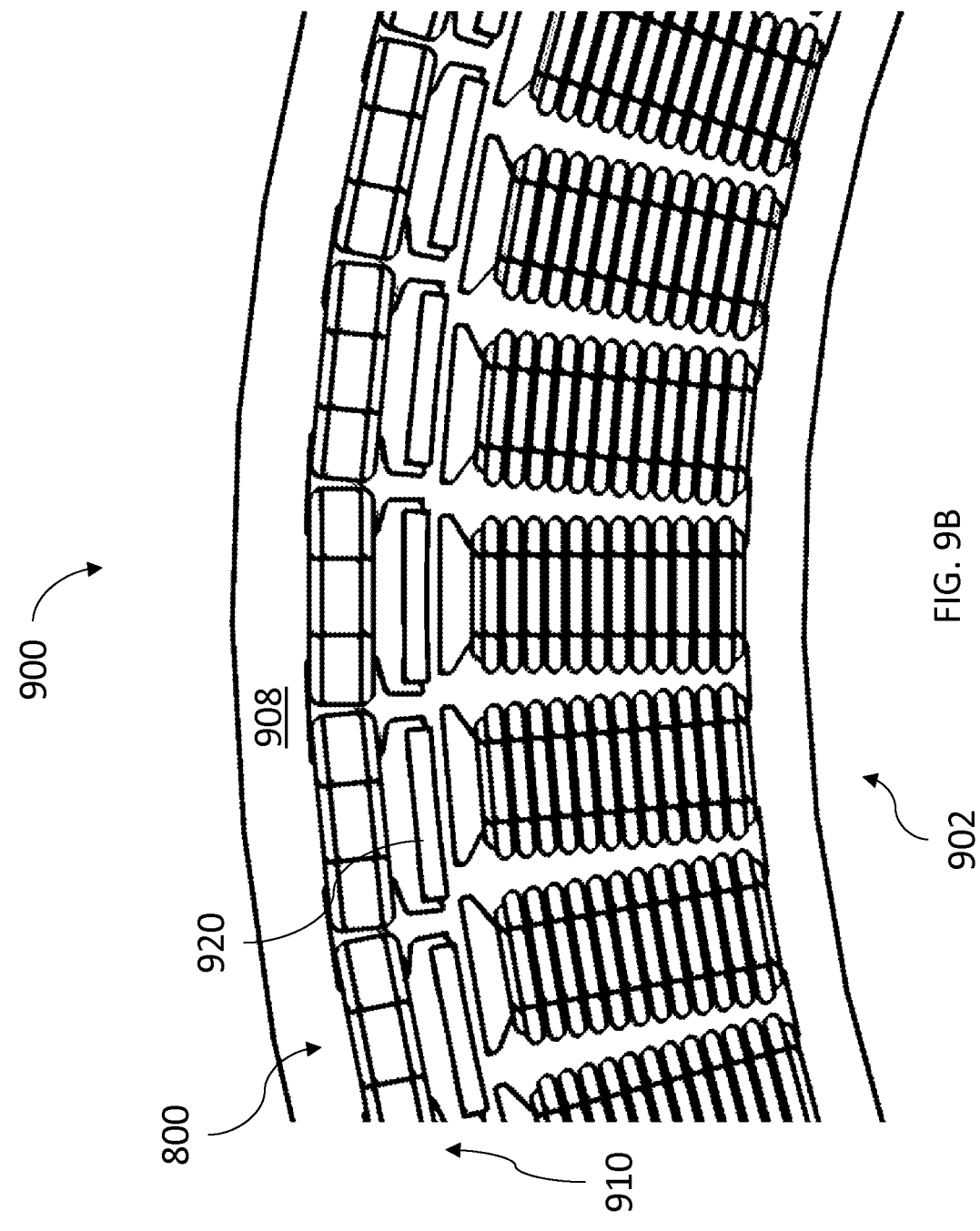
FIG. 9B is a planar view of a portion of an electric motor using the passive FPFC illustrated in FIGS. 8A-8C mounted behind a permanent magnet on the rotor.
Figure 9C:
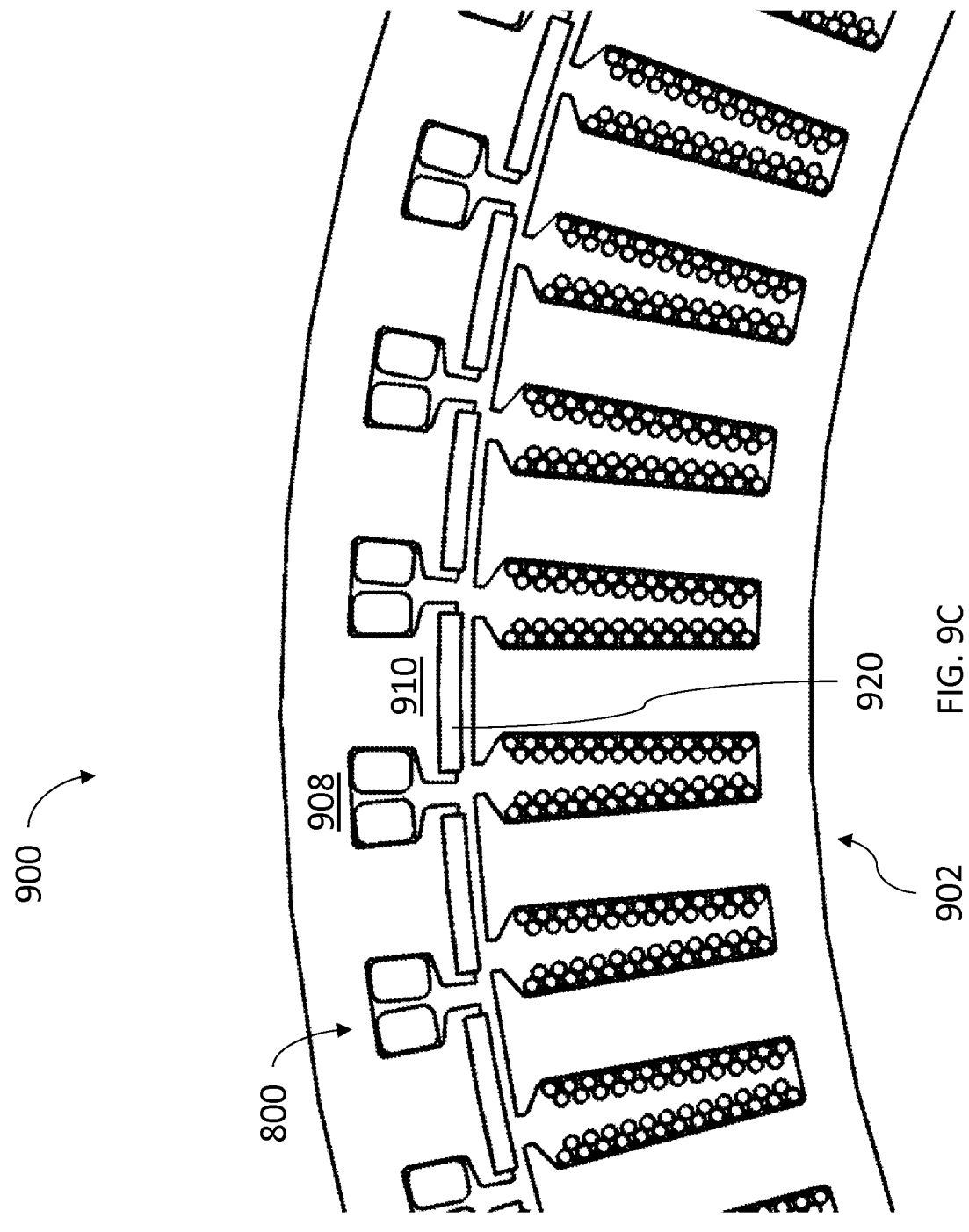
FIG. 9C is a planar cross-sectional view of a portion of an electric motor using the passive FPFC illustrated in FIGS. 8A-8C mounted behind a permanent magnet on the rotor.
Figure 9D:
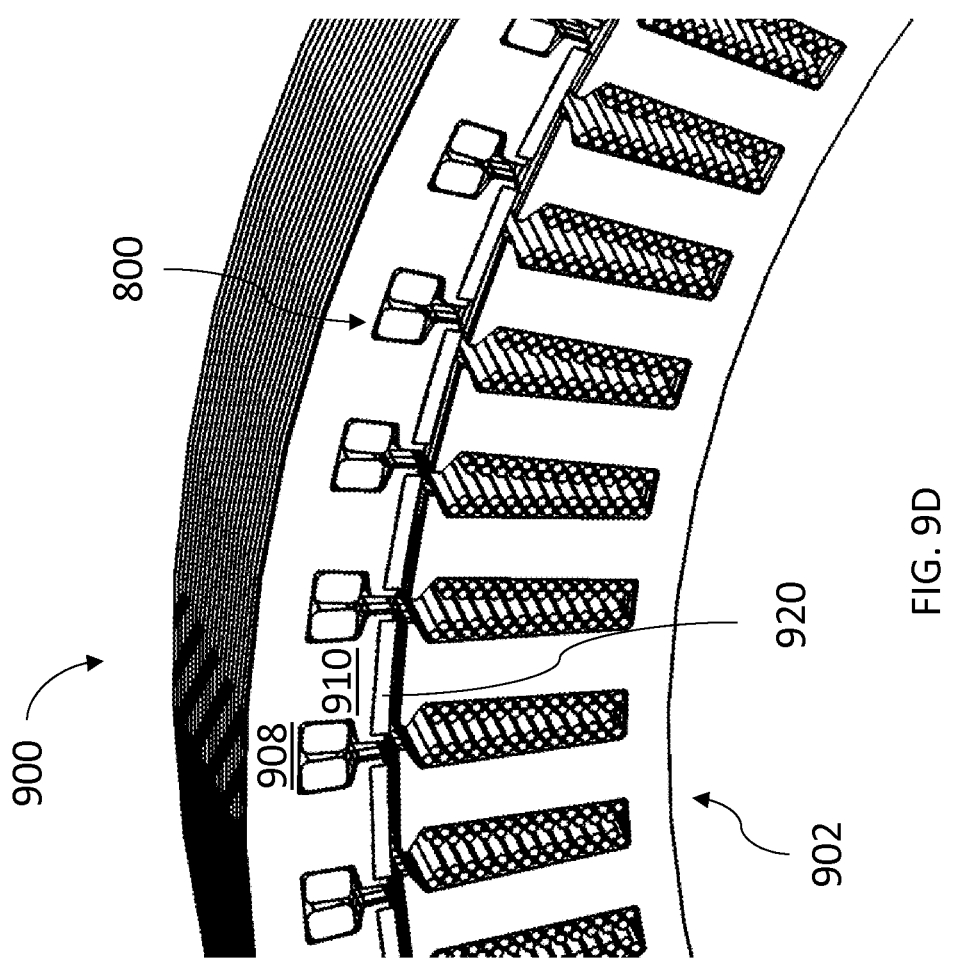
FIG. 9D is a perspective cross-sectional view of a portion of an electric motor using the passive FPFC illustrated in FIGS. 8A-8C mounted behind a permanent magnet on the rotor.

FIGS. 8A-8C are views of an example passive FPFC 800 that can be used with aspects of this disclosure. FIG. 9A is a perspective view of a portion of an electric motor 900 using the passive FPFC 800 illustrated in FIGS. 8A-8C. FIG. 9B is a planar view of a portion of the electric motor 900 using the passive FPFC 800 illustrated in FIGS. 8A-8C mounted behind a permanent magnet 920 on the rotor 908. FIG. 9C is a planar cross-sectional view of a portion of the electric motor 900 using the passive FPFC 800 illustrated in FIGS. 8A-8C mounted behind a permanent magnet 920 on the rotor 908. FIG. 9D is a perspective cross-sectional view of a portion of the electric motor 900 using the passive FPFC 800 illustrated in FIGS. 8A-8C mounted behind a permanent magnet 920 on the rotor 908. The electric motor 900 is operates on similar principles to the electric motor 500, and should be considered to be similar to the electric motor 700 with the exception of any differences described herein.

The electric motor 900 has a rotor 908 circumferentially surrounding a stator 902. The FPFCs 800 surround their respective rotor poles 910 and have a rounded rectangular cross section. In the illustrated implementation, the rotor poles include a lip 918 arranged to retain each FPFC 800 on their respective rotor pole 910. Other arrangements can be used to retain each FPFC 800, such as various fasteners, adhesives, or resins. As the illustrated implementation includes an external rotor 908, centrifugal force during operation can also help retain the FPFCs 800.

In this implementation, the FPFCs are positioned behind permanent magnets 920 that are located each of the rotor poles 910. The permanent magnets 920 can be made from a variety of material, including ferrite, SmFeN, N35, N45. While lower power permanent magnetic material is typically used, higher powered magnetic material in lower quantities can be used without departing from this disclosure. The permanent magnets 920 can extend across the entire longitudinal length of each rotor pole 910 or partially across each rotor pole 910. In some implementations, the permanent magnets 920 can be made-up of multiple layers or laminations.

Figures 10A, 10B, 10C, 11A:
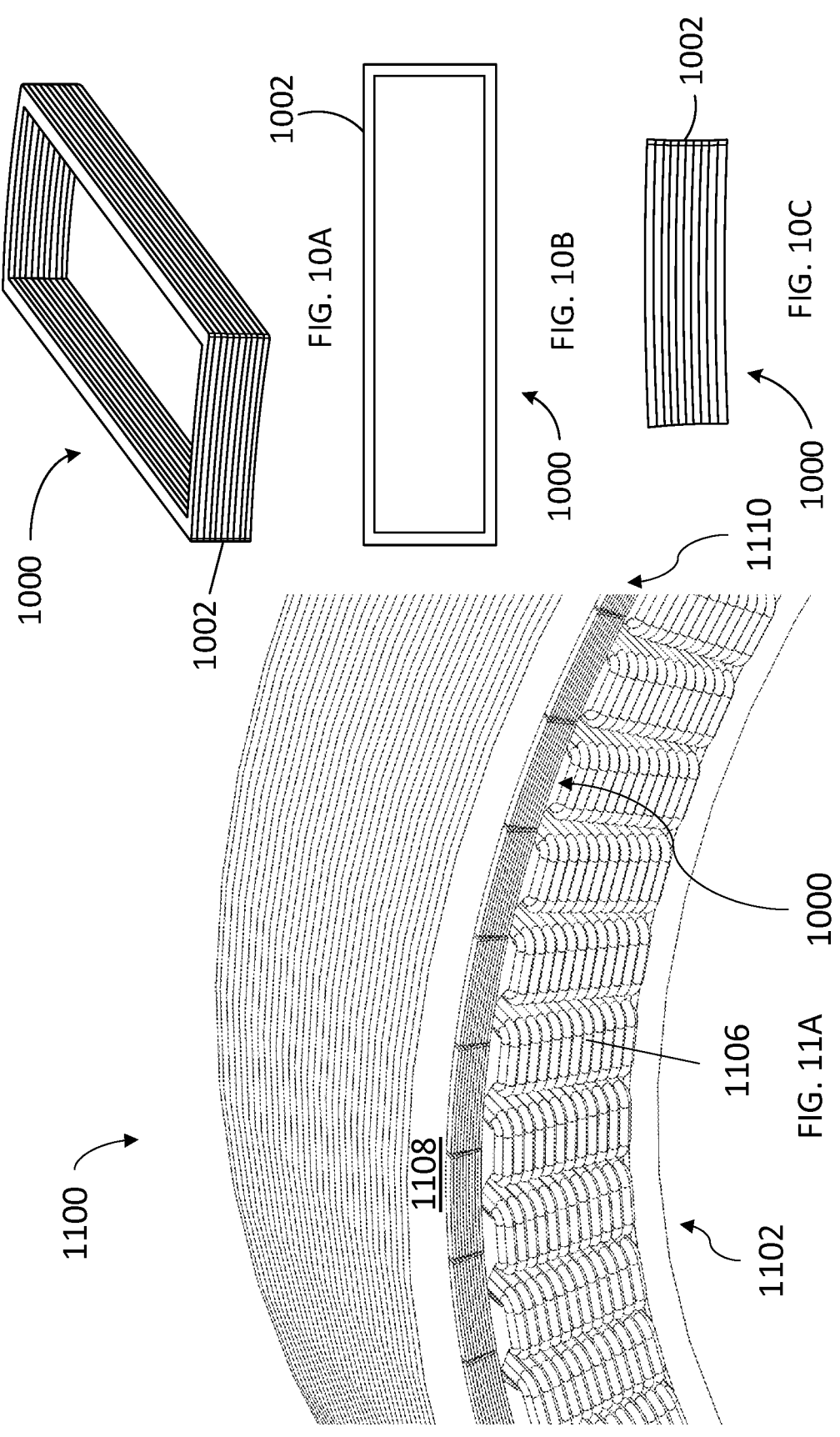
FIGS. 10A-10C are views of an example passive FPFC that can be used with aspects of this disclosure.
FIG. 11A is a perspective view of a portion of an electric motor using the passive FPFC illustrated in FIGS. 10A-10C.
Figure 11B:
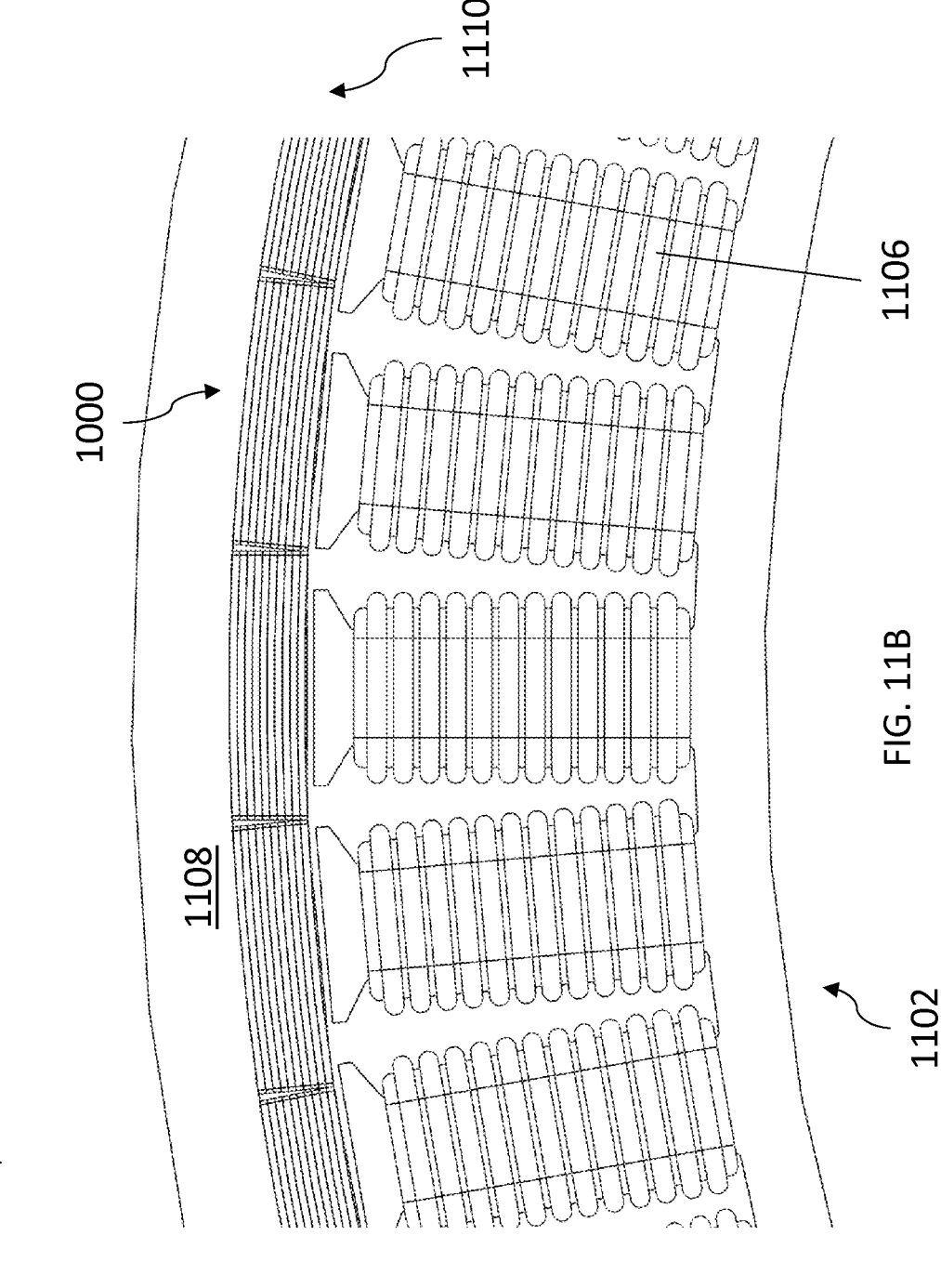
FIG. 11B is a planar view of a portion of an electric motor using the passive FPFC illustrated in FIGS. 10A-10C.
Figure 11C:
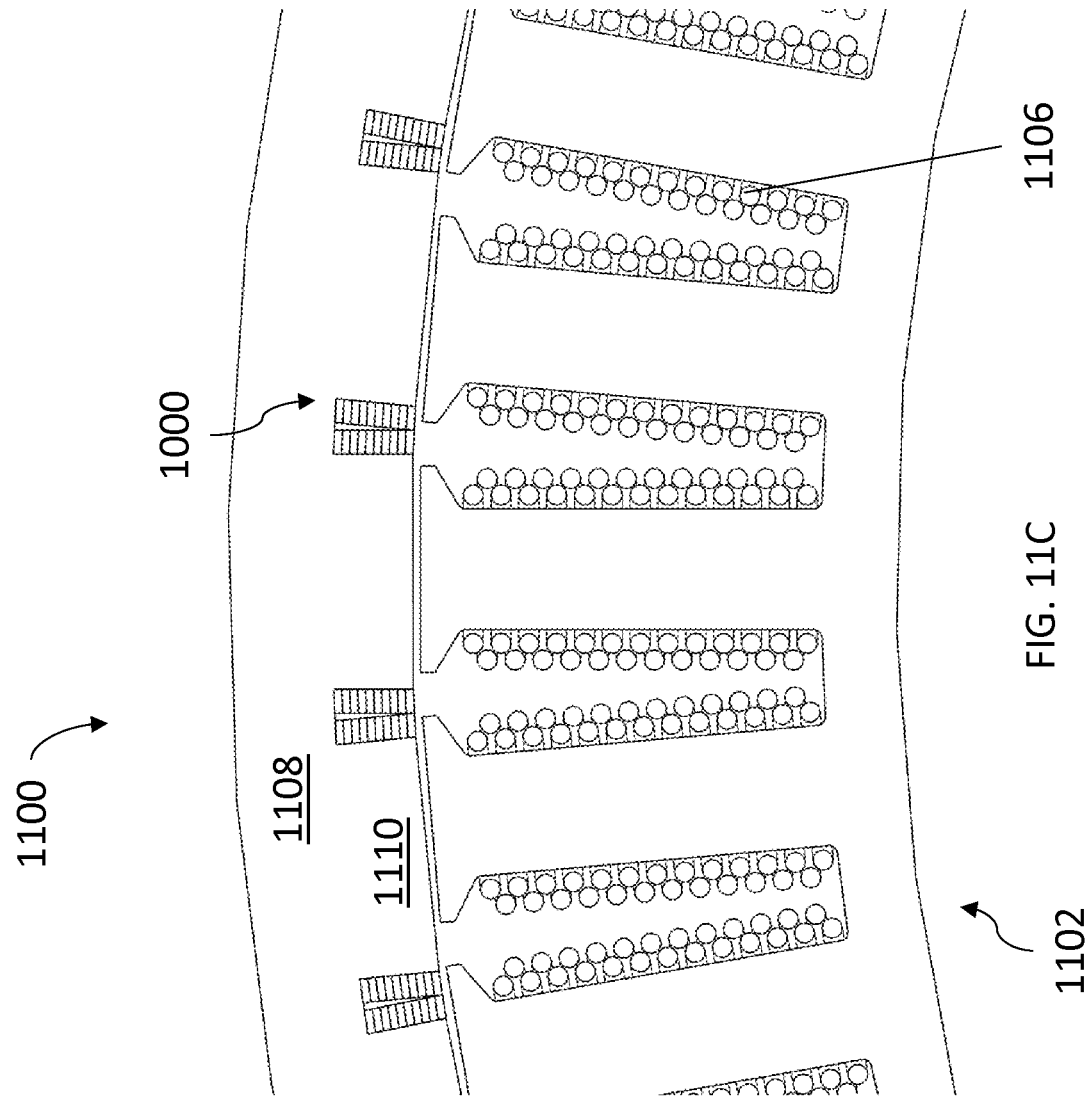
FIG. 11C is a planar cross-sectional view of a portion of an electric motor using the passive FPFC illustrated in FIGS. 10A-10C.
Figure 11D:
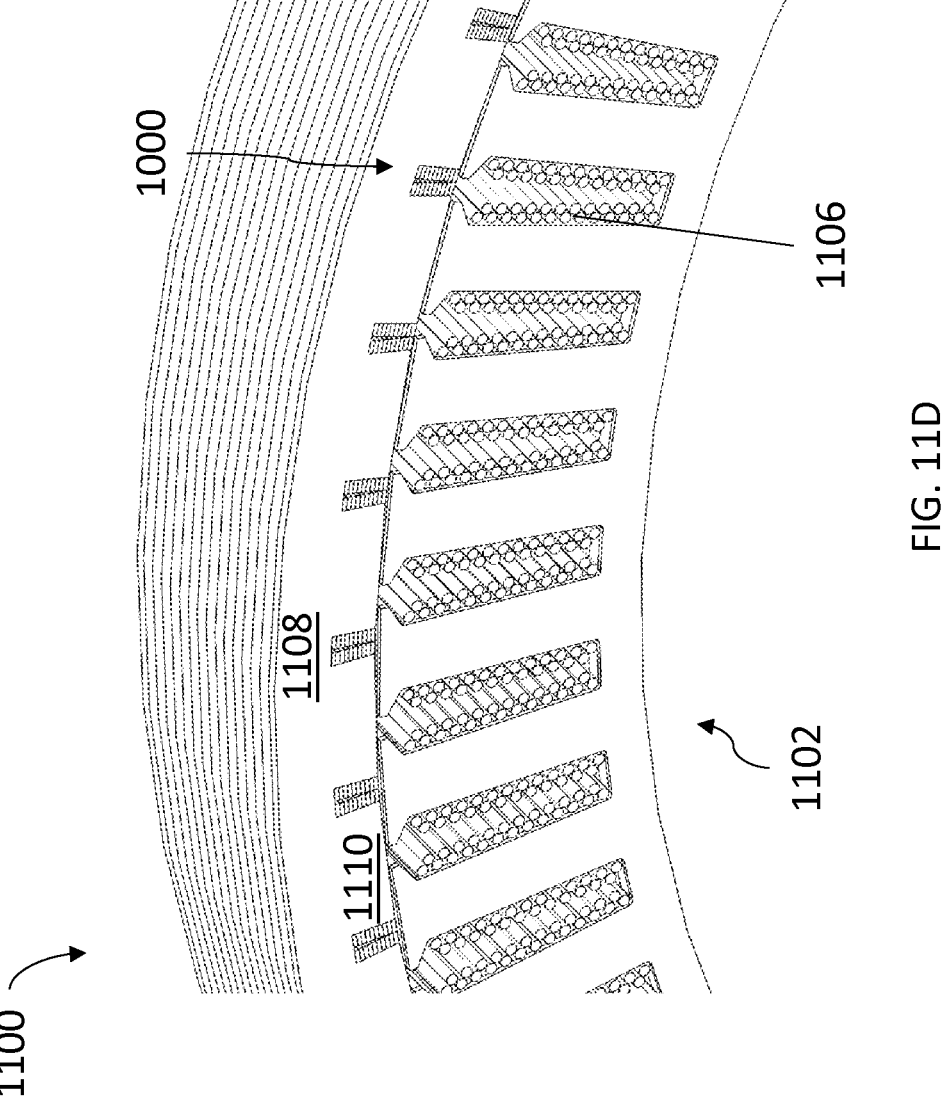
FIG. 11D is a perspective cross-sectional view of a portion of an electric motor using the passive FPFC illustrated in FIGS. 10A-10C.

FIGS. 10A-10C are views of an example passive FPFC 1000 that can be used with aspects of this disclosure. FIG. 11A is a perspective view of a portion of an electric motor 1100 using the passive FPFC 1000 illustrated in FIGS. 10A-10C. FIG. 11B is a planar view of a portion of the electric motor 1100 using the passive FPFC 1100 illustrated in FIGS. 10A-10C. FIG. 11C is a planar cross-sectional view of a portion of an electric motor 1100 using the passive FPFC 1000 illustrated in FIGS. 10A-10C. FIG. 11D is a perspective cross-sectional view of a portion of the electric motor 1100 using the passive FPFC 1000 illustrated in FIGS. 10A-10C. The electric motor 1100 is substantially similar to the electric motor 900 with the exception of any differences described herein.

The FPFC 1000 includes multiple, thin laminations 1002 that encircle each rotor pole. The thinner laminations can allow for full skin depth penetration at higher operating frequencies. Each lamination 1002 is electrically isolated from one-another within each FPFC 1000. In this implementation, no permanent magnets are used. This is because the FPFCs 1000 are capable of reflecting the entirety of the flux produced by the stator windings 1106, resulting in an electromotive force acting on the rotor 1108. This capability is inherent in all of the FPFC implementations described herein. In the illustrated implementation, the rotor poles 1110 do not include a lip to retain the FPFCs 1000 in place around their respective rotor poles 1110. Instead, fasteners, adhesive, resin, a friction fit, or an interference fit can be used to retain the FPFCs 1000 around their respective rotor poles 1100.

Figures 12A, 12B, 12C, 13A:
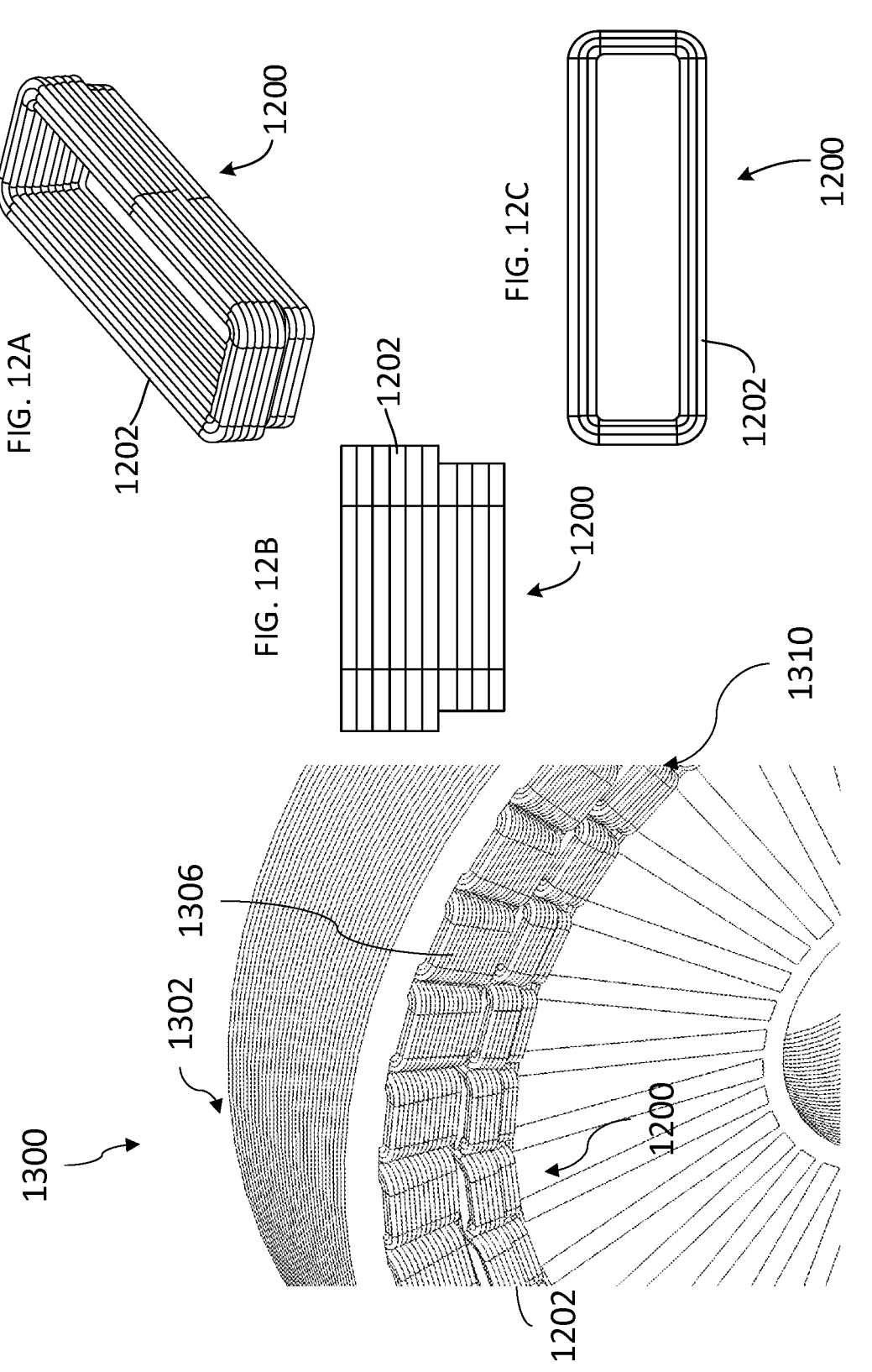
FIGS. 12A-12C are views of an example passive FPFC that can be used with aspects of this disclosure.
FIG. 13A is a perspective view of a portion of an electric motor using the passive FPFC illustrated in FIGS. 12A-12C.
Figure 13B:
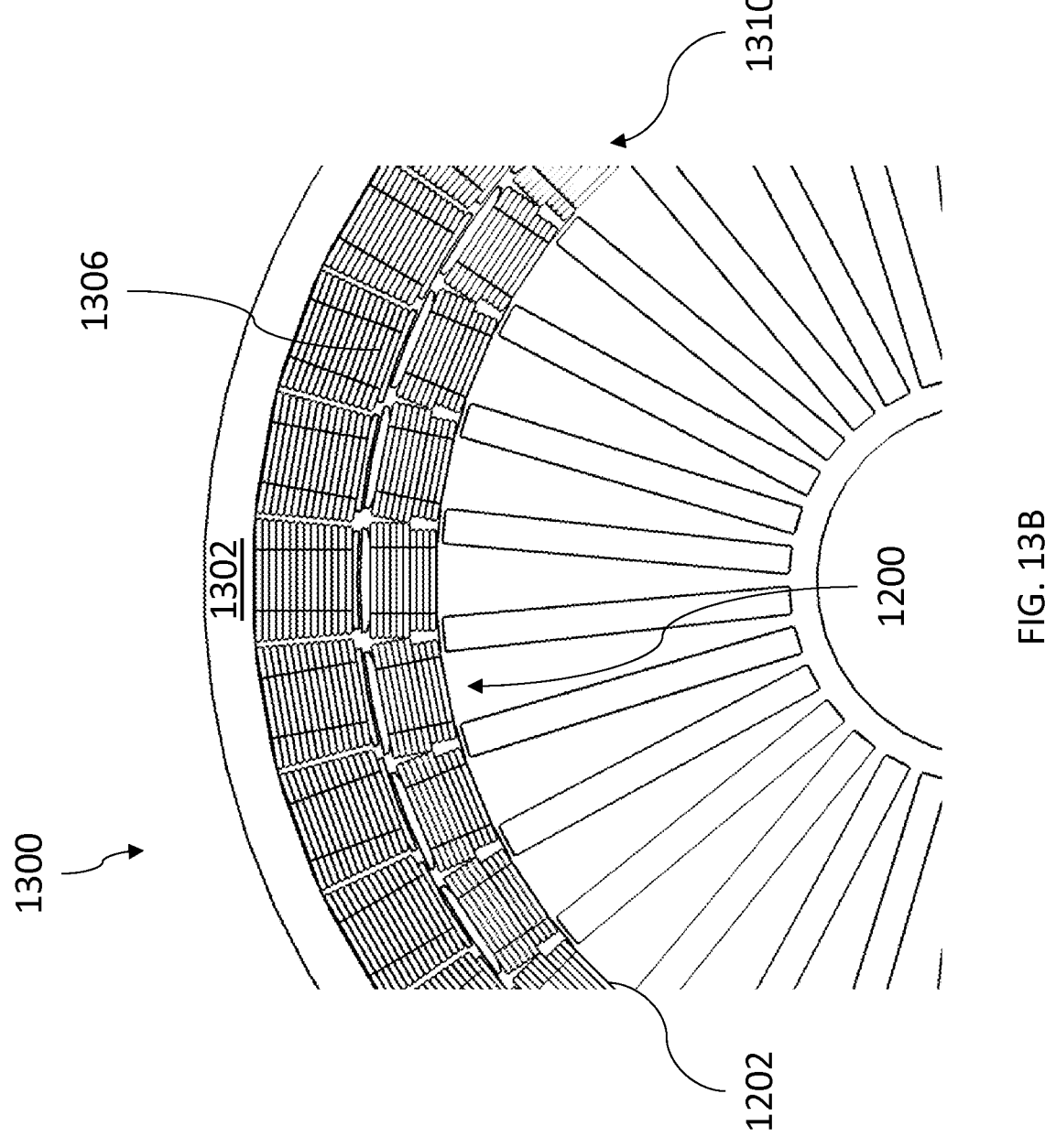
FIG. 13B is a planar view of a portion of an electric motor using the passive FPFC illustrated in FIGS. 12A-12C.
Figure 13C:
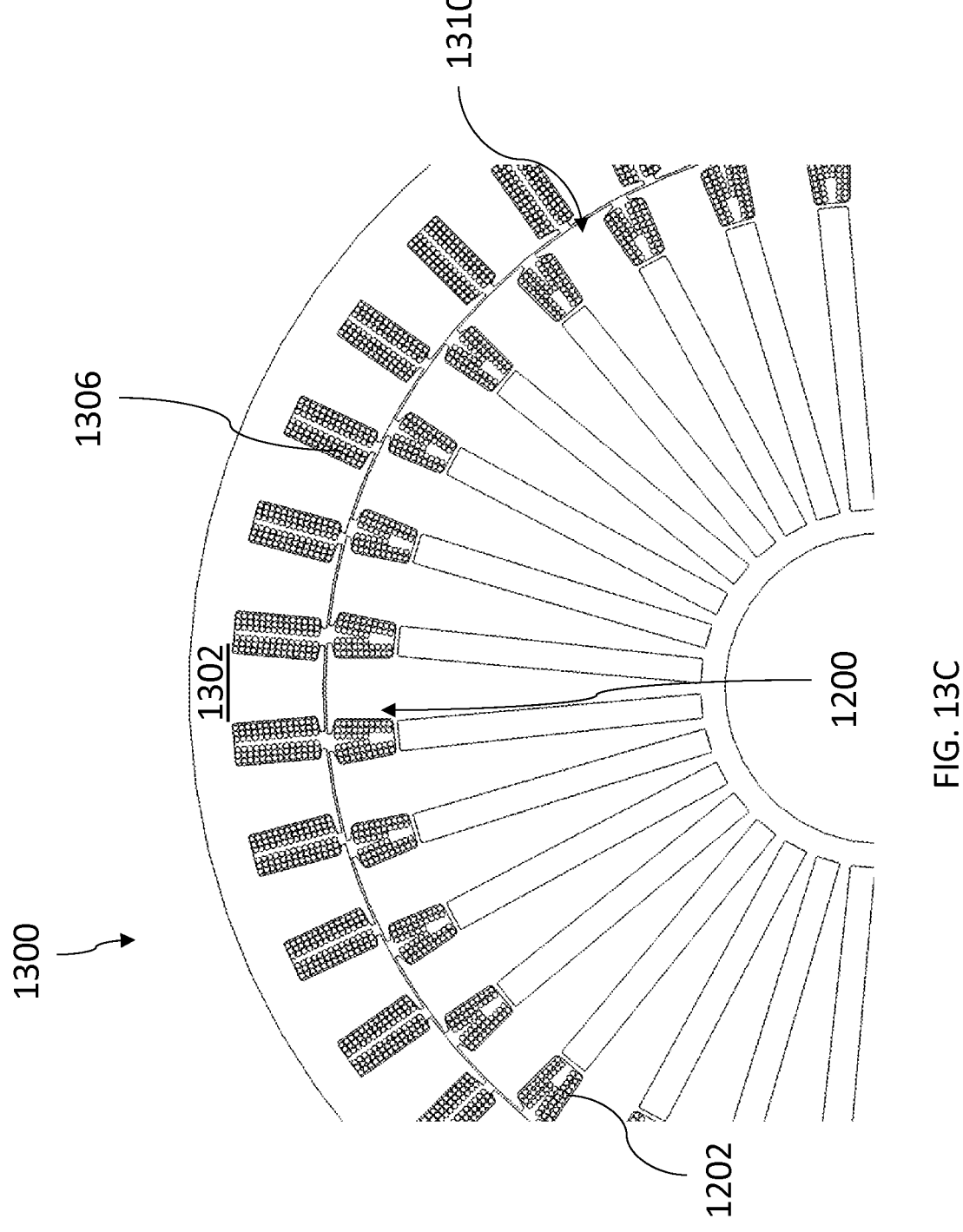
FIG. 13C is a planar cross-sectional view of a portion of an electric motor using the passive FPFC illustrated in FIGS. 12A-12C.
Figure 13D:
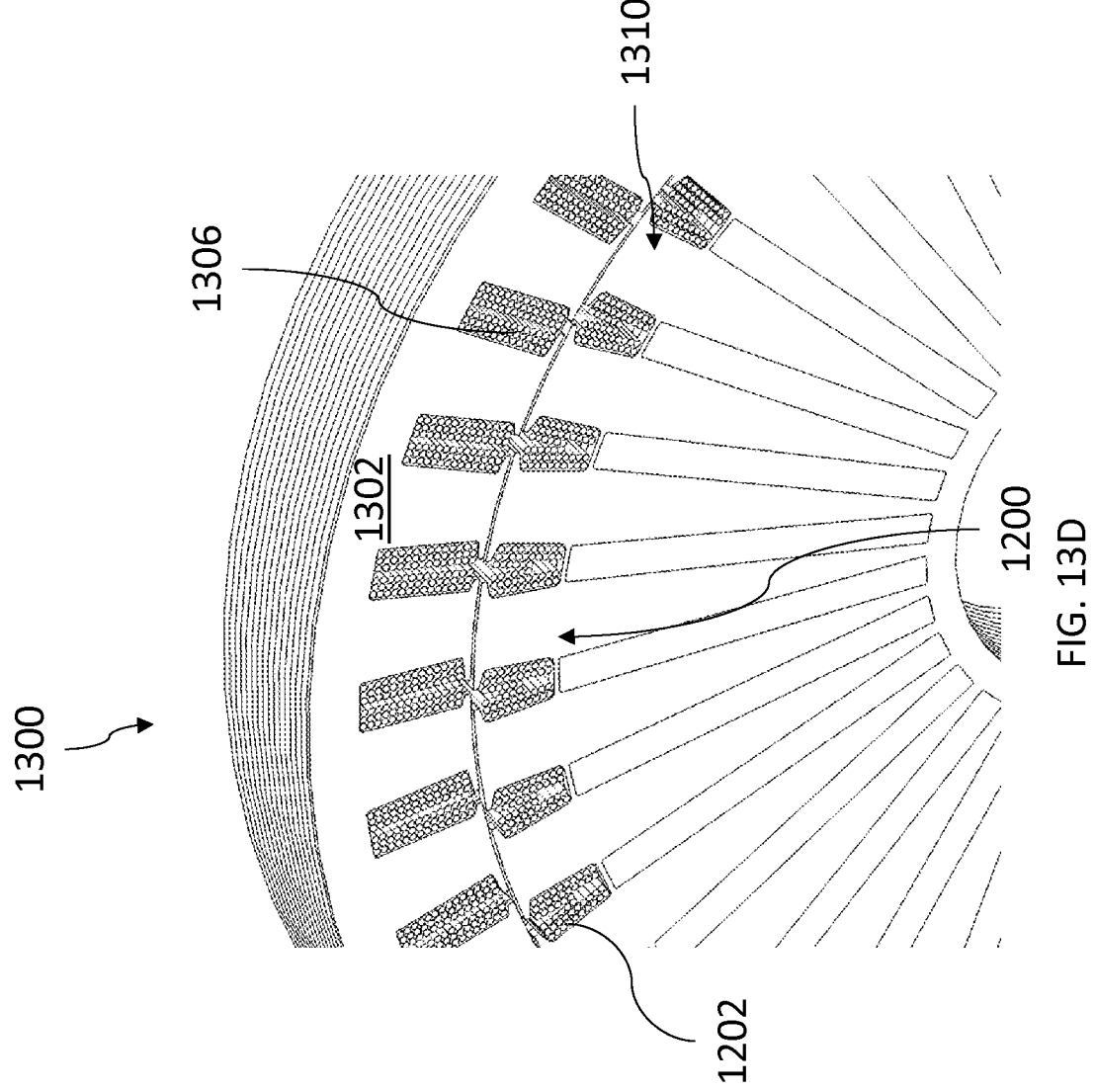
FIG. 13D is a perspective cross-sectional view of a portion of an electric motor using the passive FPFC illustrated in FIGS. 12A-12C.

FIGS. 12A-12C are views of an example passive FPFC 1200 that can be used with aspects of this disclosure. FIG. 13A is a perspective view of a portion of an electric motor 1300 using the passive FPFC 1200 illustrated in FIGS. 12A-12C. FIG. 13B is a planar view of a portion of the electric motor 1300 using the passive FPFC 1300 illustrated in FIGS. 12A-12C. FIG. 13C is a planar cross-sectional view of a portion of the electric motor 1300 using the passive FPFC 1200 illustrated in FIGS. 12A-12C. FIG. 13D is a perspective cross-sectional view of a portion of the electric motor 1300 using the passive FPFC 1200 illustrated in FIGS. 12A-12C. The electric motor 1300 is substantially similar to the electric motor 500 with the exception of any differences described herein.

The FPFCs 1200 include shorted windings of at least one loop similar to the windings 1306 used within the stator 1302. In other words, a single conductor 1202 encircles a respective rotor pole 1310 multiple times before shorting on itself. Such an arrangement allows for conductor 1202 within the FPFC 1200 to include a smaller cross-sectional area can allow for full skin depth penetration at higher operating frequencies. Such an arrangement also allows for improved uniform inductance across the FPFC 1200 when compared to solid conductors with a larger cross sectional area per loop around each pole 1310.

Figures 14A, 14B, 14C, 15A:
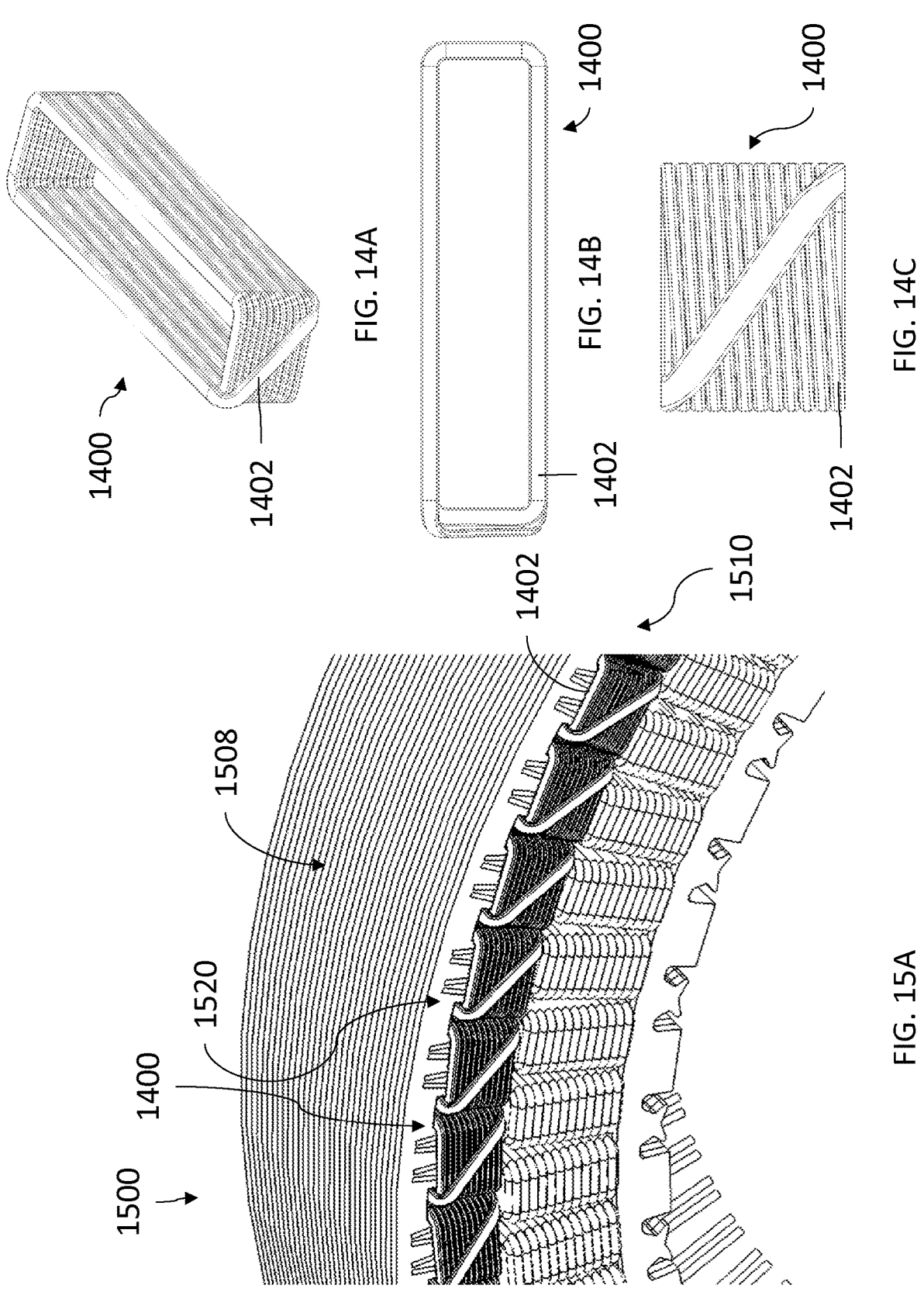
FIGS. 14A-14C are views of an example passive FPFC that can be used with aspects of this disclosure.
FIG. 15A is a perspective view of a portion of an electric motor using the passive FPFC illustrated in FIGS. 14A-14C.
Figure 15B:
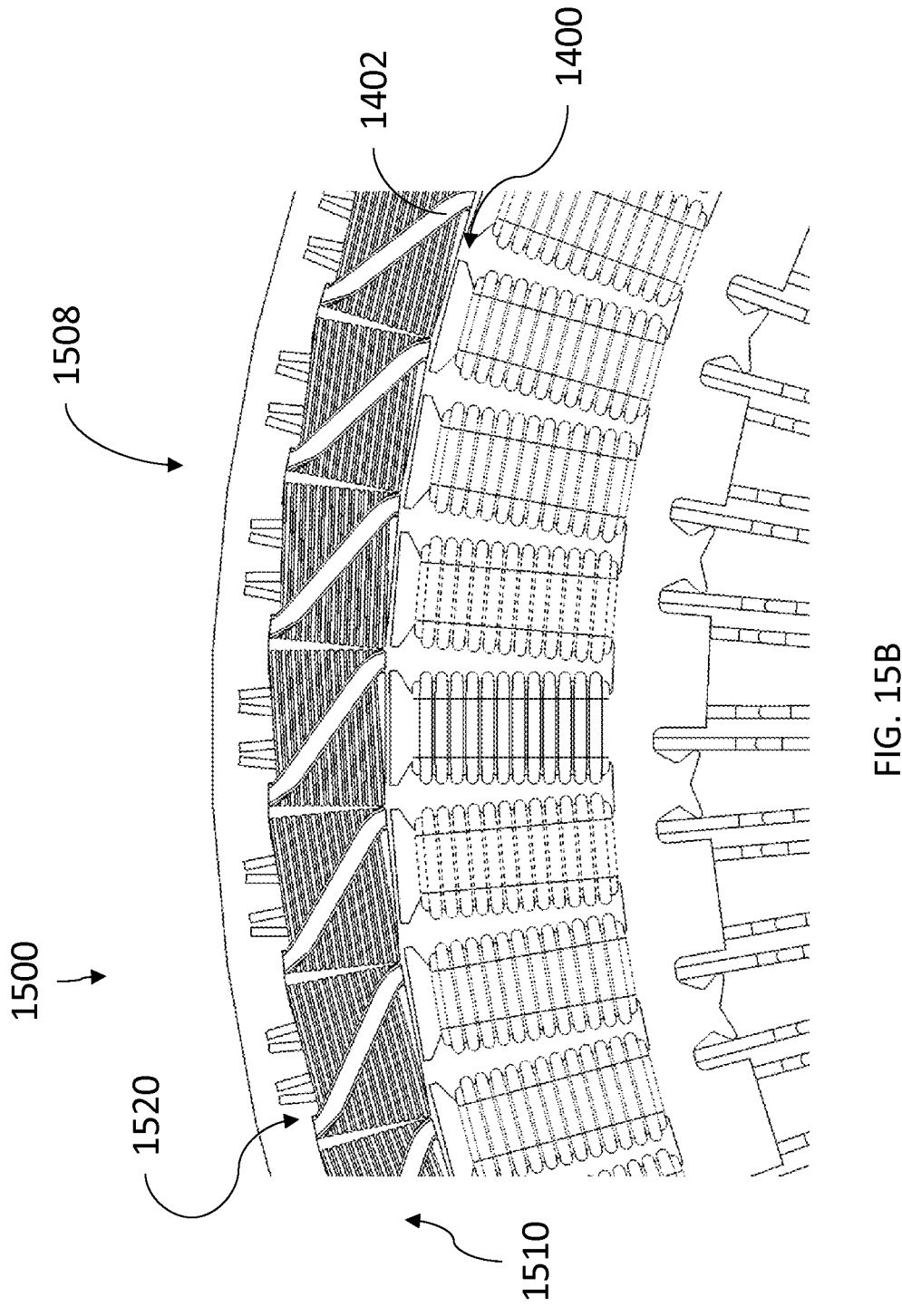
FIG. 15B is a planar view of a portion of an electric motor using the passive FPFC illustrated in FIGS. 14A-14C.
Figure 15C:
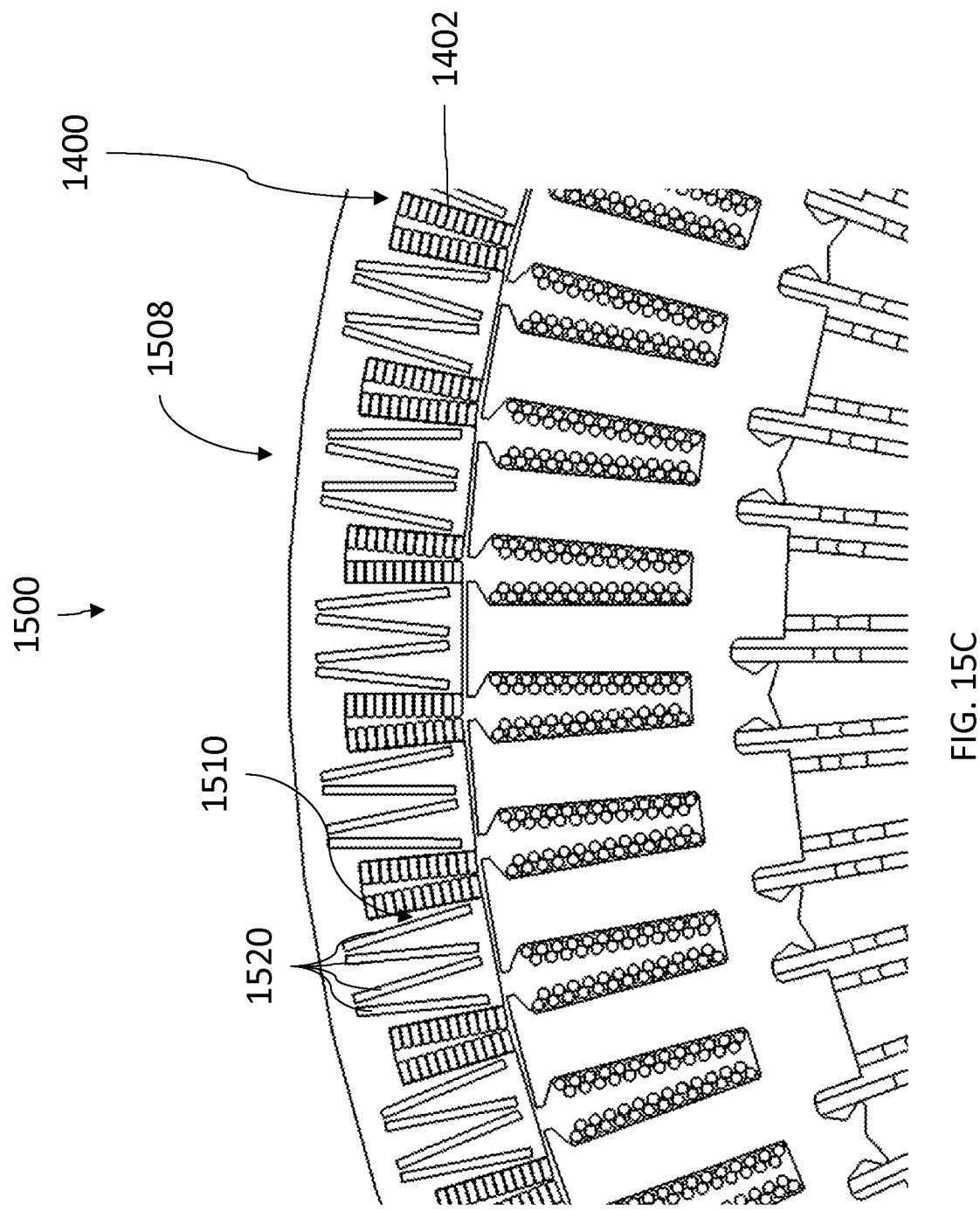
FIG. 15C is a planar cross-sectional view of a portion of an electric motor using the passive FPFC illustrated in FIGS. 14A-14C.
Figure 15D:
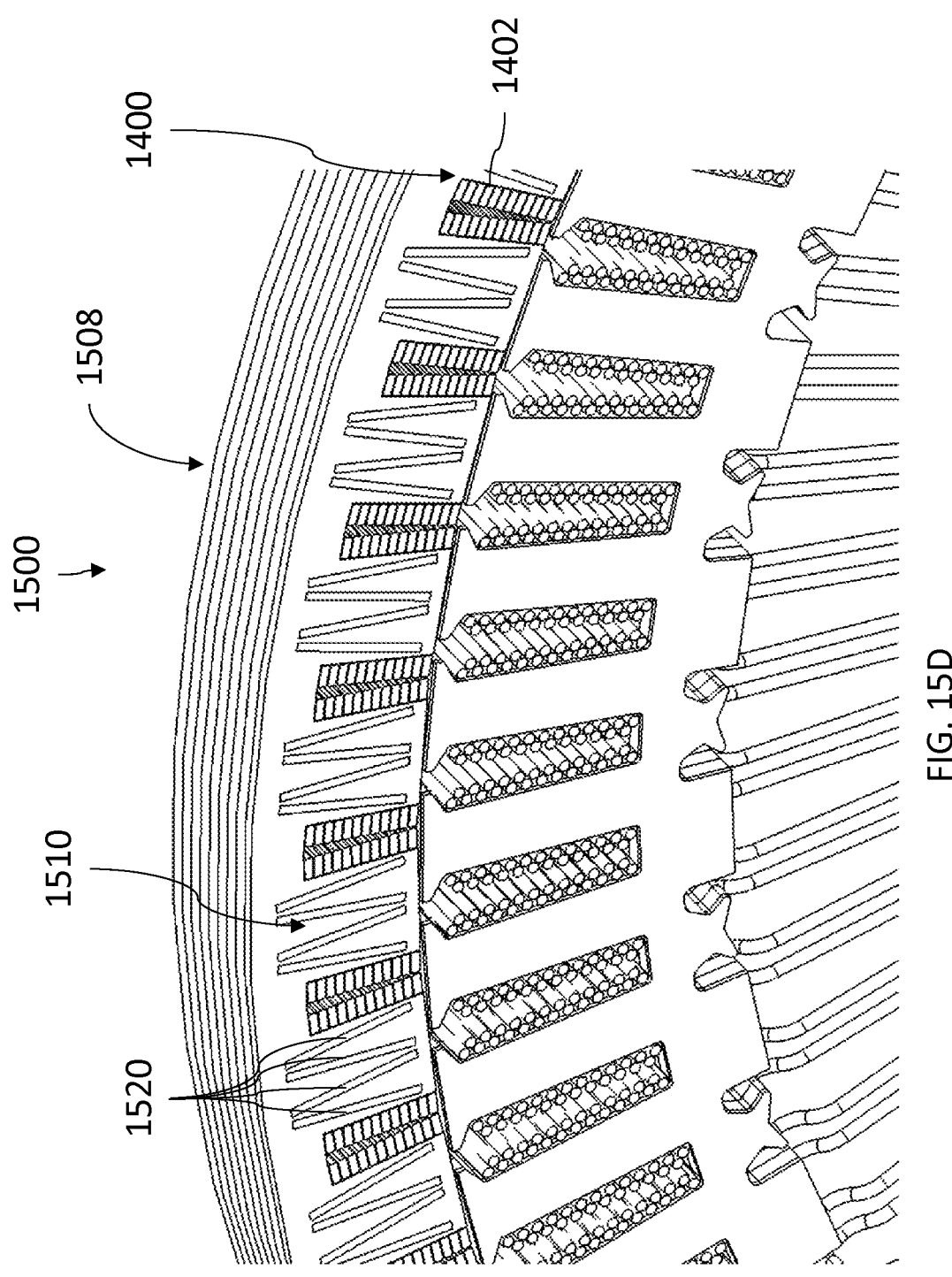
FIG. 15D is a perspective cross-sectional view of a portion of an electric motor using the passive FPFC illustrated in FIGS. 14A-14C.

FIGS. 14A-14C are views of an example passive FPFC 1400 that can be used with aspects of this disclosure. FIG. 15A is a perspective view of a portion of an electric motor 1500 using the passive FPFC 1400 illustrated in FIGS. 14A-14C. FIG. 15B is a planar view of a portion of the electric motor 1500 using the passive FPFC 1400 illustrated in FIGS. 14A-14C. FIG. 15C is a planar cross-sectional view of a portion of the electric motor 1500 using the passive FPFC 1400 illustrated in FIGS. 14A-14C. FIG. 15D is a perspective cross-sectional view of a portion of the electric motor 1500 using the passive FPFC 1400 illustrated in FIGS. 14A-14C. The electric motor 1500 is substantially similar to the electric motor 900 with the exception of any differences described herein.

The FPFCs 1400 each include a shorted coil 1402. In other words, a single conductor encircles a respective rotor pole 1510 multiple times before shorting on itself. Such an arrangement allows for the conductor within the FPFC 1400 to include a smaller cross-sectional area can allow for full skin depth penetration at higher operating frequencies. Such an arrangement also allows for improved uniform inductance across the FPFC 1400 when compared to solid conductors with a larger cross-sectional area. While the illustrated implementation includes a conductor with a substantially rectangular cross-section, other cross-section shapes can be used without departing from this disclosure.

The rotor 1508 can include multiple permanently magnetic channels 1520. In some implementations, multiple permanently magnetic channels 1520 can be included within each rotor pole 1510. As illustrated each pole includes four channels 1520 arranged in a substantial "M" of "W" configurations; however, other arrangements can be used without departing from this disclosure. The permanently magnetic channels 1520 can be include a variety of material, including ferrite, SmFeN, N35, N45. While lower power permanent magnetic material is typically used, higher powered magnetic material in lower quantities can be used without departing from this disclosure. The permanently magnetic channels 1520 can extend across the entire longitudinal length of each rotor pole 1510 or partially across each rotor pole 1510. In some implementations, the permanently magnetic channels 1520 can be made-up of multiple layers or laminations.

Figures 16A, 16B:
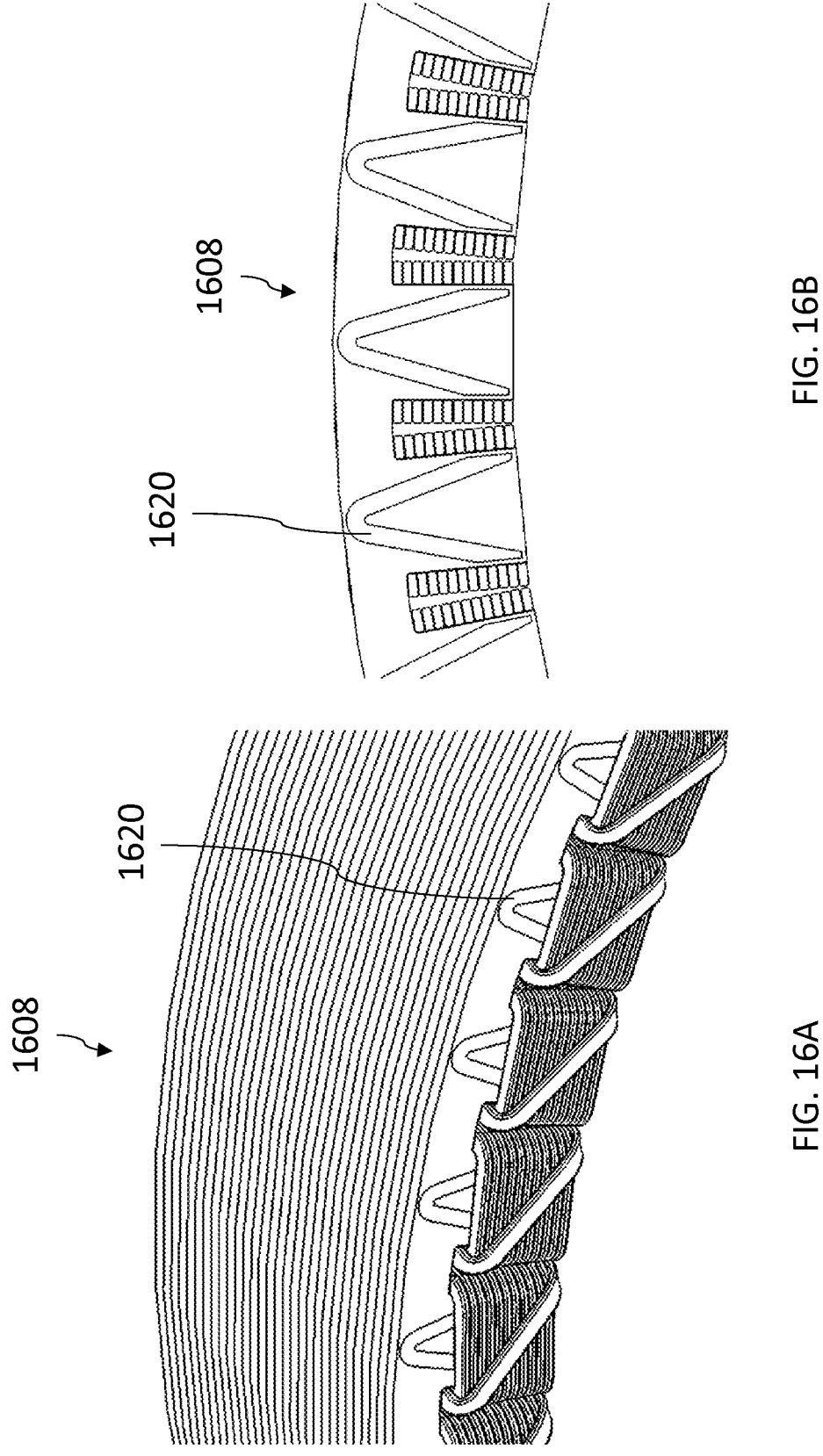
FIG. 16A is a perspective view of a rotor with the passive FPFC illustrated in FIGS. 14A-14C.
FIG. 16B is a planar cross-sectional view of the rotor illustrated in FIG. 16A.

FIG. 16A is a perspective view of a rotor 1608 with the passive FPFC 1400 illustrated in FIGS. 14A-14C. FIG. 16B is a planar cross-sectional view of the rotor 1608 illustrated in FIG. 16A. The electric rotor 1608 illustrated in FIGS. 16A-16B is substantially similar to the rotor illustrated in FIGS. 15A-15D with the exception of any differences described herein. In this implementation, each pole includes a single "V"-shaped permanently magnetic channel 1620. Other arrangements can be used without departing from this disclosure.

Figure 17A:
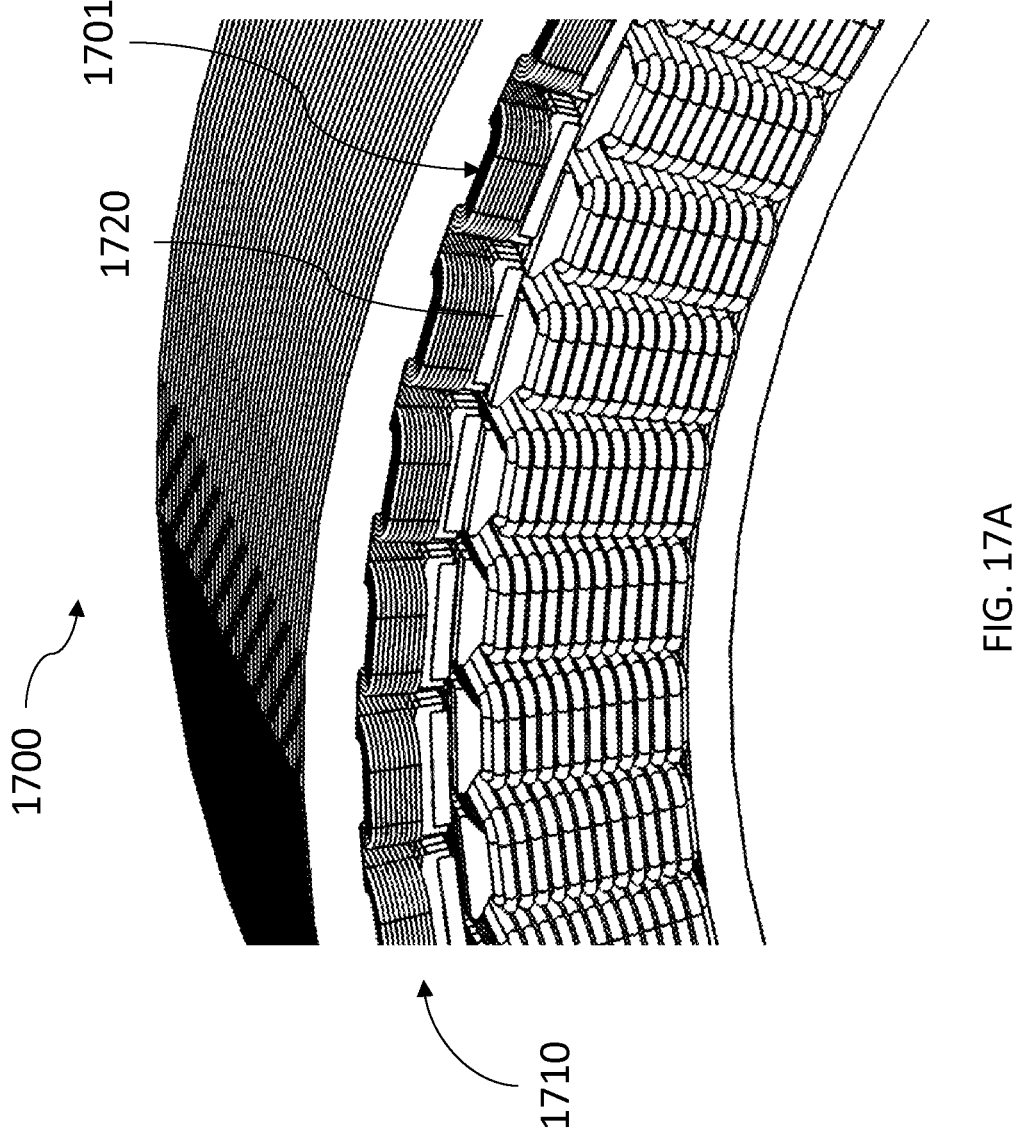
FIG. 17A is a perspective view of an electric motor with an example passive FPFC mounted behind a permanent magnet on a rotor.
Figure 17B:
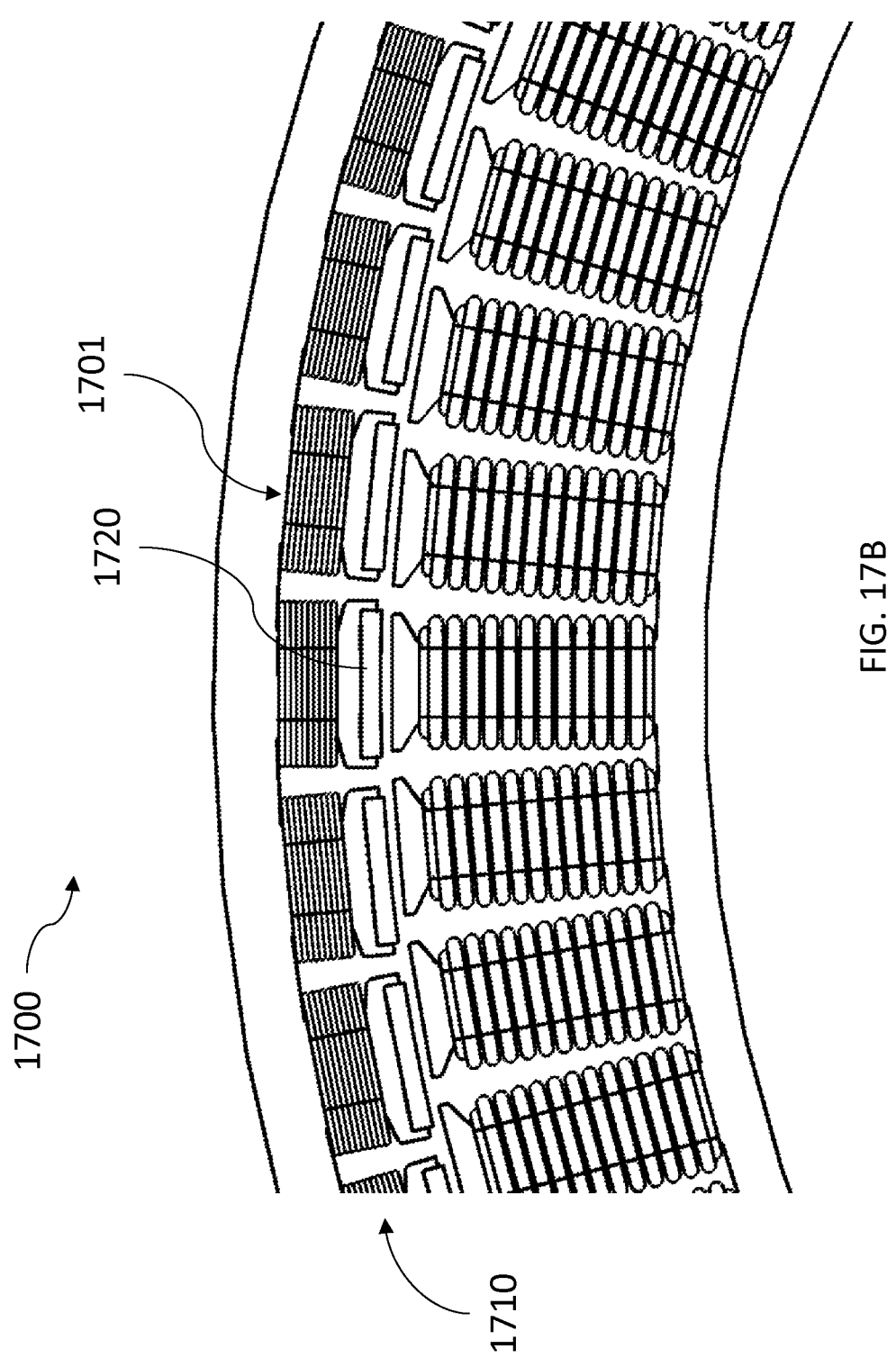
FIG. 17B is a planar view of a portion of the electric motor illustrated in FIG. 17A.
Figure 17C:
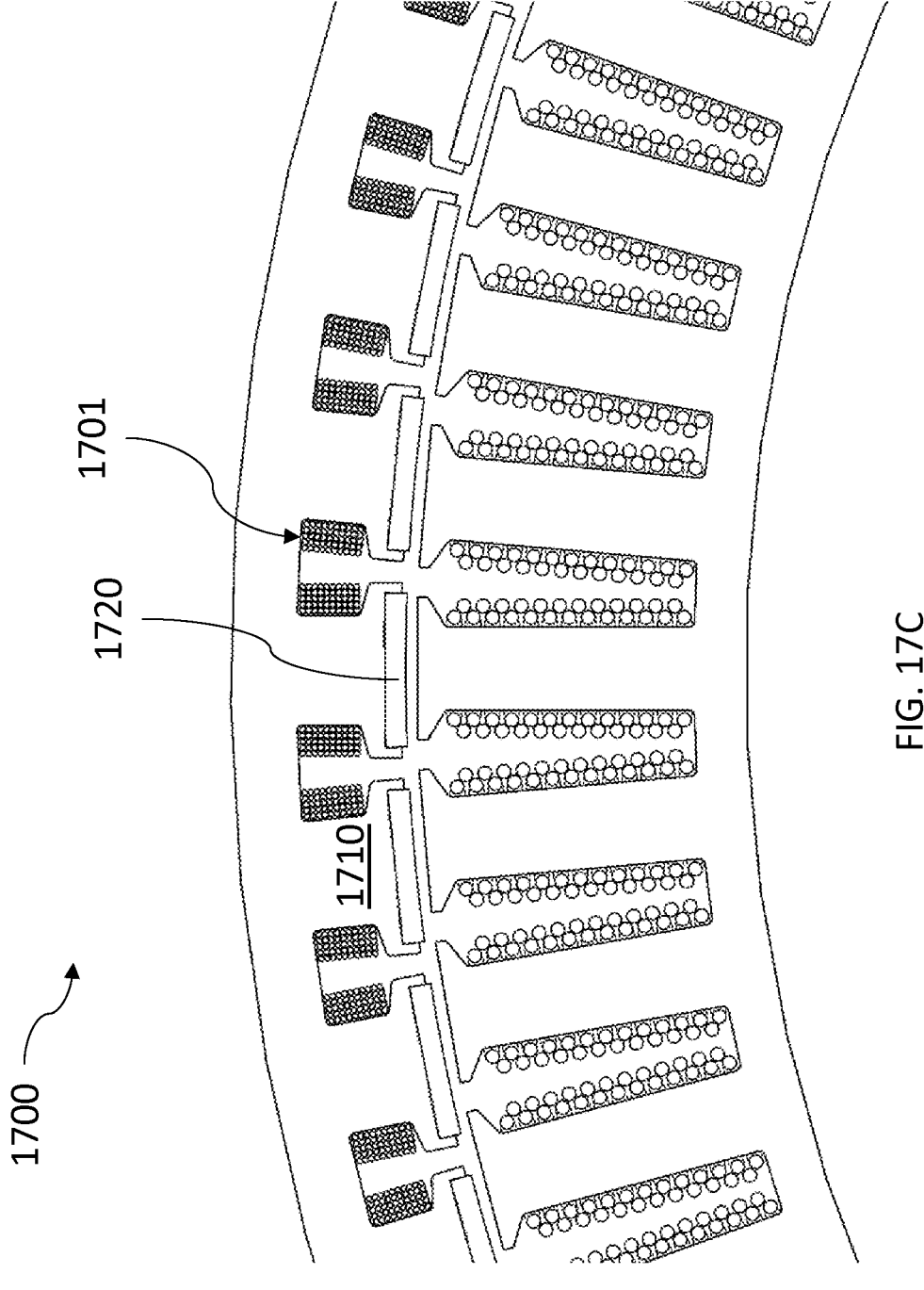
FIG. 17C is a planar cross-sectional view of a portion of an electric motor illustrated in FIG. 17A.
Figure 17D:
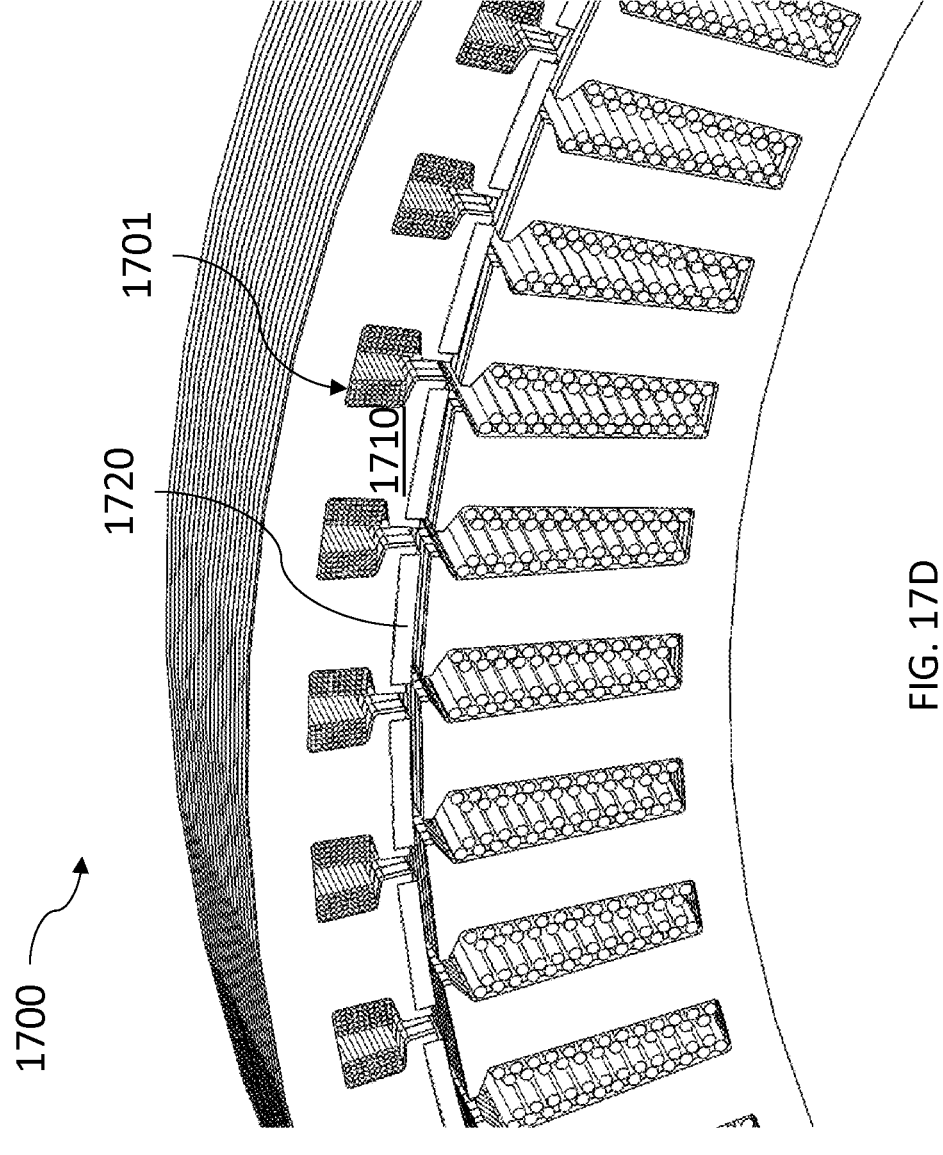
FIG. 17D is a perspective cross-sectional view of a portion of an electric motor illustrated in FIG. 17A.

FIG. 17A is a perspective view of an electric motor 1700 with an example passive FPFC 1701 mounted behind a permanent magnet 1720 on a rotor 1708. FIG. 17B is a planar view of a portion of the electric motor 1700 illustrated in FIG. 17A. FIG. 17C is a planar cross-sectional view of a portion of the electric motor 1700 illustrated in FIG. 17A. FIG. 17D is a perspective cross-sectional view of a portion of the electric motor 1700 illustrated in FIG. 17A. The electric motor 1700 is substantially similar to the electric motor 900 illustrated in FIGS. 9A-9D with the exception of any differences described herein. The FPFCs 1701 used in the electric motor 1700 are similar to the FPFCs 1200 illustrated in FIGS. 12A-12C. That is, the FPFCs 1701 are made-up of windings. A conductor within the winding encircles a respective rotor pole 1710 multiple times before shorting upon itself.

Figure 18:
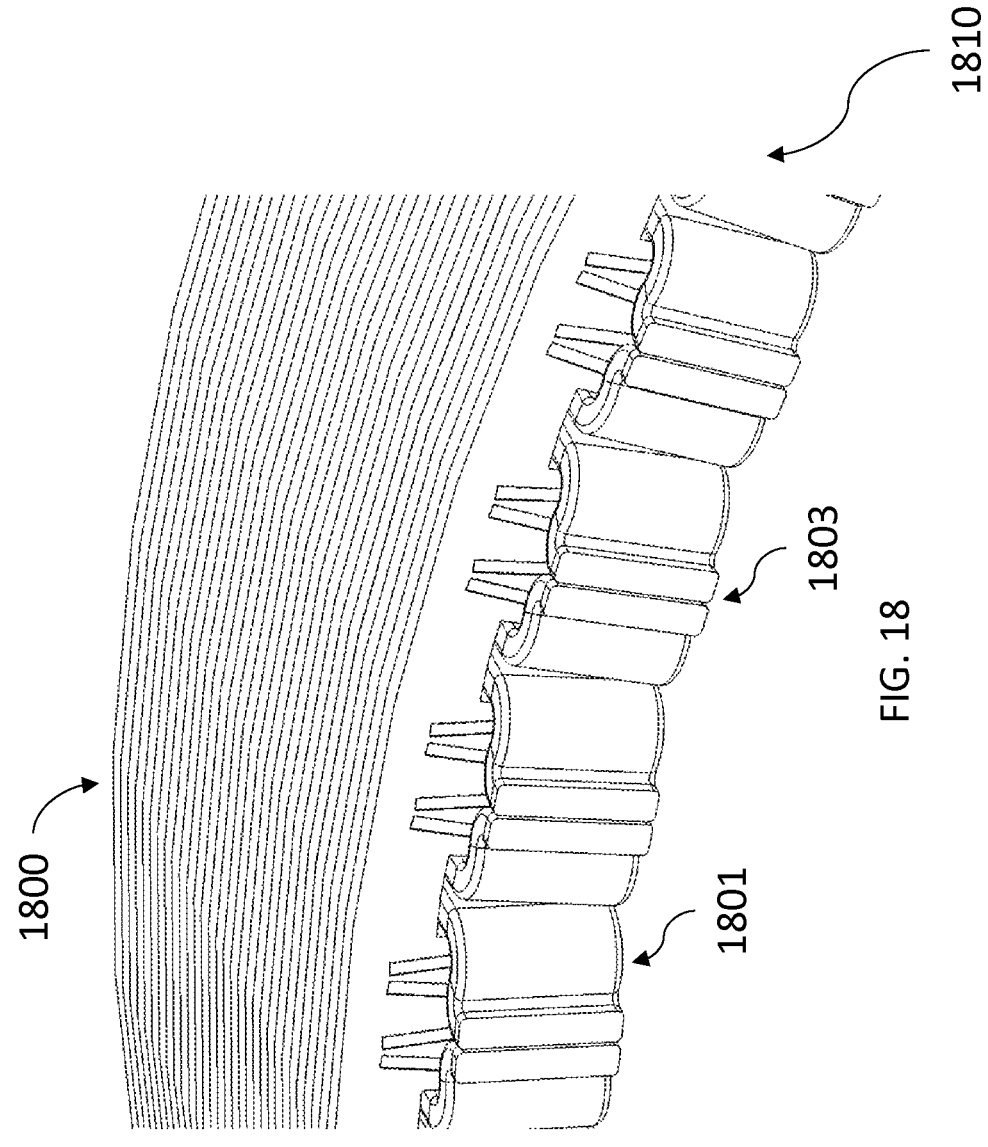
FIG. 18 is a perspective view of an example electric rotor with an example passive FPFC.

FIG. 18 is a perspective view of an example electric rotor 1800 with an example passive FPFC 1801. The FPFC 1801 is made of litz wire. As illustrated, a shorted ribbon of litz wire encircles each rotor pole 1810 and is shorted at a termination point 1803, forming a conductive loop. Litz wire includes multiple thin wire strands that do not occupy the same radial positon within the FPFC over the length of the conductive loop. That is, there is a weaving or twisting pattern to the wires such that individual strands on the inside of the FPFC for a portion of the length of the FPFC and are on the outside of the FPFC for a portion of the length of the FPFC. In some implementations, the thickness of the individual strands is less than that of the effective skin depth. That is, the thickness of the strands is small enough for full skin effect penetration for a desired drive frequency. Such an arrangement helps ensure that the conductive loop formed by each FPFC 1801 has a substantially uniform inductance, particularly in the radial direction.

Figures 19A, 19B, 19C, 20A:
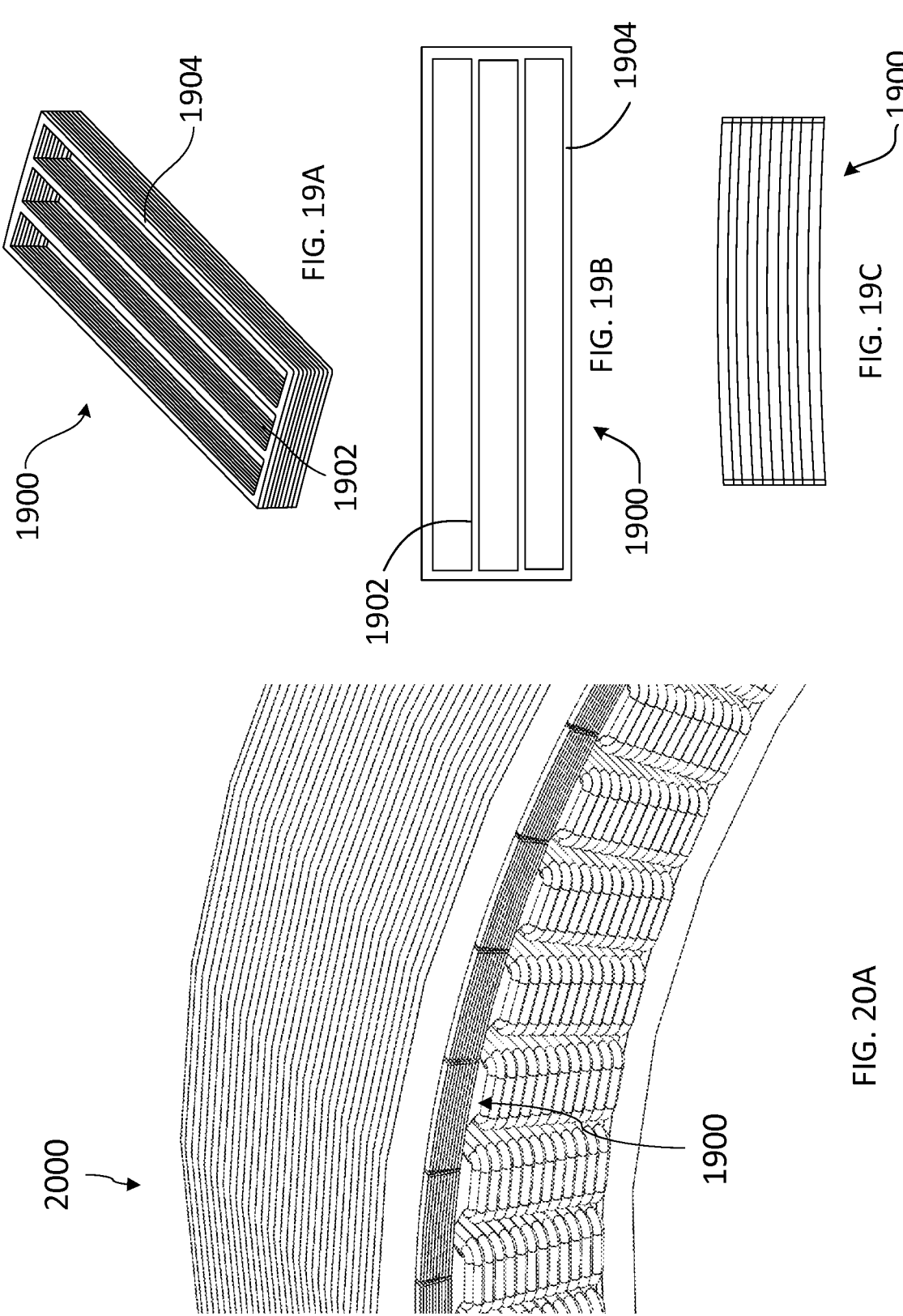
FIGS. 19A-19C are views of an example passive FPFC that can be used with aspects of this disclosure.
FIG. 20A is a perspective view of a portion of an electric motor using the passive FPFC illustrated in FIGS. 19A-19C.
Figure 20B:
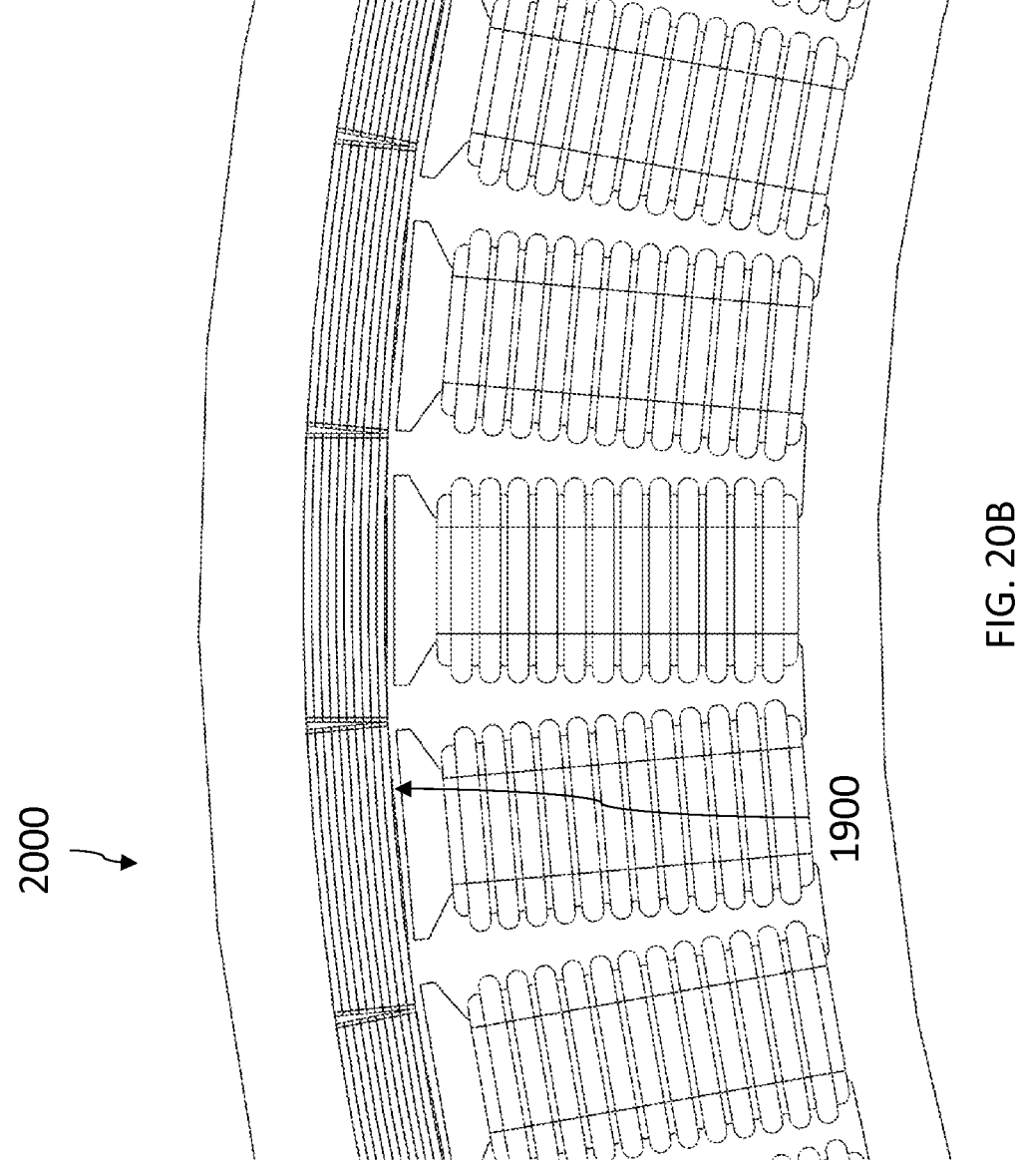
FIG. 20B is a planar view of a portion of an electric motor using the passive FPFC illustrated in FIGS. 19A-19C.
Figure 20C:
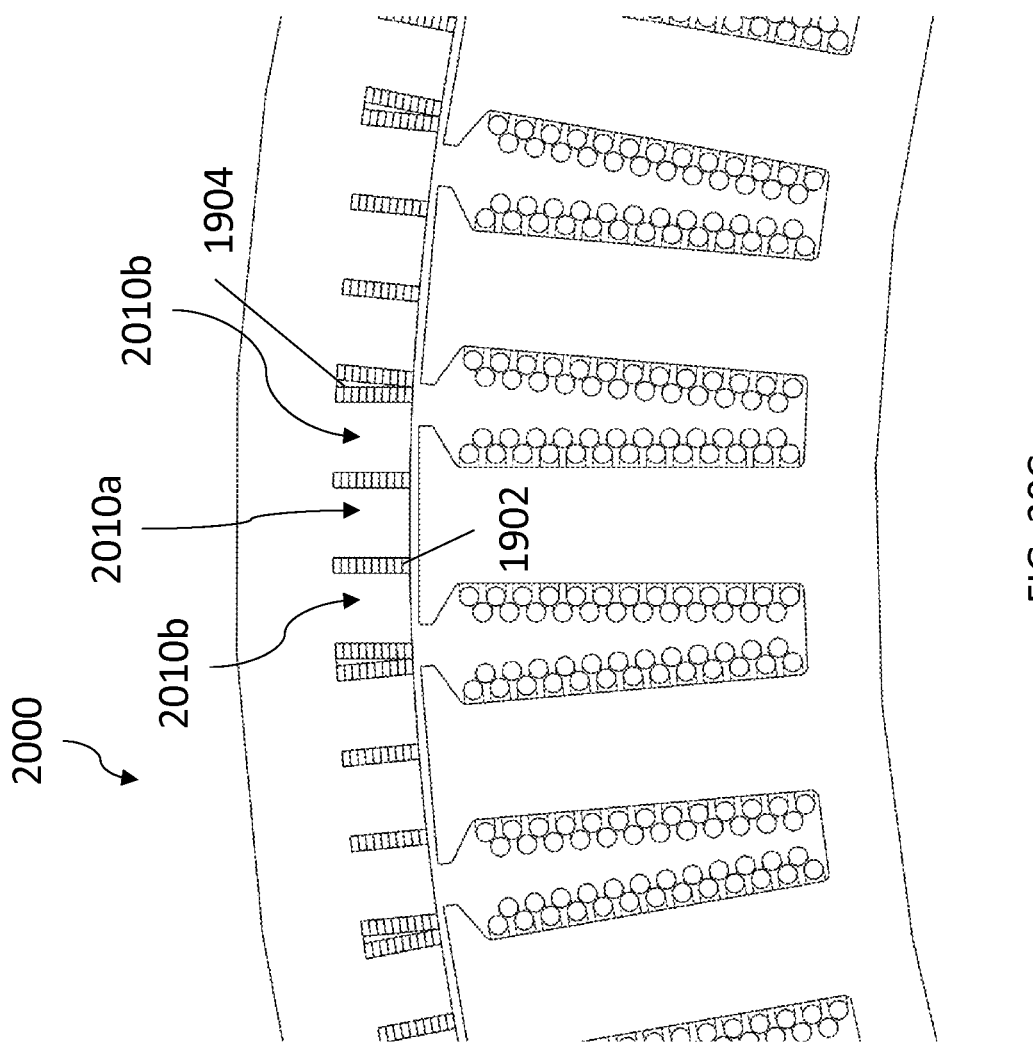
FIG. 20C is a planar cross-sectional view of a portion of an electric motor using the passive FPFC illustrated in FIGS. 19A-19C.

FIGS. 19A-19C are views of an example passive FPFC 1900 that can be used with aspects of this disclosure. FIG. 20A is a perspective view of a portion of an electric motor 2000 using the passive FPFC 1900 illustrated in FIGS. 19A-19C. FIG. 20B is a planar view of a portion of the electric motor 2000 using the passive FPFC 1900 illustrated in FIGS. 19A-19C. FIG. 20C is a planar cross-sectional view of a portion of the electric motor 2000 using the passive FPFC 1900 illustrated in FIGS. 19A-19C. The electric machine 2000 is substantially similar to the electric machine 1100 illustrated in FIGS. 11A-11D with the exception of any differences described herein.

In the illustrated implementation, the FPFC 1900 includes an inner conductive loop 1902 shorted to an outer conductive loop 1904. The inner conductive loop encircles a first rotor pole 2010a while the outer conductive loop encircles two adjacent poles 2010b. FPFCs may be nested to create local inductive asymmetries between adjacent rotor teeth. Such an implementation can create local inductive asymmetries between adjacent rotor teeth and helps enable torque generation at zero rpm under locked rotor conditions.

Figures 21A, 21B, 21C, 22A:
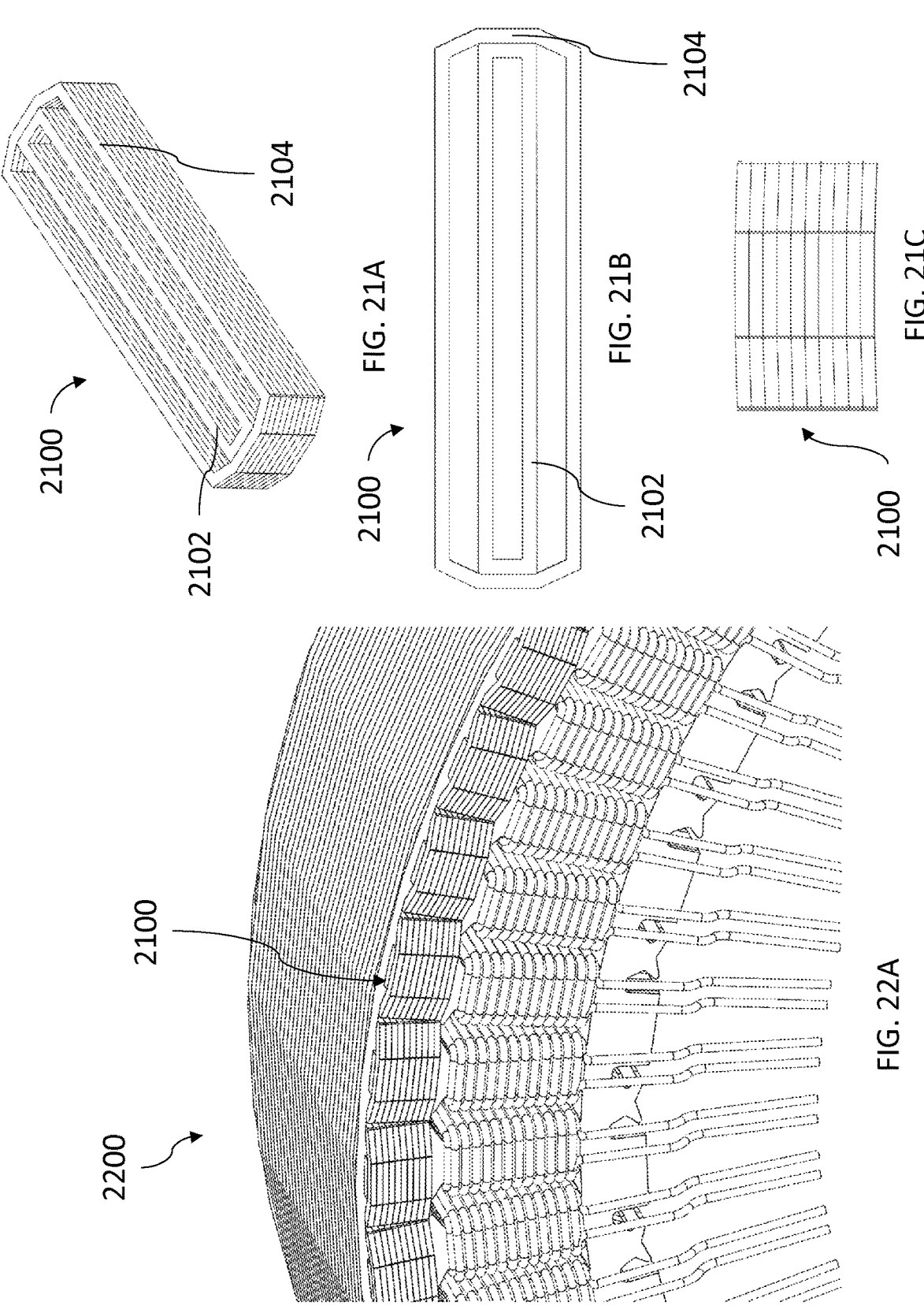
FIGS. 21A-21C are views of an example passive FPFC that can be used with aspects of this disclosure.
FIG. 22A is a perspective view of a portion of an electric motor using the passive FPFC illustrated in FIGS. 21A-21C.
Figure 22B:
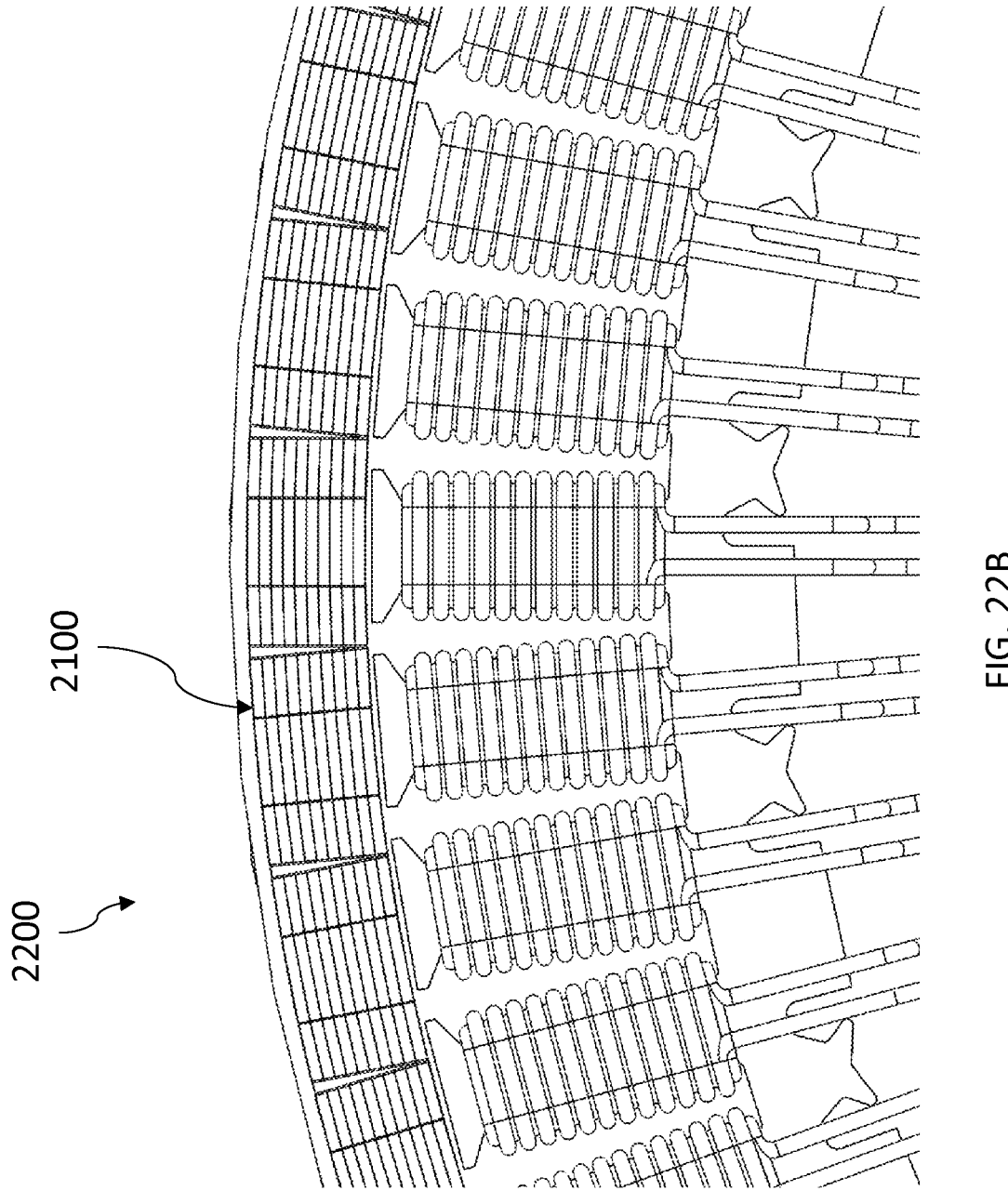
FIG. 22B is a planar view of a portion of an electric motor using the passive FPFC illustrated in FIGS. 21A-21C.
Figure 22C:
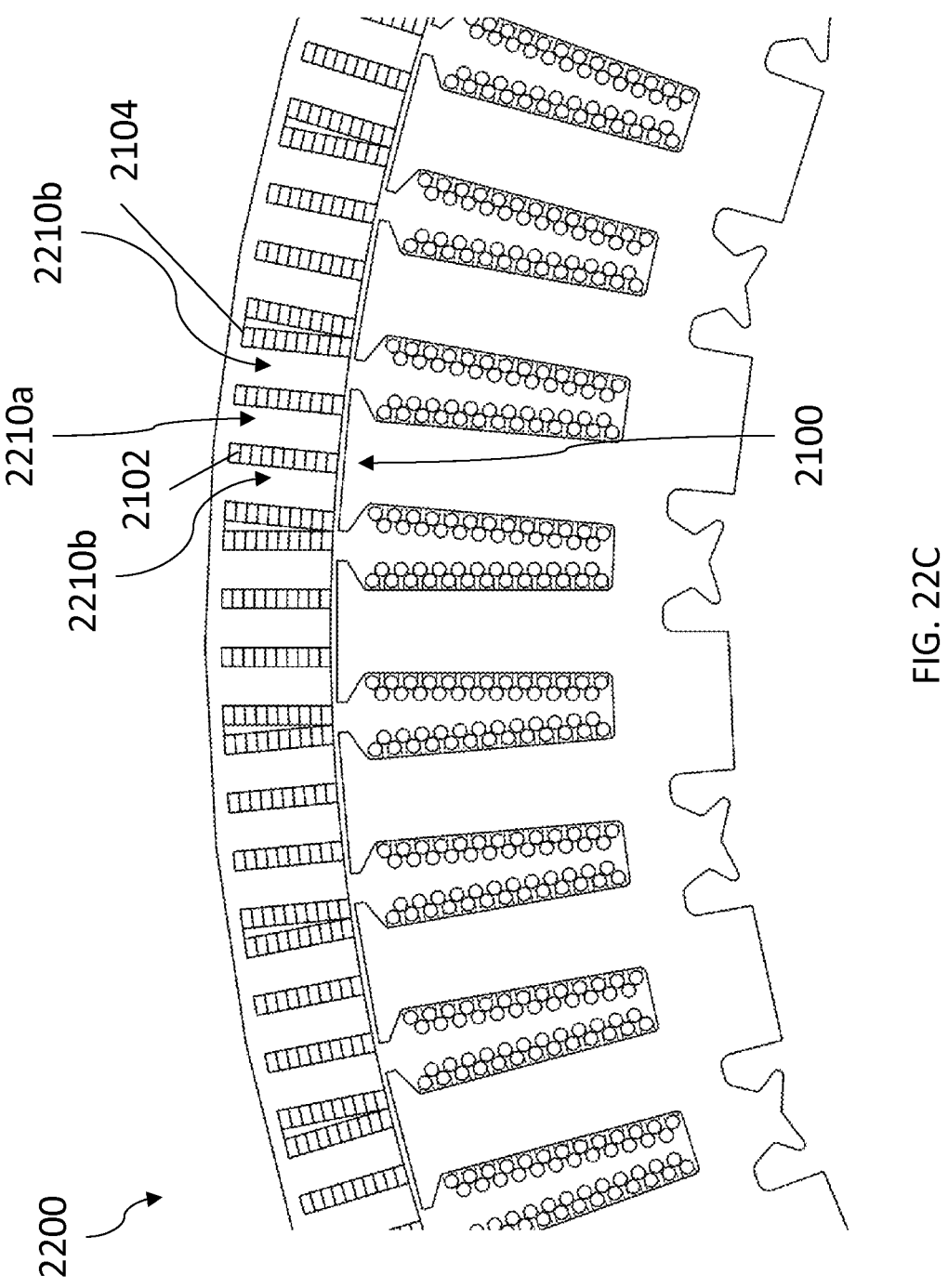
FIG. 22C is a planar cross-sectional view of a portion of an electric motor using the passive FPFC illustrated in FIGS. 21A-21C.
Figure 22D:
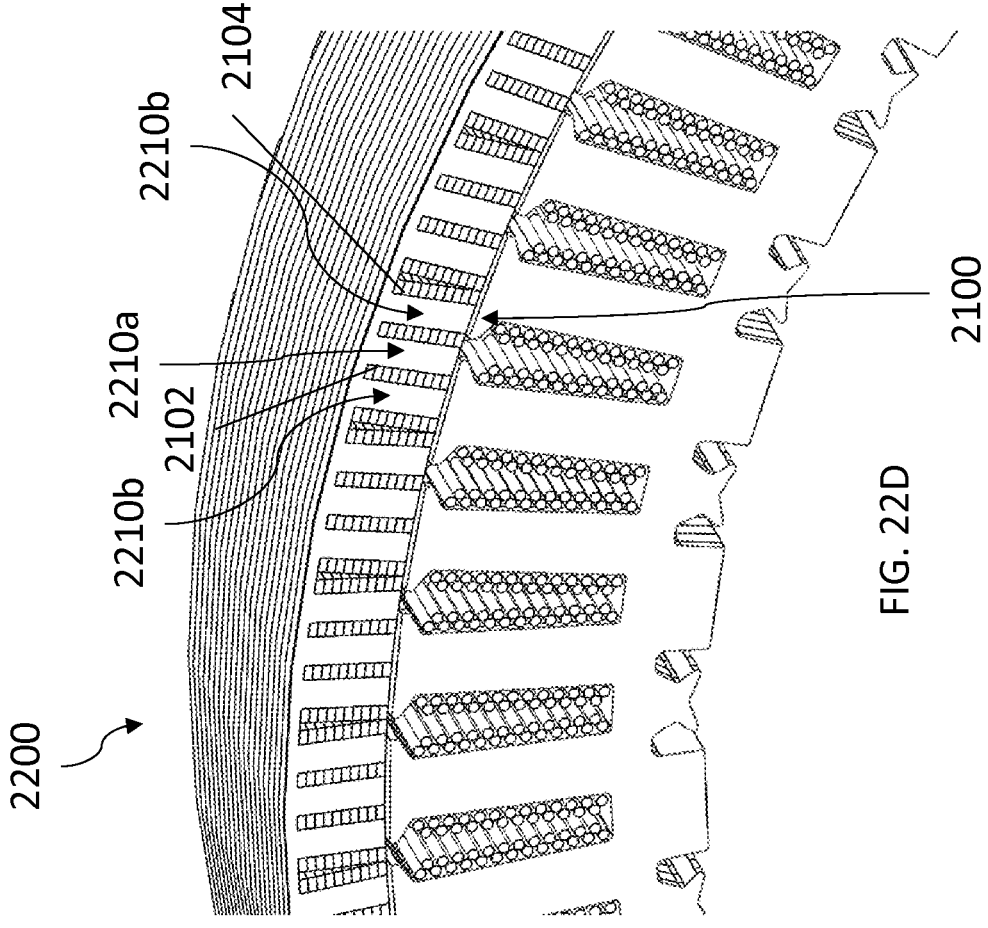
FIG. 22D is a perspective cross-sectional view of a portion of an electric motor using the passive FPFC illustrated in FIGS. 21A-21C.

FIGS. 21A-21C are views of an example passive FPFC 2100 that can be used with aspects of this disclosure. FIG. 22A is a perspective view of a portion of an electric motor 2200 using the passive FPFC 2100 illustrated in FIGS. 21A-21C. FIG. 22B is a planar view of a portion of the electric motor 2200 using the passive FPFC 2100 illustrated in FIGS. 21A-21C. FIG. 22C is a planar cross-sectional view of a portion of the electric motor 2200 using the passive FPFC 2100 illustrated in FIGS. 21A-21C. FIG. 22D is a perspective cross-sectional view of a portion of the electric motor 2200 using the passive FPFC 2100 illustrated in FIGS. 21A-21C. The electric motor 2200 is substantially similar to the electric motor 2100 illustrated in FIGS. 20A-20C with the exception of any differences described herein.

In the illustrated implementation, the FPFC 2100 includes an inner conductive loop 2102 and an outer conductive loop 2104 that are electrically isolated from one another. The inner conductive loop 2102 encircles a first rotor pole 2210*a*, while the outer conductive loop 2104 encircles two adjacent poles 2210*b*. Both the inner loop 2102 and the outer loop 214 include coiled conductors that encircle their respective pole(s) (2210*a* and 2210*b*) before shorting upon themselves.

In some implementations, the inner conductive loop 2102, the outer conductive loop 2104, or both, include material more conductive than a rotor core material. In some implementations, the first conductive loop 2102, the second conductive loop 2104, or both, include material less magnetically permeable than a rotor core material. Materials that fit these criteria include but are not limited to a single material, such as aluminum, copper, brass, silver, zinc, gold, pyrolytic graphite, bismuth, graphene, or carbon-nanotubes. In some examples, ferromagnetic combinations of materials, such as copper-iron, nickel-iron, lead-iron, brass-iron, silver-iron, zinc-iron, gold-iron, bismuth-iron, aluminum-iron, pyrolytic graphite-iron, graphene-iron, carbon-nanotubes-iron, or Alinco (aluminum-nickel-cobalt) alloys can be used as a flux barrier, in many cases with an electric conductivity higher than ferromagnetic material (e.g., iron) making up the rotor poles. In some cases, the FPFC, e.g., made of copper-iron, has an effective magnetic permeability lower than the ferromagnetic material. In some cases, the FPFC, e.g., made of nickel-iron, has an effective magnetic permeability higher than the ferromagnetic material.

In some implementations, the first conductive loop 2102, the second conductive loop 2104, or both, each have a respective substantially uniform inductance, particularly in the radial direction. In some implementations, the first conductive loop 2102 can have a different inductance than the second conductive loop 2104. In some implementations, the first conductive loop 2102 can have substantially the same inductance as the second loop 2104 within standard manufacturing tolerances. In some implementations, the individual conductors within both the first loop 2102 and the second loop 2104 have a small enough cross-sectional area to allow for full skin effect penetration for a drive frequency. This arrangement allows for flux pinning during operation of the motor 2200. More details on flux pinning are described throughout this disclosure.

A number of implementations using passive FPFCs have been described. While described as individual implementations, features of each implementation can be mixed and matched with one another without departing from this disclosure. For example, the first conductive loop 2102, the second conductive loop 2104, or both, can be made of shorted litz wire. In addition, other passive components, such as capacitors, resistors, or inductors, can be added in parallel or series with the various implementations described herein.

Example Radial-Gap Motors with Rectified FPFCs

This section primarily describes implementations relating to radial-gap motors using rectified FPFCs. In the context of this disclosure, a "rectified" FPFC is an FPFC that that includes a rectifier connecting two ends of a conductor fully encircling at least one pole on a rotor. In the various implementations described herein, both internal rotors and external rotors are described. While individual implementations may be illustrated as either using an internal or an external rotor, it is noted that aspects of the implementations described herein are applicable to both internal rotors and external rotors regardless if the individual implementation described.

Figures 23A, 23B, 23C, 24A:
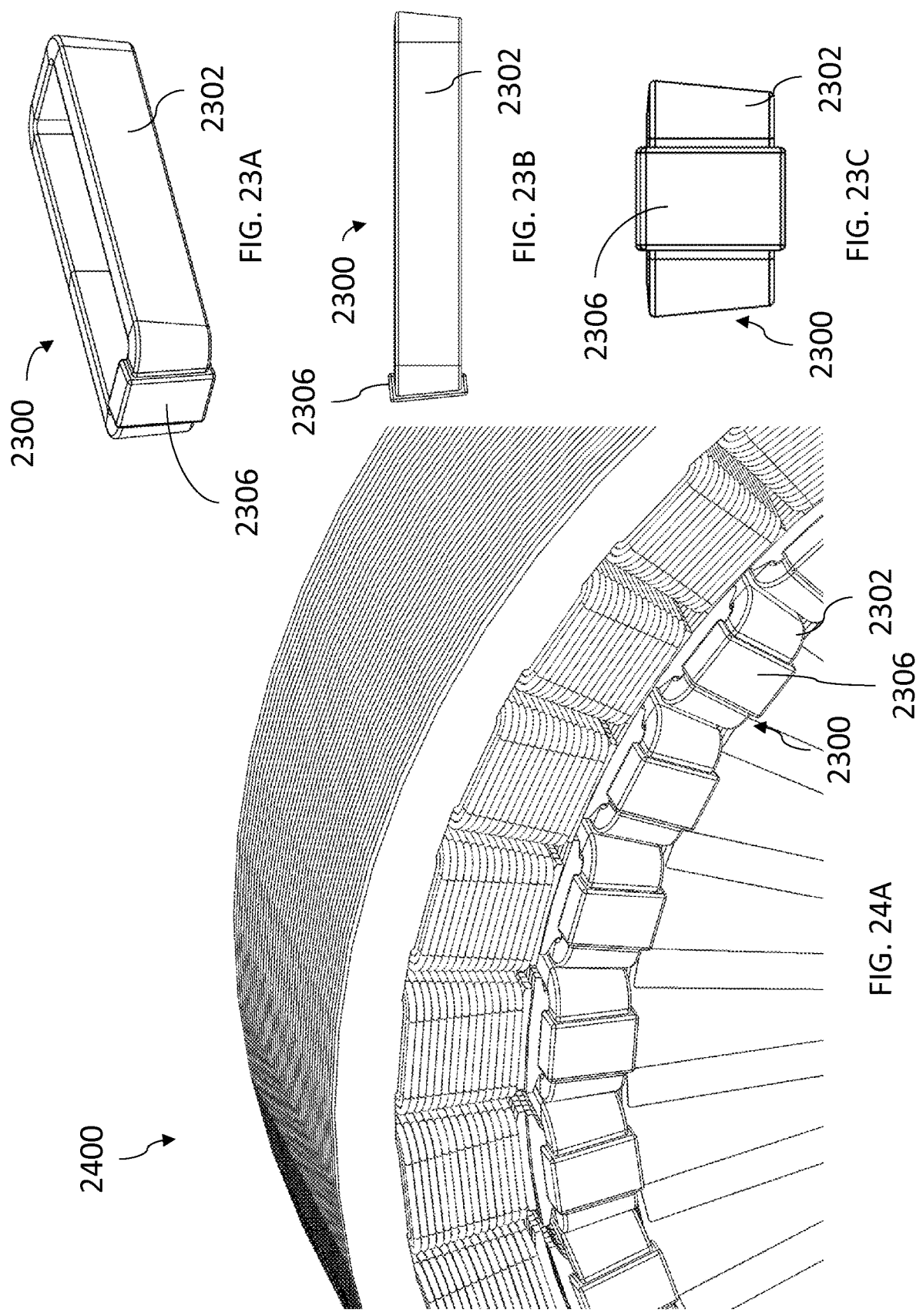
FIGS. 23A-23C are views of an example rectified FPFC that can be used with aspects of this disclosure.
FIG. 24A is a perspective view of a portion of an electric motor using the rectified FPFC illustrated in FIGS. 23A-23C.
Figure 24B:
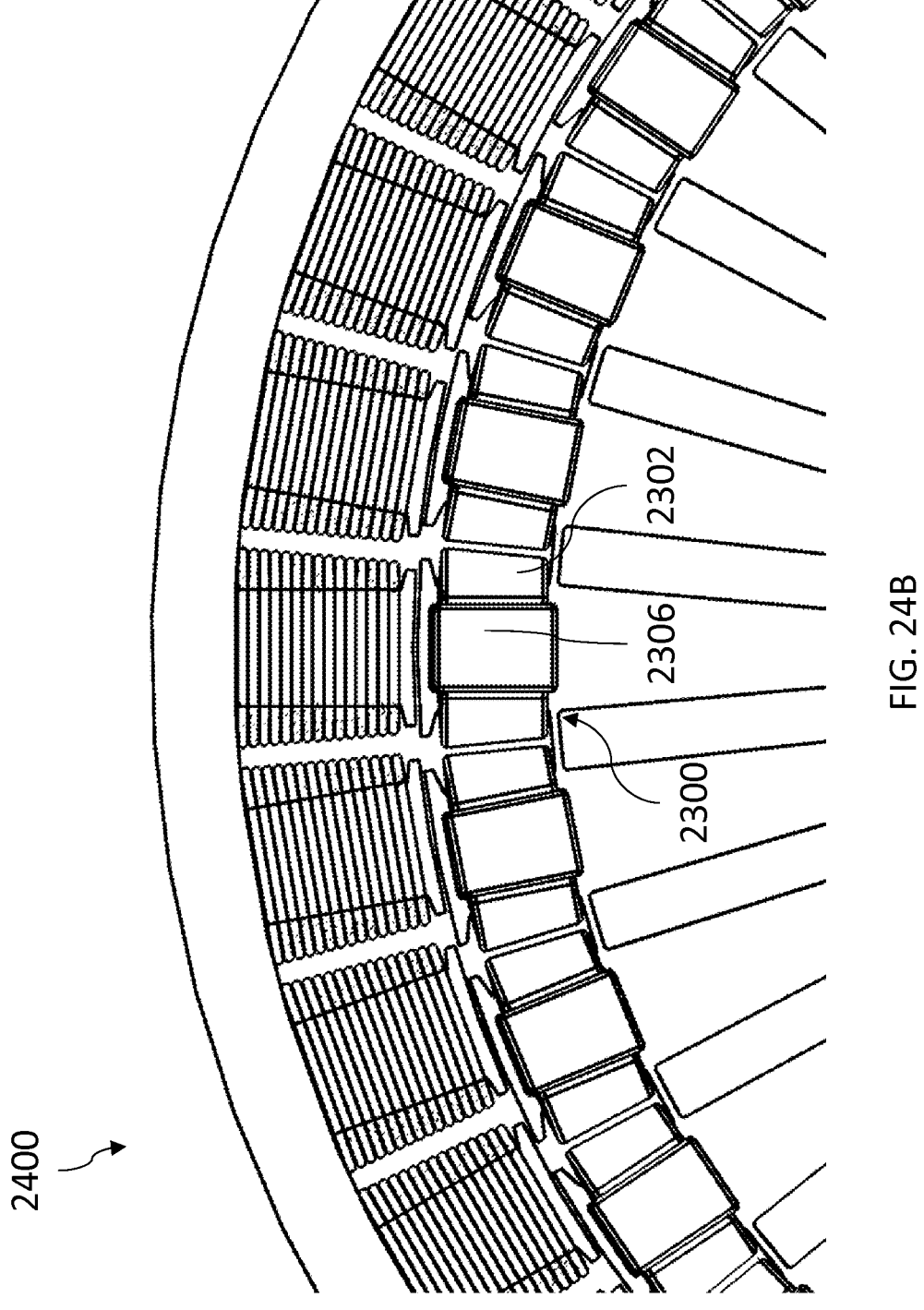
FIG. 24B is a planar view of a portion of an electric motor using the rectified FPFC illustrated in FIGS. 23A-23C.
Figure 24C:
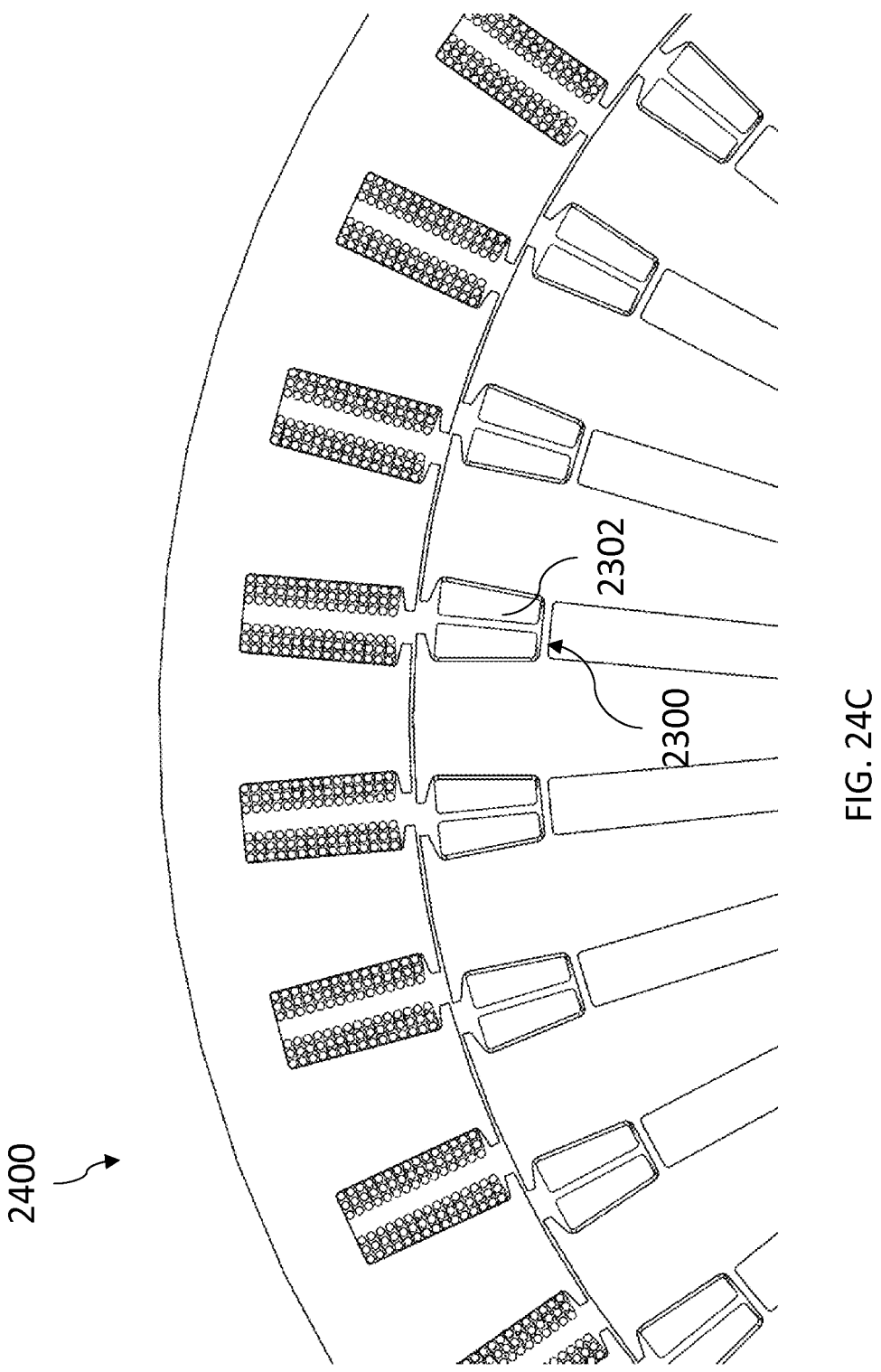
FIG. 24C is a planar cross-sectional view of a portion of an electric motor using the rectified FPFC illustrated in FIGS. 23A-23C.
Figure 24D:
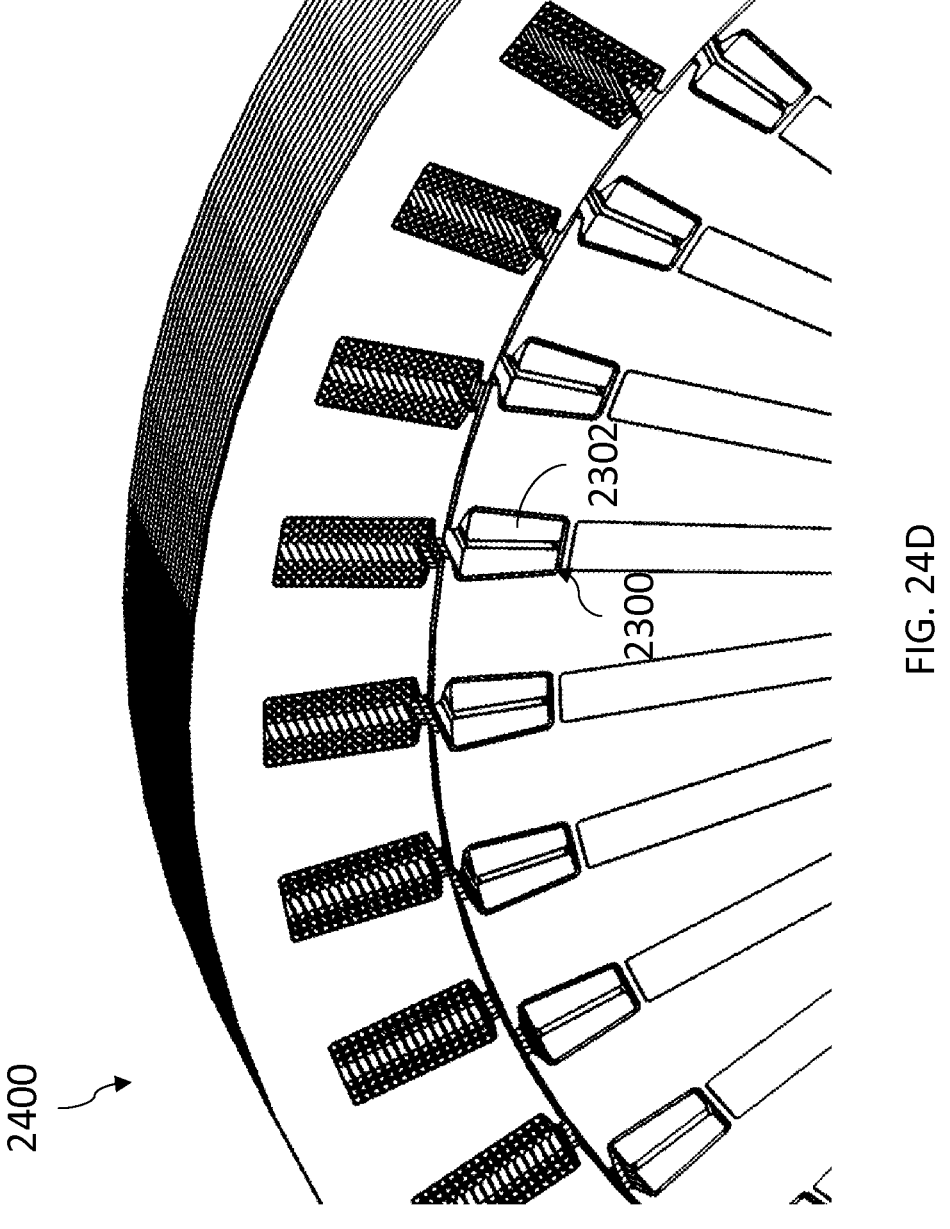
FIG. 24D is a perspective cross-sectional view of a portion of an electric motor using the rectified FPFC illustrated in FIGS. 23A-23C.

FIGS. 23A-23C are views of an example rectified FPFC 2300 that can be used with aspects of this disclosure. FIG. 24A is a perspective view of a portion of an electric motor 2400 using the rectified FPFC 2300 illustrated in FIGS. 23A-23C. FIG. 24B is a planar view of a portion of the electric motor 2400 using the rectified FPFC 2300 illustrated in FIGS. 23A-23C. FIG. 24C is a planar cross-sectional view of a portion of the electric motor 2400 using the rectified FPFC 2300 illustrated in FIGS. 23A-23C. FIG. 24D is a perspective cross-sectional view of a portion of the electric motor 2400 using the rectified FPFC 2300 illustrated in FIGS. 23A-23C. The electric motor 2400 is substantially similar to the electric motor 500 with the exception of any differences described herein.

The FPFC 2300 has a similar geometry as the FPFC 400 illustrated in FIGS. 4A-4C; however, a rectifier 2306 has been added within the conductive loop 2302 to maintain a direction of current flow within the conductive loop. That is, the conductive loop 2302 includes a rectifier 2306 in series with two ends of the conductive loop 2302. In some implementations, the rectifier can include a diode. Several types of diode can be used, for example, a p-n junction diode, a gas diode, a Zener, or a Schottky diode. In some implementations, when a Schottky diode is used, the Schottky diode can be a silicon carbide diode. Diode selection is a function of a variety of factors, including voltage drop, reverse voltage breakdown, and recovery time. Different diodes may be used depending on the desired operating conditions. While several types of diodes have been listed, other diodes can be used without departing from this disclosure. In general, the directionality of each diode or the winding direction of each FPFC alternates depending upon the polarity of each rotor pole.

Figures 25A, 25B, 25C, 26A:
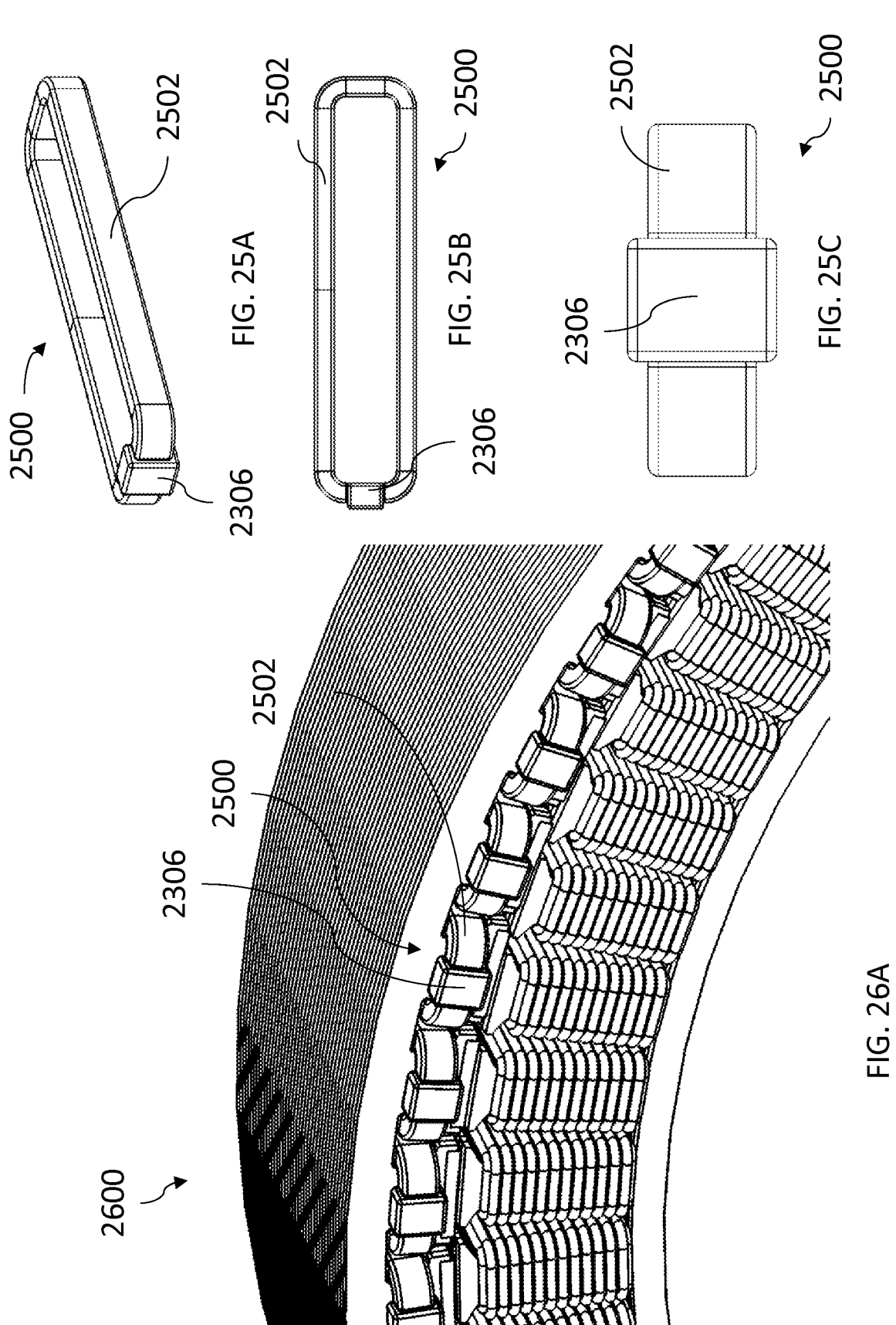
FIGS. 25A-25C are views of an example rectified FPFC that can be used with aspects of this disclosure.
FIG. 26A is a perspective view of a portion of an electric motor using the rectified FPFC illustrated in FIGS. 25A-25C.
Figure 26B:
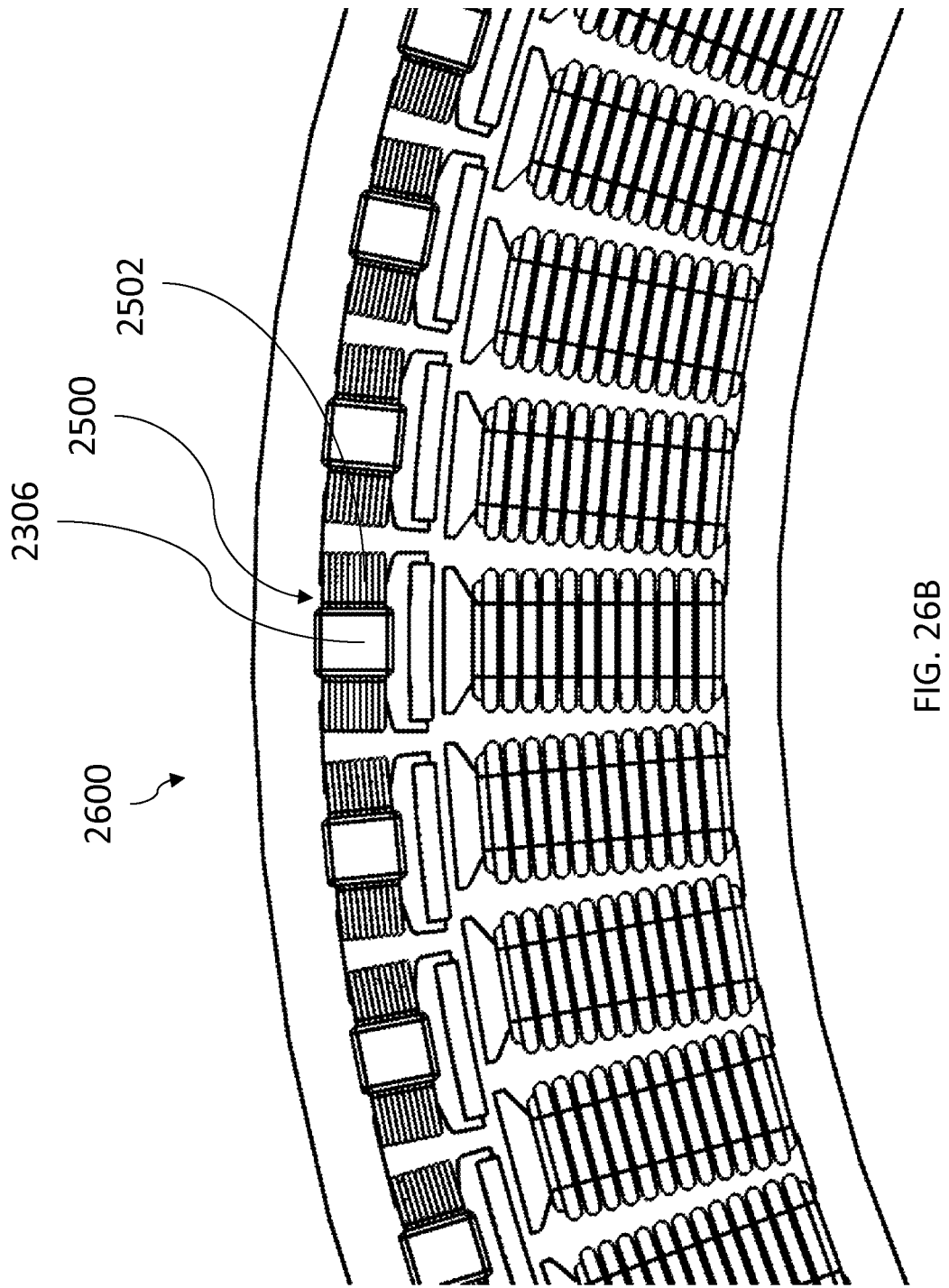
FIG. 26B is a planar view of a portion of an electric motor using the rectified FPFC illustrated in FIGS. 25A-25C.
Figure 26C:
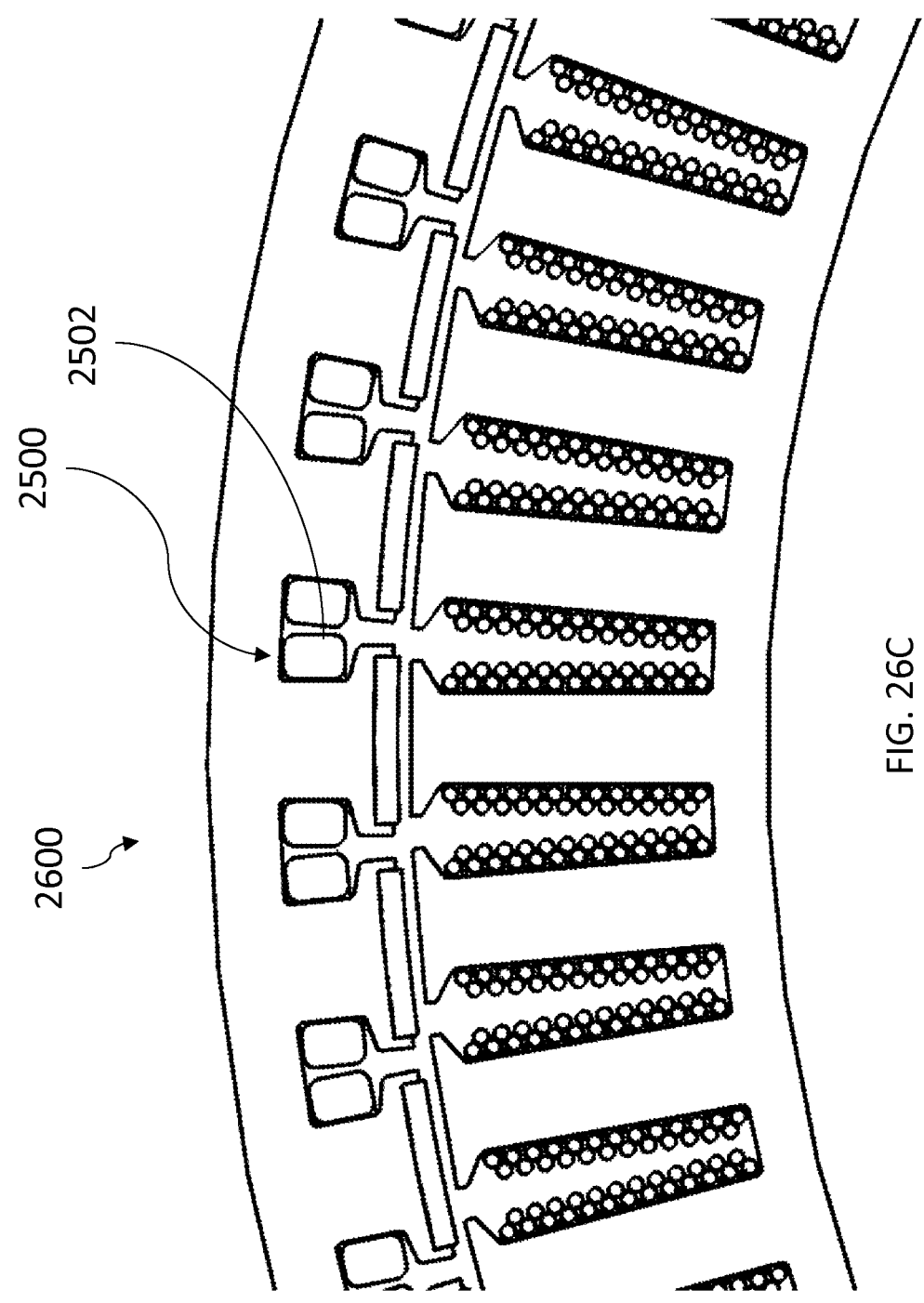
FIG. 26C is a planar cross-sectional view of a portion of an electric motor using the rectified FPFC illustrated in FIGS. 25A-25C.
Figure 26D:
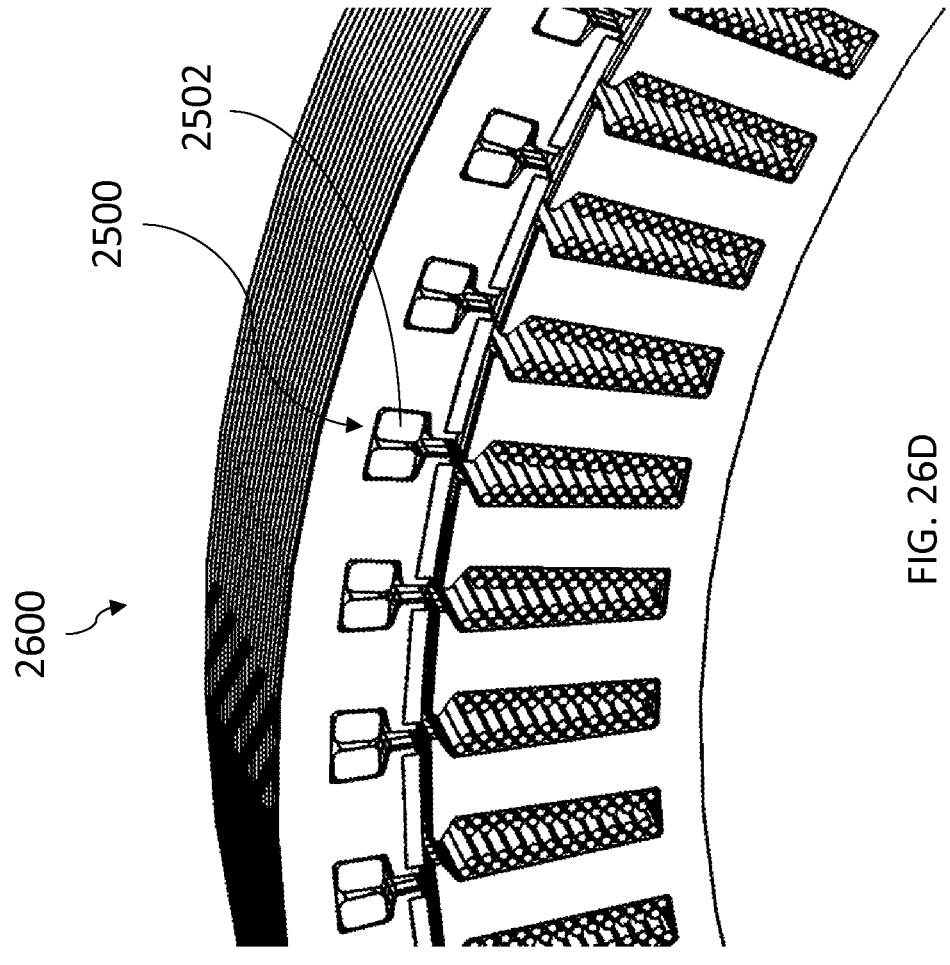
FIG. 26D is a perspective cross-sectional view of a portion of an electric motor using the rectified FPFC illustrated in FIGS. 25A-25C.

FIGS. 25A-25C are views of an example rectified FPFC 2500 that can be used with aspects of this disclosure. FIG. 26A is a perspective view of a portion of an electric motor 2600 using the rectified FPFC 2500 illustrated in FIGS. 25A-25C. FIG. 26B is a planar view of a portion of the electric motor 2600 using the rectified FPFC 2500 illustrated in FIGS. 25A-25C. FIG. 26C is a planar cross-sectional view of a portion of the electric motor 2600 using the rectified FPFC 2500 illustrated in FIGS. 25A-25C. FIG. 26D is a perspective cross-sectional view of a portion of the electric motor 2600 using the rectified FPFC 2500 illustrated in FIGS. 25A-25C. The electric motor 2400 is substantially similar to the electric motor 900 with the exception of any differences described herein. The FPFC 2500 is substantially similar to the FPFC 800 previously illustrated in FIGS. 8A-8C with the exception of the addition of the rectifier 2306 that has been added to the conductive loop 2502. The rectifier 2306 functions as previously described.

Figures 27A, 27B, 27C, 28A:
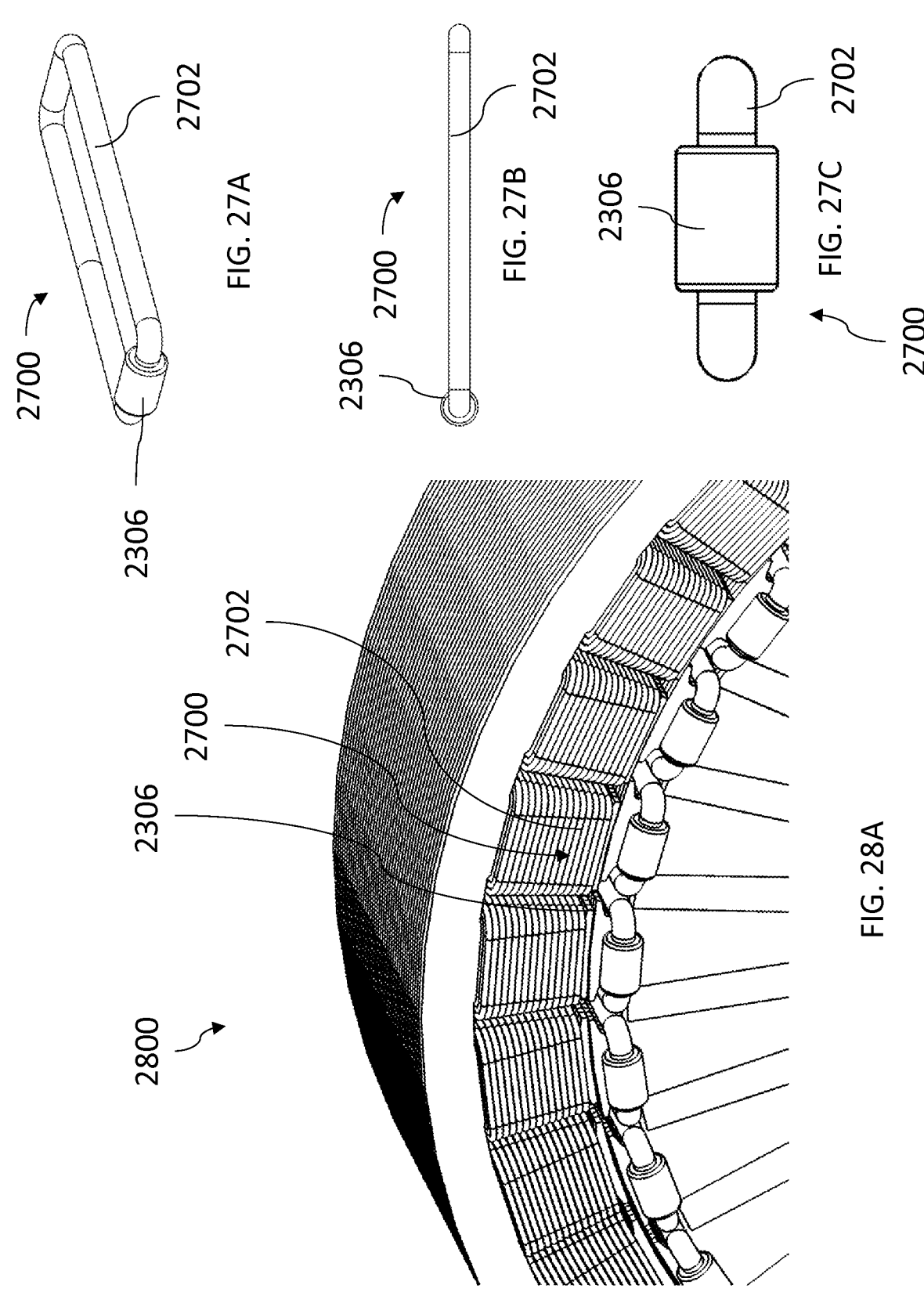
FIGS. 27A-27C are views of an example rectified FPFC that can be used with aspects of this disclosure.
FIG. 28A is a perspective view of a portion of an electric motor using the rectified FPFC illustrated in FIGS. 27A-27C.
Figure 28B:
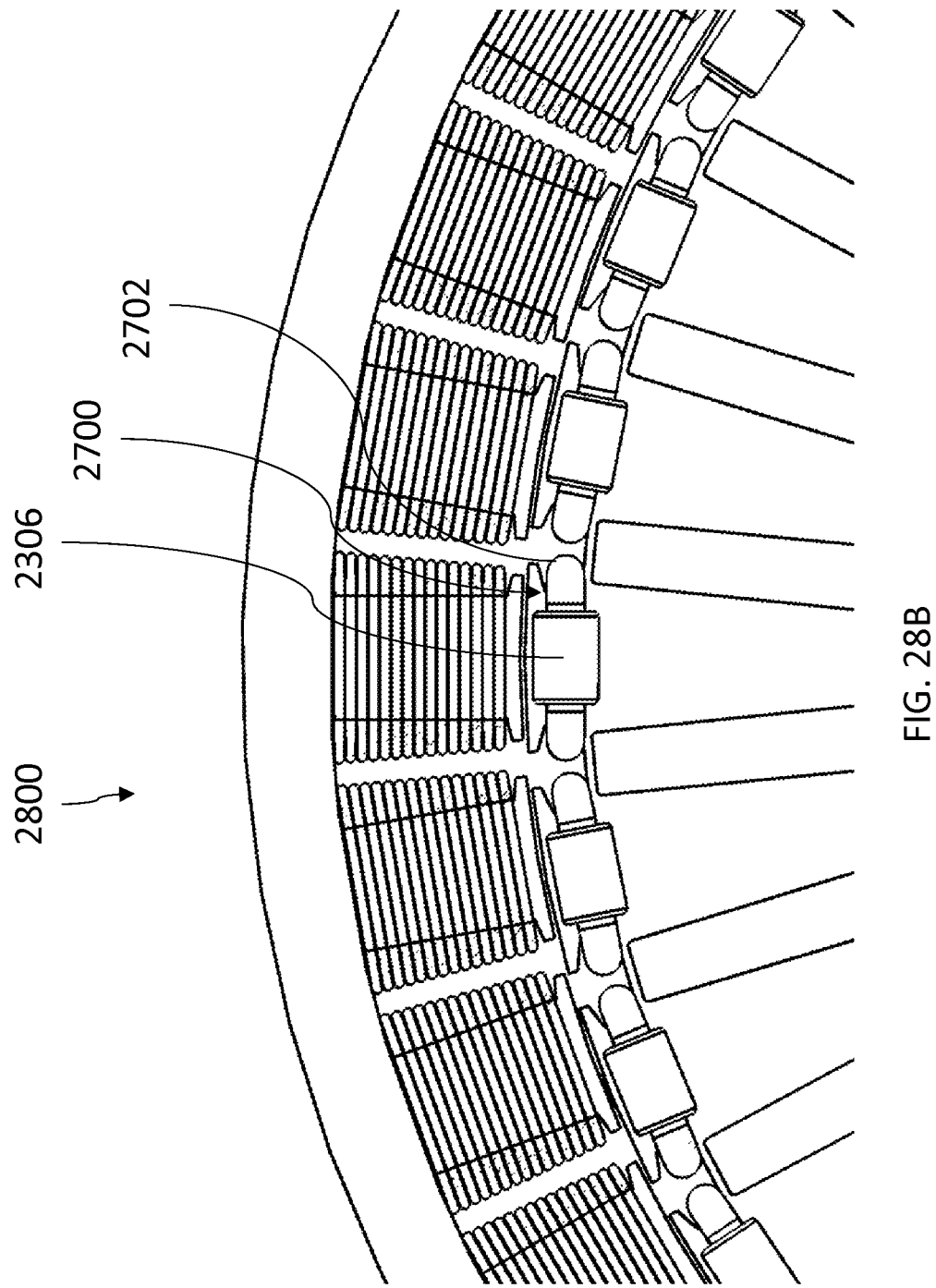
FIG. 28B is a planar view of a portion of an electric motor using the rectified FPFC illustrated in FIGS. 27A-27C.
Figure 28C:
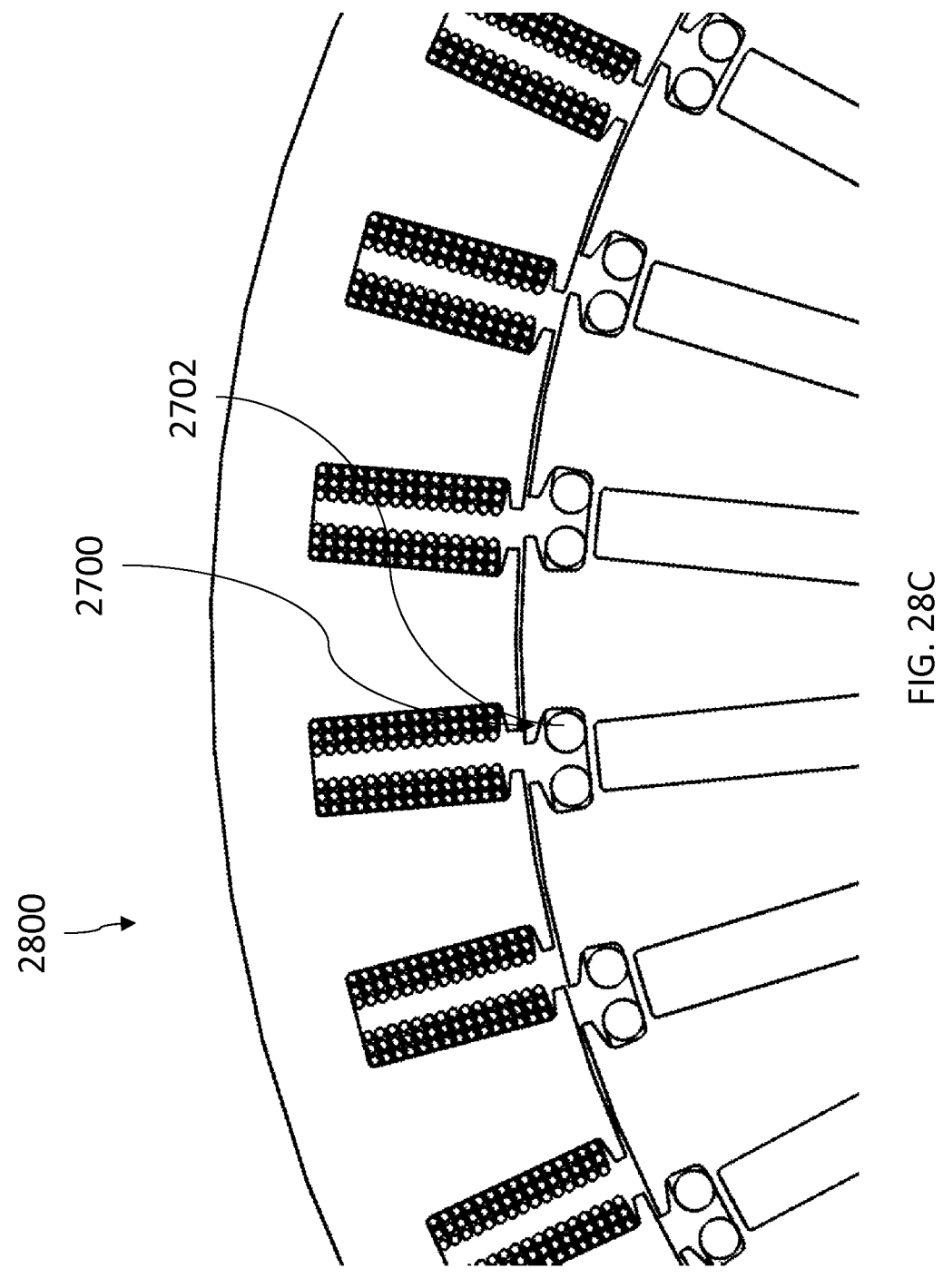
FIG. 28C is a planar cross-sectional view of a portion of an electric motor using the rectified FPFC illustrated in FIGS. 27A-27C.
Figure 28D:
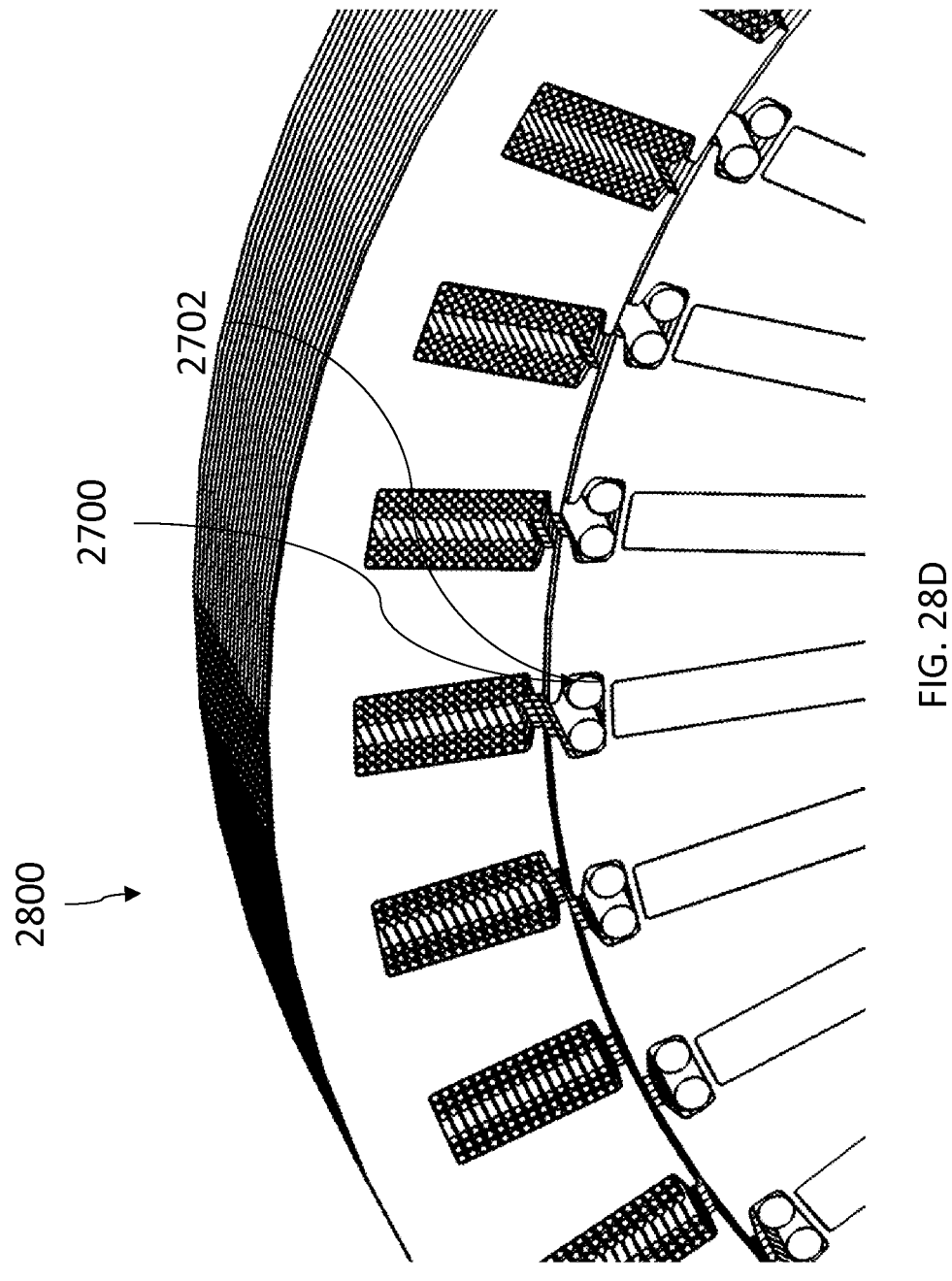
FIG. 28D is a perspective cross-sectional view of a portion of an electric motor using the rectified FPFC illustrated in FIGS. 27A-27C.

FIGS. 27A-27C are views of an example rectified FPFC 2700 that can be used with aspects of this disclosure. FIG. 28A is a perspective view of a portion of an electric motor 2800 using the rectified FPFC 2700 illustrated in FIGS. 27A-27C. FIG. 28B is a planar view of a portion of the electric motor using the rectified FPFC 2700 illustrated in FIGS. 27A-27C. FIG. 28C is a planar cross-sectional view of a portion of the electric motor 2800 using the rectified FPFC 2700 illustrated in FIGS. 27A-27C. FIG. 28D is a perspective cross-sectional view of a portion of the electric motor 2800 using the rectified FPFC 2700 illustrated in FIGS. 27A-27C. The electric motor 2600 is substantially similar to the electric motor 700 with the exception of any differences described herein. The FPFC 2700 is substantially similar to the FPFC 600 previously illustrated in FIGS. 8A-8C with the exception of the addition of the rectifier 2306 that has been added to the conductive loop 2702. The rectifier 2306 functions as previously described.

Figures 29A, 29B, 29C, 30A:
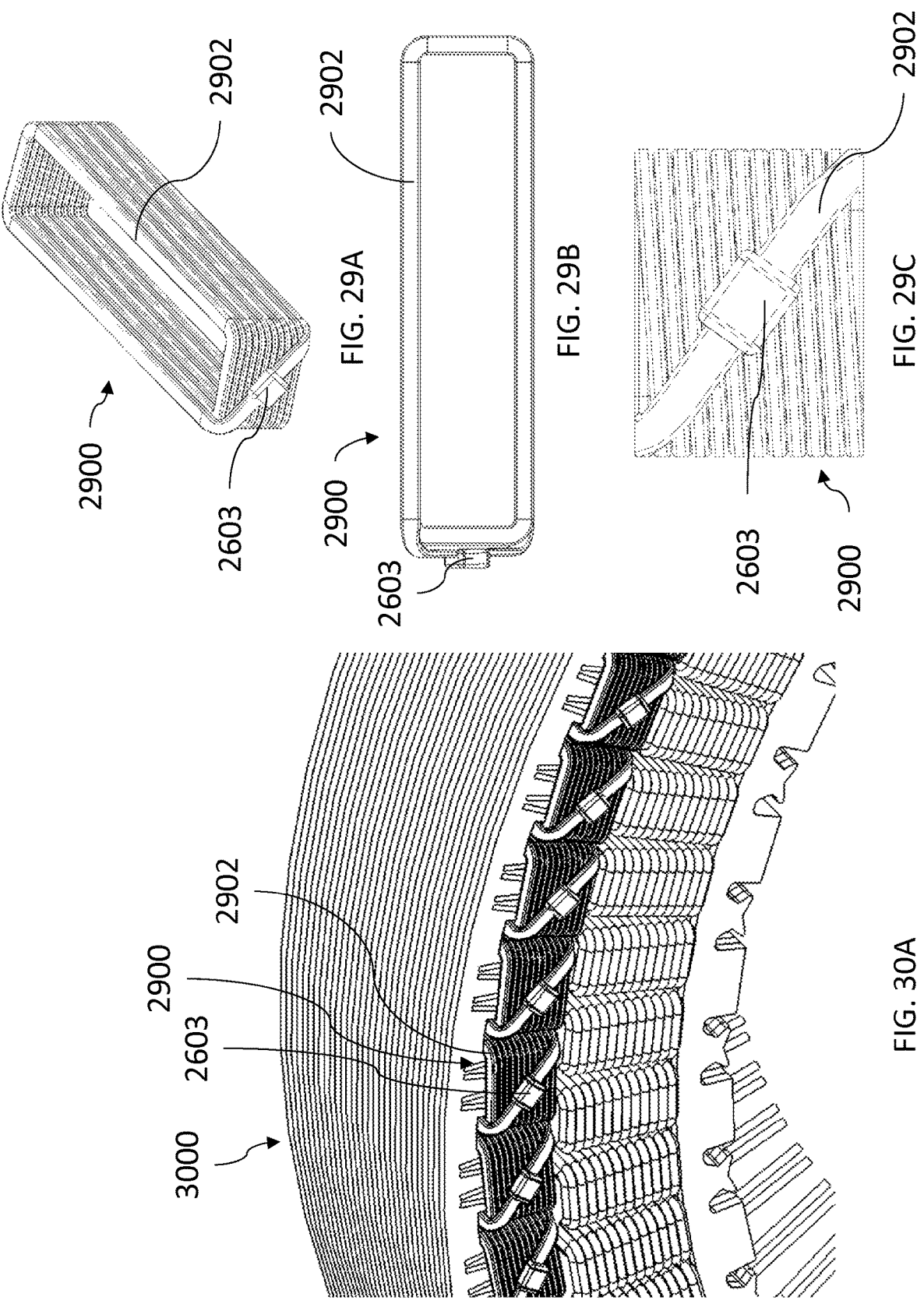
FIGS. 29A-29C are views of an example rectified FPFC that can be used with aspects of this disclosure.
FIG. 30A is a perspective view of a portion of an electric motor using the rectified FPFC illustrated in FIGS. 29A-29C.
Figure 30B:
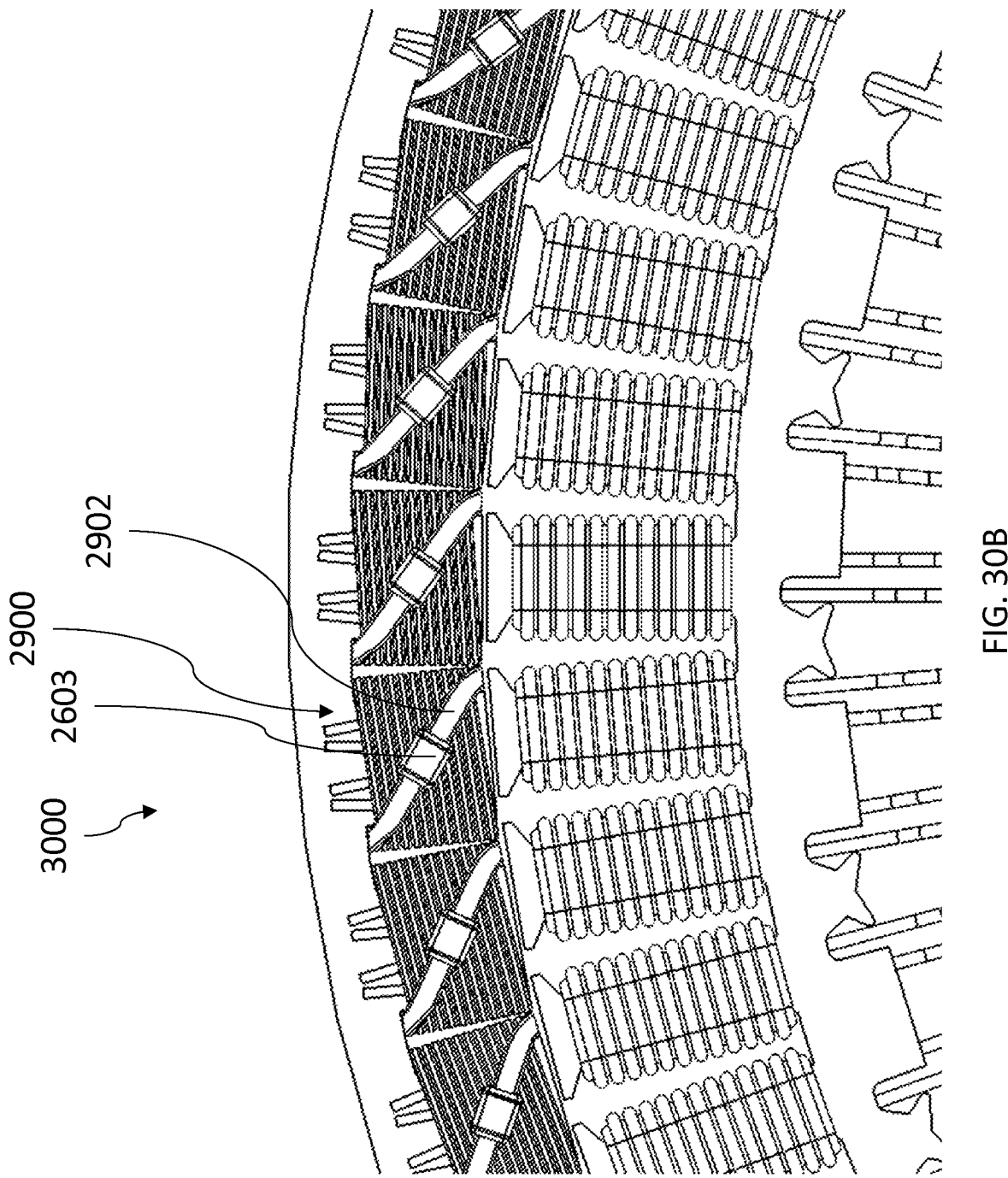
FIG. 30B is a planar view of a portion of an electric motor using the rectified FPFC illustrated in FIGS. 29A-29C.
Figure 30C:
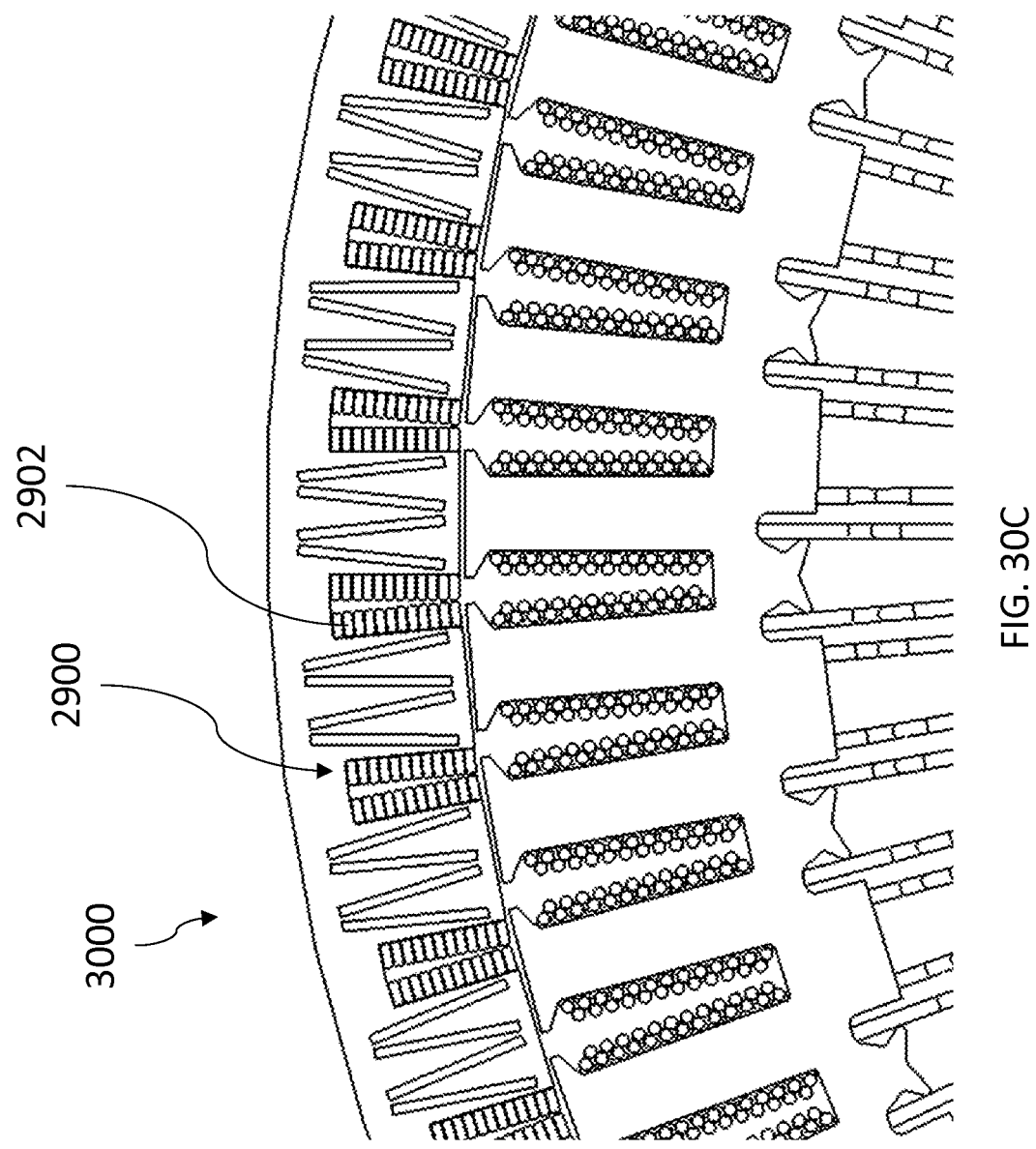
FIG. 30C is a planar cross-sectional view of a portion of an electric motor using the rectified FPFC illustrated in FIGS. 29A-29C.

FIGS. 29A-29C are views of an example rectified FPFC 2900 that can be used with aspects of this disclosure. FIG. 30A is a perspective view of a portion of an electric motor 3000 using the rectified FPFC 2900 illustrated in FIGS. 29A-29C. FIG. 30B is a planar view of a portion of the electric motor 3000 using the rectified FPFC 2900 illustrated in FIGS. 29A-29C. FIG. 30C is a planar cross-sectional view of a portion of the electric motor 3000 using the rectified FPFC 2900 illustrated in FIGS. 29A-29C. The electric motor 3000 is substantially similar to the electric motor 1500 with the exception of any differences described herein. The FPFC 2900 is substantially similar to the FPFC 1400 previously illustrated in FIGS. 14A-14C with the exception of the addition of the rectifier 2306 that has been added to the conductive loop 2902. The rectifier 2306 functions as previously described.

Figure 31A:
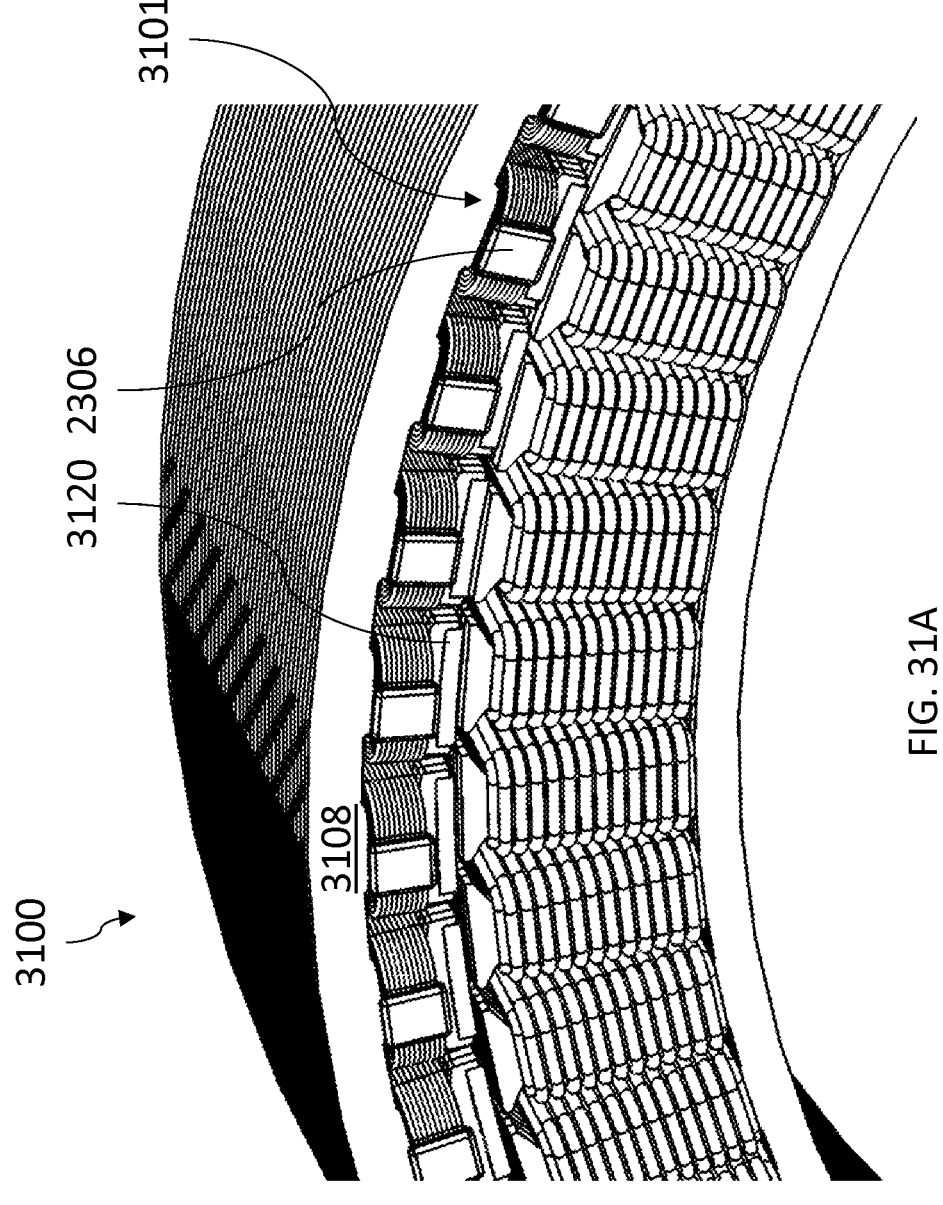
FIG. 31A is a perspective view of an electric motor with an example rectified FPFC mounted behind a permanent magnet on a rotor.
Figure 31B:
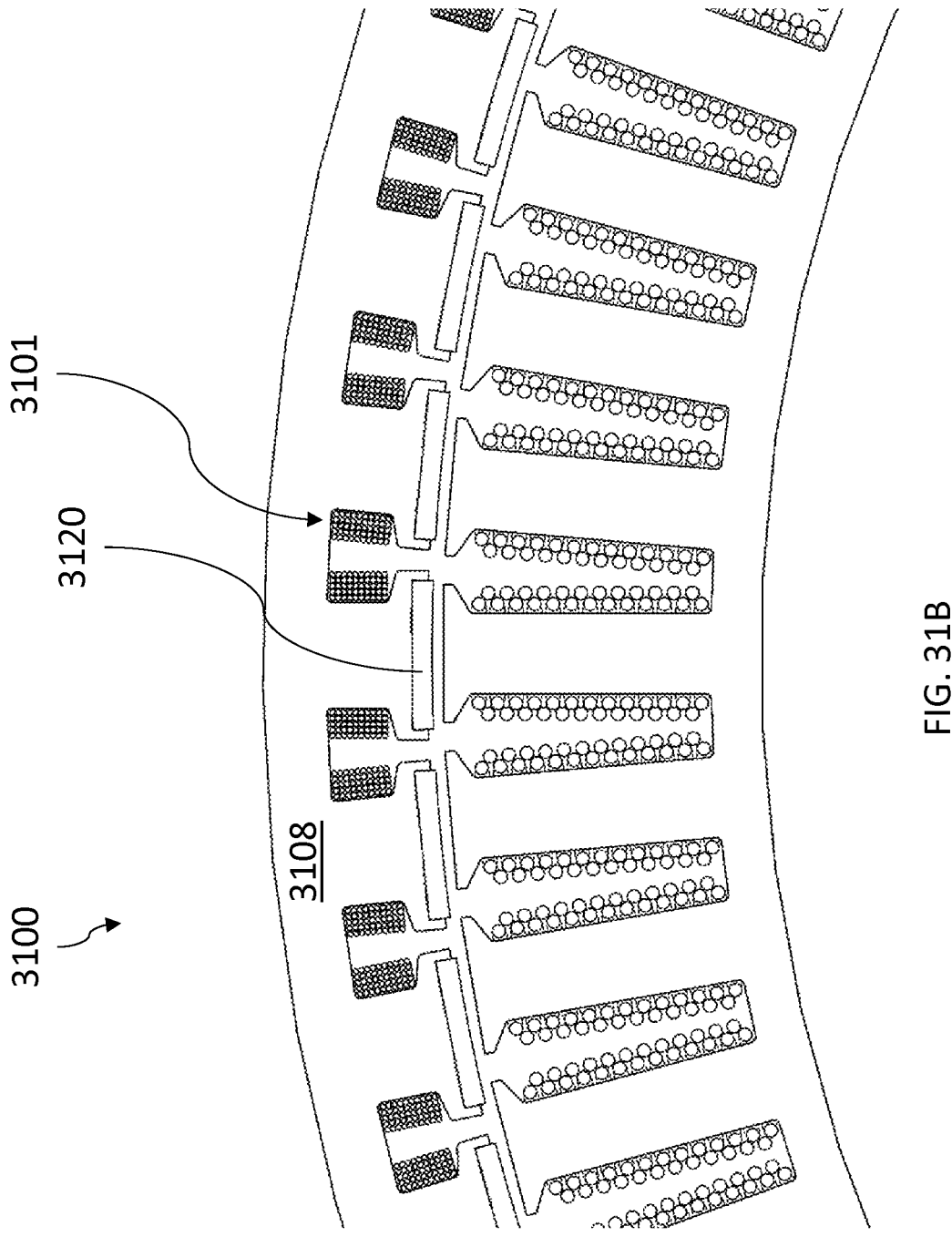
FIG. 31B is a planar view of a portion of the electric motor illustrated in FIG. 31A.
Figure 31C:
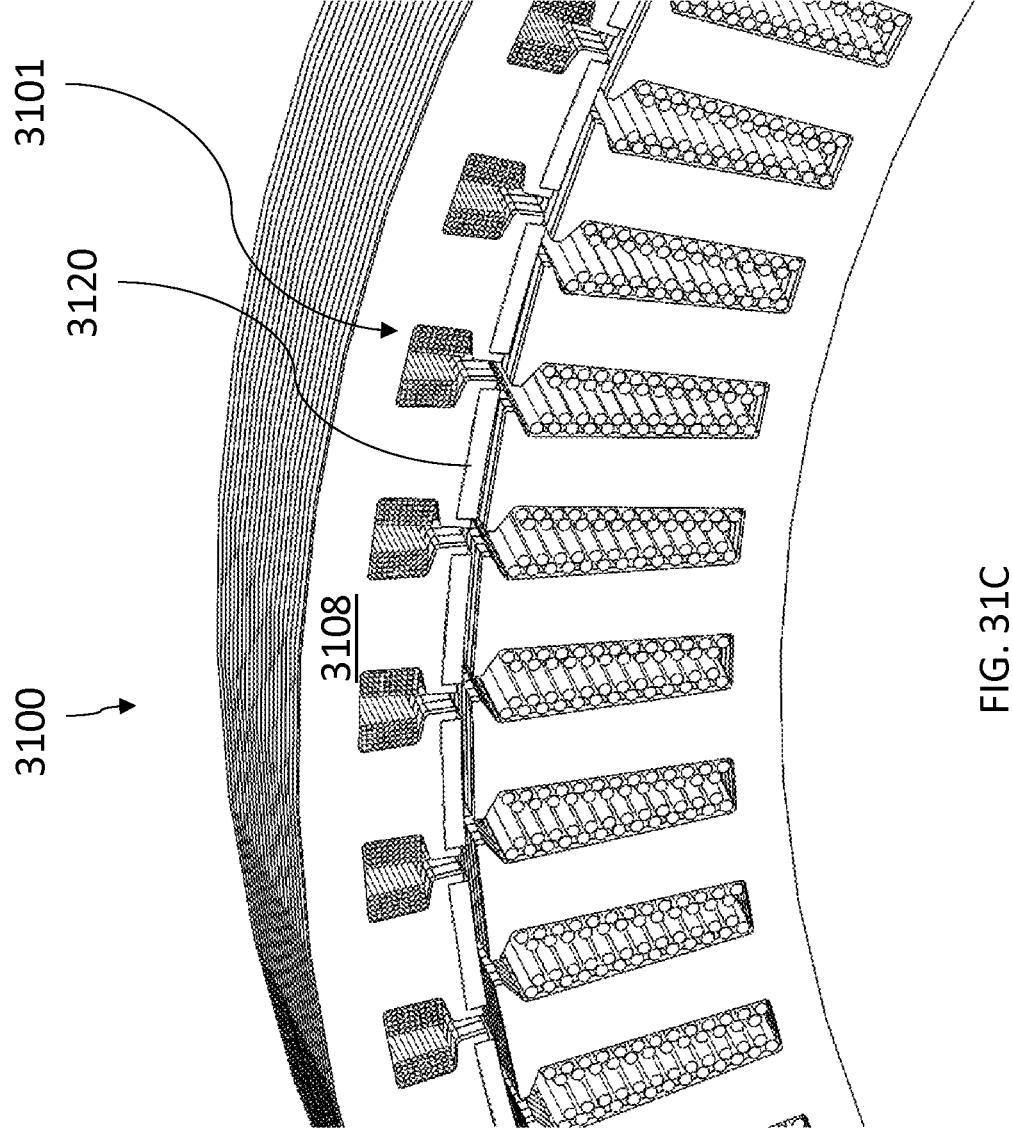
FIG. 31C is a planar cross-sectional view of a portion of an electric motor illustrated in FIG. 31A.

FIG. 31A is a perspective view of an electric motor with an example rectified FPFC 3101 mounted behind a permanent magnet 3120 on a rotor 3108. FIG. 31B is a planar view of a portion of the electric motor 3100 illustrated in FIG. 31A. FIG. 31C is a planar cross-sectional view of a portion of the electric motor 3100 illustrated in FIG. 31A. The electric motor 3100 is substantially similar to the electric motor 1700 with the exception of any differences described herein. The FPFC 3101 is substantially similar to the FPFC 1701 previously illustrated in FIGS. 17A-17D with the exception of the addition of the rectifier 2306 that has been added to the conductive loop. The rectifier 2306 functions as previously described.

Figure 33B:
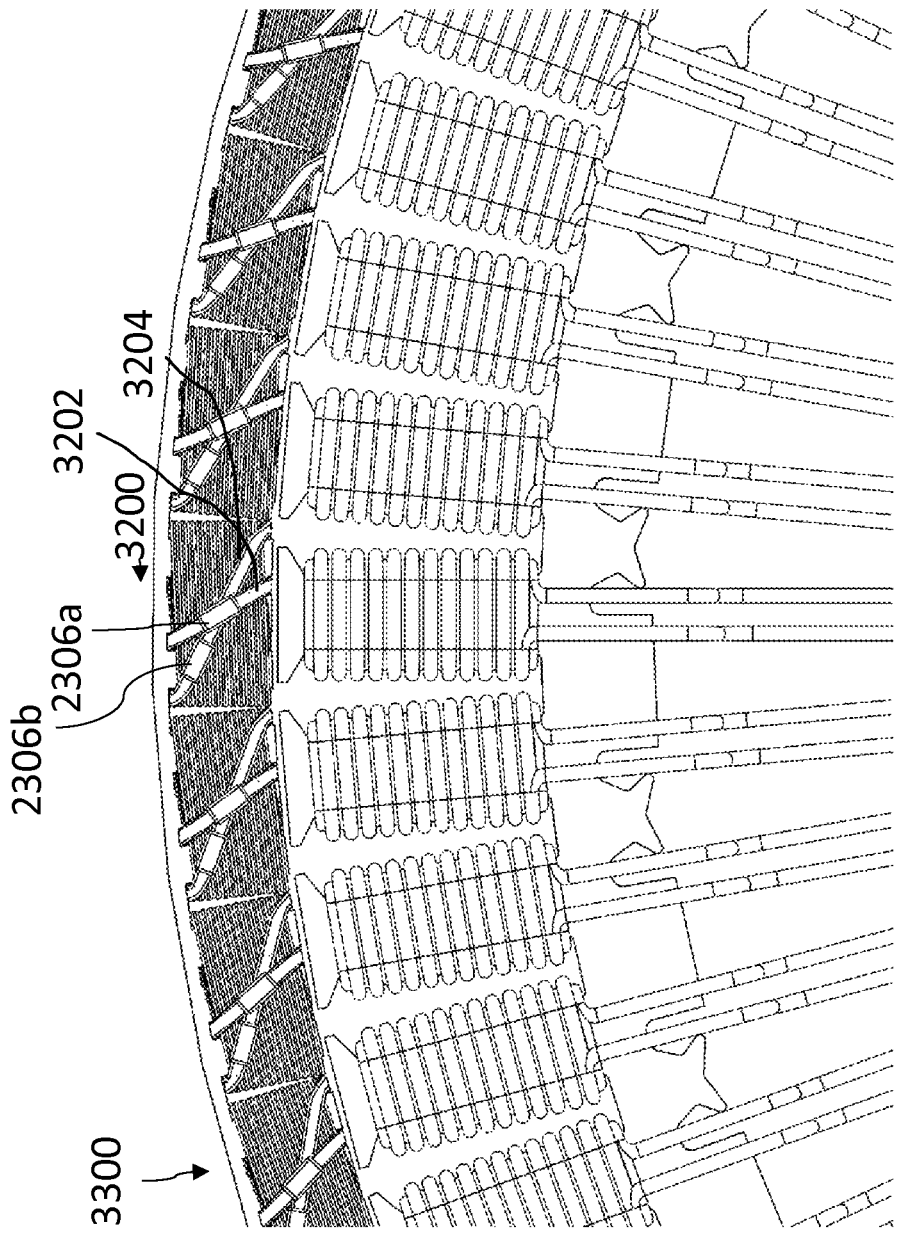
FIG. 33B is a planar view of a portion of an electric motor using the rectified FPFC illustrated in FIGS. 32A-32C.
Figure 33C:
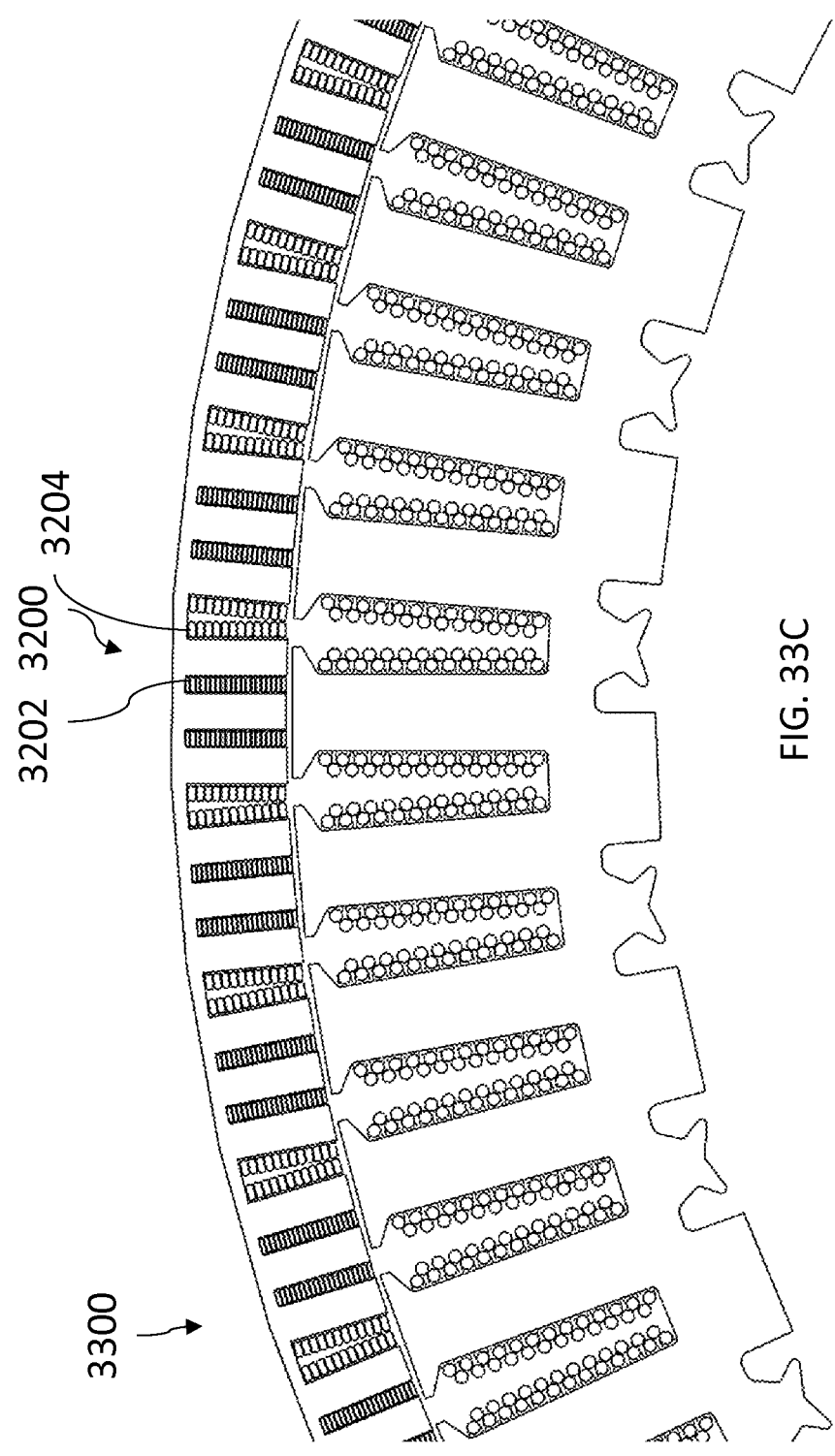
FIG. 33C is a planar cross-sectional view of a portion of an electric motor using the rectified FPFC illustrated in FIGS. 32A-32C.
Figure 33D:
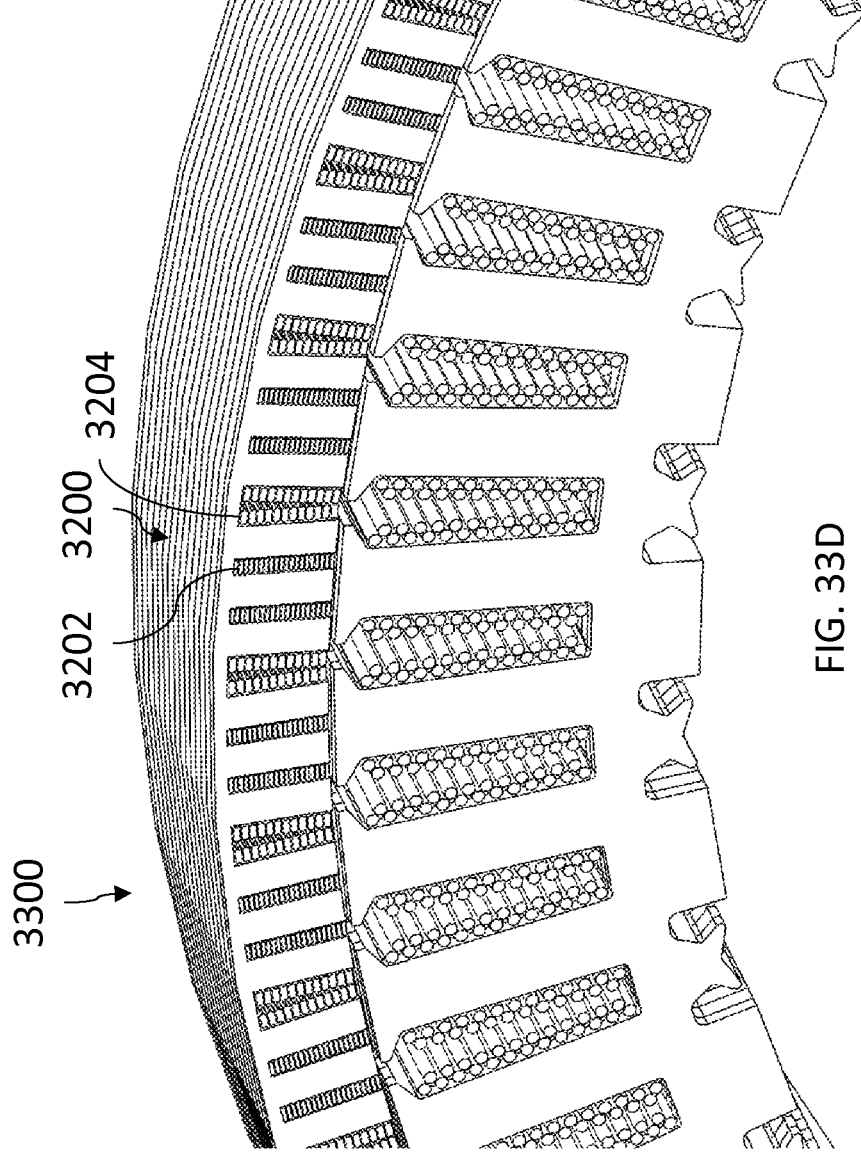
FIG. 33D is a perspective cross-sectional view of a portion of an electric motor using the rectified FPFC illustrated in FIGS. 32A-32C.

FIG. 32A-32C are views of an example rectified FPFC 3200 that can be used with aspects of this disclosure. FIG. 33A is a perspective view of a portion of an electric motor 3300 using the rectified FPFC 3200 illustrated in FIGS. 32A-32C. FIG. 33B is a planar view of a portion of the electric motor 3300 using the rectified FPFC 3200 illustrated in FIGS. 32A-32C. FIG. 33C is a planar cross-sectional view of a portion of the electric motor 3300 using the rectified FPFC 3200 illustrated in FIGS. 32A-32C. FIG. 33D is a perspective cross-sectional view of a portion of the electric motor 3300 using the rectified FPFC 3200 illustrated in FIGS. 32A-32C. The electric motor 3300 is substantially similar to the electric motor 2200 with the exception of any differences described herein. The FPFC 3200 is substantially similar to the FPFC 2100 previously illustrated in FIGS. 21A-21C with the exception of the addition a first rectifier 2306a on the first conductive loop 3202 and a second rectifier 2306b on the second conductive loop 3204. The rectifiers 2306a and 2306b are substantially the same as the rectifier 2306 that has previously been described.

A number of implementations using rectified FPFCs have been described. While described as individual implementations, features of each implementation can be mixed and matched with one another without departing from this disclosure. For example, the first conductive loop 3202, the second conductive loop 3204, or both, can be made of shorted litz wire. In addition, other passive components, such as capacitors, resistors, or inductors, can be added in parallel or series with the various implementations described herein. For example, in some implementations, a discrete capacitor (not shown) can be added to any of the rectified FPFCs described herein. The discrete capacitor can be wired in parallel or in series with any of the rectifiers described herein. The addition of such a capacitor allows for tuning the FPFC to be responsive to specified frequencies.

Example of Radial-Gap Motors with Active FPFCs

This section primarily describes implementations relating to radial-gap motors using active FPFCs. In the context of this disclosure, an "active" FPFC is an FPFC that that includes any logic circuit, such as a transistor, connecting two ends of a conductor fully encircling at least one pole on a rotor. In the various implementations described herein, both internal rotors and external rotors are described. While individual implementations may be illustrated as either using an internal or an external rotor, it is noted that aspects of the implementations described herein are applicable to both internal rotors and external rotors regardless if the individual implementation described.

Figure 35B:
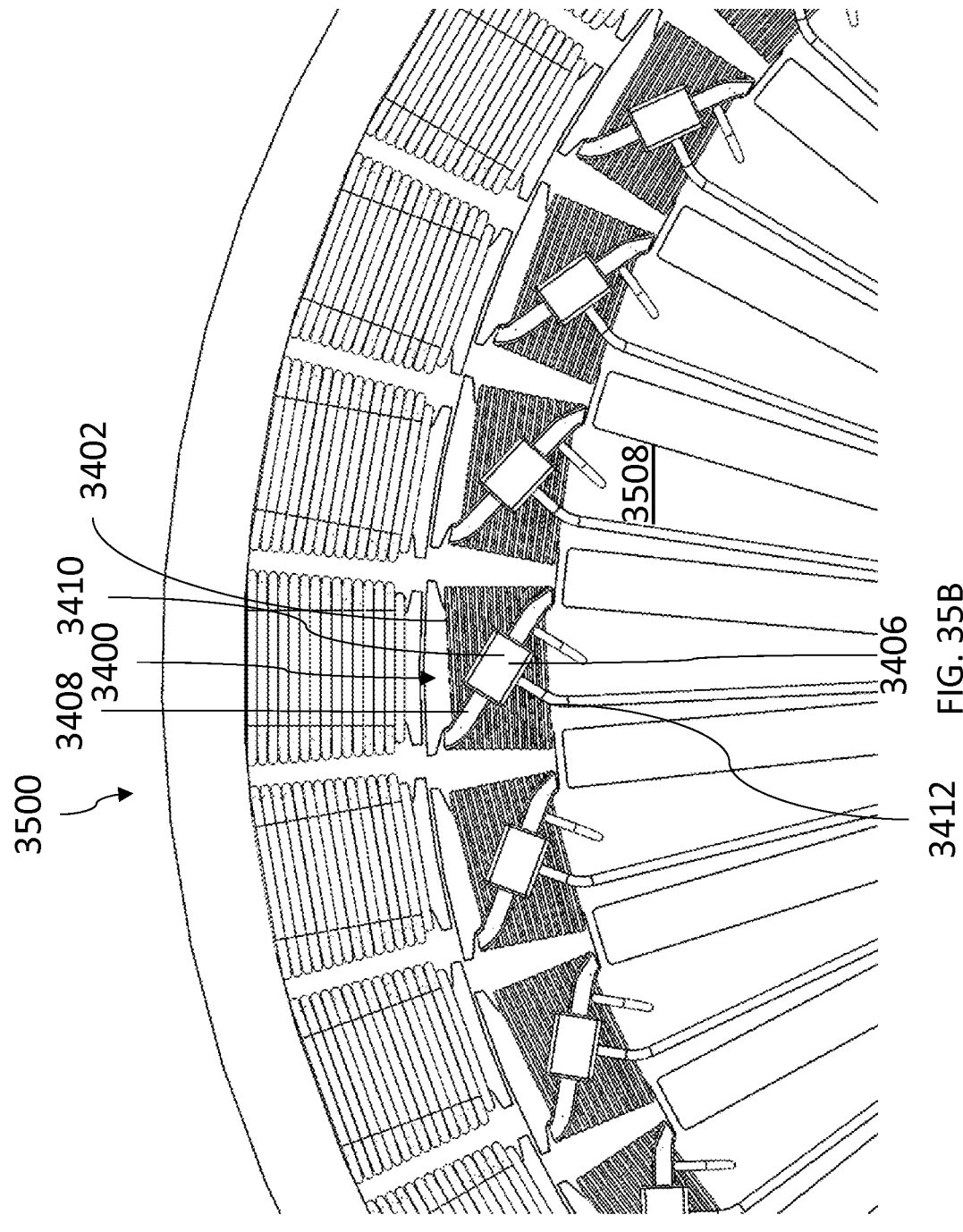
FIG. 35B is a planar view of a portion of an electric motor using the FPFC illustrated in FIGS. 34A-34C.
Figure 35C:
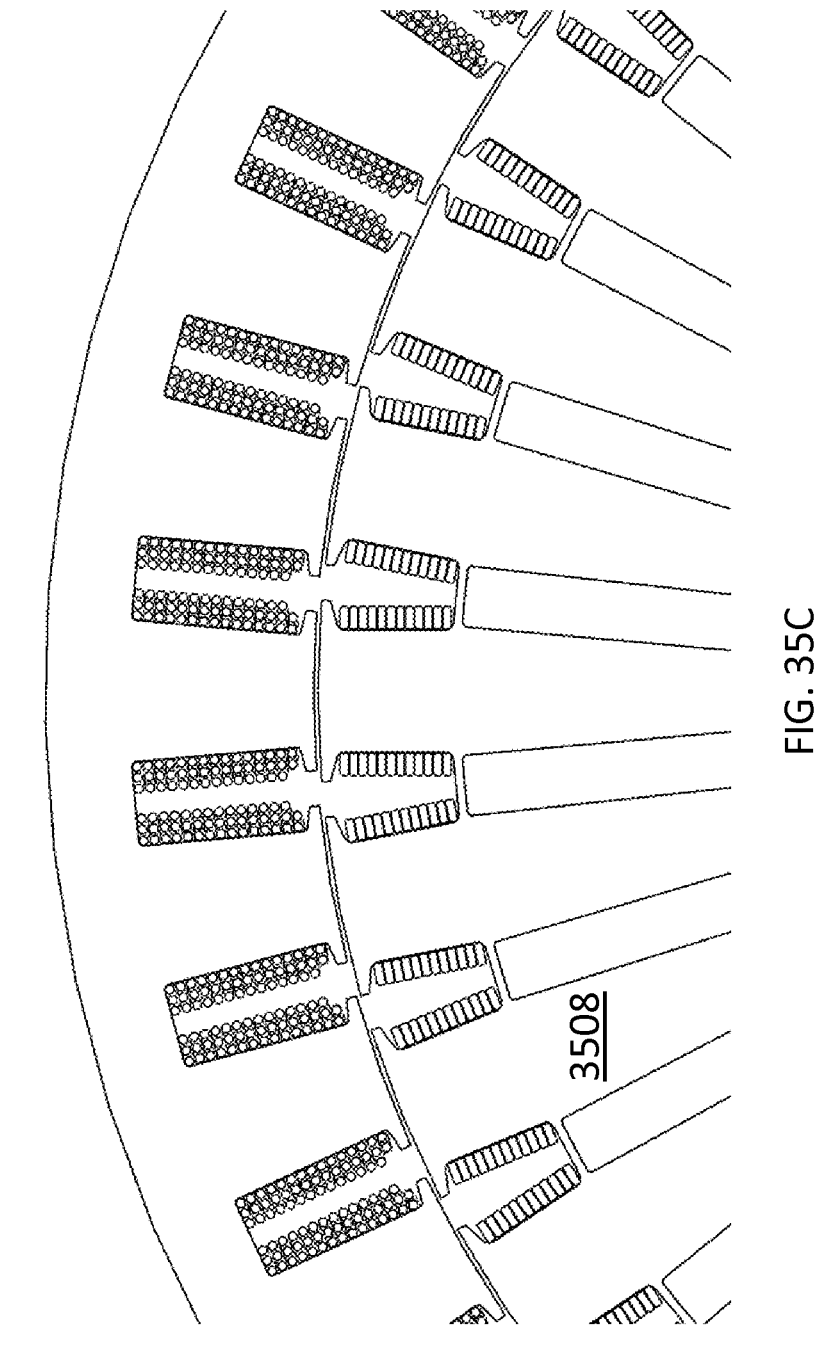
FIG. 35C is a planar cross-sectional view of a portion of an electric motor using the FPFC illustrated in FIGS. 34A-34C.
Figure 35D:
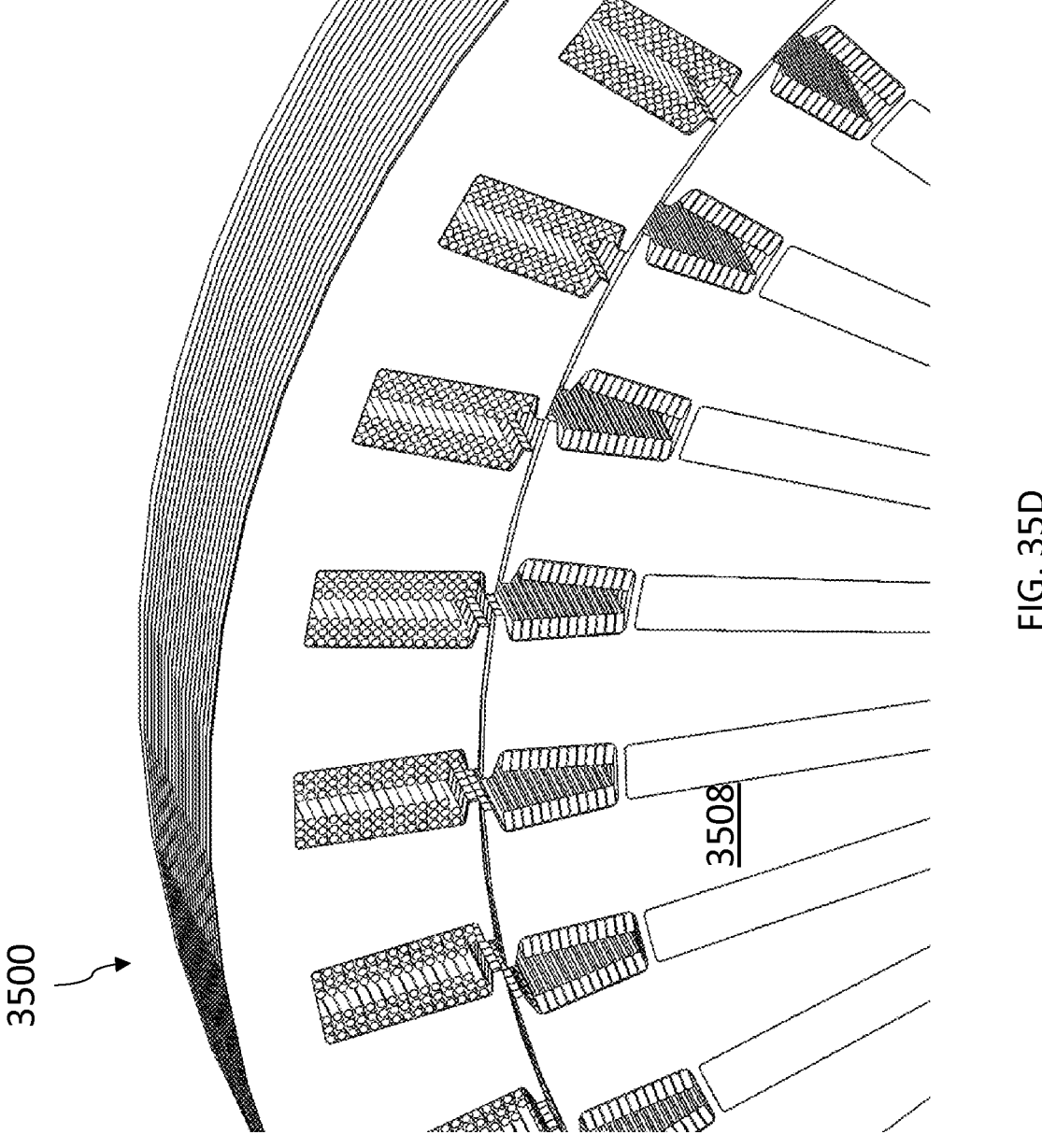
FIG. 35D is a perspective cross-sectional view of a portion of an electric motor using the FPFC illustrated in FIGS. 34A-34C.
Figure 35E:
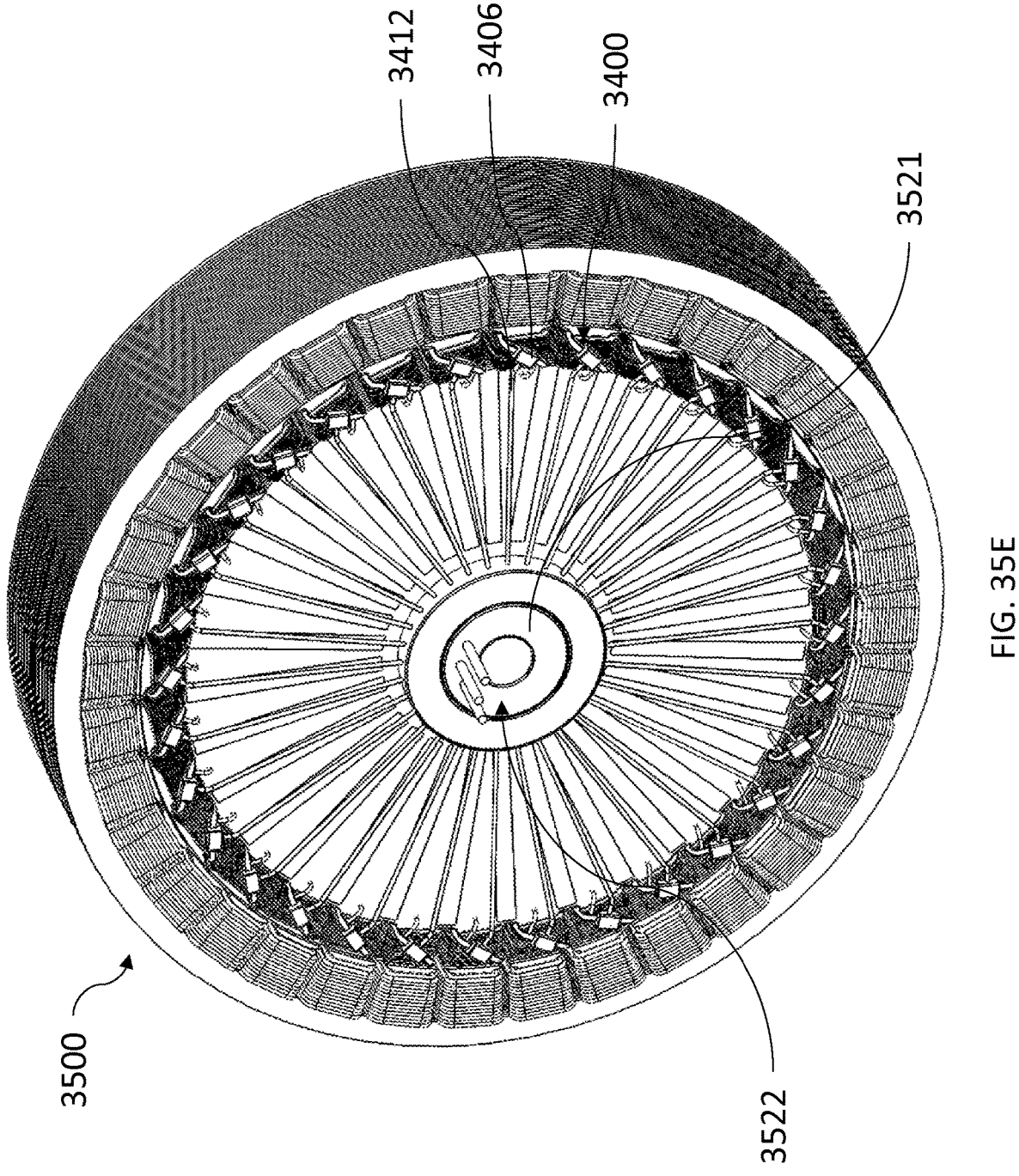
FIG. 35E is a perspective view of an example motor using the FPFC illustrated in FIGS. 34A-34C.
Figure 35F:
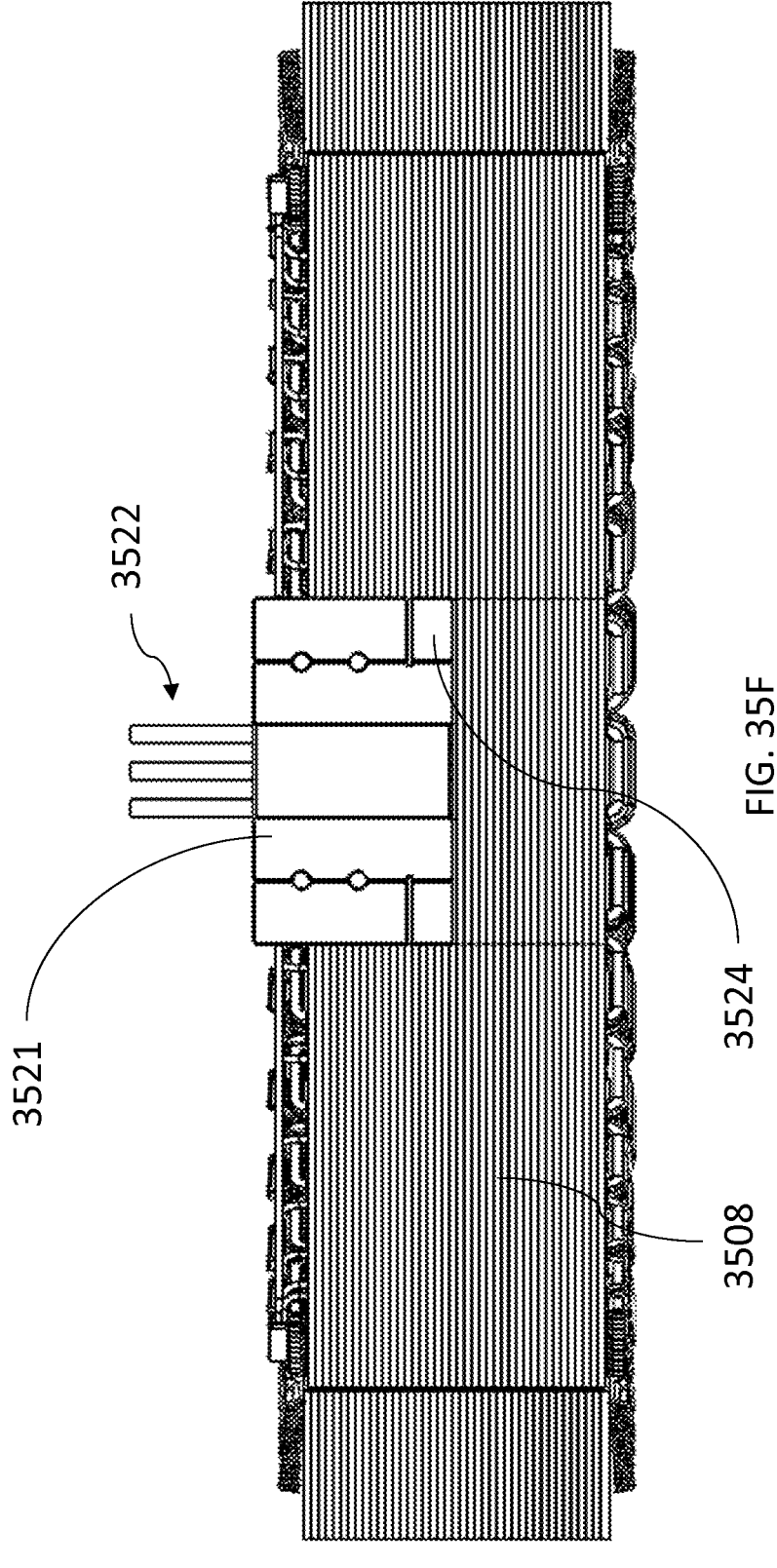
FIG. 35F is a longitudinal cross-sectional view of the example motor illustrated in FIG. 35E.
Figure 35G:
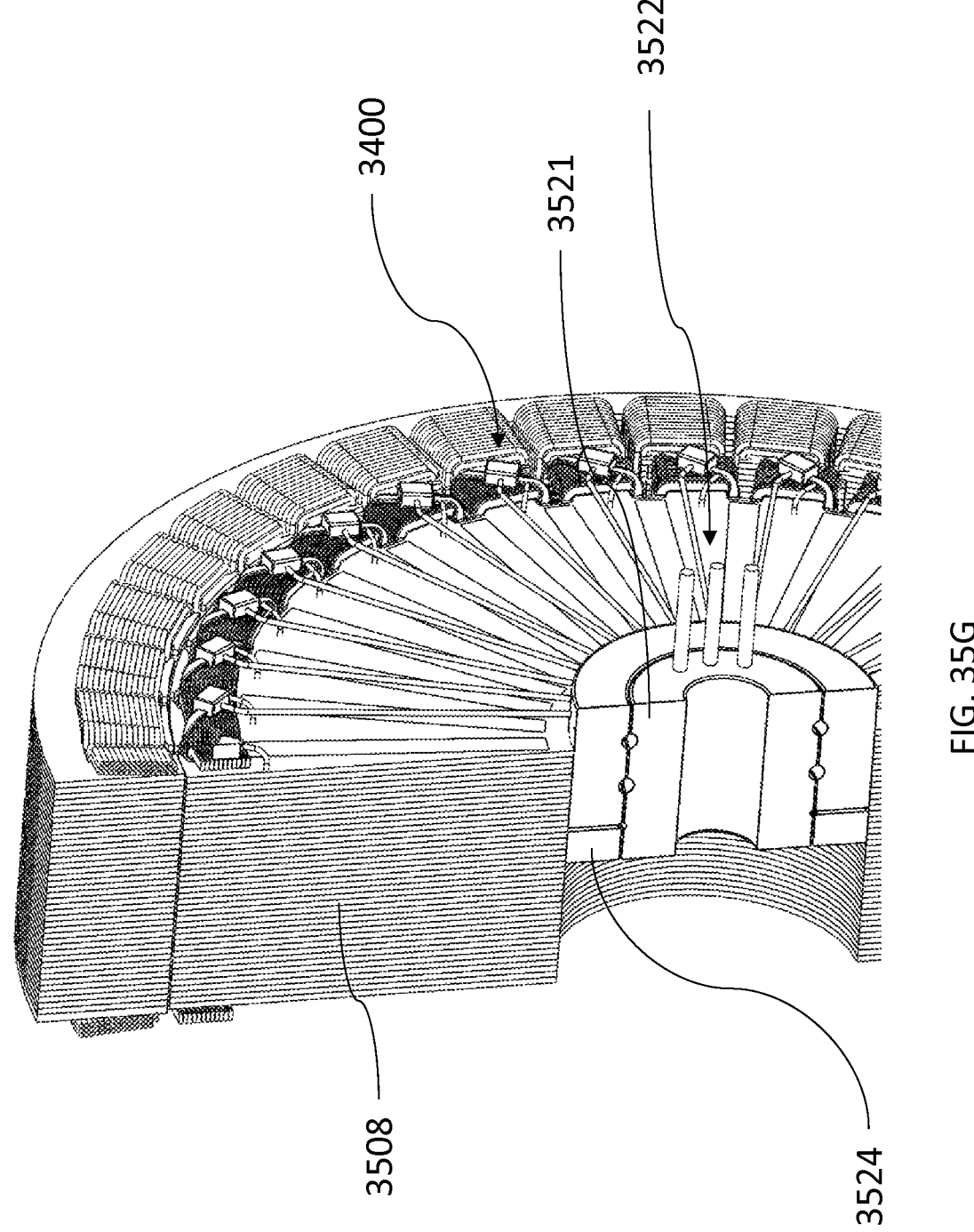
FIG. 35G is a perspective cross-sectional view of the example motor illustrated in FIG. 35E.

FIGS. 34A-34C are views of an example active FPFC 3400 that can be used with aspects of this disclosure. FIG. 35A is a perspective view of a portion of an electric motor 3500 using the active FPFC 3400 illustrated in FIGS. 34A-34C. FIG. 35B is a planar view of a portion of the electric motor 3300 using the active FPFC 3400 illustrated in FIGS. 34A-34C. FIG. 35C is a planar cross-sectional view of a portion of the electric motor 3500 using the active FPFC 3400 illustrated in FIGS. 34A-34C. FIG. 35D is a perspective cross-sectional view of a portion of the electric motor 3500 using the active FPFC 3400 illustrated in FIGS. 34A-34C. FIG. 35E is a perspective view of the example motor 3500 using the active FPFC 3400 illustrated in FIGS. 34A-34C. FIG. 35F is a longitudinal cross-sectional view of the example motor 3500 illustrated in FIG. 35E. FIG. 35G is a perspective cross-sectional view of the example motor 3500 illustrated in FIG. 35E. The motor 3500 is substantially similar to motor 500 previously described in FIGS. 5A-5D with the exception of any differences described herein. The active FPFC 3400 is substantially similar to the passive FPFC 1400 with the exception of any differences described herein.

The FPFC 3400 includes a logic circuit 3406 in series with two ends of the conductive loop 3402. The logic circuit 3406 can includes a transistor, such as a field effect transistor, a dual gate field effect transistor, or a bipolar junction transistor.

As illustrated, the logic circuit 3406 includes a transistor with a source 3408 and a drain 3410 defined by the short-circuited FPFC 3400. A gate 3412 of the transistor is connected to a slip ring 3520 that provides control signals. In some implementations, the leads, the transistor, or both may be embedded in a printed circuit board (PCB) wherein the FPFC and slip ring 3520 or other control mechanism are connected to. There are three slip rings 3521 (one shown) with three leads 3522, one for each phase. The slip ring 3521 is grounded to the rotor with a fourth slip ring 3524 as shown in FIGS. 35F-35G. The drain 3410 on the transistor is also shown as grounded to the rotor 3508. The leads 3522 coming out of the slip ring on the rotor shaft would be coupled to a controller, such as controller 130 (FIG. 2).

The additions of a logic circuit 3406 allows for the FPFC 3400 to be essentially "turned-off" during operation. This can be beneficial in high-speed, low load conditions, such as coasting. In some implementations of active FPFCs, switches in active rectifiers may be implemented such that, when in an unpowered state, the switches act passively. For example, in some implementations a bipolar junction transistor rectifies current across two terminals in the absence of active control. Therefore, upon motor start-up, the active rectifier acts as a passive rectifier until active control is available.

While primarily illustrated and described as being wired to a controller through conductive leads 3522, other communication mediums can be used to send a control signal to the control circuit, for example, by light sensitive diodes, capacitively coupled, or inductively coupled mechanisms, or by other wireless communication mediums.

Alternative Motors Using FPFCs

This section primarily describes implementations relating to alternative electric machines, such as linear motors, axial gap motors, and to radial-gap motors with distributed windings, although descriptions herein can apply to other implementations of radial or salient machines (e.g., concentrated wound, fractional slot, or radial machines).

Axial-Gap Motors with FPFCs

Figures 36A, 36B:
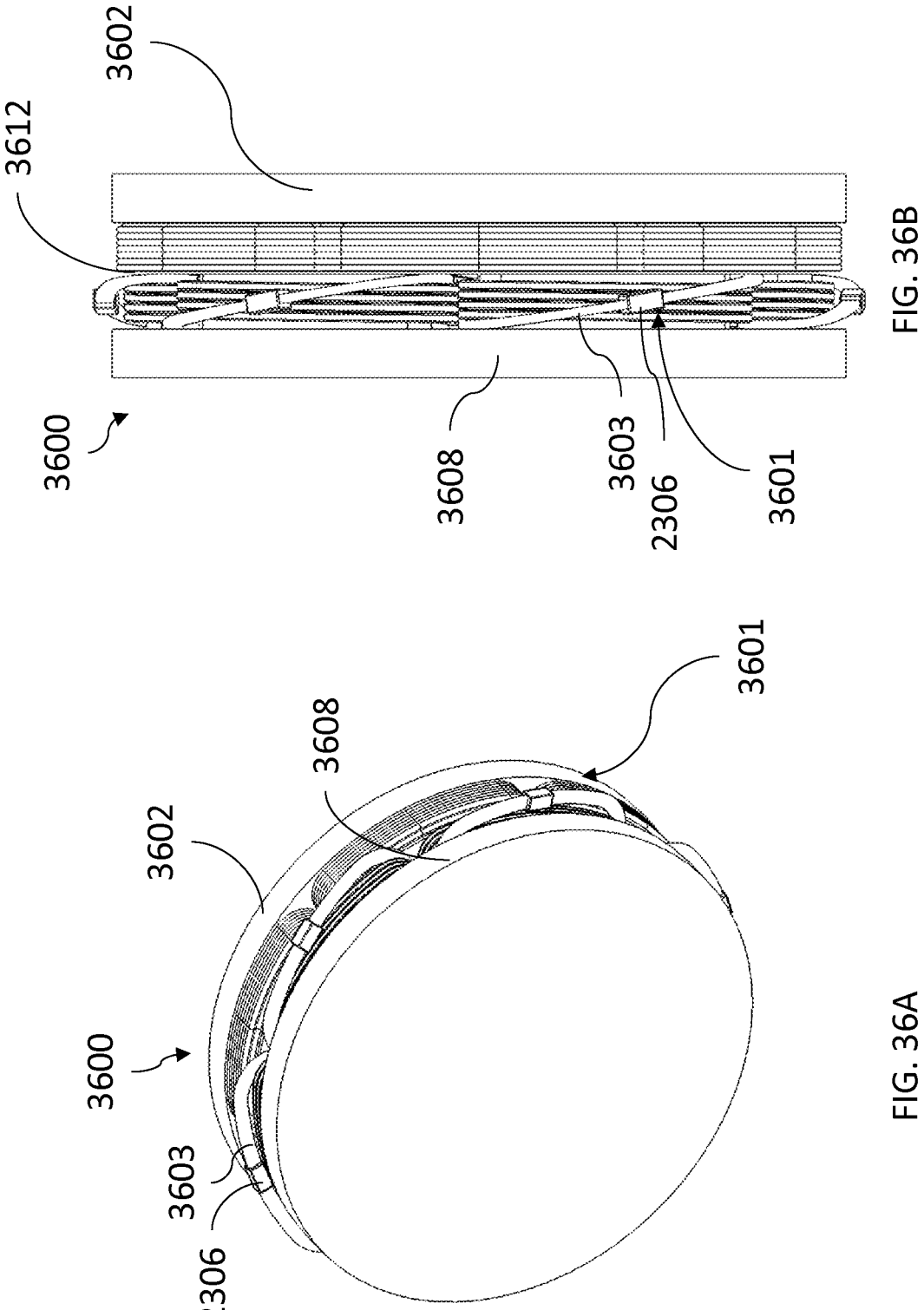
FIG. 36A is a perspective view of an example axial-gap motor that can be used with aspects of this disclosure
FIG. 36B is a side view of the example axial gap motor illustrated in FIG. 36A.
Figures 36C, 36D:
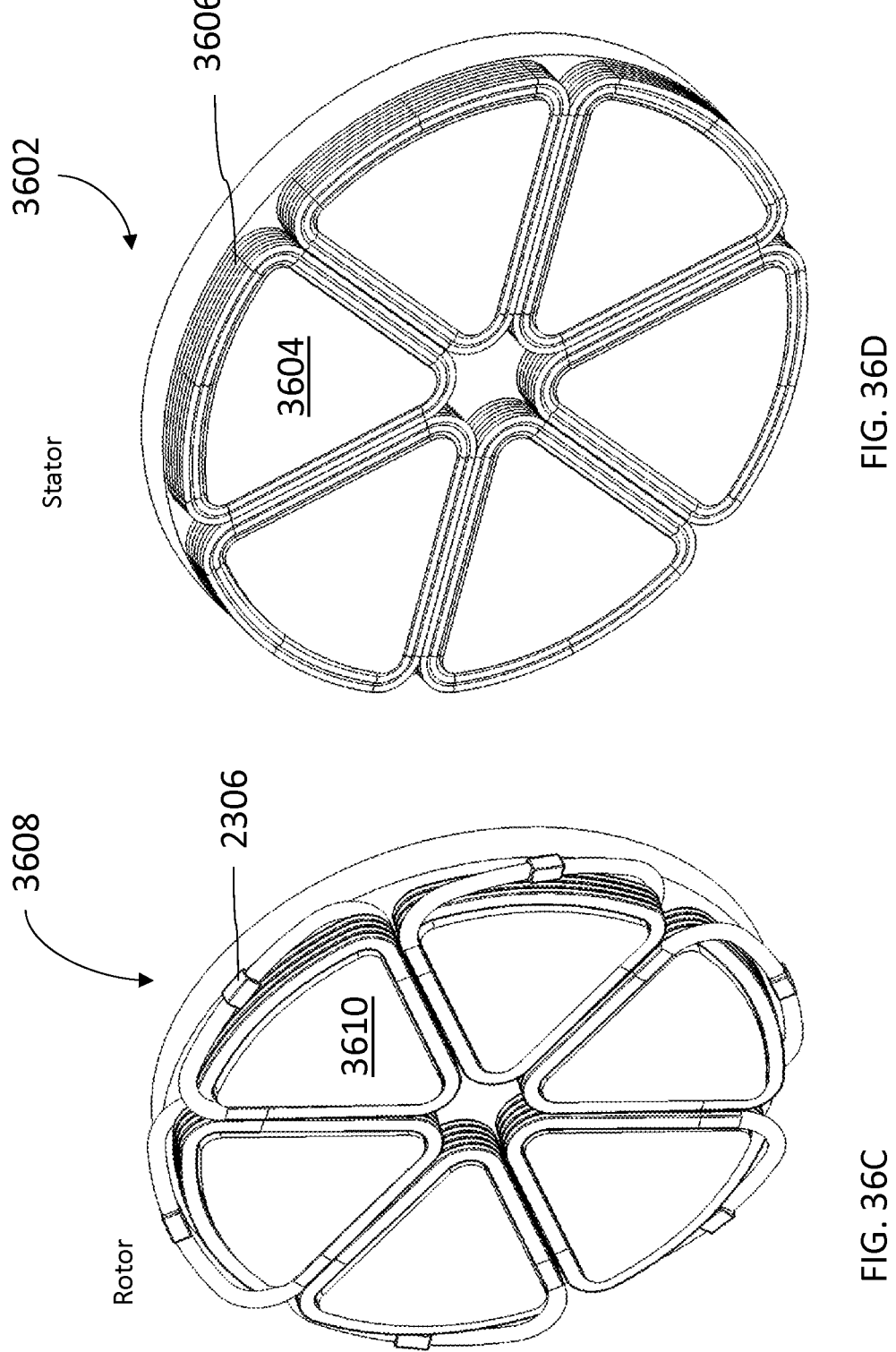
FIG. 36C is a perspective view of the rotor used in the motor illustrated in FIG. 36A.
FIG. 36D is a perspective view of the stator used in the motor illustrated in FIG. 36A.

FIG. 36A is a perspective view of an example axial-gap motor 3600 that can be used with aspects of this disclosure. FIG. 36B is a side view of the example axial gap motor 3600 illustrated in FIG. 36A. FIG. 36C is a perspective view of the rotor 3608 used in the motor 3600 illustrated in FIG. 36A. FIG. 36D is a perspective view of the stator 3602 used in the motor 3600 illustrated in FIG. 36A.

The electric machine 3600 includes a stator 3602 defining multiple stator poles 3604 with associated electrical windings 3606. As illustrated, the stator poles 3604 are shaped as circular sectors; however, other shapes can be used without departing from this disclosure. A rotor 3608 includes multiple rotor poles 3610. Similar to the stator, the rotor poles 3610 are shaped as circular sectors; however, other shapes can be used without departing from this disclosure. While the present implementation has stator poles 3604 shaped similarly to the rotor poles 3610, the stator poles 3604 and rotor poles 3610 can be different from one another without departing from this disclosure. The rotor 3608 is movable with respect to the stator 3620. In this case, the rotor 3608 is arranged to rotate adjacent the stator 3602. The rotor 3608 and the stator 3602 together define a nominal gap 3612 between the stator poles 3604 and the rotor poles 3610. In this case, the nominal gap 3612 is an axial gap. The rotor poles 3610 include a magnetically permeable pole material, such as iron. The rotor 3608 also includes a series of frequency programmable flux channels (FPFCs) 3601. Each FPFC 3601 includes a conductive loop 3603 that surrounds or encircles an associated rotor pole 3610. In the illustrated implementation, each rotor pole 3610 is encircled. The stator 3602 and the rotor 368 are arranged such that the electrical windings 3606 in the stator 3602 induce an excitement current within the FPFCs 3601.

The rotor 3608 can be made of a magnetically permeable material, such as iron. In some implantation, the rotor 3608 can be made-up of rotor laminations to reduce eddy currents within the back-iron of the rotor 3608. Similarly, the stator 3602 can be made-up of stator laminations to reduce eddy currents within the back iron of the stator 3602. In some implementations, the poles 3610 of the rotor 3608 include a material with a non-zero remanence. To retain each FPFC 3601 to their respective rotor poles 3610, various fasteners, adhesives, or resins can be used. In some implementations, The FPFCs 3601 are retained with a friction or interference fit.

As illustrated, the rotor 3608 includes no permanent magnets; however, permanent magnetic material can be used in the stator 3602, the rotor 3608, or both without departing from this disclosure.

Similarly to previously described implementations, the FPFCs 3601 include at least one conductive loop 3603 that has at least one turn of shorted conductive material. That is, the conductive material fully encircles a rotor pole 3610 and shorts itself to form a loop. In some implementations, the conductive loop 3603 includes material more conductive than a rotor core material. In some implementations, the conductive loop 3603 includes material less magnetically permeable than a rotor core material. Similar to the radial-gap implementations, the FPFCs 3601 have a substantially uniform inductance, particularly in a radial direction. Such a criteria allows for full skin effect penetration of each FPFC 3601 at a specified drive frequency. Conductor geometry, such as thickness of individual conductors within the conductive loop, is considered when designing the FPFCs 3601. In some implementations, drive frequencies can extend between 0 hertz and 20 hertz. In some implementations, drive frequencies can range between 100 hertz and 2000 hertz. In some implementations, drive frequencies can extend between 2,000 hertz and 15,000 hertz. As illustrated, the FPFCs 3601 are rectified FPFCs that include a rectifier 2306. While illustrated as using rectified FPFCs, passive or active FPFCs can be used without departing from this disclosure.

Distributed Windings

Figure 37A:
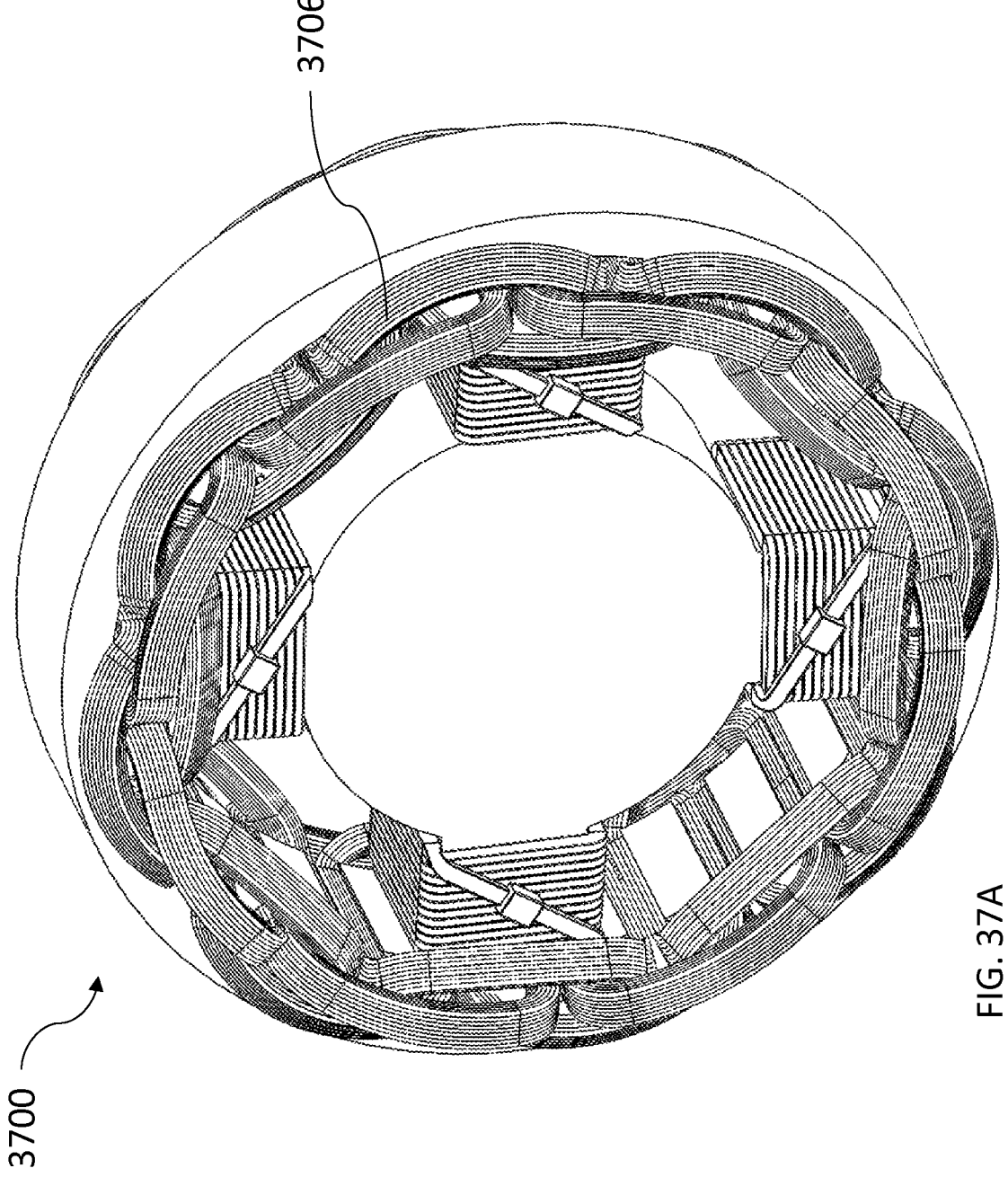
FIG. 37A is a perspective view of an example electric motor with distributed windings that can be used with aspects of this disclosure.
Figures 37B, 37C:
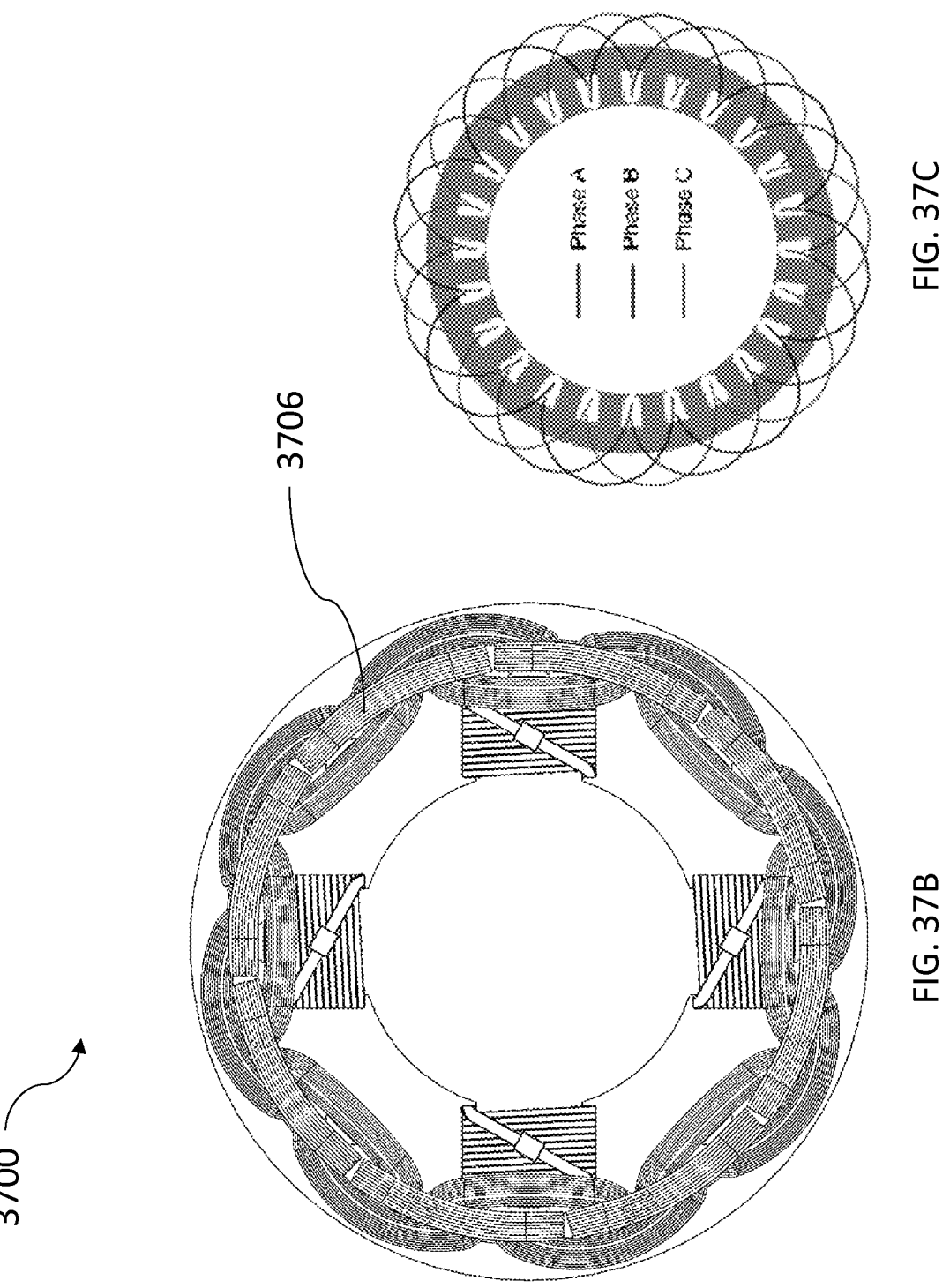
FIG. 37B is a side view of the example electric motor illustrated in FIG. 37A.
FIG. 37C is a schematic view of the stator in the electric motor illustrated in FIG. 37A.
Figure 37D:
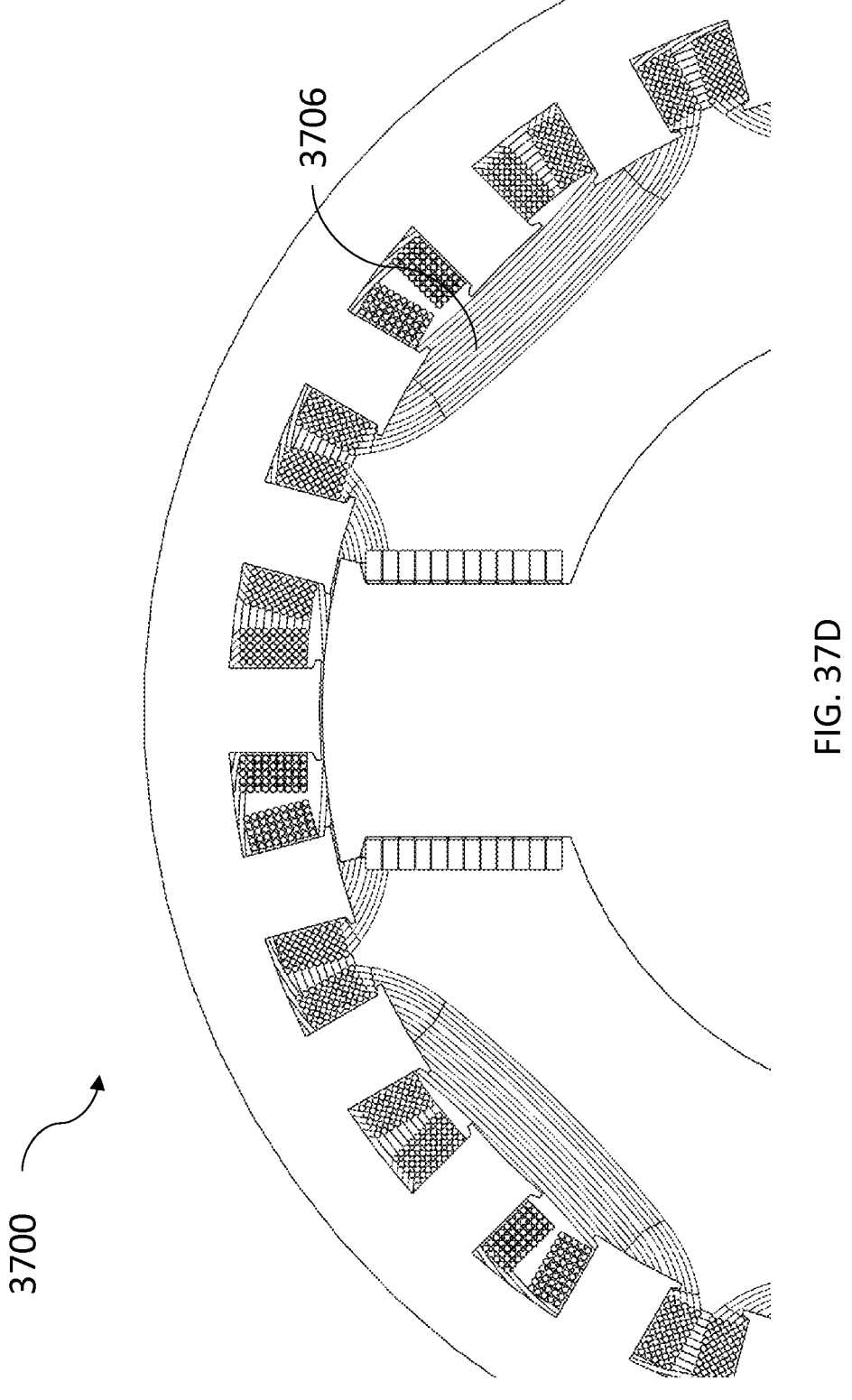
FIG. 37D is a planar cross-sectional view of the example motor illustrated in FIG. 37A.
Figure 37E:
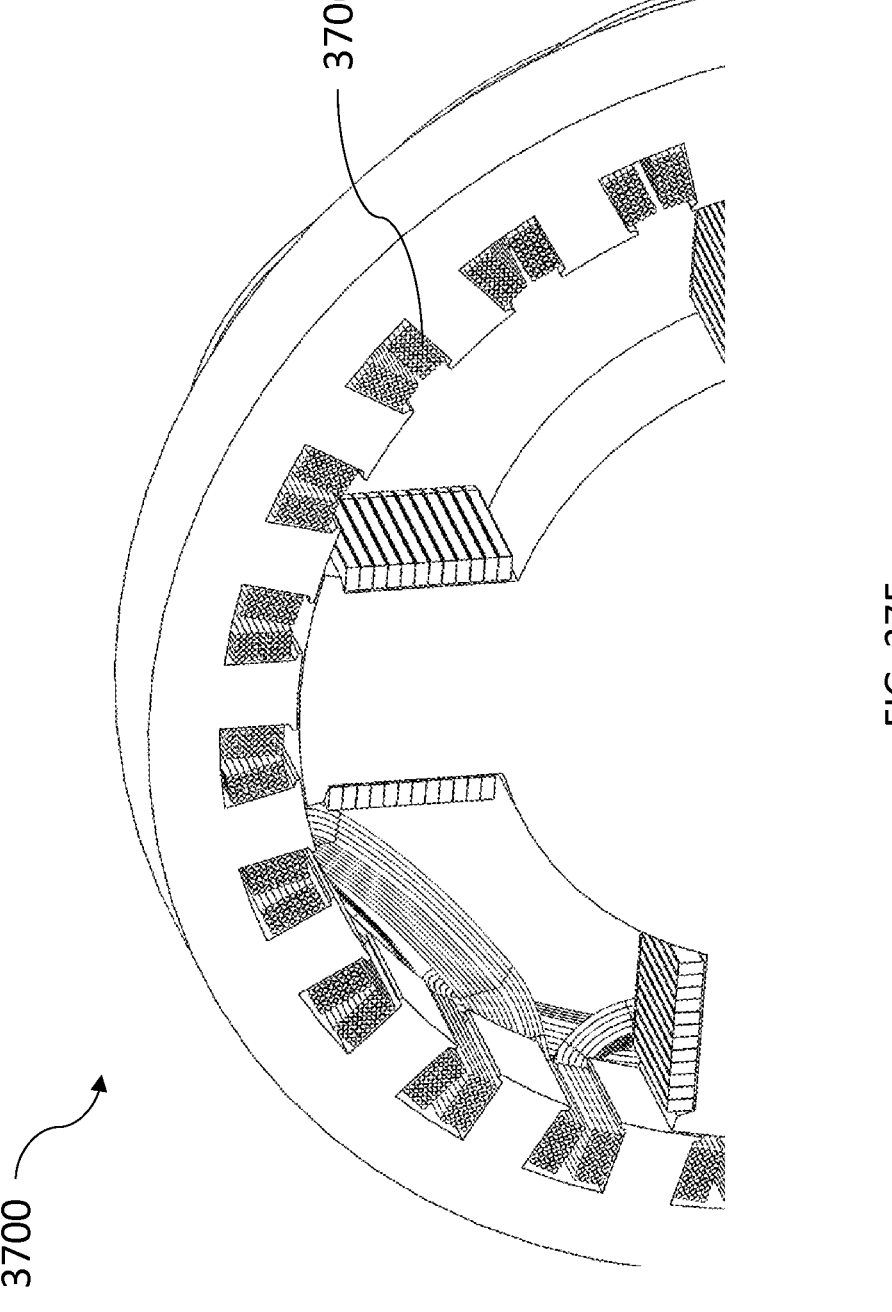
FIG. 37E is a perspective cross-sectional view of the example motor illustrated in FIG. 37A.
Figures 38A, 38B:
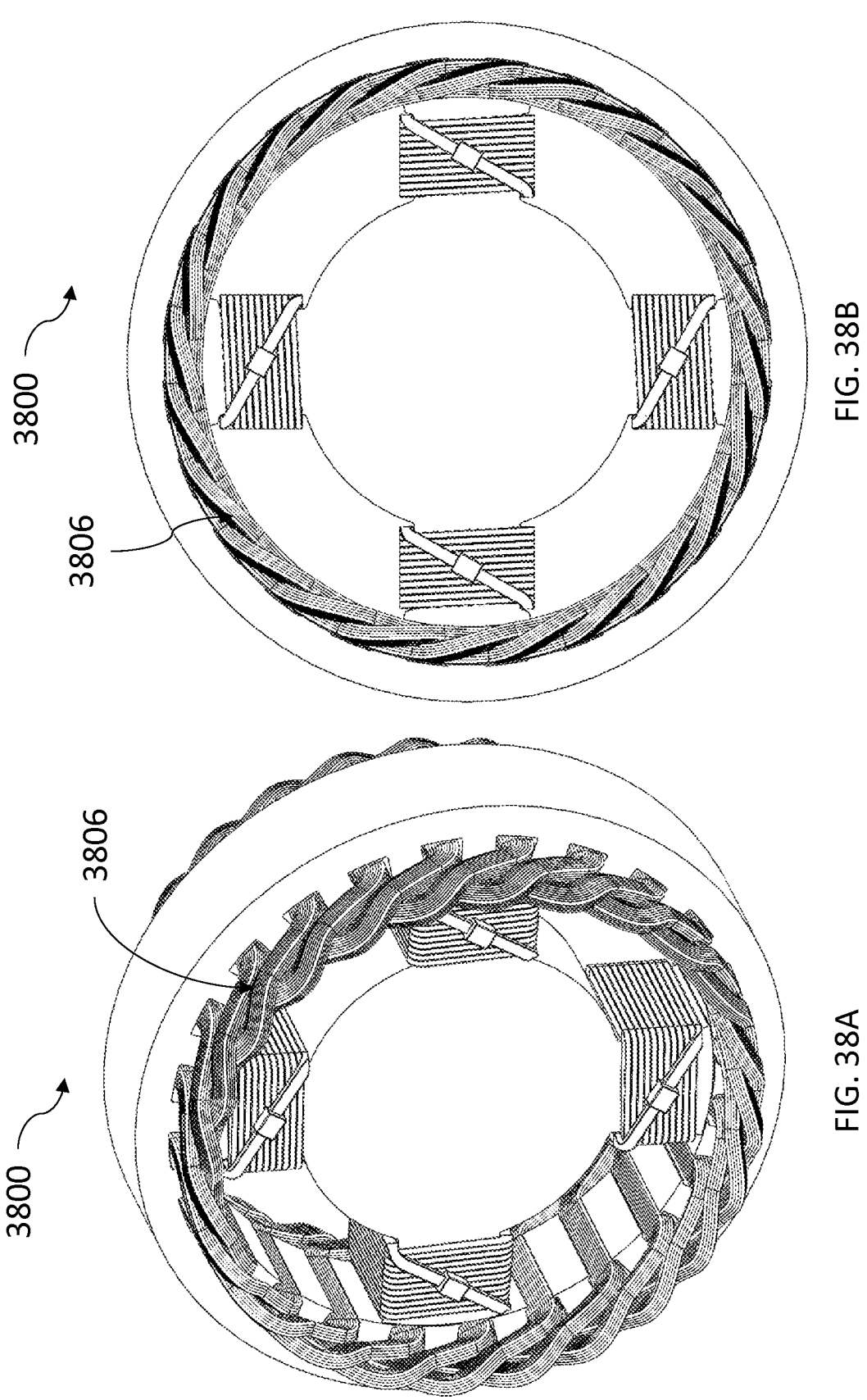
FIGS. 38A-38B are perspective and planar views of an example motor with distributed windings that can be used with aspects of this disclosure.

FIG. 37A is a perspective view of an example electric motor 3700 with distributed stator windings 3706 that can be used with aspects of this disclosure. FIG. 37B is a side view of the example electric motor 3700 illustrated in FIG. 37A. FIG. 37C is a schematic view of the stator 3702 in the electric motor 3700 illustrated in FIG. 37A. FIG. 37D is a planar cross-sectional view of the example motor 3700 illustrated in FIG. 37A. FIG. 37E is a perspective cross-sectional view of the example motor 3700 illustrated in FIG. 37A. FIGS. 38A-38B are perspective and planar views of an example motor 3800 with distributed stator windings 3806 that can be used with aspects of this disclosure.

Previous implementations described within this disclosure related to rotors with salient poles and stators with salient poles. In some implementations, a stator with distributes stator poles can be used. In such an implementation, the stator windings overlap one-another. Details about how such an implantation is controlled, and any differences that can exist between controlling a motor with salient stator windings versus distributes windings, are explained in greater detail later in this disclosure. While distributed stator windings can be used without departing from this disclosure, the rotor poles and their associated FPFCs are salient and non-overlapping in all implementations described within. In some implementations, FPFCs within the same phase may be shorted to one another without departing from this disclosure. Such an arrangement is still considered non-distributed rotor poles.

Linear Motors with Frequency Programmable Flux Channels

Figure 39A:
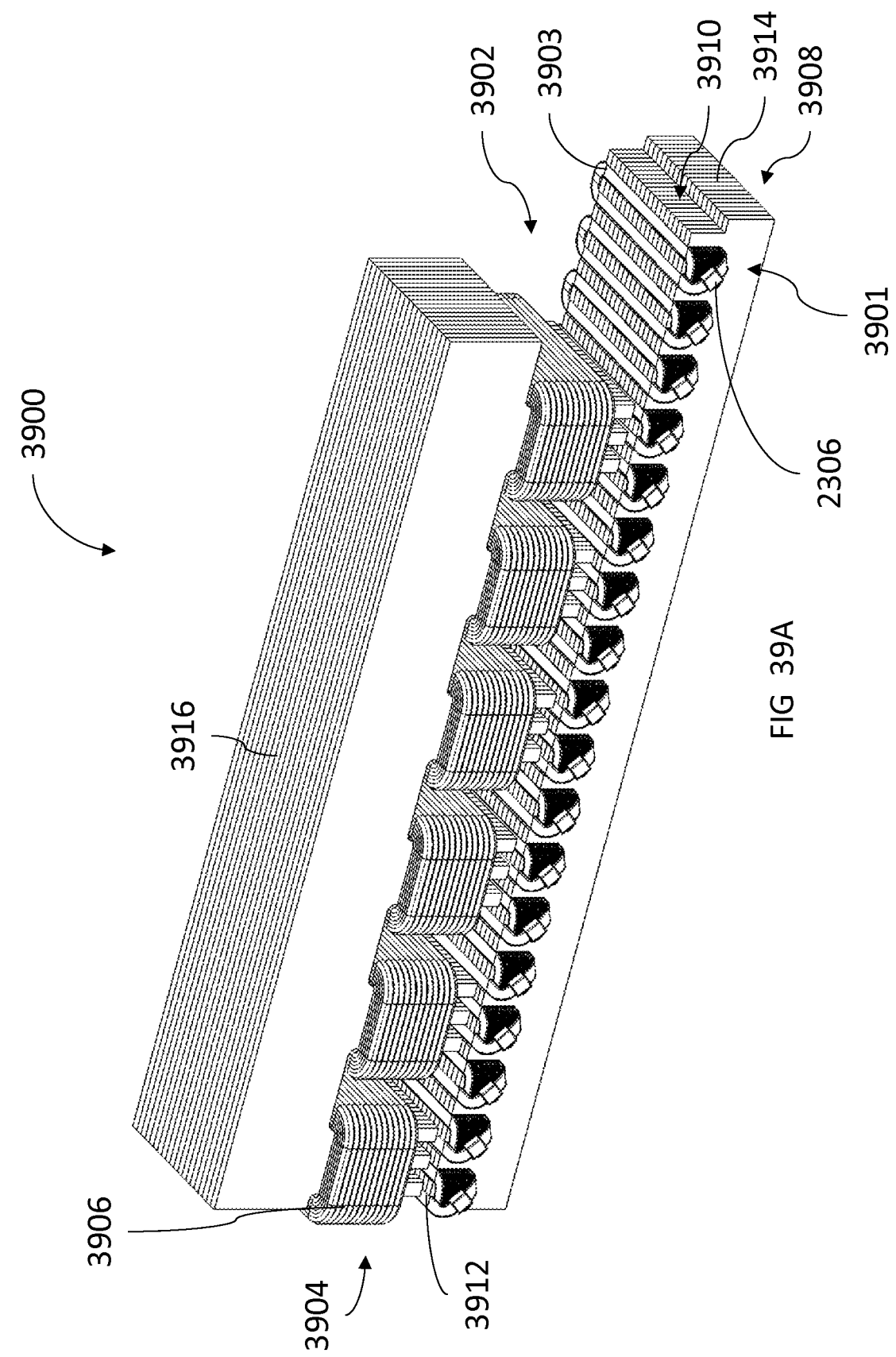
FIG. 39A is a perspective view of an example linear motor with rectified FPFCs on the "rotor"
Figures 39B, 39C:
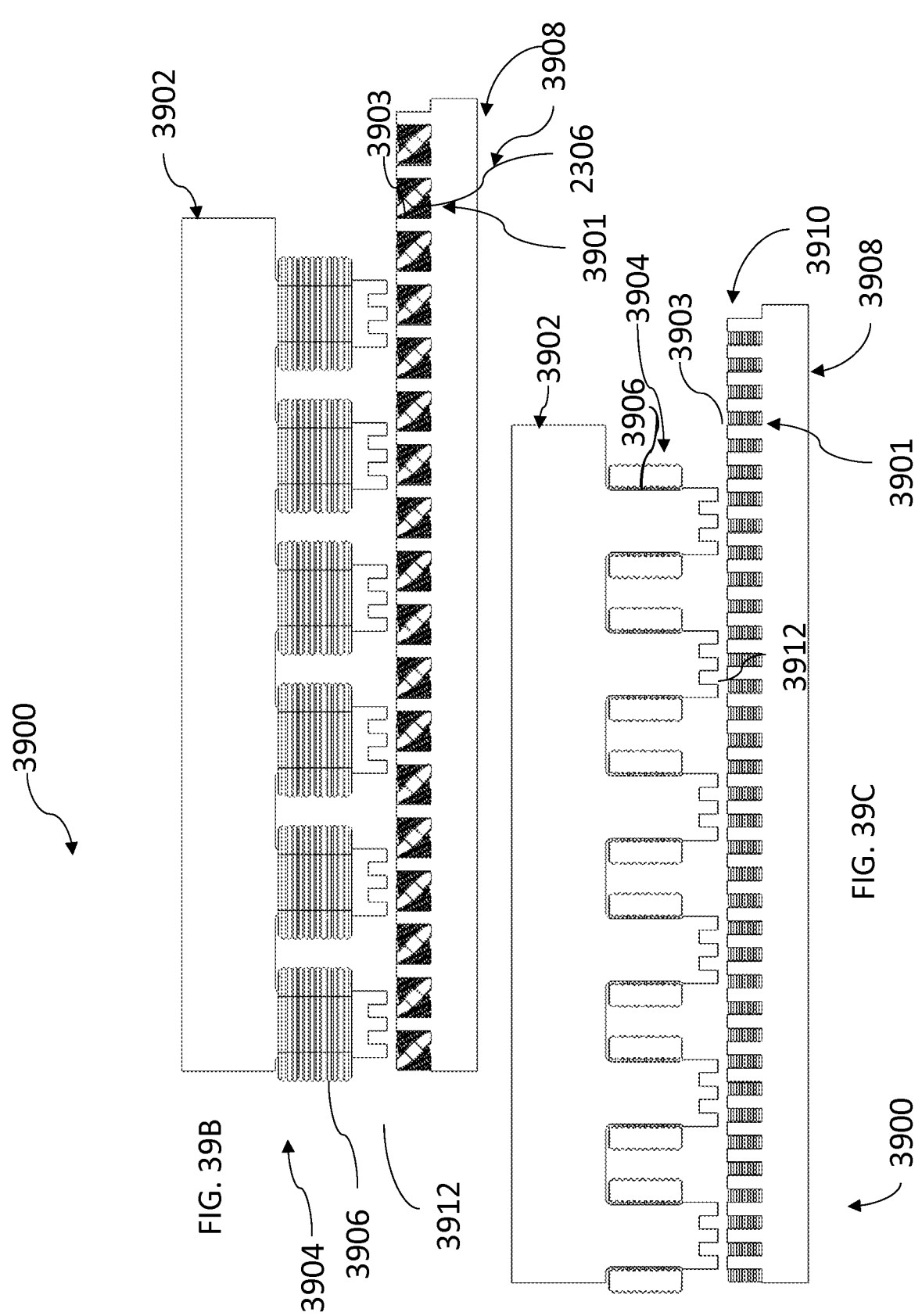
FIG. 39B is a longitudinal side view of the example linear motor illustrated in FIG. 39A.
FIG. 39C is a longitudinal cross-sectional view of the example linear motor illustrated in FIG. 39A.
Figure 39D:
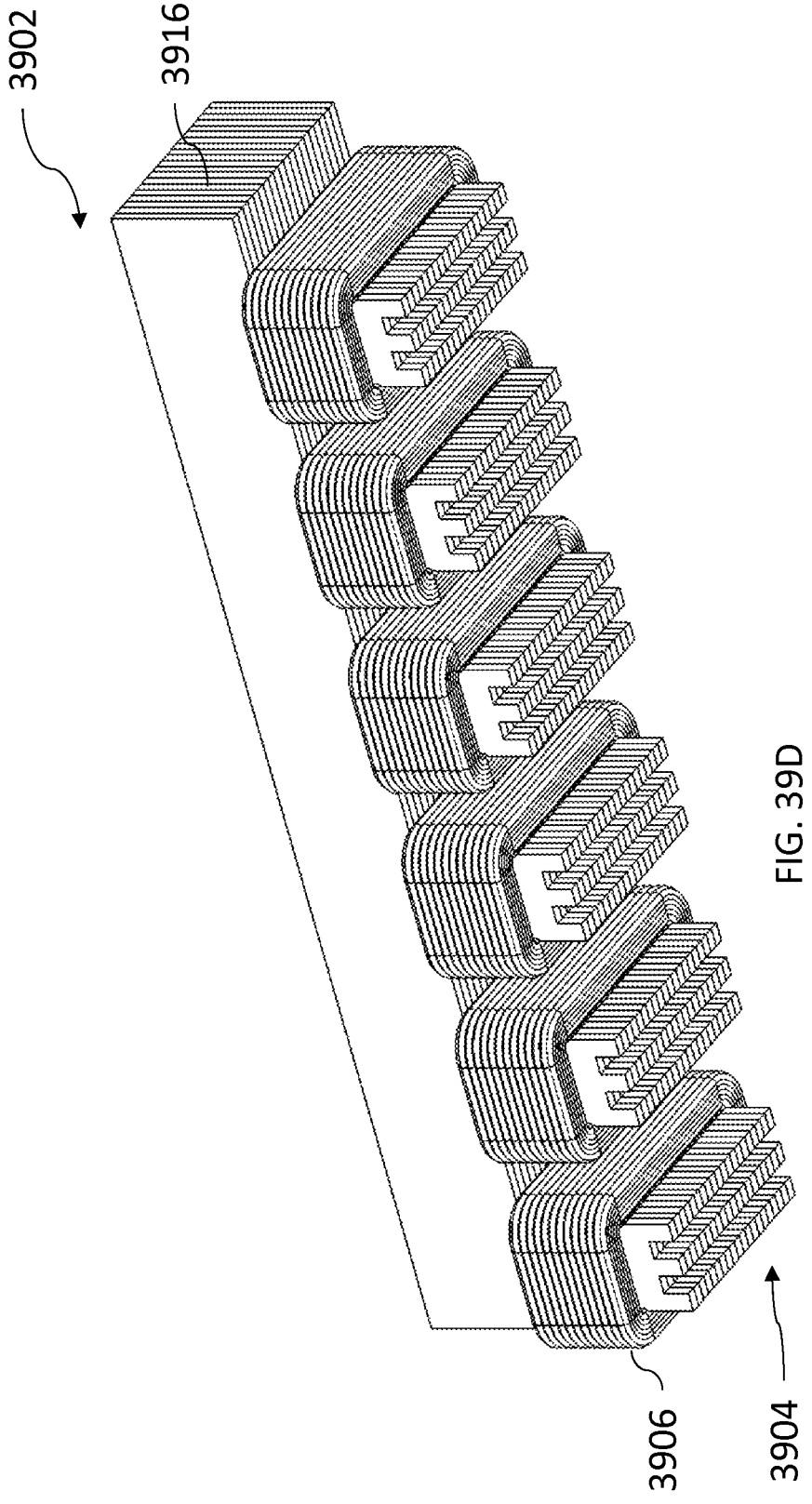
FIG. 39D is a perspective view of the stator of the example linear motor illustrated in FIG. 39A.
Figure 39E:
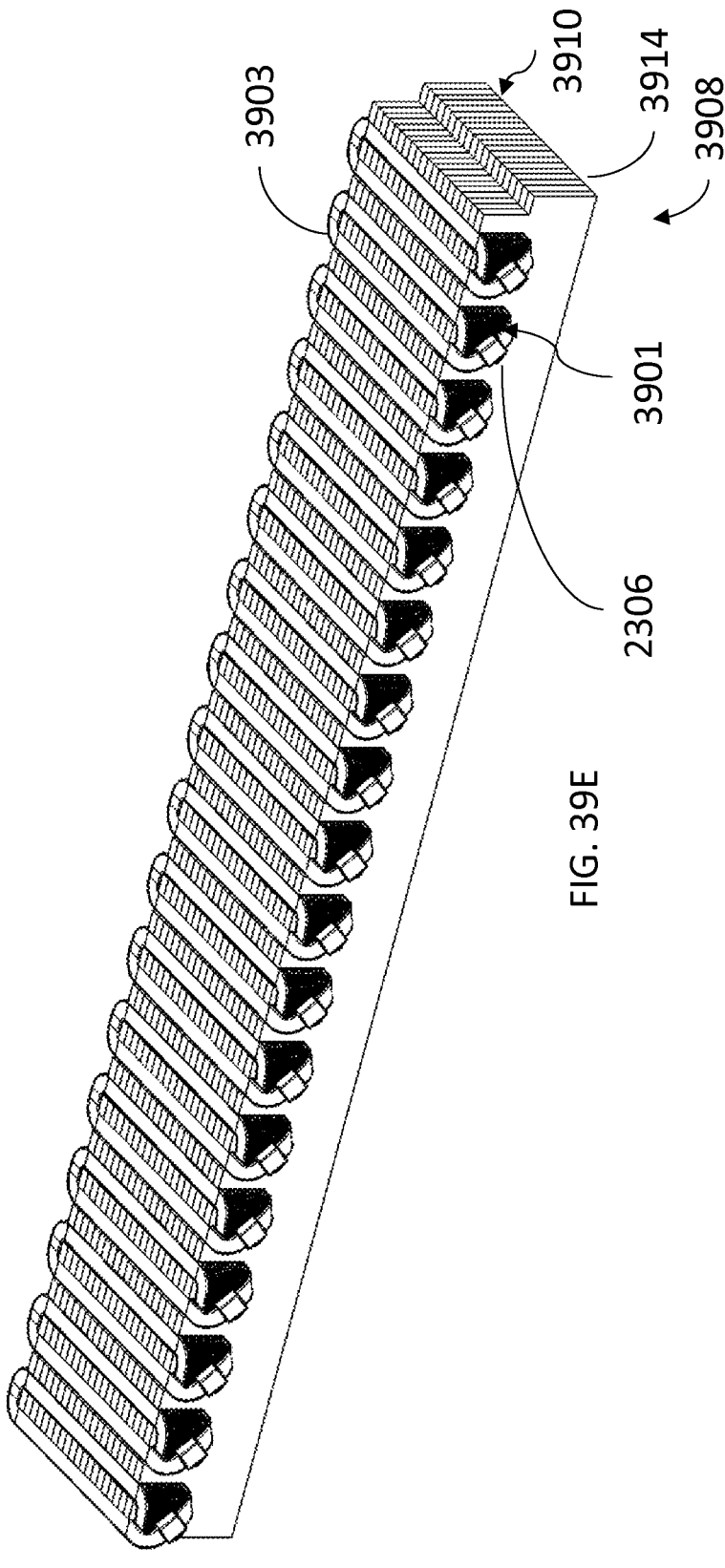
FIG. 39E is a perspective view of the "rotor" of the example linear motor illustrated in FIG. 39A.

FIG. 39A is a perspective view of an example linear motor 3900 with rectified FPFCs on the "rotor" 3908 (the passive magnetic section). FIG. 39B is a longitudinal side view of the example linear motor 3900 illustrated in FIG. 39A. FIG. 39C is a longitudinal cross-sectional view of the example linear motor 3900 illustrated in FIG. 39A. FIG. 39D is a perspective view of the stator 3902 (the active magnetic section) of the example linear motor 3900 illustrated in FIG. 39A. FIG. 39E is a perspective view of the "rotor" 3908 of the example linear motor 3900 illustrated in FIG. 39A.

The electric machine 3900 includes a stator 3902 defining multiple stator poles 3904 with associated electrical windings 3906. A rotor 3908 includes multiple rotor poles 3910. While the present implementation has stator poles 3904 shaped similarly to the rotor poles 3910, the stator poles 3904 and rotor poles 3910 can be different from one another without departing from this disclosure. As illustrated, the stator 3902 is movable with respect to the rotor 3908. The rotor 3908 can act as a passive magnetic track that the active magnetic stator 3902 travels across. The rotor 3908 and the stator 3902 together define a nominal gap 3912 between the stator poles 3904 and the rotor poles 3910. In this case, the nominal gap 3912 is a lateral gap. The rotor poles 3910 include a magnetically permeable pole material, such as iron. The rotor 3908 also includes a series of frequency programmable flux channels (FPFCs) 3901. Each FPFC 3901 includes a conductive loop 3903 that surrounds or encircles an associated rotor pole 3910. In the illustrated implementation, every other rotor pole 3910 is encircled. The stator 3902 and the rotor 3908 are arranged such that the electrical windings 3906 in the stator 3902 induce an excitement current within the FPFCs 3901.

The rotor 3908 can be made of a magnetically permeable material, such as iron. In some implantation, the rotor 3908 can be made-up of rotor laminations 3914 to reduce eddy currents within the back-iron of the rotor 3908. Similarly, the stator 3902 can be made-up of stator laminations 3916 to reduce eddy currents within the back iron of the stator 3902. In some implementations, the poles 3910 of the rotor 3908 include a material with a non-zero remanence. To retain each FPFC 3901 to their respective rotor poles 3910, various fasteners, adhesives, or resins can be used. In some implementations, The FPFCs 3901 are retained with a friction or interference fit.

As illustrated, the rotor 3908 includes no permanent magnets; however, permanent magnetic material can be used in the stator 3902, the rotor 3908, or both without departing from this disclosure.

Similarly to previously described implementations, the FPFCs 3901 include at least one conductive loop 3903 that has at least one turn of shorted conductive material. That is, the conductive material fully encircles a rotor pole 3910 and shorts itself to form a loop. In some implementations, the conductive loop 3903 includes material more conductive than a rotor core material. In some implementations, the conductive loop 3903 includes material less magnetically permeable than a rotor core material. Similar to the radial-gap implementations, the FPFCs 3901 have a substantially uniform inductance, particularly in a radial direction. Such a criteria allows for full skin effect penetration of each FPFC 3901 at a specified drive frequency. Conductor geometry, such as thickness of individual conductors within the conductive loop, is considered when designing the FPFCs 3901. In some implementations, drive frequencies can extend between 0 hertz and 20 hertz. In some implementations, drive frequencies can range between 100 hertz and 2000 hertz. In some implementations, drive frequencies can extend between 2,000 hertz and 15,000 hertz. As illustrated, the FPFCs 3901 are rectified FPFCs that include a rectifier 2306.

Figure 40A:
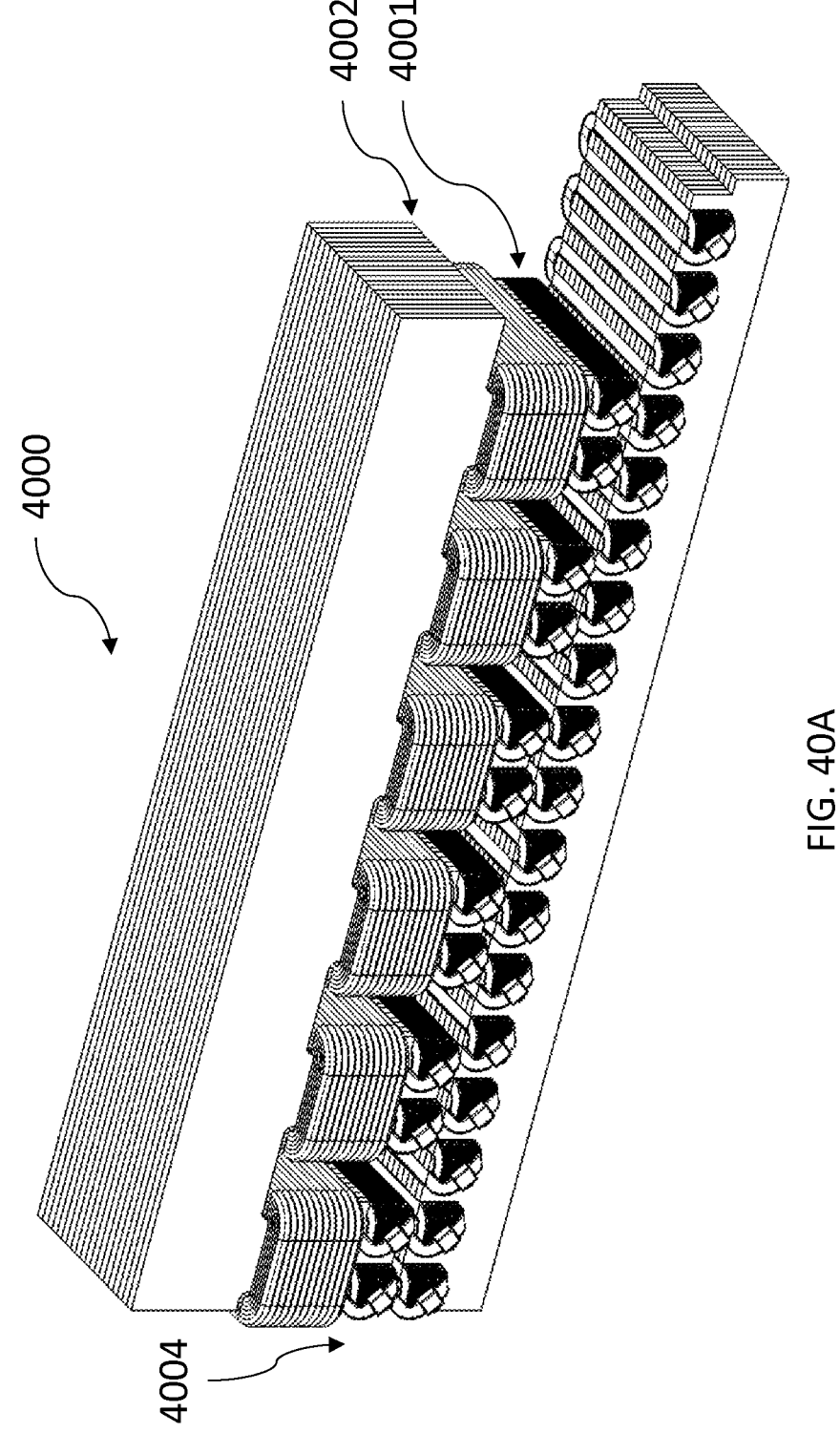
FIG. 40A is a perspective view of an example linear motor with rectified FPFCs on the "rotor" and the stator.
Figure 40B:
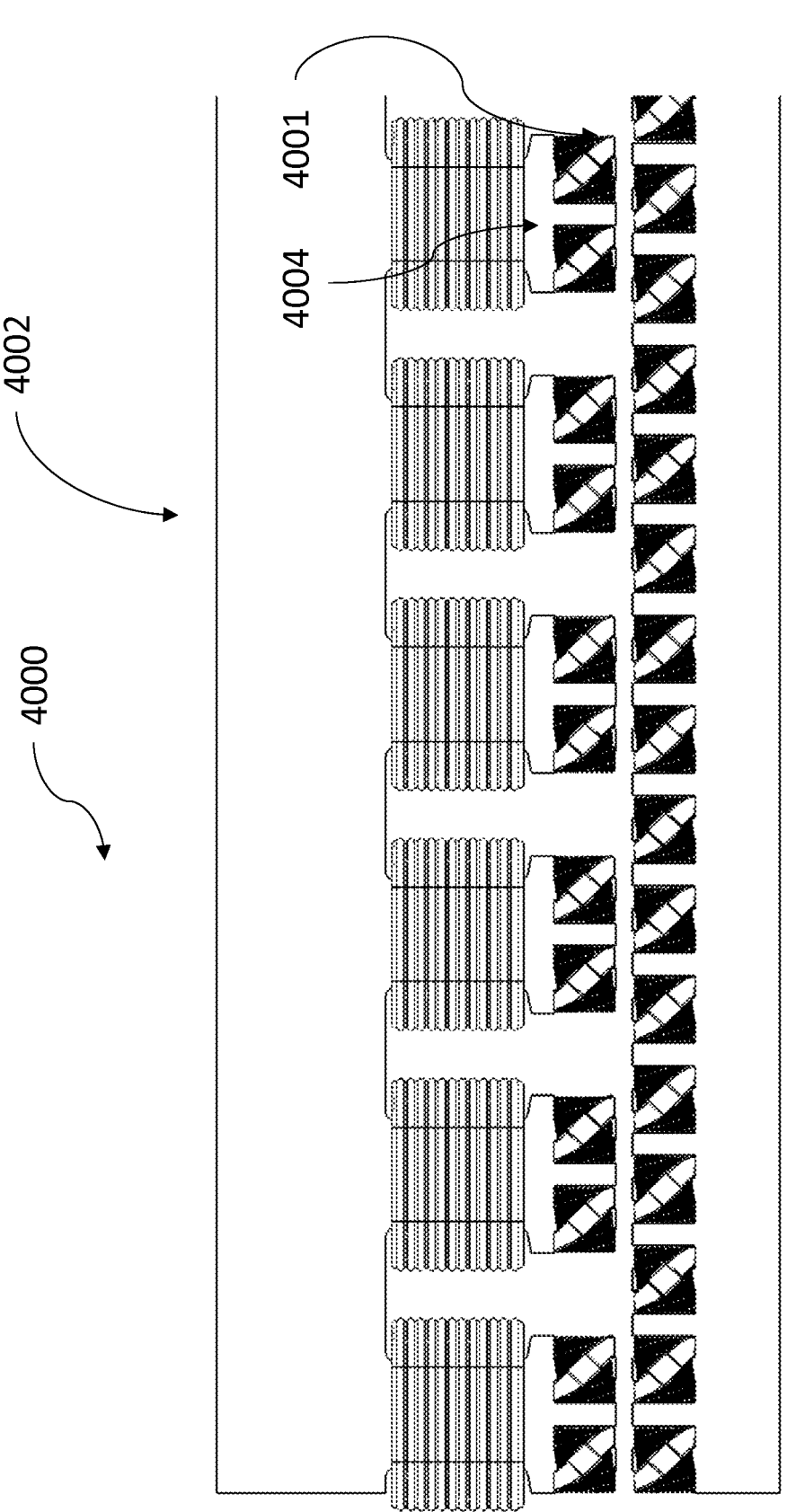
FIG. 40B is a longitudinal side view of the example linear motor illustrated in FIG. 40A.
Figure 40C:
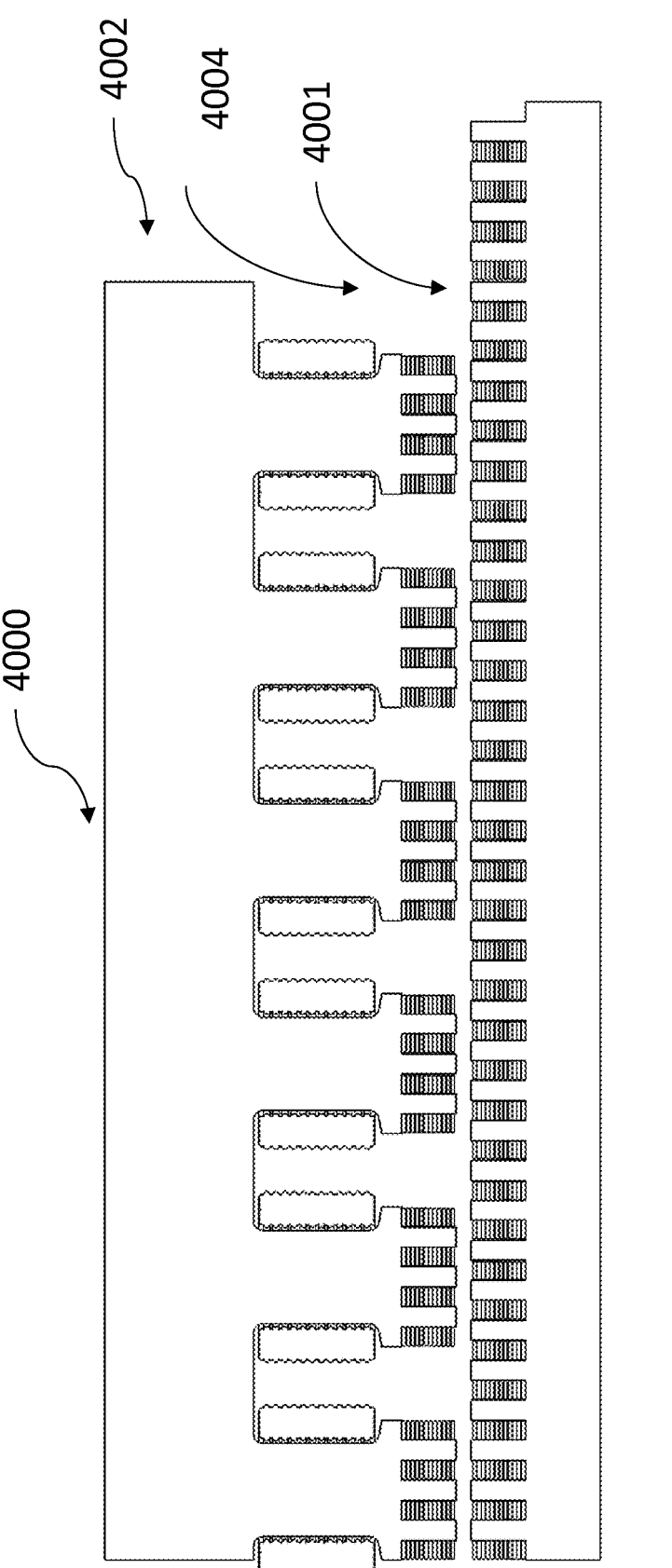
FIG. 40C is a longitudinal cross-sectional view of the example linear motor illustrated in FIG. 40A.
Figure 40D:
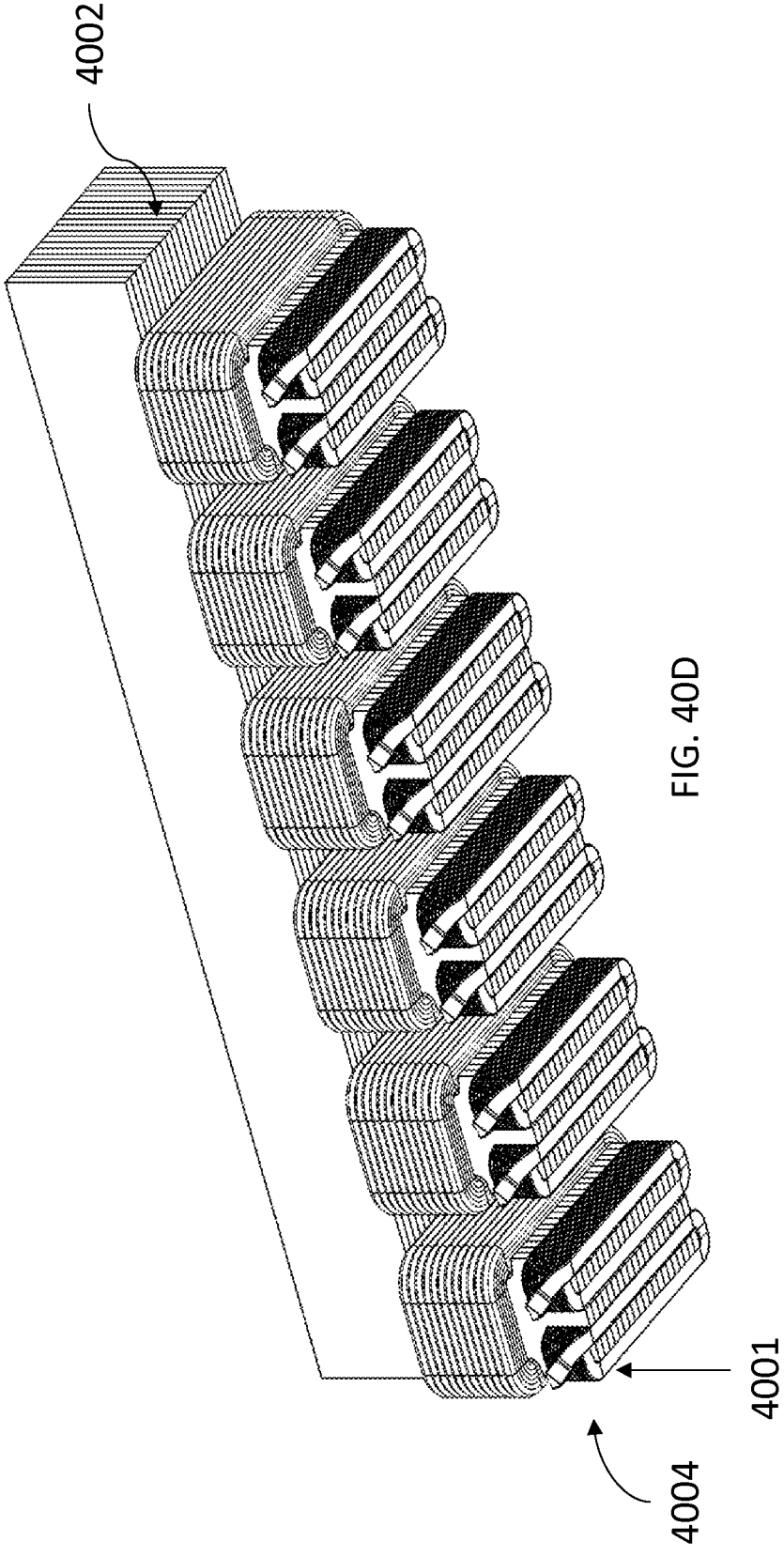
FIG. 40D is a perspective view of the stator of the example linear motor illustrated in FIG. 40A.

FIG. 40A is a perspective view of an example linear motor 4000 with rectified FPFCs on the "rotor" 4008 and the stator 4002. FIG. 40B is a longitudinal side view of the example linear motor 4000 illustrated in FIG. 40A. FIG. 40C is a longitudinal cross-sectional view of the example linear motor 4000 illustrated in FIG. 40A. FIG. 40D is a perspective view of the stator 4002 of the example linear motor 4000 illustrated in FIG. 40A. The linear motor 4000 is substantially similar to the linear motor 3900 with the exception of any differences described herein.

The stator 4002 includes two rectified FPFCs 4001 on the stator poles 4004. The addition of the two rectified FPFCs per stator pole 4004 allows for flux pinning within the stator poles 4004. That is, the flux is topologically constrained to a desired area of the stator pole. While illustrated as using rectified FPFCs, passive or active FPFCs can be used without departing from this disclosure.

Operation of Motors with Frequency Programmable Flux Channels

This section describes general motor concepts that are applicable to electric motors with FPFCs. While described primarily in the context of rotating electric motors, the concepts described herein are applicable to other motors as well. In some instances, the concepts described herein are applicable to motors without FPFCs.

Figures 41A, 41B:
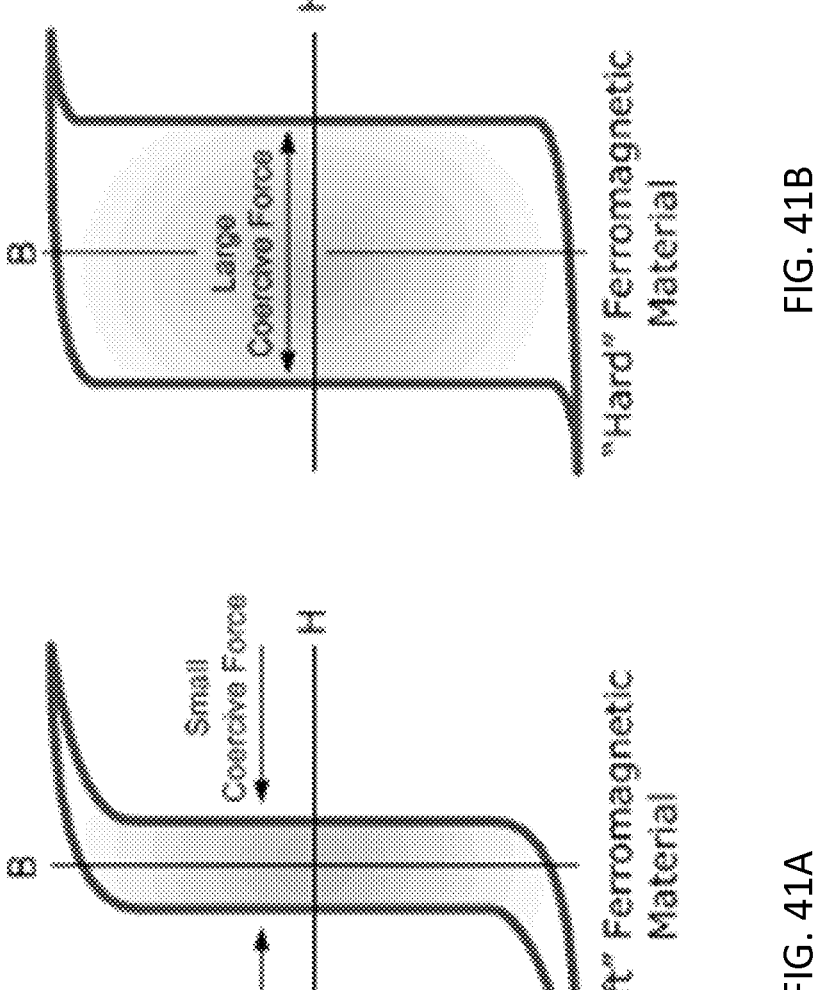
FIG. 41A is a hysteresis diagram of a "soft" magnetic material
FIG. 41B is a hysteresis diagram of a "hard" magnetic material

A magnetic material can be classified as "soft" or "hard" based upon its coercivity. Traditionally, synchronous motors don't have magnetizing current to magnetize a material so magnets have to be magnetized at the factory or prior to installation. To that effect, if the magnetic material demagnetizes under operation (e.g., because the stator is putting too much of a load on it or due to thermal effects generated throughout operation) the magnet can be damaged, or the motor can be rendered inoperable entirely. Thus, "hard" materials are often used in permanent magnet synchronous machines. Moreover, regardless of magnetic material, sufficiently large quantities of such magnetic material are typically used to ensure a given field strength (B) and coercivity (H). FIG. 41A is a hysteresis diagram of a "soft" magnetic material and FIG. 41B is a hysteresis diagram of a "hard" magnetic material. The coercive force for the "hard" magnetic material is larger than that of "soft" magnetic material. Referring back to FIGS. 3A-3D, the inverted pulses 306 can magnetically harden (or stiffen) the rotor poles 308 that include an FPFC 310. The FPFC itself can also assist in supporting the flux of a given magnetic material, or magnetically permeable material, throughout operation (e.g., under sinusoidal or square-wave control).

Figure 42:
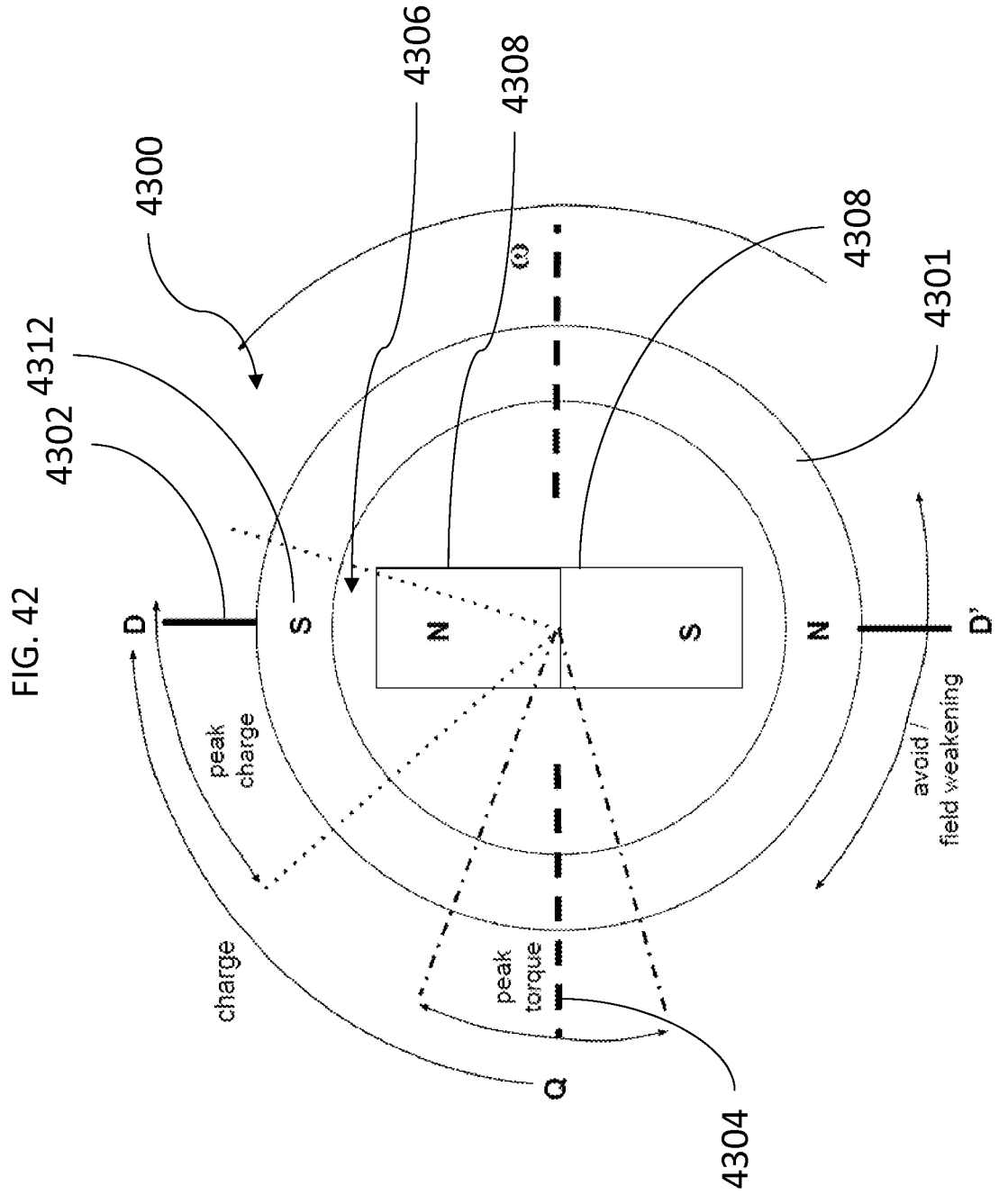
FIG. 42 is a schematic diagram of an electric motor with alignments between the rotor and the stator marked.

FIG. 42 is a schematic diagram of an electric motor 4300 with alignments between the rotor 4308 and the stator marked 4301. Position D is defined as opposite stator & rotor poles being aligned, Q & Q' as fully unaligned (approaching similar poles and opposite poles respectively), and D' as similar stator and rotor poles aligned. Motor components and controls are sometimes discussed in reference to a D-axis 4302 and Q-axis 4304 of a motor rotor and/or stator. In such a transformed system, the direct axis, or D-axis 4302, in a motor may be defined as the center line of a pole perpendicular to the air gap 4306, and may be applied to either a stator pole 4308 or rotor pole 4312. A rotor may be characterized with a D-axis 4302 for each pole as viewed in the synchronous reference frame. In a motor with salient rotor poles and FPFCs, the D-axis 4302 is the center point of the resultant magnetic center of a pole with an FPFC regardless of whether the FPFC is concentrated to a single, large slot or spread across multiple, smaller slots. Stator poles can be similarly characterized.

The Q-axis 4304 is normal to the D-axis 4302 within the magnetic reference frame. In some implementations, the Q-axis 4304 is electrically normal to the D-axis 4302, and both lie in a plane in which the rotor rotates. In general, forces along the Q-axis 4304 generate an electromotive force, such as torque. Topologically, the Q-axis 4304 of a rotor or a stator is typically located directly between two poles.

In the D-Q reference frame, a current phasor angle is the relative angle of a rotor D-axis 4302 to the magnetic center of the stator. A positive current phasor angle indicates that the magnetic center of the stator is ahead of the rotor pole in a direction of motion. Such a situation results in the magnetic center of the stator "pulling" the rotor pole towards the magnetic center of the stator. Similarly, a negative current angle indicates that the magnetic center of the stator is behind the rotor pole. Such a situation "pulls" the rotor pole in the opposite direction. Such a negative current phasor angle can be used in braking situations. In some implementations, a current phasor angle of greater than 90° can be used. Such a large phasor current angle can "push" an adjacent pole in the direction of motion. Similarly, a current phasor angle of less than −90° can be used to "push" an adjacent pole in an opposite direction, such as during braking operations. Converting the current phasor angle between the stationary and synchronous reference frames can be done using the following equation:

$$\theta_e = (P/2)\theta_m, \qquad (1)$$

where $\theta_e$ is the current phasor angle in the synchronous reference frame, P is the number of stator poles, and $\theta_m$ is a current phasor angle in the stationary reference frame. Regardless of the current phasor angle, it can be broken down into a D-axis component and a Q-axis component. In general, for the motors and generators described herein, the D-axis component acts to "charge" or modulate the field within a rotor pole and FPFC while the Q-axis component acts to impart a force or torque onto the rotor pole.

Figures 43A, 43B:
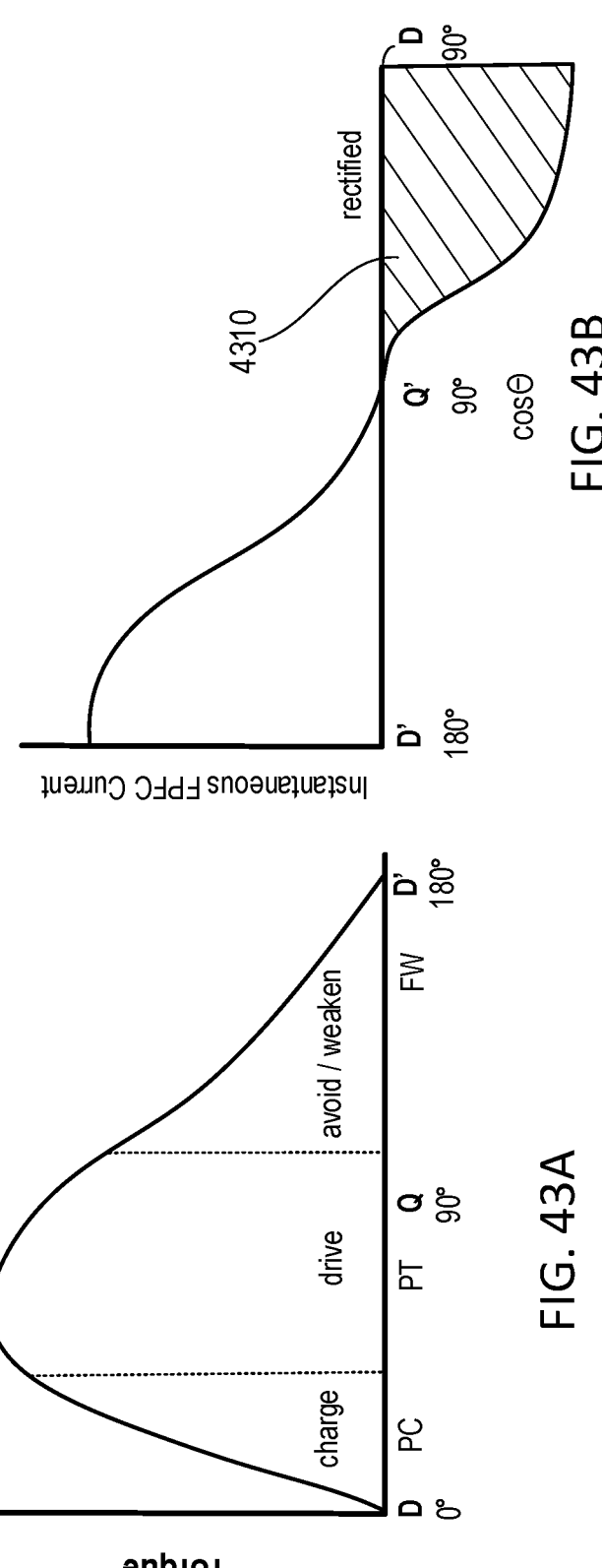
FIG. 43A is a graph showing torque of the rotor relative to the position of the rotor relative to the stator.
FIG. 43B is a graph showing the current flow within an FPFC during rotation of the rotor.

FIG. 43A is a graph showing torque of the rotor relative to the position of the rotor relative to the stator. In some implementations, especially in rotors with high saliency, peak toque occurs between the D and Q positions in the synchronous reference frame (e.g., due to its reluctance component). In other implementations, peak torque occurs between Q and D' positions. In instances where a permanent magnet motor is used, peak torque operation can cause demagnetization at high load and require field weakening at high speed. Weaker magnets can be used to the detriment of size/weight and/or torque production. To increase the magnetic current capabilities without risk of demagnetization FPFC's are used. FIG. 43B is a graph showing the current flow within an FPFC during rotation of the rotor. The negative current portion 4310 is present in the simple FPFC implementations, but is eliminated with rectified or active FPFC implementations. At lower torques, FPFC current can be allowed to reduce lowering cogging (resistive) torque and eliminating the need for active flux weakening of stronger permanent magnets. An advantage of FPFCs is that they can be flux weakened or strengthened (e.g., current decrease or increase within the FPFC and flux within the rotor pole itself) through control mechanisms, for instance, by modifying the current phasor angle of the synchronous excitation from the stator. There is no need for a secondary control system or additional commutation hardware such as in a wound rotor synchronous motor (e.g., to control the stator field).

Control schemes for the FPFC implementations included herein do not necessarily require additional stator-to-rotor coupling elements; rather, in some implementations, excitations are transmitted using the stator windings and FPFCs along with the rotor. This can help reduce a total number of components, increase performance (e.g., eliminating ohmic losses of brushes), eliminate physical contacts and wear components, reduce package size, and provide control flexibility compared to schemes that incorporate special detectors, sensors, wired or wireless connections, or brushes to transmit signals from stator to rotor.

In electric machine design, the stator and rotor are often coupled to enable power transfer and/or field modulation during operation. Couplings may be classified as direct coupling or indirect coupling. Direct coupling occurs between the stator and rotor along the primary operating air-gap. Indirect coupling occurs along a secondary interface away from the primary operating air-gap.

Direct couplings are typically characterized as inductively coupled, for example, a squirrel cage induction rotor is considered to be directly coupled to the stator. While direct coupling is common and easily controlled in asynchronous machine, direct coupling with synchronous machines can be difficult for reasons described throughout this disclosure and are difficult to control.

Indirect couplings operate along a secondary coupling and may be radial oriented or axially oriented, and may communicate via electrical contacts, inductive couplings along a separate air-gap, capacitively coupled, or optically coupled. While secondary coupling may be used for a variety of functions to improve the efficiency and/or overall controllability of an electric machine, additional components are often required that can increase the weight, complexity, failure frequency, and costs (both operating and capital costs) of machines that take advantage of such systems.

Motors and generators described in this disclosure are primarily energetically isolated (within standard electromagnetic shielding tolerances) where they use direct coupling to transmit power and signals between the stator and the rotor without the necessity of an indirect or secondary coupling. Direct coupling can control torque, speed, control flux of the rotor. The electric machines described herein include direct coupling between the rotor 404 and the stator 402 for both torque, speed, flux and signal coupling and control.

A frequency and harmonic independence can be observed in some implementations between the signal emitted by the stator, and the base operating frequency that determines rotor speed. In some implementations, the subject matter described herein is able to provide a constant excitation frequency to the rotor regardless of rotor speed, and even use the modulation of stator excitation such as frequency modulation as discussed herein under constant or dynamic speed conditions. Control of FPFCs does not rely on harmonic relationships between the stator and rotor, or base frequency and higher order harmonics, enabling the FPFCs in the rotor to be designed, and controlled, around specific parameters (e.g., control and material). Various controls schemes for FPFCs been discussed throughout this disclosure and are explored further herein.

In some instances, FPFCs may need to be, or benefit from being, charged when located on position D, or transitioning from position D to position Q. Charging may mean inducing current in the FPFC itself or transferring, increasing, or storing magnetic flux in the rotor, each of which may involve some power transfer from the stator to the rotor. Such a task can be accomplished in a variety of ways, for example, by modulating a current phasor angle of stator excitation (e.g., advancing or retarding the current angle of stator excitation as appropriate), increasing a frequency of change in the stator excitation current phasor angle, increasing amplitude of excitation current in the stator (or any of the stator's resultant signal components), or any combination thereof. In some instances, the FPFCs may be weakened (e.g., decreasing the level of current or magnetic flux present in the FPFC and/or rotor), for example, by operating on or near position D' (e.g., by transitioning from position Q to position D', or form position D' to Q'). Such a task can be accomplished in a variety of ways, such as modulating the current phasor angle (e.g., advancing or retarding the current angle of stator excitation as appropriate), decreasing the frequency of stator excitation current angle phasor change, decreasing the amplitude of excitation current in the stator, or any combination thereof. Alternatively or in addition too, field weakening can be accomplished through a passive loss of FPFC current via ohmic losses.

As previously mentioned, active field weakening of the FPFCs can be achieved by operating in D' or by replacing the using an active FPFC. Such implementations include a logic circuit, such as a transistor, that may be inductively or capacitively coupled and controlled, conventionally through slip rings or a commutator, or wirelessly which might include a means of optional control, e.g., a light emitting diode, photo sensor or primary control. Reversing rectification with the logic circuit causes a rapid reduction in FPFC current via the inductive coupling with the stator excitations. Leaving the gate 3412 (FIGS. 34A-35G) open will not allow current in the FPFCs to build and therefore no reactive current can be generated.

For any of implementations described throughout this disclosure, if a permanent magnetic material is used within the pole, the FPFC circuit winding and diode polarity can be arranged to provide various outputs. For instance, in some implementations the rectification can be constructive, such that they are constructive to the polarity or magnetomotive force (MMF) of the material. This provides magnetic shielding against unwanted fields and harmonics; rotor magnetic field augmentation, where the remnant magnetic field of the rotor pole is increased from a residual value during operation (e.g., amplification using the coils); and magnetic flux charging where a material is magnetized to a remnant field (e.g., fluxing of a material). In other implementations, the rectification can be deconstructive, such that they can decrement a magnetic field (e.g., field weaken). In some implementations with active FPFCs, the active FPFCs would allow for bi-directional rectification and the selective constructive or deconstructive rectification using logic gates and associated control.

All of the concepts and operations described herein can be applied to electric machines with wound rotors or permanent magnet assisted wound rotors. Specifics of increasing or decreasing/maintain charging in FPFCs dependent on speed, torque and other operating conditions. For example, high torque demand and low speed require more charging. For example, high speed low torque may demand the lowest average FPFC current possible while maintaining torque requirements. It should be noted that rotor speed is not intended to change when stator excitation advanced or retarded. Torque and speed remain constant until a control request dictates change.

Figure 44A:
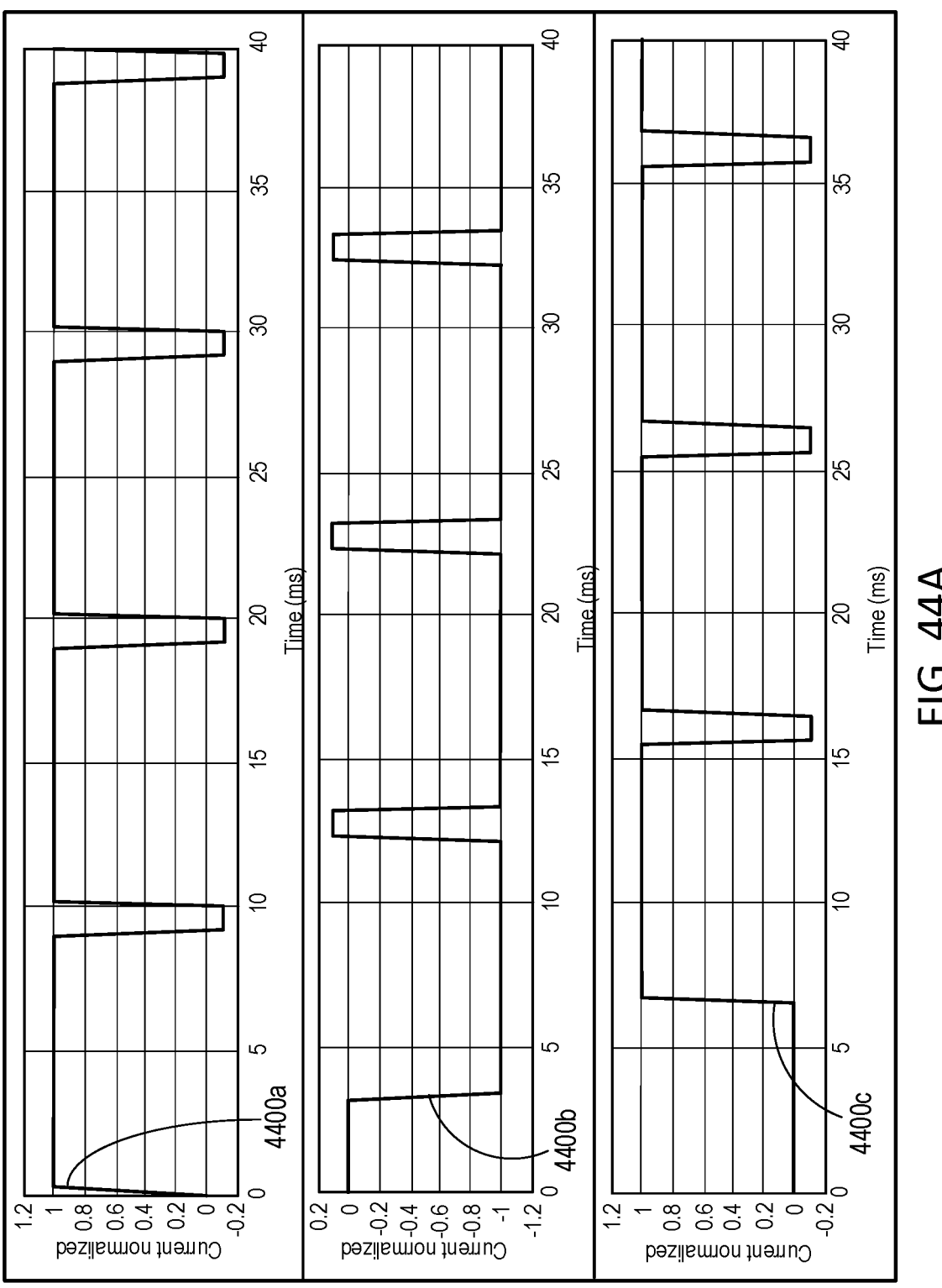
FIG. 44A is a set of graphs illustrating drive wave forms during a locked rotor condition.
Figure 44B:
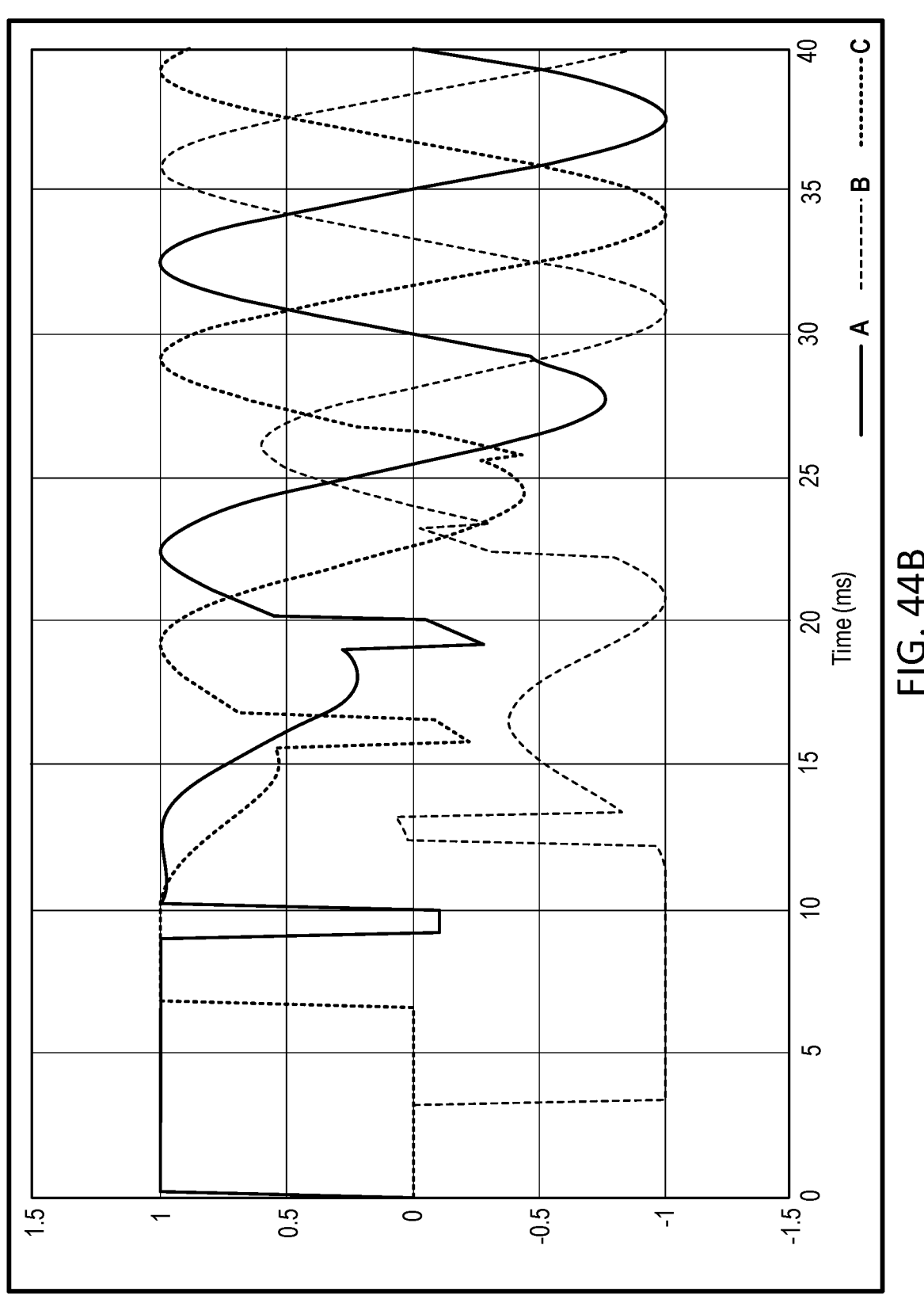
FIG. 44B is a graph illustrating the transition from locked rotor condition to moving rotor condition.

In distributed stator pole implementations, to maintain substantially zero torque ripple (in some implementations, equal to or less than 1%, in other implementations between 0-2%), the stator can be excited or amplified in the D position where the excitation alignment, or current phasor angle, works to augment the rotor field. The current phasor angle (and resultant magnetic field) can then be rotated to substantially near the peak torque position (or whatever the controller set point is) while maintaining synchronous timing. The excitation wave can periodically be shifted to the peak charge position to field strengthen the FPFC. In implementations where a rectified FPFC is used, the period of the excitation wave may not be equal. In such a situation, the current can be increased during the charge phase to compensate for flux leakage and reluctance torque. Three-phase excitation timing can be timed to keep the excitation wave leading the rotor or in the synchronous reference frame While steady state operation has been described, different drive waveforms may be needed for locked rotor (start-up) conditions. FIG. 44A is a set of graphs illustrating drive wave forms 4400*a*, 4400*b* and 4400*c* during a locked rotor condition. Each waveform, 4400*a*, 4400*b* and 4400*c*, is associated with a different phase of a 3-phase motor. During normal start-up of a synchronous machine, direct current is sent to each phase to have the rotor begin to rotate in the desired direction. With machines utilizing FPFCs, a periodic pulse of inverted current is used to charge the FPFCs until the rotor begins moving. This signal may range from a pulsed to continuous sine wave as a function of the rotor speed as described elsewhere in this document where, at higher speeds, the pulse and charge cycles overlap as the mechanical timing reaches the pulse frequency. Therefore the waveform adopts a fundamental wave. In some implementations, the quasi-direct current, or a transform thereof, is flowed for nine milliseconds, and the inverted direct current is pulsed for one millisecond. In some implementations, a ratio of duration of quasi-direct current to a duration of pulsing inverted current is 1:1 to 100:1. In some implementations, the ratio of duration of quasi-direct current to a duration of pulsing inverted current is 5:1 to 15:1. In some implementations, a ratio of duration of quasi-direct current to a duration of pulsing inverted current is 9:1. Regardless of the ratio used, once the rotor begins movement, the rotor can then be driven by an alternating current flowing through each of the phases. Such a transition is illustrated in FIG. 44B. FIG. 44B is a graph illustrating the transition from locked rotor condition to moving rotor condition. While the locked rotor conditions is illustrated as square waves and the drive frequency is illustrated as sinusoidal waves, other wave forms can be used for each operating condition without departing from this disclosure.

As previously described effects of FPFCs can vary under different frequencies. For example force can start to increase above a cutoff frequency, e.g., 10 hertz, and the increase between a lower frequency, e.g., 10 hertz, and a higher frequency, e.g., 105 hertz, can be more than one order of magnitude. At higher frequencies, an FPFC can exhibit stronger diamagnetic properties to concentrate the magnetic flux towards the rotor pole, which in turns increases the component of force along the motion direction.

The useful force can be also affected by operating conditions. Under saturated conditions and at a high frequency, the FPFCs can exhibit stronger diamagnetic properties to concentrate the magnetic flux towards the rotor pole, compared to in unsaturated conditions. The useful force can keep increasing when the frequency increases. For example, at a higher frequency, e.g., 105 hertz, the horizontal force can increase two orders of magnitude when a drive current increases from 10 Amp*turns (corresponding to an unsaturated operation condition) to 200 Amp*turns (corresponding to a saturated operation condition).

A number of teeth per pole can also have an effect on useful force. An increase in the number of teeth per pole can cause gradual increase in the force. However, when a gap size becomes larger, e.g., at 1.0 mm, the force may decrease when the number of teeth per pole increases.

The operation utilizes high-inductance and low-resistance FPFCs, resulting in a high reactance that is in phase with the magnetic field. As the magnetic field climbs through the primary coils and reluctance teeth, the magnetic field is reflected through the shielded teeth and results in high impedance to the magnetic field. This system can be operated through an alternating magnetic signal only through 50% of duty cycle (e.g., from unaligned to aligned). Continuing throughout the duty cycle (e.g., from aligned to unaligned) can result in inverse torque. In some implementations, an impedance matching or impedance network can be established.

A higher reactance FPFC can also enable a higher power factor system that can generate torque more efficiently compared to a conventional machine. The high reactance, high impedance FPFC design can prevent substantially all of the magnetic flux from penetrating the FPFC throughout the entire cycle of operation. In this way, the motor can benefit from diamagnetic properties previously only experienced in super conducting motors at a broad range of temperatures (e.g., room temp-elevated temp). This can also be less sensitive to temp as compared with permanent magnet motors, which tend to demagnetize above a critical temperature.

The motors described above with FPFCs can be driven dynamically with a square wave current. If it is driven dynamically, a square wave may be used at a relatively lower switching frequency than an equivalent sine wave to induce large reactance in the FPFC while pulsing at a relatively low frequency (such as 50 hertz). This is due in part to the high proportion of harmonic values in a square wave as opposed to a sine wave. This also decreases switching losses required by a power electronic device due to high frequently required by pulse-width modulation (PWM) switching. In such operation, relatively thin (e.g., 0.127 mm) laminations can be used to decrease eddy current loss in core iron and low gauge (e.g., 0.2 mm) or even Litz wire windings can be utilized in the primary coils to decrease skin effect losses in the core windings.

The motors described throughout this disclosure can also benefit from higher winding efficiency of the coils. Whereas the typical slot fill ratio of a winding is 30-40% of a given slot area, by utilizing casting techniques to fill FPFCs in slots between adjacent poles the motor can utilize substantially all (e.g., 85-95%) of the slot volume for the FPFCs. This can decrease the amount of total wire necessary for the primary winding of the motor, which can enable the primary winding to use less turns compared to a typical motor.

As noted above, filling the slots with FPFCs allows for the controlled concentration of the magnetic flux in operation of the motor. Specifically, when the stator and rotor are disposed in an unaligned state, significant internal electromagnetic reflection prevents the majority of magnetic communication from the opposing pole surfaces. This diamagnetic shielding allows the field slots to effectively push the rotor while the reluctance of the electromagnetic poles pull the rotor. This effect allows more energy per cycle to be produced from the system and is similar to the effect permanent magnets can produce in certain configurations.

This effect provides a notably advantage over permanent magnets, which may be subject to demagnetization by high eddy currents. This effect may be seen in a B-H curve examining coercivity of a permanent magnet. In the motors described throughout this disclosure, a high reactance FPFC can approximate a permanent magnet in the opposite direction with an infinite coercivity. Thus, the FPFC can reflect the imposed magnetic field to achieve magnetic field levels beyond what may be achieved in typical permanent magnet motors, which can increase torque density, power density, and efficiency by creating a larger back EMF. Moreover, whereas permanent magnets demagnetize at elevated temperatures as previously mentioned, FPFCs can be constructed of materials capable of withstanding temperatures over 100 degrees Fahrenheit hotter than typical permanent magnets.

Moreover, where permanent magnets produce a constant magnetic field, the FPFCs exists dynamically in a transient state. This benefits both efficiency and safety, as permanent magnet motors can result in dent torque, cogging torque, and braking torque, which can sometimes be catastrophic due to the EMF that can be produced whether or not power it utilized. The above motors can be controlled to effectively freewheel for long periods of time, with losses only from the resistance of the bearings.

Further, unlike an IM having significant inductive load that generates a continuous current, the current in each FPFC is allowed to go back to near zero each cycle. The higher the operating frequency of the motor, the lower the necessary current is required in each FPFC to maintain reflection. Because the system is reactive, energy is either returned elastically or translated into kinetic energy of the rotor in each switching cycle.

The FPFC slot filling can be tuned, both for a given application and dynamically during operation. Unlike air, the magnetic properties of the system can be tuned, both in amplitude of magnetomotive force (MMF) for a given position, and in frequency of the MMF. This allows for real time adaptation by weakening or strengthening the magnetic flux properties of the system by changing the switching frequency of the motor. This can change the back-EMF on the primary coil, which can allow the motor to achieve broader speed ranges than traditional motors. Traditional motors have a fixed back-EMF based on a fixed saliency ratio, which is used to change the magnitude of magnetic field. The motor can change the magnitude of the magnetic field, in addition to the activating frequency of the motor's operation.

At higher speeds, the motor can operate as a reactive reluctance motor. In conventional SRM operation, peak voltage is applied at onset of the unaligned position of stator and rotor (or the stator-rotor teeth) and current is rapidly increased until the stator and rotor (or the stator-rotor teeth) reach a point of alignment. At this point, a reverse voltage is applied and current then drops to zero. In a locked rotor (stall) condition in a conventional SRM, current is continuously applied rather than pulsed. In a motor with FPFCs, during stall current can be pulsed through an active coil. Once pole switching frequency exceeds the cross-over frequency of the FPFCs during motor acceleration, each pole may be excited by a single pulse.

Example Process

Implementations of the present disclosure provide a method of driving an electric motor. The electric motor can be the electric motor 102 of FIG. 1, and the method can be performed by a motor controller, e.g., the motor controller 107 of FIG. 1 or the controller 130 of FIG. 2.

During operation, the motor controller applies a pulse of magnetizing current over time to a stator coil of a stator pole when the stator pole is aligned with a rotor pole across a nominal gap. The magnetizing current is configured to charge a magnetic field within the rotor pole through induced direct coupling. Then, the motor controller applies a load current pulsed over time to the stator coil when rotor pole is positioned between adjacent stator poles. The load current pulses stiffen the magnetic field within the rotor pole. The pulsed load current include more pulses per increment of time than pulse the magnetizing current.

In some instances, the magnetizing current is applied as a single pulse of current over time. The single pulse of current can include a half-sine wave, a half-square wave, a half-trapezoidal wave, or any combination thereof. Applying the magnetizing current strongly couples the rotor pole to the stator pole. In some instances, for instance when a rotor has a sufficient field strength, no magnetizing (or less) current is applied when compared to previous time steps.

In some instances, the pulsed load current is applied as a rotor rotates from a first pole to a second pole. The multiple pulses of the pulsed load current can include half-sine waves, half-square waves, half-trapezoidal waves, full sine waves, full square waves, full trapezoidal waves, or any combination thereof. In some implementations, signals may have a DC offset. In some implementations, the multiple current pulses are not a function of a rotor speed. For example, in some implementations, the multiple current pulses are applied between five to ten hertz. In some implementations, the multiple current pulses are applied between 5-1000 hertz, 10-500 hertz, 50-350 hertz, or 100-200 hertz.

In some implementations, the controller maintains a rotor flux within a desired range during peak load condition. For example, the desired range can vary within 50-100%. In another example, the desired range can vary within 65-100%. In another example, the desired range can vary within 80-100%.

As previously described, the motor controller can adjust a strength of apparent magnetism within the permanent magnet channels, or any other permanent magnetic material within the rotor, by inducing a current within the FPFCs.

The previously described operating parameters can be performed by the controller by operating a first switch to open and close in multiple cycles between a voltage source and the electrical winding associated with the first active pole. The first switch can be associated with the first active pole and conductively coupled to the first active pole. The first switch can be the switch 134 of FIG. 2 or the power switch 200 of FIG. 2A.

Example Cooling and Heat Mitigation

Electric motors can generate significant heat during operation and require cooling, especially during higher frequency operation. An active cooling system can be used to provide intermittent or continuous cooling of surface by circulating a fluid coolant through the motor. The cooling system can be the cooling system as described in pending patent application Ser. 62/675,207, filed on May 23, 2018 and entitled "Electric Motor," the contents of which are expressly incorporated herein by reference as if set forth in their entirety.

Also, if operating temperatures are depressed, the efficiency and power of a FPFC can increase for a given frequency. Typically operating conditions are −80° C. to 300° C. Coolant may be added to the motor system to further suppress the temperature and increase the diamagnetic properties of a FPFC.

A coolant may be any conventional fluid used for heat mitigation. At operating conditions, the coolant may be a low viscosity fluid in the range of 1 to 500 centipoise, such as water or motor oil to allow for both high cooling efficiency and rotational dynamics. Coolant may also provide the damping of vibration generated during operation, as well as providing restorative force to harmonics that are generated at higher rotational speeds.

Active cooling may enable greater power density by providing a medium to absorb heat from electrical coils and mechanical contact surfaces. An active lubrication system may be used to provide intermittent or continuous lubrication of surface by circulating a fluid lubricant through the motor. For example, a fluid pump may mechanically promote a lubricant to flow from the fluid pump to the motor via fluid lines, where it may be discharged via directional nozzles to provide active lubrication and/or fluid cooling to specific locations within the motor. Fluid may then gravitationally collect in an oil pan at the base of the motor and flow via a return fluid line back to the pump for recirculation. In this way, a motor rotor assembly may operate in a cool, non-submerged environment. In addition, a portion of the lubricant may pass through a heat exchanger to add or remove heat from the lubricant in order to modulate the temperature and/or viscosity of the lubricant to meet the specific needs of an application.

A coolant may be any conventional fluid used for heat mitigation. At operating conditions, the coolant may be a low viscosity fluid in the range of 1 to 500 centipoise, such as water or motor oil to allow for both high cooling efficiency and rotational dynamics. Coolant may also provide the dampening of vibration generated during operation, as well as providing restorative force to harmonics that are generated at higher rotational speeds.

The motor may include a collection pan to gravitationally collect the coolant discharged within the motor assembly and direct it toward a return fluid line.

The coolant system may have a fluid pump that provides a pressure gradient to the coolant resulting in circulation through the fluid system. Such a pump may be a fixed displacement pump, such as a rotary pump, or a variable displacement pumps, such as a gear or piston pump. The pump may be operationally connected to a mechanical or electrical power source and may be operated continuously or intermittently during motor operation. A wet sump active lubrication system may have a single fluid pump operationally connected to a collection pan to circulate oil through fluid lines and within the cooled system. In this case, the majority of the oil supply is located in the collection pan. Alternatively, multiple fluid pumps may be operated in a dry sump active coolant configuration where fluid from the collection pan is continuously pumped into a holding tank, preferably with a large height relative to its cross-sectional area, and a second pump may pump the fluid under a separate, controlled flow rate back to the motor to complete coolant circulation.

The coolant system may have one or more directional nozzles to direct coolant to specific locations within the motor assembly including, for example, the stator poles.

Other Implementations

Any of the above-described motors can be controlled to generate electrical energy from dynamic energy (such as for regeneratively braking the motor). This may be accomplished by altering the timing of the excitation signal such that stator current is pulsed at the point of minimum air gap (or even slightly lagging the point of minimum air gap) to generate forward EMF during expansion. In this manner, electrical current can be generated and directed to storage in an associated battery while a deceleration torque is applied to the rotor to slow the motor, even though the motor is not mechanically back drivable by torque applied to the output shaft.

Any of the above-described motors can be controlled to generate electrical energy from dynamic energy (such as for regeneratively braking the motor). This may be accomplished by altering the timing of the compression wave such that stator current is pulsed at the point of minimum air gap (or even slightly lagging the point of minimum air gap) to generate forward EMF during expansion. In this manner, electrical current can be generated and directed to storage in an associated battery while a deceleration torque is applied to the rotor to slow the motor, even though the motor is not mechanically back-drivable by torque applied to the output shaft.

While a number of examples have been described for illustration purposes, the foregoing description is not intended to limit the scope of the concepts described herein, which is defined by the scope of the appended claims. There are and will be other examples and modifications within the scope of the following claims. Other implementations and modifications are within the scope of the following claims and have the benefit of this disclosure. It is intended to embrace all such implementations and modifications and, accordingly, the above description to be regarded as illustrative rather than in a restrictive sense. In some cases, the actions or methods recited in the claims can be performed in a different order and still achieve desirable results. In addition, the processes depicted in the accompanying figures do not necessarily require the particular order shown, or sequential order, to achieve desirable results, and various elements may be added, reordered, combined, omitted, or modified.

What is claimed is:

1. A synchronous electric machine comprising:
a stator defining multiple stator poles with associated electrical windings that overlap one another;
a rotor comprising multiple rotor poles, the rotor movable with respect to the stator and defining, together with the stator, a nominal gap between the stator poles and the rotor poles, the rotor poles comprising a magnetically permeable pole material;
a stator-rotor coupling configured to wirelessly communicate signals between the stator and a circuit on the rotor; and
wherein the signals include a constant excitation frequency to the rotor regardless of rotor speed.

2. The synchronous electric machine of claim 1, wherein the stator-rotor coupling is configured to perform wireless power transfer from the stator to the rotor.

3. The synchronous electric machine of claim 1, wherein the signals between the stator and the rotor provide torque, speed, flux and signal coupling or control.

4. The synchronous electric machine of claim 1, wherein the signals include modulation of stator excitation under constant or dynamic speed conditions.

5. A synchronous electric machine comprising:
a stator defining multiple stator poles with associated electrical windings that overlap one another;
a rotor comprising multiple rotor poles, the rotor movable with respect to the stator and defining, together with the stator, a nominal gap between the stator poles and the rotor poles, the rotor poles comprising a magnetically permeable pole material; and
a stator-rotor coupling configured to wirelessly communicate signals between the stator and a circuit on the rotor,
wherein the circuit includes a frequency programmable flux channel (FPFC).

6. The synchronous electric machine of claim 5, wherein current induced in the FPFC generates a magnetic field configured to oppose an alternating magnetic field induced between the stator and the rotor, thereby producing a repelling force therebetween.

7. A synchronous electric machine comprising:
a stator defining multiple stator poles with associated electrical windings that overlap one another;
a rotor comprising multiple rotor poles, the rotor movable with respect to the stator and defining, together with the stator, a nominal gap between the stator poles and the rotor poles, the rotor poles comprising a magnetically permeable pole material; and
a stator-rotor coupling configured to wirelessly communicate signals between the stator and a circuit on the rotor,
wherein the circuit includes a logic circuit of an active FPFC.

8. A synchronous electric machine comprising:
a stator defining multiple stator poles with associated electrical windings that overlap one another;
a rotor comprising multiple rotor poles, the rotor movable with respect to the stator and defining, together with the stator, a nominal gap between the stator poles and the rotor poles, the rotor poles comprising a magnetically permeable pole material; and
a stator-rotor coupling configured to wirelessly communicate signals between the stator and a circuit on the rotor,
wherein the stator-rotor coupling includes a plurality of frequency programmable flux channels (FPFCs), and wherein current induced in the each FPFC generates a magnetic field configured to oppose an alternating magnetic field induced between the stator and the rotor, thereby producing a repelling force therebetween.

9. The synchronous electric machine of claim 8, wherein the repelling force concentrates or redirects magnetic flux of the magnetic field substantially tangentially along a direction of relative motion between the rotor and the stator to increase a force available to do work by the synchronous electric machine.

10. The synchronous electric machine of claim 8, wherein the magnetic field configured to oppose an alternating magnetic field is a reflective or resistant magnetic field, such that each FPFC controllably attenuates a change in total magnetic flux of the synchronous electric machine during operation.

11. The synchronous electric machine of claim 8, wherein each rotor pole and associated FPFCs are salient and non-overlapping with respect to other rotor poles and associated FPFCs.

12. The synchronous electric machine of claim 8, wherein the stator and the rotor are arranged such that the electrical windings in the stator induce an excitement current within at least one of the FPFCs during start-up or wherein the stator and the rotor are arranged such that the electrical windings in the stator magnetize at least one of the rotor poles during start-up.

13. The synchronous electric machine of claim 8, wherein each of the FPFCs do not overlap with an adjacent FPFC.

14. The synchronous electric machine of claim 8, wherein each FPFC comprises a conductive loop surrounding an associated rotor pole.

15. The synchronous electric machine of claim 14, wherein the conductive loop comprises a substantially uniform inductance.

16. The synchronous electric machine of claim 14, wherein the conductive loop comprises a rectifier in series with two ends of the conductive loop.

17. The synchronous electric machine of claim 14, wherein the conductive loop includes a discrete capacitor or a logic circuit in series with two ends of the conductive loop configured to tune the FPFC to be responsive to specified frequencies.

18. The synchronous electric machine of claim 14, wherein the conductive loop is a first conductive loop and the rotor pole is a first rotor pole, and wherein each FPFC further comprises a second conductive loop the associated rotor pole and an additional rotor pole adjacent the first rotor pole.

19. A synchronous electric machine comprising:

a stator defining multiple stator poles with associated electrical windings that overlap one another;

a rotor comprising multiple rotor poles, the rotor movable with respect to the stator and defining, together with the stator, a nominal gap between the stator poles and the rotor poles, the rotor poles comprising a magnetically permeable pole material; and a stator-rotor coupling configured to wirelessly communicate signals between the stator and a circuit on the rotor, further comprising a controller configured to:

apply a pulse of magnetizing current over time to a stator coil of a stator pole when the stator pole is aligned with a rotor pole across a nominal gap, wherein the magnetizing current is configured to charge a magnetic field within the rotor pole through induced coupling; and apply a load current pulsed over time to the stator coil when rotor pole is positioned between adjacent stator poles, wherein the load current pulses stiffen the magnetic field within the rotor pole, and wherein the pulsed load current comprising more pulses per increment of time than pulse the magnetizing current.

* * * * *